United States Patent
Shigemitsu

(10) Patent No.: US 10,228,536 B2
(45) Date of Patent: Mar. 12, 2019

(54) LENS ELEMENT, IMAGE CAPTURING DEVICE, AND IMAGING LENS

(71) Applicant: Sharp Kabushiki Kaisha, Sakai, Osaka (JP)

(72) Inventor: Norimichi Shigemitsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 69 days.

(21) Appl. No.: 15/300,903

(22) PCT Filed: Mar. 3, 2015

(86) PCT No.: PCT/JP2015/056245
§ 371 (c)(1),
(2) Date: Sep. 30, 2016

(87) PCT Pub. No.: WO2015/151697
PCT Pub. Date: Oct. 8, 2015

(65) Prior Publication Data
US 2017/0023775 A1    Jan. 26, 2017

(30) Foreign Application Priority Data

| Apr. 4, 2014 | (JP) | 2014-078139 |
| Apr. 4, 2014 | (JP) | 2014-078140 |
| Apr. 4, 2014 | (JP) | 2014-078141 |
| Nov. 7, 2014 | (JP) | 2014-227453 |

(51) Int. Cl.
*H04N 5/225* (2006.01)
*G02B 13/00* (2006.01)
(Continued)

(52) U.S. Cl.
CPC .......... *G02B 13/0045* (2013.01); *G02B 3/04* (2013.01); *G02B 5/208* (2013.01); *G02B 7/04* (2013.01);
(Continued)

(58) Field of Classification Search
CPC ......... G02B 15/00–15/28; G02B 23/16; G03B 9/04–9/043; G03B 9/048; G03B 9/06
See application file for complete search history.

(56) References Cited

U.S. PATENT DOCUMENTS

| 6,014,265 A | 1/2000 | Kato et al. |
| 6,411,443 B1 | 6/2002 | Kato et al. |

(Continued)

FOREIGN PATENT DOCUMENTS

| CN | 1601307 A | 3/2005 |
| CN | 102687051 A | 9/2012 |

(Continued)

OTHER PUBLICATIONS

Official Communication issued in International Patent Application No. PCT/JP2015/056245, dated Jun. 2, 2015.

*Primary Examiner* — Daniel M Pasiewicz
*Assistant Examiner* — Selam T Gebriel
(74) *Attorney, Agent, or Firm* — Keating & Bennett, LLP

(57) ABSTRACT

There is provided a lens element which is capable of obtaining a small-sized image capturing device with excellent resolving power, and an image capturing device including the lens element. A shape of an outer profile of an image side surface (L2) is substantially rectangular.

11 Claims, 96 Drawing Sheets

(51) Int. Cl.
   *G02B 13/18*   (2006.01)
   *G02B 3/04*    (2006.01)
   *G02B 5/20*    (2006.01)
   *G02B 7/04*    (2006.01)
   *G02B 9/62*    (2006.01)
   *G02B 27/00*   (2006.01)
   *H04N 5/369*   (2011.01)
   *G02B 7/22*    (2006.01)
   *G02B 7/08*    (2006.01)
   *G02B 27/64*   (2006.01)

(52) U.S. Cl.
   CPC ............... *G02B 7/22* (2013.01); *G02B 9/62* (2013.01); *G02B 13/0025* (2013.01); *G02B 13/18* (2013.01); *G02B 27/0025* (2013.01); *H04N 5/2253* (2013.01); *H04N 5/2254* (2013.01); *H04N 5/369* (2013.01); *G02B 7/08* (2013.01); *G02B 27/646* (2013.01)

(56) References Cited

U.S. PATENT DOCUMENTS

| | | | |
|---|---|---|---|
| 2005/0068456 A1 | 3/2005 | Ohta et al. | |
| 2010/0027135 A1* | 2/2010 | Sodeyama | G02B 7/021 |
| | | | 359/740 |
| 2010/0073531 A1* | 3/2010 | Yano | B26D 3/08 |
| | | | 348/294 |
| 2011/0134305 A1 | 6/2011 | Sano et al. | |
| 2011/0149143 A1 | 6/2011 | Tsujino | |
| 2011/0194014 A1* | 8/2011 | Ozaki | G02B 13/0035 |
| | | | 348/340 |
| 2012/0262805 A1 | 10/2012 | Fujii et al. | |
| 2013/0176469 A1 | 7/2013 | Sano et al. | |
| 2013/0265660 A1* | 10/2013 | Yoshida | G02B 7/021 |
| | | | 359/811 |

FOREIGN PATENT DOCUMENTS

| | | |
|---|---|---|
| JP | 11-119102 A | 4/1999 |
| JP | 2004-302095 A | 10/2004 |
| JP | 2009-145597 A | 7/2009 |
| JP | 2009-544226 A | 12/2009 |
| JP | 2011-049275 A | 3/2011 |
| JP | 2011-128355 A | 6/2011 |
| JP | 2012-163963 A | 8/2012 |
| JP | 2013-153537 A | 8/2013 |
| JP | 2013-186338 A | 9/2013 |
| JP | 2014-029547 A | 2/2014 |
| WO | 2008/011003 A2 | 1/2008 |
| WO | 2012/169778 A2 | 12/2012 |

* cited by examiner

1: LENS ELEMENT
2: IMAGING ELEMENT
3: LIGHT RECEIVING UNIT
4: LAMINATE SUBSTRATE
6: TOP SURFACE OF LAMINATE SUBSTRATE
8: LENS
9: FLIP-CHIP BOND
14: FLANGE PORTION
L1: OBJECT SIDE SURFACE
L2: IMAGE SIDE SURFACE

1: LENS ELEMENT
2: IMAGING ELEMENT
3: LIGHT RECEIVING UNIT
4: LAMINATE SUBSTRATE
6: TOP SURFACE OF LAMINATE SUBSTRATE
7: INFRARED RAY-CUTTING GLASS
8: LENS
9: FLIP-CHIP BOND
10: MOUNTING COMPONENT
14: FLANGE PORTION
17: PROJECTION PORTION
18: END PORTION OF PROJECTION PORTION
L1: OBJECT SIDE SURFACE
L2: IMAGE SIDE SURFACE
La: OPTICAL AXIS

| | |
|---|---|
| 1: LENS ELEMENT | M0: APERTURE DIAPHRAGM |
| 7: INFRARED RAY-CUTTING GLASS | M1: FIRST LENS |
| 8: LENS | M2: SECOND LENS |
| | M3: THIRD LENS |
| | M4: FOURTH LENS |

| | |
|---|---|
| 1: LENS ELEMENT | L1: OBJECT SIDE SURFACE |
| 19: GATE CUTTING UNIT | L2: IMAGE SIDE SURFACE |

| 1: LENS ELEMENT | 20: BONDING WIRE |
| 2: IMAGING ELEMENT | 21: SENSOR COVER |
| 3: LIGHT RECEIVING UNIT | 22: OPENING |
| 4': LAMINATE SUBSTRATE | 23: FLANGE STOPPER |
| 7: INFRARED RAY-CUTTING GLASS | 24: TOP SURFACE OF FLANGE STOPPER |
| 8: LENS | 25: ADHESIVE |
| 14: FLANGE PORTION | |

47: FLIP-CHIP SUBSTRATE
48: BUMP

2: IMAGING ELEMENT
3: LIGHT RECEIVING UNIT
L2: IMAGE SIDE SURFACE
La: OPTICAL AXIS

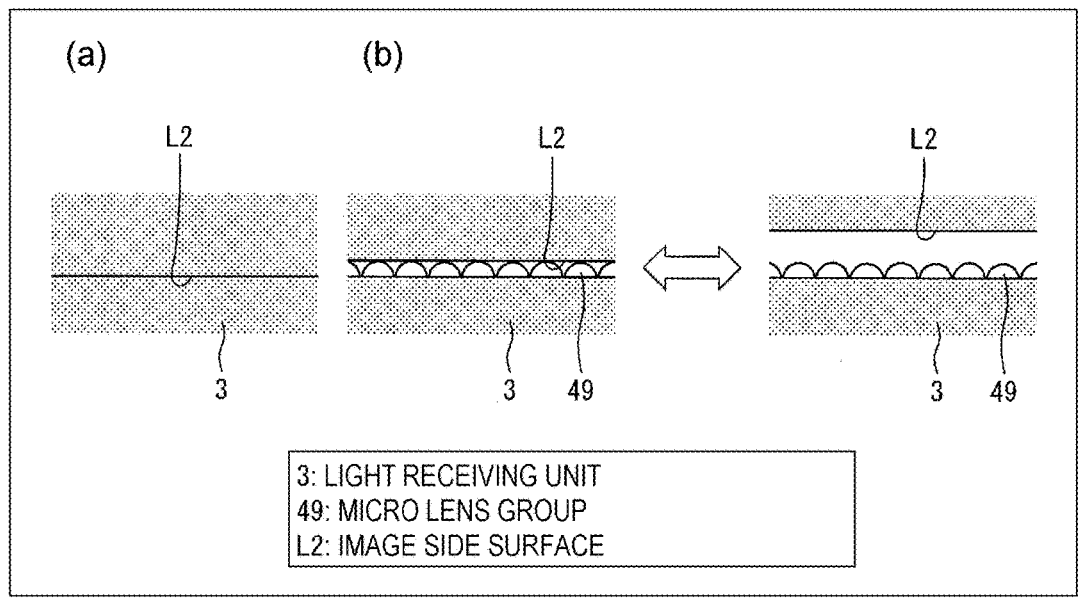
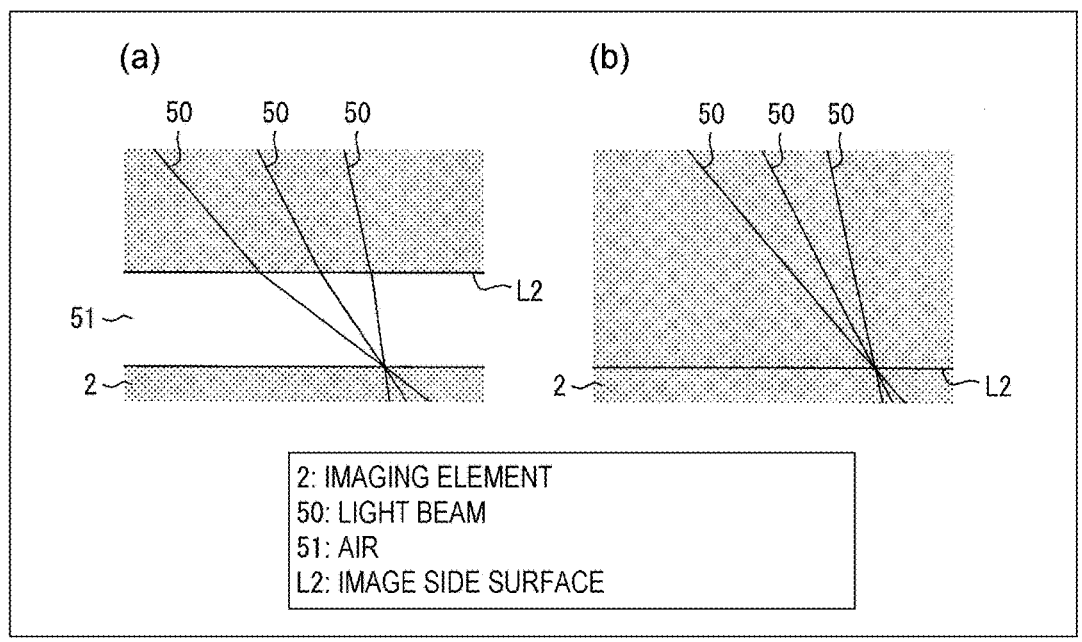

1: LENS ELEMENT
10: MOUNTING COMPONENT
13: STEP PORTION
14: FLANGE PORTION
47: FLIP-CHIP SUBSTRATE
53: TOP SURFACE OF FLIP-CHIP SUBSTRATE
54: SPACE

1: LENS ELEMENT
7: INFRARED RAY-CUTTING GLASS
21: SENSOR COVER
55: ELEMENT ATTACHMENT PORTION
56: OPENING
Ln: NORMAL DIRECTION

1: LENS ELEMENT
56: OPENING

1: LENS ELEMENT
58: POINT OF INFLECTION
L1: OBJECT SIDE SURFACE

FIG. 32

ASPHERICAL SURFACE EQUATION $$Z = \frac{x^2/R}{1+\sqrt{1-(1+K)\cdot x^2/R}} + \sum_{i=4}^{\infty} A_i \cdot x^i$$

| ELEMENT | MATERIAL Nd | νd | SURFACE | CURVATURE /mm-1 | CENTER THICKNESS /mm | RADIUS /mm | ASPHERIC COEFFICIENT | | | | | | | |
|---|---|---|---|---|---|---|---|---|---|---|---|---|---|---|
| | | | | | | | Conic | A4 | A6 | A8 | A10 | A12 | A14 | A16 |
| L0V | - | - | s0V | 0.00000E+00 | -0.411 | 1.204 | 0.00000E+00 | 0.00000E+00 | 0.00000E+00 | 0.00000E+00 | 0.00000E+00 | 0.00000E+00 | 0.00000E+00 | 0.00000E+00 |
| L1V | 1.544 | 55.9 | s1V | 4.86344E-01 | 0.666 | 1.252 | 0.00000E+00 | 9.88084E-03 | -7.55797E-03 | 1.07753E-02 | -5.71256E-03 | 1.92070E-03 | 0.00000E+00 | 0.00000E+00 |
| | | | s2V | -7.32510E-02 | 0.059 | 1.242 | 0.00000E+00 | 3.70885E-02 | 1.65464E-03 | -1.45738E-02 | 1.14360E-02 | -3.05923E-03 | 0.00000E+00 | 0.00000E+00 |
| L2V | 1.614 | 25.6 | s3V | 3.71471E-01 | 0.239 | 1.241 | 0.00000E+00 | -1.59669E-01 | 1.74807E-01 | -1.44136E-01 | 6.71376E-02 | -1.52104E-02 | 0.00000E+00 | 0.00000E+00 |
| | | | s4V | 7.23766E-01 | 0.526 | 1.242 | 0.00000E+00 | -2.31740E-01 | 2.01061E-01 | -1.60560E-01 | 7.20143E-02 | -1.67955E-02 | 0.00000E+00 | 0.00000E+00 |
| L3V | 1.544 | 55.9 | s5V | 1.31851E-01 | 0.692 | 1.400 | 0.00000E+00 | -1.69490E-02 | -1.96136E-02 | 2.03479E-02 | -1.71831E-02 | 5.64143E-03 | 0.00000E+00 | 0.00000E+00 |
| | | | s6V | -3.46781E-01 | 0.131 | 1.496 | 0.00000E+00 | 3.76160E-02 | -6.67010E-02 | 4.42176E-02 | -1.67293E-02 | 2.38421E-03 | 0.00000E+00 | 0.00000E+00 |
| L4V | 1.614 | 25.6 | s7V | -6.13288E-01 | 0.395 | 1.569 | 0.00000E+00 | 1.58810E-01 | -9.68375E-02 | 8.18620E-02 | -2.91670E-02 | 4.23819E-03 | 0.00000E+00 | 0.00000E+00 |
| | | | s8V | -3.60724E-01 | 0.381 | 1.737 | 0.00000E+00 | 6.68179E-03 | 2.16807E-02 | -5.55908E-03 | 2.88669E-03 | -6.16117E-04 | 0.00000E+00 | 0.00000E+00 |
| L5V | 1.544 | 55.9 | s9V | 4.26160E-01 | 0.798 | 2.201 | 0.00000E+00 | -1.25740E-01 | 4.41753E-02 | -1.99551E-02 | 4.51834E-03 | -3.67361E-04 | 0.00000E+00 | 0.00000E+00 |
| | | | s10V | 3.57267E-01 | 0.381 | 2.626 | 0.00000E+00 | -4.79058E-02 | 7.41368E-02 | -1.20268E-03 | 2.01101E-05 | 1.76284E-06 | 0.00000E+00 | 0.00000E+00 |
| CGV | 1.517 | 64.2 | s11V | 0.00000E+00 | 0.210 | 2.747 | 0.00000E+00 | 0.00000E+00 | 0.00000E+00 | 0.00000E+00 | 0.00000E+00 | 0.00000E+00 | 0.00000E+00 | 0.00000E+00 |
| | | | s12V | 0.00000E+00 | 0.416 | 2.780 | 0.00000E+00 | 0.00000E+00 | 0.00000E+00 | 0.00000E+00 | 0.00000E+00 | 0.00000E+00 | 0.00000E+00 | 0.00000E+00 |
| LOCV | 1.544 | 55.9 | s13V | -3.38423E-01 | 0.200 | 2.790 | 0.00000E+00 | 6.41728E-02 | 1.45864E-02 | -2.80302E-03 | 1.60845E-04 | 0.00000E+00 | 0.00000E+00 | 0.00000E+00 |
| | | | s14V | 0.00000E+00 | 0.100 | 2.966 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | - | - | s15V | 0.00000E+00 | - | - | 0.00000E+00 | 0.00000E+00 | 0.00000E+00 | 0.00000E+00 | 0.00000E+00 | 0.00000E+00 | 0.00000E+00 | 0.00000E+00 |

FIG. 38

| ELEMENT | MATERIAL | | SURFACE | CURVATURE /mm⁻¹ | CENTER THICKNESS /mm | RADIUS /mm | ASPHERIC COEFFICIENT | | | | | | | |
|---|---|---|---|---|---|---|---|---|---|---|---|---|---|---|
| | Nd | νd | | | | | Conic | A4 | A6 | A8 | A10 | A12 | A14 | A16 |
| L0V | - | - | s0V | 0.00000E+00 | -0.402 | 1.148 | 0.000000E+00 | 0.000000E+00 | 0.000000E+00 | 0.000000E+00 | 0.000000E+00 | 0.000000E+00 | 0.000000E+00 | 0.000000E+00 |
| L1V | 1.544 | 55.9 | s1V | 5.21059E-01 | 0.654 | 1.194 | 0.000000E+00 | 1.17789E-02 | -7.13444E-03 | 8.37675E-03 | -3.18975E-03 | 1.61631E-03 | 4.85203E-06 | 0.000000E+00 |
| | | | s2V | -7.99405E-02 | 0.026 | 1.183 | 0.000000E+00 | 5.16975E-02 | -1.25243E-02 | -6.92553E-03 | 1.25134E-02 | -5.09953E-03 | 0.000000E+00 | 0.000000E+00 |
| L2V | 1.614 | 25.6 | s3V | 3.70279E-01 | 0.230 | 1.179 | 0.000000E+00 | -1.68854E-01 | 1.99010E-01 | -1.66457E-01 | 8.12956E-02 | -2.12697E-02 | 0.000000E+00 | 0.000000E+00 |
| | | | s4V | 7.32921E-01 | 0.481 | 1.174 | 0.000000E+00 | -2.48134E-01 | 2.27481E-01 | -1.66936E-01 | 6.80477E-02 | -1.45679E-02 | 0.000000E+00 | 0.000000E+00 |
| L3V | 1.544 | 55.9 | s5V | 1.16843E-01 | 0.605 | 1.288 | 0.000000E+00 | -2.09574E-02 | -2.89876E-02 | 2.72371E-02 | -2.70233E-02 | 1.16737E-02 | 0.000000E+00 | 0.000000E+00 |
| | | | s6V | -3.57326E-01 | 0.107 | 1.381 | 0.000000E+00 | 3.86931E-02 | -6.53262E-02 | 3.38134E-02 | -1.16697E-02 | 1.49082E-03 | 0.000000E+00 | 0.000000E+00 |
| L4V | 1.614 | 25.6 | s7V | -6.66765E-01 | 0.346 | 1.442 | 0.000000E+00 | 1.84041E-01 | -9.91751E-02 | 1.02259E-01 | -4.42576E-02 | 7.86236E-03 | 0.000000E+00 | 0.000000E+00 |
| | | | s8V | -4.08896E-01 | 0.414 | 1.632 | 0.000000E+00 | 2.03019E-02 | 2.27326E-02 | 2.68292E-03 | -1.80477E-03 | -2.17095E-05 | 1.17036E-06 | 0.000000E+00 |
| L5V | 1.544 | 55.9 | s9V | 4.29308E-01 | 0.764 | 2.153 | 0.000000E+00 | -1.31393E-01 | 4.69389E-02 | -2.09255E-02 | 4.70083E-03 | -3.83563E-04 | 1.19463E-08 | 0.000000E+00 |
| | | | s10V | 3.56327E-01 | 0.351 | 2.571 | 0.000000E+00 | -5.38643E-02 | 9.87333E-03 | -1.69446E-03 | 4.02458E-05 | 1.60480E-06 | 1.98031E-09 | 0.000000E+00 |
| CGV | 1.517 | 64.2 | s11V | 0.00000E+00 | 0.210 | 2.742 | 0.000000E+00 | 0.000000E+00 | 0.000000E+00 | 0.000000E+00 | 0.000000E+00 | 0.000000E+00 | 0.000000E+00 | 0.000000E+00 |
| | | | s12V | 0.00000E+00 | 0.419 | 2.780 | 0.000000E+00 | 0.000000E+00 | 0.000000E+00 | 0.000000E+00 | 0.000000E+00 | 0.000000E+00 | 0.000000E+00 | 0.000000E+00 |
| L0CV | 1.544 | 55.9 | s13V | -3.37749E-01 | 0.199 | 2.789 | 0.000000E+00 | 1.90856E-01 | 1.74779E-02 | -3.39630E-03 | 1.98563E-04 | -3.00628E-08 | 0.000000E+00 | 0.000000E+00 |
| | | | s14V | 0.00000E+00 | 0.100 | 2.964 | 0.000000E+00 | 0.000000E+00 | 0.000000E+00 | 0.000000E+00 | 0.000000E+00 | 0.000000E+00 | 0.000000E+00 | 0.000000E+00 |
| IMAGE SURFACE | - | - | s15V | 0.00000E+00 | | | | | | | | | | |

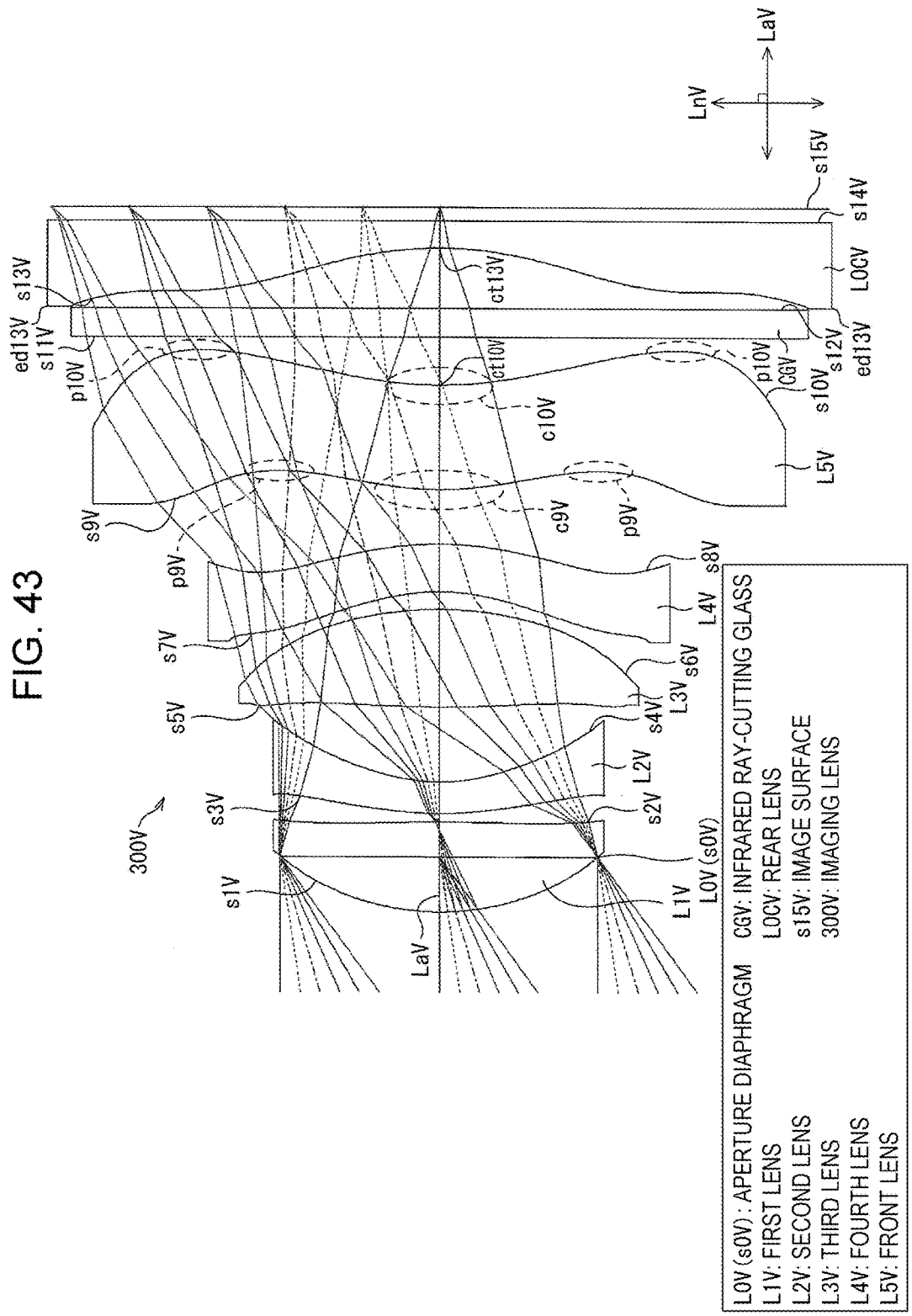

FIG. 44

| ELEMENT | MATERIAL | | SURFACE | CURVATURE /mm-1 | CENTER THICKNESS /mm | RADIUS /mm | ASPHERIC COEFFICIENT | | | | | | | |
|---|---|---|---|---|---|---|---|---|---|---|---|---|---|---|
| | Nd | νd | | | | | Conic | A4 | A6 | A8 | A10 | A12 | A14 | A16 |
| L0V | - | - | s0V | 0.00000E+00 | -0.405 | 1.204 | 0.000000E+00 | 0.000000E+00 | 0.000000E+00 | 0.000000E+00 | 0.000000E+00 | 0.000000E+00 | 0.000000E+00 | 0.000000E+00 |
| L1V | 1.544 | 55.9 | s1V | 4.82160E-01 | 0.662 | 1.252 | 0.000000E+00 | 9.39229E-03 | -7.45156E-03 | 1.06500E-02 | -5.72533E-03 | 1.92380E-03 | 0.000000E+00 | 0.000000E+00 |
| | | | s2V | -7.29025E-02 | 0.061 | 1.244 | 0.000000E+00 | 3.62362E-02 | 2.00864E-03 | -1.45797E-02 | 1.12625E-02 | -2.91903E-03 | 0.000000E+00 | 0.000000E+00 |
| L2V | 1.614 | 25.6 | s3V | 3.79296E-01 | 0.232 | 1.246 | 0.000000E+00 | -1.59298E-01 | 1.74453E-01 | -1.44024E-01 | 6.72420E-02 | -1.52577E-02 | 0.000000E+00 | 0.000000E+00 |
| | | | s4V | 7.20351E-01 | 0.551 | 1.252 | 0.000000E+00 | -2.29565E-01 | 2.00334E-01 | -1.60729E-01 | 7.27622E-02 | -1.70833E-02 | 0.000000E+00 | 0.000000E+00 |
| L3V | 1.544 | 55.9 | s5V | 1.16805E-01 | 0.721 | 1.416 | 0.000000E+00 | -1.93698E-02 | -1.94520E-02 | 2.02415E-02 | -1.72212E-02 | 5.65439E-03 | 0.000000E+00 | 0.000000E+00 |
| | | | s6V | -3.61549E-01 | 0.130 | 1.511 | 0.000000E+00 | 3.27731E-02 | -6.77002E-02 | 4.52873E-02 | -1.68298E-02 | 2.28348E-03 | 0.000000E+00 | 0.000000E+00 |
| L4V | 1.614 | 25.6 | s7V | -6.09685E-01 | 0.348 | 1.587 | 0.000000E+00 | 1.56973E-01 | -9.72673E-02 | 8.17558E-02 | -2.90896E-02 | 4.22122E-03 | 0.000000E+00 | 0.000000E+00 |
| | | | s8V | -3.53529E-01 | 0.401 | 1.745 | 0.000000E+00 | 8.76220E-03 | 2.16671E-02 | -5.75944E-03 | 2.82187E-03 | -5.90579E-04 | 0.000000E+00 | 0.000000E+00 |
| L5V | 1.544 | 55.9 | s9V | 4.24740E-01 | 0.771 | 2.193 | 0.000000E+00 | -1.25796E-01 | 4.39183E-02 | -1.99826E-02 | 4.51987E-03 | -3.65488E-04 | 0.000000E+00 | 0.000000E+00 |
| | | | s10V | 3.41506E-01 | 0.356 | 2.615 | 0.000000E+00 | -4.68059E-02 | 7.38072E-03 | -1.19766E-03 | 2.27458E-05 | 1.78865E-06 | 0.000000E+00 | 0.000000E+00 |
| CGV | 1.517 | 64.2 | s11V | 0.00000E+00 | 0.210 | 2.750 | 0.000000E+00 | 0.000000E+00 | 0.000000E+00 | 0.000000E+00 | 0.000000E+00 | 0.000000E+00 | 0.000000E+00 | 0.000000E+00 |
| | | | s12V | 0.00000E+00 | 0.442 | 2.783 | 0.000000E+00 | 0.000000E+00 | 0.000000E+00 | 0.000000E+00 | 0.000000E+00 | 0.000000E+00 | 0.000000E+00 | 0.000000E+00 |
| LOCV | 1.614 | 25.6 | s13V | -3.39765E-01 | 0.200 | 2.793 | 0.000000E+00 | 5.96662E-03 | 1.40354E-02 | -2.71845E-02 | 1.59399E-04 | 0.000000E+00 | 0.000000E+00 | 0.000000E+00 |
| | | | s14V | 0.00000E+00 | 0.100 | 2.960 | 0.000000E+00 | 0.000000E+00 | 0.000000E+00 | 0.000000E+00 | 0.000000E+00 | 0.000000E+00 | 0.000000E+00 | 0.000000E+00 |
| IMAGE SURFACE | - | - | s15V | 0.00000E+00 | | | 0.000000E+00 | 0.000000E+00 | 0.000000E+00 | 0.000000E+00 | 0.000000E+00 | 0.000000E+00 | 0.000000E+00 | 0.000000E+00 |

FIG. 50

| ELEMENT | MATERIAL | | SURFACE | CURVATURE /mm⁻¹ | CENTER THICKNESS /mm | RADIUS /mm | ASPHERIC COEFFICIENT | | | | | | | |
|---|---|---|---|---|---|---|---|---|---|---|---|---|---|---|
| | Nd | νd | | | | | Conic | A4 | A6 | A8 | A10 | A12 | A14 | A16 |
| L0V | - | - | s0V | 0.00000E+00 | -0.409 | 1.207 | 0.00000E+00 | 0.00000E+00 | 0.00000E+00 | 0.00000E+00 | 0.00000E+00 | 0.00000E+00 | 0.00000E+00 | 0.00000E+00 |
| L1V | 1.544 | 55.9 | s1V | 4.81906E-01 | 0.664 | 1.255 | 0.00000E+00 | 9.50166E-03 | -7.33793E-03 | 1.07235E-02 | -5.73106E-03 | 1.93165E-03 | 0.00000E+00 | 0.00000E+00 |
| | | | s2V | -7.29187E-02 | 0.068 | 1.246 | 0.00000E+00 | 3.67583E-02 | 1.83612E-03 | -1.45122E-02 | 1.13998E-02 | -3.02572E-03 | 0.00000E+00 | 0.00000E+00 |
| L2V | 1.614 | 25.6 | s3V | 3.69360E-01 | 0.237 | 1.246 | 0.00000E+00 | -1.59357E-01 | 1.74778E-01 | -1.44251E-01 | 6.70948E-02 | -1.51827E-02 | 0.00000E+00 | 0.00000E+00 |
| | | | s4V | 7.22496E-01 | 0.534 | 1.254 | 0.00000E+00 | -2.31937E-01 | 2.00881E-01 | -1.60862E-01 | 7.19761E-02 | -1.68298E-02 | 0.00000E+00 | 0.00000E+00 |
| L3V | 1.544 | 55.9 | s5V | 1.40630E-01 | 0.713 | 1.435 | 0.00000E+00 | -1.81602E-02 | -1.98344E-02 | 2.08619E-02 | -1.71802E-02 | 5.39015E-03 | 0.00000E+00 | 0.00000E+00 |
| | | | s6V | -3.43740E-01 | 0.136 | 1.523 | 0.00000E+00 | 3.56434E-02 | -6.66306E-02 | 4.45591E-02 | -1.67792E-02 | 2.31986E-03 | 0.00000E+00 | 0.00000E+00 |
| L4V | 1.614 | 25.6 | s7V | -6.09823E-01 | 0.416 | 1.590 | 0.00000E+00 | 1.58039E-01 | -9.78543E-02 | 8.18163E-02 | -2.91103E-02 | 4.23639E-03 | 0.00000E+00 | 0.00000E+00 |
| | | | s8V | -3.55019E-01 | 0.379 | 1.770 | 0.00000E+00 | 4.06797E-03 | 2.18838E-02 | -5.82497E-03 | 2.84742E-03 | -5.75493E-04 | 0.00000E+00 | 0.00000E+00 |
| L5V | 1.544 | 55.9 | s9V | 4.24493E-01 | 0.854 | 2.222 | 0.00000E+00 | -1.27857E-01 | 4.42827E-02 | -1.99168E-02 | 4.52172E-03 | -3.67206E-04 | 0.00000E+00 | 0.00000E+00 |
| | | | s10V | 3.51168E-01 | 0.876 | 2.645 | 0.00000E+00 | -4.98959E-02 | 7.74259E-03 | -1.19962E-03 | 1.08668E-05 | 2.35628E-06 | 0.00000E+00 | 0.00000E+00 |
| L0CV | 1.544 | 55.9 | s13V | -3.42946E-01 | 0.211 | 2.768 | 0.00000E+00 | 8.38181E-03 | 1.42804E-02 | -2.85854E-03 | 1.69093E-04 | 0.00000E+00 | 0.00000E+00 | 0.00000E+00 |
| | | | s14V | 0.00000E+00 | 0.100 | 2.954 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | - | - | s15V | 0.00000E+00 | | | | | | | | | | |

FIG. 56

| ELEMENT | MATERIAL | | SURFACE | CURVATURE /mm⁻¹ | CENTER THICKNESS /mm | RADIUS /mm | ASPHERIC COEFFICIENT | | | | | | | |
|---|---|---|---|---|---|---|---|---|---|---|---|---|---|---|
| | Nd | νd | | | | | Conic | A4 | A6 | A8 | A10 | A12 | A14 | A16 |
| L0V | - | - | s0V | 0.00000E+00 | -0.413 | 1.223 | 0.00000E+00 | 0.00000E+00 | 0.00000E+00 | 0.00000E+00 | 0.00000E+00 | 0.00000E+00 | 0.00000E+00 | 0.00000E+00 |
| L1V | 1.544 | 55.9 | s1V | 4.74213E-01 | 0.667 | 1.270 | 0.00000E+00 | 9.57405E-03 | -8.60309E-03 | 1.20087E-02 | -6.38703E-03 | 1.99052E-03 | 0.00000E+00 | 0.00000E+00 |
| | | | s2V | -7.47136E-02 | 0.061 | 1.262 | 0.00000E+00 | 3.49709E-02 | 5.08789E-03 | -1.60067E-02 | 1.08260E-02 | -2.56162E-03 | 0.00000E+00 | 0.00000E+00 |
| L2V | 1.614 | 25.6 | s3V | 3.75203E-01 | 0.240 | 1.264 | 0.00000E+00 | -1.56733E-01 | 1.77341E-01 | -1.45166E-01 | 6.82454E-02 | -1.41120E-02 | 0.00000E+00 | 0.00000E+00 |
| | | | s4V | 7.14486E-01 | 0.519 | 1.271 | 0.00000E+00 | -2.27332E-01 | 2.00725E-01 | -1.59207E-01 | 6.99856E-02 | -1.59382E-02 | 0.00000E+00 | 0.00000E+00 |
| L3V | 1.544 | 55.9 | s5V | 1.42523E-01 | 0.757 | 1.443 | 0.00000E+00 | -1.88166E-02 | -1.31855E-02 | 1.36088E-02 | -1.04931E-02 | 3.31877E-03 | 0.00000E+00 | 0.00000E+00 |
| | | | s6V | -3.67781E-01 | 0.079 | 1.534 | 0.00000E+00 | 4.21119E-02 | -7.44682E-02 | 5.32688E-02 | -1.97062E-02 | 2.59008E-03 | 0.00000E+00 | 0.00000E+00 |
| L4V | 1.614 | 25.6 | s7V | -6.09458E-01 | 0.388 | 1.579 | 0.00000E+00 | 1.40225E-01 | -8.11873E-02 | 7.01602E-02 | -2.50939E-02 | 3.68690E-03 | 0.00000E+00 | 0.00000E+00 |
| | | | s8V | -3.30513E-01 | 0.401 | 1.745 | 0.00000E+00 | -1.68219E-02 | 4.38685E-02 | -2.07722E-02 | 7.27404E-03 | -1.03457E-03 | 0.00000E+00 | 0.00000E+00 |
| L5V | 1.544 | 55.9 | s9V | 4.21332E-01 | 0.879 | 2.216 | 0.00000E+00 | -1.29028E-01 | 4.74921E-02 | -2.02444E-02 | 4.33204E-03 | -3.37094E-04 | 0.00000E+00 | 0.00000E+00 |
| | | | s10V | 3.46902E-01 | 0.287 | 2.673 | 0.00000E+00 | -4.89305E-02 | 8.30210E-03 | -1.09975E-03 | -2.50327E-05 | 5.39687E-06 | 0.00000E+00 | 0.00000E+00 |
| CGV | 1.517 | 64.2 | s11V | 0.00000E+00 | 0.210 | 2.764 | 0.00000E+00 | 0.00000E+00 | 0.00000E+00 | 0.00000E+00 | 0.00000E+00 | 0.00000E+00 | 0.00000E+00 | 0.00000E+00 |
| | | | s12V | 0.00000E+00 | 0.508 | 2.792 | 0.00000E+00 | 0.00000E+00 | 0.00000E+00 | 0.00000E+00 | 0.00000E+00 | 0.00000E+00 | 0.00000E+00 | 0.00000E+00 |
| LOCV | 1.544 | 55.9 | s13V | -3.36618E-01 | 0.100 | 2.803 | 0.00000E+00 | -4.84472E-03 | 1.83353E-02 | -3.31752E-02 | 1.84939E-04 | 0.00000E+00 | 0.00000E+00 | 0.00000E+00 |
| | | | s14V | 0.00000E+00 | 0.100 | 2.968 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | - | - | s15V | 0.00000E+00 | - | - | 0.00000E+00 | 0.00000E+00 | 0.00000E+00 | 0.00000E+00 | 0.00000E+00 | 0.00000E+00 | 0.00000E+00 | 0.00000E+00 |

FIG. 62

| ELEMENT | MATERIAL | | SURFACE | CURVATURE /mm-1 | CENTER THICKNESS /mm | RADIUS /mm | ASPHERIC COEFFICIENT | | | | | | | |
|---|---|---|---|---|---|---|---|---|---|---|---|---|---|---|
| | Nd | νd | | | | | Conic | A4 | A6 | A8 | A10 | A12 | A14 | A16 |
| L0V | - | - | s0V | 0.00000E+00 | -0.297 | 1.045 | 0.00000E+00 | 0.00000E+00 | 0.00000E+00 | 0.00000E+00 | 0.00000E+00 | 0.00000E+00 | 0.00000E+00 | 0.00000E+00 |
| L1V | 1.544 | 55.9 | s1V | 4.97712E-01 | 0.568 | 1.096 | 0.00000E+00 | 1.16320E-02 | -8.06155E-03 | 1.26928E-02 | -5.80914E-03 | 1.94587E-03 | 0.00000E+00 | 0.00000E+00 |
| | | | s2V | -5.74770E-02 | 0.063 | 1.109 | 0.00000E+00 | 3.34168E-02 | 5.28404E-03 | -1.52335E-02 | 1.03616E-02 | -3.17912E-03 | 0.00000E+00 | 0.00000E+00 |
| L2V | 1.614 | 25.6 | s3V | 3.88940E-01 | 0.230 | 1.130 | 0.00000E+00 | -1.57251E-01 | 1.74610E-01 | -1.46862E-01 | 6.52775E-02 | -1.52802E-02 | 0.00000E+00 | 0.00000E+00 |
| | | | s4V | 7.28440E-01 | 0.561 | 1.153 | 0.00000E+00 | -2.22143E-01 | 2.01277E-01 | -1.61247E-01 | 6.86295E-02 | -1.50917E-02 | 0.00000E+00 | 0.00000E+00 |
| L3V | 1.544 | 55.9 | s5V | 1.16154E-01 | 0.696 | 1.382 | 0.00000E+00 | -2.18513E-02 | -1.38697E-02 | 1.35699E-02 | -1.03282E-02 | 3.32476E-03 | 0.00000E+00 | 0.00000E+00 |
| | | | s6V | -3.64630E-01 | 0.104 | 1.481 | 0.00000E+00 | 4.00601E-02 | -7.84440E-02 | 5.35160E-02 | -1.92233E-02 | 2.42009E-03 | 0.00000E+00 | 0.00000E+00 |
| L4V | 1.614 | 25.6 | s7V | -6.05572E-01 | 0.304 | 1.557 | 0.00000E+00 | 1.49830E-01 | -7.97048E-02 | 6.99387E-02 | -2.52580E-02 | 3.70230E-03 | 0.00000E+00 | 0.00000E+00 |
| | | | s8V | -3.42260E-01 | 0.465 | 1.673 | 0.00000E+00 | -1.25190E-02 | 4.55516E-02 | -2.04316E-02 | 7.25566E-03 | -1.09460E-03 | 0.00000E+00 | 0.00000E+00 |
| L5V | 1.544 | 55.9 | s9V | 4.18634E-01 | 0.912 | 2.137 | 0.00000E+00 | -1.30909E-01 | 4.73703E-02 | -2.01613E-02 | 4.34330E-03 | -3.77764E-04 | 0.00000E+00 | 0.00000E+00 |
| | | | s10V | 3.49545E-01 | 0.287 | 2.650 | 0.00000E+00 | -5.22240E-02 | 9.43677E-03 | -1.20334E-03 | -2.98388E-05 | 6.35102E-06 | 0.00000E+00 | 0.00000E+00 |
| CGV | 1.517 | 64.2 | s11V | 0.00000E+00 | 0.210 | 2.750 | 0.00000E+00 | 0.00000E+00 | 0.00000E+00 | 0.00000E+00 | 0.00000E+00 | 0.00000E+00 | 0.00000E+00 | 0.00000E+00 |
| | | | s12V | 0.00000E+00 | 0.480 | 2.786 | 0.00000E+00 | 0.00000E+00 | 0.00000E+00 | 0.00000E+00 | 0.00000E+00 | 0.00000E+00 | 0.00000E+00 | 0.00000E+00 |
| LOCV | 1.544 | 55.9 | s13V | -3.36237E-01 | 0.100 | 2.798 | 0.00000E+00 | -4.86268E-03 | 1.85100E-02 | -3.35638E-03 | 1.87768E-04 | 0.00000E+00 | 0.00000E+00 | 0.00000E+00 |
| | | | s14V | 0.00000E+00 | 0.100 | 2.965 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | - | - | s15V | 0.00000E+00 | | - | 0.00000E+00 | 0.00000E+00 | 0.00000E+00 | 0.00000E+00 | 0.00000E+00 | 0.00000E+00 | 0.00000E+00 | 0.00000E+00 |

FIG. 67

| | | IMAGING LENS 100V | IMAGING LENS 200V | IMAGING LENS 300V | IMAGING LENS 400V | IMAGING LENS 500V | IMAGING LENS 600V | IMAGING LENS 700V | IMAGING LENS 800V | IMAGING LENS 900V |
|---|---|---|---|---|---|---|---|---|---|---|
| F NUMBER | | 1.60 | 1.60 | 1.60 | 1.60 | 1.54 | 1.80 | 1.60 | 1.60 | 1.60 |
| ANGLE OF VIEW (DIAGONAL)/deg | | 73.7 | 76.3 | 73.8 | 73.6 | 75.1 | 75.1 | 77.6 | 77.8 | 76.7 |
| FOCAL DISTANCE /mm | fV | 3.854 | 3.673 | 3.852 | 3.862 | 3.766 | 3.761 | 3.609 | 3.586 | 3.628 |
| | f5V | 16.375 | 16.053 | 14.914 | 15.944 | 15.278 | 15.753 | 16.068 | 17.063 | 12.827 |
| | fcV | -5.410 | -5.420 | -4.767 | -5.338 | -5.439 | -5.445 | -5.461 | -5.521 | -5.492 |
| OTLV/mm | | 5.193 | 4.905 | 5.186 | 5.188 | 5.195 | 5.079 | 4.800 | 4.800 | 4.803 |
| CAV/mm | | 0.100 | 0.100 | 0.100 | 0.100 | 0.100 | 0.100 | 0.050 | 0.050 | 0.100 |
| FBV/mm | | 1.025 | 1.025 | 1.052 | 0.923 | 0.927 | 0.899 | 0.897 | 0.945 | 0.958 |
| CGV THICKNESS/mm | | 0.210 | 0.210 | 0.210 | NONE | 0.210 | 0.210 | NONE | 0.210 | 0.210 |
| | f5V/fV | 4.248 | 4.371 | 3.872 | 4.128 | 4.057 | 4.188 | 4.452 | 4.758 | 3.536 |
| | fcV/fV | -1.404 | -1.476 | -1.237 | -1.382 | -1.444 | -1.448 | -1.513 | -1.540 | -1.514 |
| OTLV/SDV | | 0.885 | 0.836 | 0.884 | 0.884 | 0.886 | 0.866 | 0.818 | 0.818 | 0.819 |
| CAV/OTLV | | 0.019 | 0.020 | 0.019 | 0.019 | 0.019 | 0.020 | 0.010 | 0.010 | 0.021 |

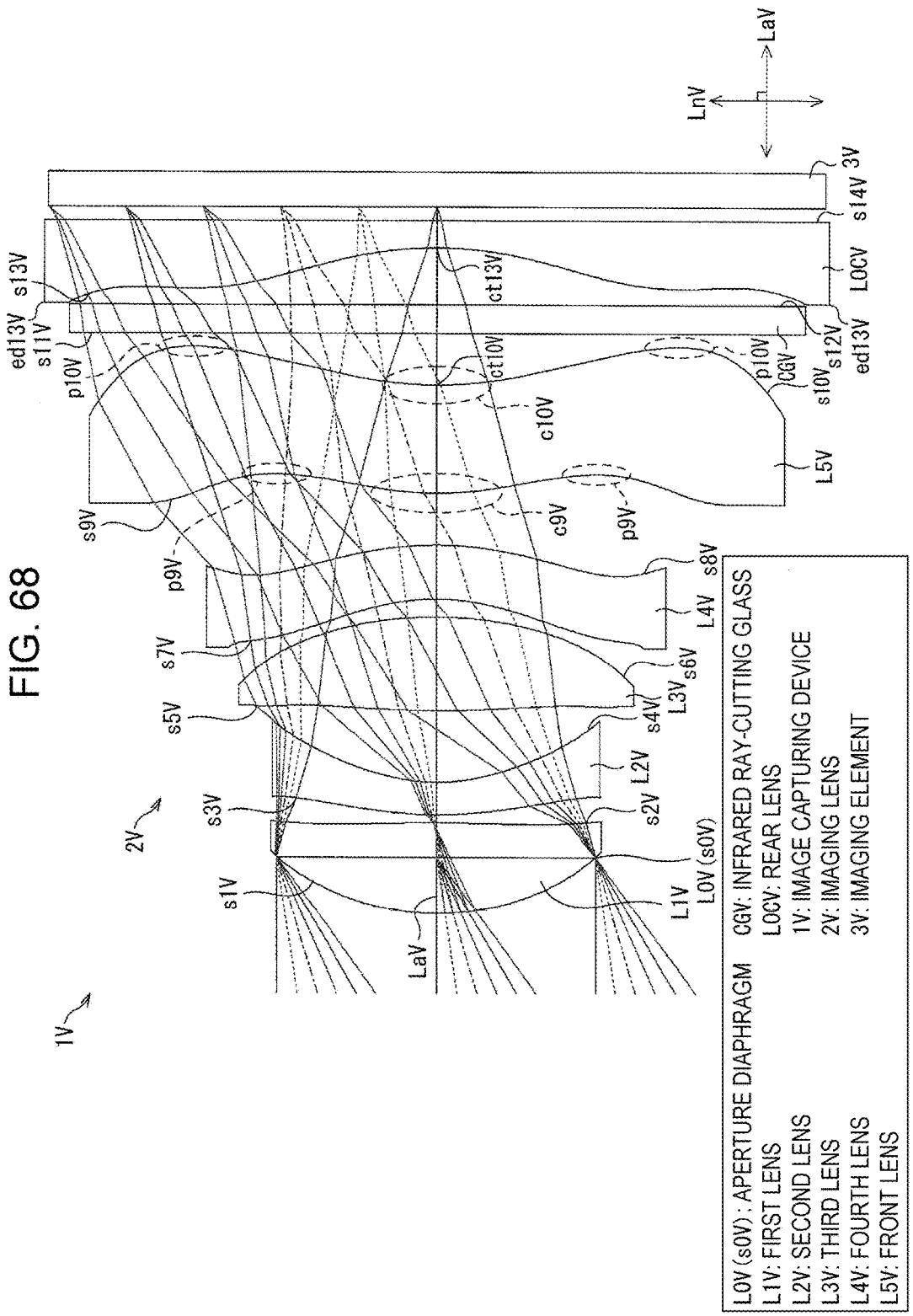

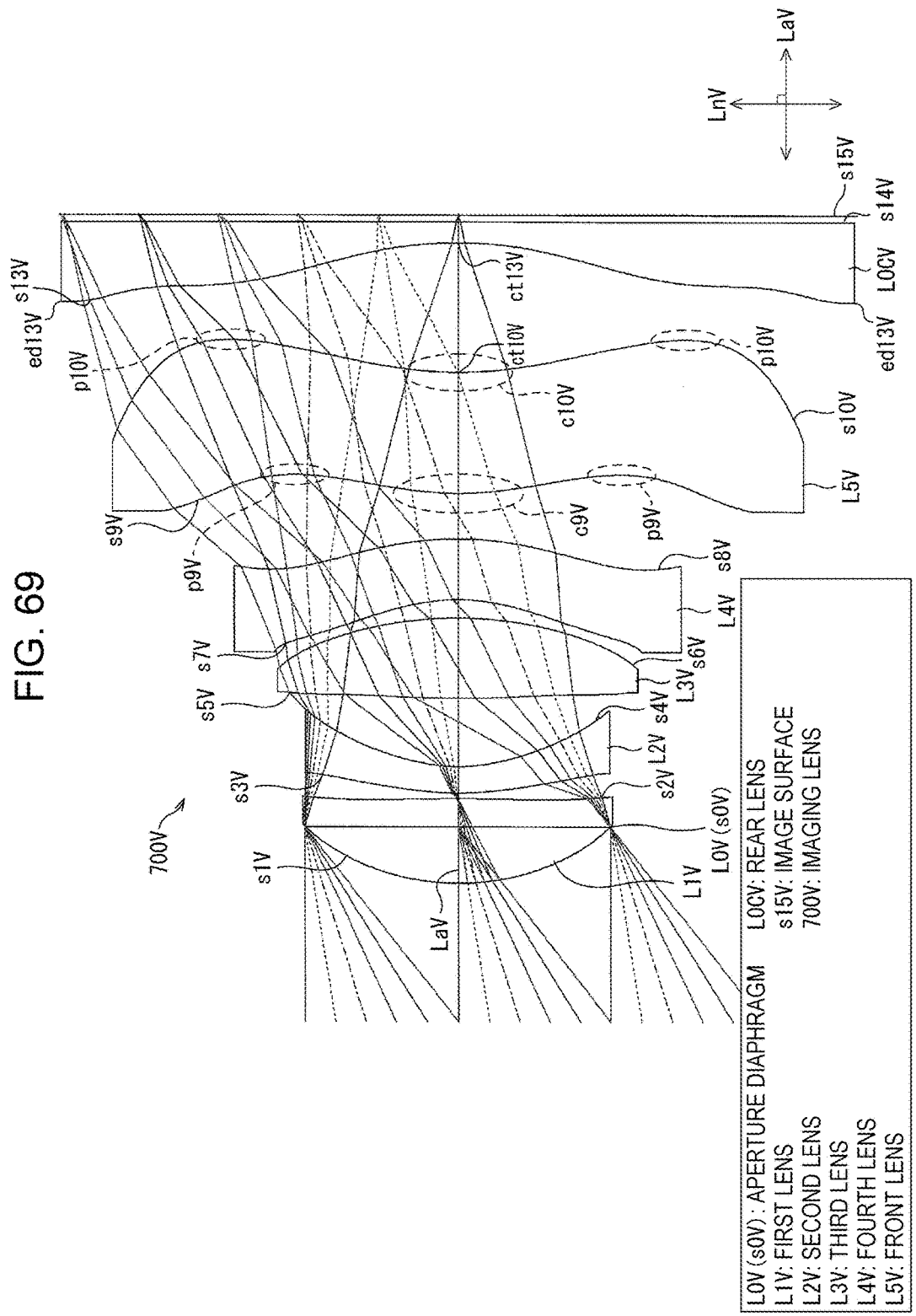

FIG. 70

| ELEMENT | MATERIAL | | SURFACE | CURVATURE /mm-1 | CENTER THICKNESS /mm | RADIUS /mm | ASPHERIC COEFFICIENT | | | | | | | |
|---|---|---|---|---|---|---|---|---|---|---|---|---|---|---|
| | Nd | νd | | | | | Conic | A4 | A6 | A8 | A10 | A12 | A14 | A16 |
| L0V | - | - | s0V | 0.00000E+00 | -0.403 | 1.128 | 0.00000E+00 | 0.00000E+00 | 0.00000E+00 | 0.00000E+00 | 0.00000E+00 | 0.00000E+00 | 0.00000E+00 | 0.00000E+00 |
| L1V | 1.544 | 55.9 | s1V | 5.35697E-01 | 0.607 | 1.141 | 0.00000E+00 | 1.45058E-02 | -1.31896E-02 | 1.84272E-02 | -1.01823E-02 | 4.02330E-03 | 0.00000E+00 | 0.00000E+00 |
| | | | s2V | -7.37747E-02 | 0.040 | 1.128 | 0.00000E+00 | 5.32661E-02 | -1.05967E-02 | -1.07803E-02 | 1.49608E-02 | -5.53951E-03 | 0.00000E+00 | 0.00000E+00 |
| L2V | 1.614 | 25.6 | s3V | 4.44139E-01 | 0.190 | 1.121 | 0.00000E+00 | -2.34933E-01 | 3.00633E-01 | -2.65237E-01 | 1.29462E-01 | -3.18696E-02 | 0.00000E+00 | 0.00000E+00 |
| | | | s4V | 8.00370E-01 | 0.490 | 1.111 | 0.00000E+00 | -3.33128E-01 | 3.54152E-01 | -3.18253E-01 | 1.59662E-01 | -4.39225E-02 | 0.00000E+00 | 0.00000E+00 |
| L3V | 1.544 | 55.9 | s5V | 1.24165E-01 | 0.578 | 1.256 | 0.00000E+00 | -2.52495E-02 | -1.79722E-02 | 8.87705E-03 | 1.10378E-03 | 7.92299E-04 | 0.00000E+00 | 0.00000E+00 |
| | | | s6V | -3.56839E-01 | 0.132 | 1.328 | 0.00000E+00 | 5.70654E-02 | -9.96094E-02 | 7.73073E-02 | -2.88704E-02 | 2.71518E-03 | 0.00000E+00 | 0.00000E+00 |
| L4V | 1.614 | 25.6 | s7V | -7.05041E-01 | 0.435 | 1.354 | 0.00000E+00 | 2.46997E-01 | -1.83734E-01 | 1.86118E-01 | -8.85340E-02 | 1.72769E-02 | 0.00000E+00 | 0.00000E+00 |
| | | | s8V | -4.09955E-01 | 0.326 | 1.648 | 0.00000E+00 | 3.87672E-02 | 5.29424E-03 | 5.58567E-03 | -1.68876E-03 | -3.54774E-07 | 0.00000E+00 | 0.00000E+00 |
| L5V | 1.544 | 55.9 | s9V | 4.24488E-01 | 0.872 | 2.175 | 0.00000E+00 | -1.29258E-01 | 4.46350E-02 | -1.92569E-02 | 4.22795E-03 | -3.37760E-04 | 0.00000E+00 | 0.00000E+00 |
| | | | s10V | 3.57244E-01 | 0.930 | 2.545 | 0.00000E+00 | -5.51229E-02 | 9.84624E-03 | -2.03925E-03 | 1.30526E-04 | -5.39188E-06 | 0.00000E+00 | 0.00000E+00 |
| LOGV | 1.544 | 55.9 | s13V | -3.35213E-01 | 0.150 | 2.814 | 0.00000E+00 | 6.35652E-03 | 1.47163E-02 | -3.02175E-03 | 1.84428E-04 | -3.37760E-04 | 0.00000E+00 | 0.00000E+00 |
| | | | s14V | 0.00000E+00 | 0.050 | 2.926 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | - | - | s15V | 0.00000E+00 | - | - | 0.00000E+00 | 0.00000E+00 | 0.00000E+00 | 0.00000E+00 | 0.00000E+00 | 0.00000E+00 | 0.00000E+00 | 0.00000E+00 |

FIG. 76

| ELEMENT | MATERIAL | | SURFACE | CURVATURE /mm⁻¹ | CENTER THICKNESS /mm | RADIUS /mm | ASPHERIC COEFFICIENT | | | | | | | |
|---|---|---|---|---|---|---|---|---|---|---|---|---|---|---|
| | Nd | νd | | | | | Conic | A4 | A6 | A8 | A10 | A12 | A14 | A16 |
| L0V | - | - | s0V | 0.000000E+00 | -0.403 | 1.121 | 0.000000E+00 | 0.000000E+00 | 0.000000E+00 | 0.000000E+00 | 0.000000E+00 | 0.000000E+00 | 0.000000E+00 | 0.000000E+00 |
| L1V | 1.544 | 55.9 | s1V | 5.40814E-01 | 0.609 | 1.168 | 0.000000E+00 | 1.51608E-02 | -1.28749E-02 | 1.83286E-02 | -1.01717E-02 | 4.14018E-03 | 0.000000E+00 | 0.000000E+00 |
| | | | s2V | -7.22090E-02 | 0.038 | 1.154 | 0.000000E+00 | 5.40100E-02 | -1.13009E-02 | -1.08180E-02 | 1.53937E-02 | -5.80598E-03 | 0.000000E+00 | 0.000000E+00 |
| L2V | 1.614 | 25.6 | s3V | 4.54025E-01 | 0.193 | 1.146 | 0.000000E+00 | -2.36893E-01 | 2.97235E-01 | -2.65203E-01 | 1.30459E-01 | -3.22094E-02 | 0.000000E+00 | 0.000000E+00 |
| | | | s4V | 8.10179E-01 | 0.477 | 1.133 | 0.000000E+00 | -3.35070E-01 | 3.50028E-01 | -3.18349E-01 | 1.60996E-01 | -4.54521E-02 | 0.000000E+00 | 0.000000E+00 |
| L3V | 1.544 | 55.9 | s5V | 1.15303E-01 | 0.570 | 1.283 | 0.000000E+00 | -1.93724E-02 | -1.51421E-02 | 1.13089E-02 | 1.16586E-03 | -2.21531E-04 | 0.000000E+00 | 0.000000E+00 |
| | | | s6V | -3.52137E-01 | 0.146 | 1.354 | 0.000000E+00 | 5.48859E-02 | -9.32262E-02 | 7.84440E-02 | -2.87015E-02 | 1.63094E-03 | 0.000000E+00 | 0.000000E+00 |
| L4V | 1.614 | 25.6 | s7V | -7.16549E-01 | 0.390 | 1.370 | 0.000000E+00 | 2.43093E-01 | -1.79683E-01 | 1.88167E-01 | -8.99112E-02 | 1.73731E-02 | 0.000000E+00 | 0.000000E+00 |
| | | | s8V | -4.32182E-01 | 0.331 | 1.653 | 0.000000E+00 | 4.32415E-02 | 2.34186E-03 | 7.41804E-03 | -1.67201E-03 | -1.01337E-04 | 0.000000E+00 | 0.000000E+00 |
| L5V | 1.544 | 55.9 | s9V | 4.21986E-01 | 0.852 | 2.225 | 0.000000E+00 | -1.28973E-01 | 4.44350E-01 | -1.92794E-02 | 4.23177E-03 | -3.35715E-04 | 0.000000E+00 | 0.000000E+00 |
| | | | s10V | 3.60491E-01 | 0.352 | 2.622 | 0.000000E+00 | -5.28679E-02 | 9.52598E-03 | -2.01972E-03 | 1.27999E-04 | -5.92943E-06 | 0.000000E+00 | 0.000000E+00 |
| CGV | 1.517 | 64.2 | s11V | 0.000000E+00 | 0.210 | 2.871 | 0.000000E+00 | 0.000000E+00 | 0.000000E+00 | 0.000000E+00 | 0.000000E+00 | 0.000000E+00 | 0.000000E+00 | 0.000000E+00 |
| | | | s12V | 0.000000E+00 | 0.435 | 2.911 | 0.000000E+00 | 0.000000E+00 | 0.000000E+00 | 0.000000E+00 | 0.000000E+00 | 0.000000E+00 | 0.000000E+00 | 0.000000E+00 |
| LOCV | 1.544 | 55.9 | s13V | -3.31883E-01 | 0.150 | 2.932 | 0.000000E+00 | 9.22879E-03 | 1.44887E-03 | -3.03443E-02 | 1.83879E-04 | 0.000000E+00 | 0.000000E+00 | 0.000000E+00 |
| | | | s14V | 0.000000E+00 | 0.050 | 3.019 | 0.000000E+00 | 0.000000E+00 | 0.000000E+00 | 0.000000E+00 | 0.000000E+00 | 0.000000E+00 | 0.000000E+00 | 0.000000E+00 |
| IMAGE SURFACE | - | - | s15V | 0.000000E+00 | | | 0.000000E+00 | 0.000000E+00 | 0.000000E+00 | 0.000000E+00 | 0.000000E+00 | 0.000000E+00 | 0.000000E+00 | 0.000000E+00 |

FIG. 82

| ELEMENT | MATERIAL | | SURFACE | CURVATURE /mm⁻¹ | CENTER THICKNESS /mm | RADIUS /mm | ASPHERIC COEFFICIENT | | | | | | | |
|---|---|---|---|---|---|---|---|---|---|---|---|---|---|---|
| | Nd | νd | | | | | Conic | A4 | A6 | A8 | A10 | A12 | A14 | A16 |
| L0V | - | - | s0V | 0.00000E+00 | -0.412 | 1.134 | 0.00000E+00 | 0.00000E+00 | 0.00000E+00 | 0.00000E+00 | 0.00000E+00 | 0.00000E+00 | 0.00000E+00 | 0.00000E+00 |
| L1V | 1.544 | 55.9 | s1V | 5.45999E-01 | 0.633 | 1.174 | 0.00000E+00 | 9.00590E-03 | -2.58392E-03 | 7.01046E-03 | -5.03392E-03 | 2.62710E-03 | 0.00000E+00 | 0.00000E+00 |
| | | | s2V | -5.00658E-02 | 0.032 | 1.158 | 0.00000E+00 | 2.14367E-02 | 3.72151E-02 | -6.42130E-02 | 4.68042E-02 | -1.30596E-02 | 0.00000E+00 | 0.00000E+00 |
| L2V | 1.634 | 23.8 | s3V | 3.34193E-01 | 0.230 | 1.148 | 0.00000E+00 | -1.57616E-01 | 2.08775E-01 | -2.07455E-01 | 1.26103E-01 | -3.55075E-02 | 0.00000E+00 | 0.00000E+00 |
| | | | s4V | 6.58787E-01 | 0.501 | 1.114 | 0.00000E+00 | -1.91710E-01 | 1.93402E-01 | -1.54126E-01 | 8.34108E-02 | -1.71431E-02 | 0.00000E+00 | 0.00000E+00 |
| L3V | 1.544 | 55.9 | s5V | 6.28646E-02 | 0.519 | 1.222 | 0.00000E+00 | -1.49822E-02 | -7.29007E-02 | 8.08330E-02 | -8.71186E-02 | 3.80836E-02 | 0.00000E+00 | 0.00000E+00 |
| | | | s6V | -3.31769E-01 | 0.164 | 1.328 | 0.00000E+00 | 7.12011E-02 | -1.53958E-01 | 9.70951E-02 | -3.42384E-02 | 5.24359E-03 | 0.00000E+00 | 0.00000E+00 |
| L4V | 1.634 | 23.8 | s7V | -6.76558E-01 | 0.230 | 1.424 | 0.00000E+00 | 2.24291E-01 | -2.35660E-01 | 2.72305E-01 | -1.26145E-01 | 2.19878E-02 | 0.00000E+00 | 0.00000E+00 |
| | | | s8V | -4.55215E-01 | 0.439 | 1.544 | 0.00000E+00 | 2.33049E-02 | -2.29259E-02 | 7.60025E-02 | -3.59060E-02 | 5.06501E-03 | 0.00000E+00 | 0.00000E+00 |
| L5V | 1.544 | 55.9 | s9V | 4.17896E-01 | 0.874 | 2.104 | 0.00000E+00 | -1.46367E-01 | 5.55346E-02 | -2.19091E-02 | 4.48521E-03 | -3.39713E-04 | 0.00000E+00 | 0.00000E+00 |
| | | | s10V | 3.15931E-01 | 0.324 | 2.618 | 0.00000E+00 | -5.56612E-02 | 1.10099E-02 | -5.30242E-04 | -2.73713E-04 | 2.46182E-05 | 0.00000E+00 | 0.00000E+00 |
| CGV | 1.517 | 64.2 | s11V | 0.00000E+00 | 0.210 | 2.821 | 0.00000E+00 | 0.00000E+00 | 0.00000E+00 | 0.00000E+00 | 0.00000E+00 | 0.00000E+00 | 0.00000E+00 | 0.00000E+00 |
| | | | s12V | 0.00000E+00 | 0.349 | 2.866 | 0.00000E+00 | 0.00000E+00 | 0.00000E+00 | 0.00000E+00 | 0.00000E+00 | 0.00000E+00 | 0.00000E+00 | 0.00000E+00 |
| LOCV | 1.544 | 55.9 | s13V | -3.33335E-01 | 0.200 | 2.868 | 0.00000E+00 | -1.31869E-02 | 2.32325E-02 | -4.15391E-03 | 2.32165E-04 | 0.00000E+00 | 0.00000E+00 | 0.00000E+00 |
| | | | s14V | 0.00000E+00 | 0.100 | 2.988 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | - | - | s15V | 0.00000E+00 | | | 0.00000E+00 | 0.00000E+00 | 0.00000E+00 | 0.00000E+00 | 0.00000E+00 | 0.00000E+00 | 0.00000E+00 | 0.00000E+00 |

| 1W: IMAGING LENS | 15W: UPPER LENS |
| --- | --- |
| 10W: APERTURE DIAPHRAGM | 16W: IR CUT GLASS |
| 11W: FIRST LENS | 17W: LOWER LENS |
| 12W: SECOND LENS | 18W: IMAGE SENSOR (IMAGE SURFACE) |
| 13W: THIRD LENS | |
| 14W: FOURTH LENS | |

FIG. 89

| | EMBODIMENT 23 | EMBODIMENT 24 | EMBODIMENT 25 | EMBODIMENT 26 | EMBODIMENT 27 | COMPARATIVE EXAMPLE 1 |
|---|---|---|---|---|---|---|
| F NUMBER | 1.80 | 1.80 | 1.80 | 1.94 | 1.80 | 1.80 |
| ANGLE OF VIEW (DIAGONAL) (deg) | 71.2 | 70.0 | 70.8 | 71.4 | 76.0 | 72.9 |
| FOCAL DISTANCE — ENTIRE OPTICAL SYSTEM: fW(mm) | 4.026 | 4.098 | 4.051 | 4.012 | 3.675 | 3.892 |
| FOCAL DISTANCE — FOURTH LENS: f4W(mm) | -17.066 | -21.437 | -13.462 | -17.744 | -13.047 | -9.322 |
| FOCAL DISTANCE — LOWER LENS: fcW(mm) | -5.795 | -5.637 | -5.788 | -5.795 | -6.138 | -24.194 |
| OPTICAL TOTAL LENGTH: OTLW(mm) | 5.122 | 5.179 | 5.124 | 5.070 | 4.802 | 5.064 |
| LOWER LENS PROXIMITY DISTANCE (mm) | 0.100 | 0.100 | 0.100 | 0.100 | 0.100 | 0.100 |
| UPPER LENS BACK FOCUS: FBW(mm) | 1.068 | 0.899 | 0.920 | 1.067 | 0.960 | 0.895 |
| IR CUT GLASS (mm) | 0.210 | 0.210 | — | 0.210 | 0.210 | 0.210 |
| f4W/fW | -4.239 | -5.231 | -3.323 | -4.422 | -3.550 | -2.395 |
| fcW/fW | -1.440 | -1.375 | -1.429 | -1.444 | -1.670 | -6.217 |
| OPTICAL TOTAL LENGTH/SENSOR SIZE | 0.873 | 0.883 | 0.873 | 0.864 | 0.819 | 0.863 |
| LOWER LENS PROXIMITY DISTANCE/ OPTICAL TOTAL LENGTH | 0.020 | 0.019 | 0.020 | 0.020 | 0.021 | 0.020 |

FIG. 90

EMBODIMENT 23

| MEMBER | MATERIAL CHARACTERISTICS | | SURFACE | CURVATURE RADIUS (mm) | CENTER THICKNESS (mm) | EFFECTIVE RADIUS (mm) | ASPHERIC COEFFICIENT | | | | | | | |
|---|---|---|---|---|---|---|---|---|---|---|---|---|---|---|
| | REFRACTIVE INDEX Nd | ABBE NUMBER Nd | | | | | CONIC COEFFICIENT K | 4-TH ORDER COEFFICIENT | 6-TH ORDER COEFFICIENT | 8-TH ORDER COEFFICIENT | 10-TH ORDER COEFFICIENT | 12-TH ORDER COEFFICIENT | 14-TH ORDER COEFFICIENT | 16-TH ORDER COEFFICIENT |
| APERTURE DIAPHRAGM | — | — | — | 0.00000E+00 | -0.341 | 1.118 | 0.00000E+00 | 0.00000E+00 | 0.00000E+00 | 0.00000E+00 | 0.00000E+00 | 0.00000E+00 | 0.00000E+00 | 0.00000E+00 |
| FIRST LENS | 1.544 | 55.9 | OBJECT SIDE | 4.88839E-01 | 0.593 | 1.133 | 0.00000E+00 | 5.37591E-03 | 3.29770E-03 | -1.43311E-02 | 2.25814E-02 | -8.54512E-03 | -3.34599E-03 | 2.89843E-03 |
| | | | IMAGE SURFACE SIDE | -1.30642E-01 | 0.029 | 1.132 | 0.00000E+00 | 6.07186E-02 | -2.74269E-02 | 2.02725E-02 | -2.15775E-02 | 2.27503E-02 | -1.43612E-02 | 4.58410E-03 |
| SECOND LENS | 1.614 | 25.6 | OBJECT SIDE | 3.51004E-01 | 0.293 | 1.145 | 0.00000E+00 | -1.24012E-01 | 1.42877E-01 | -1.31247E-01 | 7.55080E-02 | -4.34432E-02 | 2.47678E-02 | -7.16018E-03 |
| | | | IMAGE SURFACE SIDE | 7.56292E-01 | 0.567 | 1.159 | 0.00000E+00 | -2.22282E-01 | 1.93774E-01 | -1.61657E-01 | 5.71465E-02 | -5.55743E-03 | -1.00695E-03 | -1.73120E-03 |
| THIRD LENS | 1.544 | 55.9 | OBJECT SIDE | 1.50195E-01 | 0.905 | 1.530 | 0.00000E+00 | -9.29484E-03 | 1.56642E-02 | -4.01858E-04 | -3.42205E-03 | 3.90177E-03 | -1.82580E-03 | 2.52853E-04 |
| | | | IMAGE SURFACE SIDE | -1.79182E-01 | 0.622 | 1.507 | 0.00000E+00 | -5.60277E-02 | 4.01214E-02 | -4.40309E-02 | 3.68226E-02 | -1.75342E-02 | 4.33355E-03 | -3.51110E-04 |
| FOURTH LENS | 1.614 | 25.6 | OBJECT SIDE | 3.75447E-02 | 1.019 | 1.501 | 0.00000E+00 | -9.91836E-02 | 1.75197E-02 | -4.72504E-02 | 5.79372E-02 | -4.30563E-02 | 1.65749E-02 | -2.72612E-03 |
| | | | IMAGE SURFACE SIDE | 1.34126E-01 | 0.127 | 2.298 | 0.00000E+00 | -4.15396E-02 | -3.55946E-03 | 5.24737E-03 | -2.37339E-03 | 6.06366E-04 | -8.57020E-05 | 5.03582E-06 |
| IR CUT GLASS | 1.517 | 64.2 | OBJECT SIDE | 0.00000E+00 | 0.210 | 2.682 | 0.00000E+00 | 0.00000E+00 | 0.00000E+00 | 0.00000E+00 | 0.00000E+00 | 0.00000E+00 | 0.00000E+00 | 0.00000E+00 |
| | | | IMAGE SURFACE SIDE | 0.00000E+00 | 0.478 | 2.750 | 0.00000E+00 | 0.00000E+00 | 0.00000E+00 | 0.00000E+00 | 0.00000E+00 | 0.00000E+00 | 0.00000E+00 | 0.00000E+00 |
| LOWER LENS | 1.544 | 55.9 | OBJECT SIDE | -3.15990E-01 | 0.180 | 2.766 | 0.00000E+00 | 4.98670E-03 | 6.26261E-03 | -9.30515E-04 | 4.25959E-05 | 7.63449E-07 | 0.00000E+00 | 0.00000E+00 |
| | | | IMAGE SURFACE SIDE | 0.00000E+00 | 0.100 | 2.912 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | — | — | — | 0.00000E+00 | — | — | 0.00000E+00 | 0.00000E+00 | 0.00000E+00 | 0.00000E+00 | 0.00000E+00 | 0.00000E+00 | 0.00000E+00 | 0.00000E+00 |

FIG. 92

EMBODIMENT 24

| MEMBER | MATERIAL CHARACTERISTICS | | SURFACE | CURVATURE RADIUS (mm) | CENTER THICKNESS (mm) | EFFECTIVE RADIUS (mm) | ASPHERIC COEFFICIENT | | | | | | | | |
|---|---|---|---|---|---|---|---|---|---|---|---|---|---|---|---|
| | REFRACTIVE INDEX Nd | ABBE NUMBER Vd | | | | | CONIC COEFFICIENT K | 4-TH ORDER COEFFICIENT | 6-TH ORDER COEFFICIENT | 8-TH ORDER COEFFICIENT | 10-TH ORDER COEFFICIENT | 12-TH ORDER COEFFICIENT | 14-TH ORDER COEFFICIENT | 16-TH ORDER COEFFICIENT |
| APERTURE DIAPHRAGM | - | - | | 0.00000E+00 | -0.397 | 1.138 | 0.00000E+00 | 0.00000E+00 | 0.00000E+00 | 0.00000E+00 | 0.00000E+00 | 0.00000E+00 | 0.00000E+00 | 0.00000E+00 |
| FIRST LENS | 1.544 | 55.9 | OBJECT SIDE | 5.33037E-01 | 0.643 | 1.150 | 0.00000E+00 | 4.03595E-03 | 5.67786E-03 | -1.23927E-02 | 1.70295E-02 | -8.13134E-03 | 5.80094E-04 | 8.38534E-04 |
| | | | IMAGE SIDE | -1.45150E-01 | 0.071 | 1.139 | 0.00000E+00 | 1.09988E-01 | -1.65889E-01 | 2.73529E-01 | -3.19301E-01 | 2.34663E-01 | -9.58784E-02 | 1.66494E-02 |
| SECOND LENS | 1.614 | 25.6 | OBJECT SIDE | 1.96559E-01 | 0.200 | 1.133 | 0.00000E+00 | -9.65244E-02 | 1.16579E-01 | -7.59337E-02 | 1.09639E-02 | 8.23305E-03 | -1.21551E-03 | -1.69162E-03 |
| | | | IMAGE SIDE | 6.49237E-01 | 0.554 | 1.125 | 0.00000E+00 | -2.08821E-01 | 2.59875E-01 | -2.30024E-01 | 1.11804E-01 | -4.94928E-04 | -2.88832E-02 | 1.01350E-02 |
| THIRD LENS | 1.544 | 55.9 | OBJECT SIDE | 1.24061E-01 | 0.885 | 1.426 | 0.00000E+00 | -2.03391E-01 | 1.01948E-02 | 5.16342E-03 | -6.76831E-03 | 7.12958E-03 | -2.87164E-03 | 3.82899E-04 |
| | | | IMAGE SIDE | -1.75088E-01 | 0.786 | 1.486 | 0.00000E+00 | -3.76380E-02 | 1.30880E-02 | -2.04235E-03 | -1.84707E-03 | 3.65750E-03 | -1.63965E-03 | 3.49330E-04 |
| FOURTH LENS | 1.614 | 25.6 | OBJECT SIDE | 1.60431E-01 | 0.955 | 1.776 | 0.00000E+00 | -7.35670E-02 | 5.41252E-03 | -7.25979E-03 | 3.01319E-03 | -3.42488E-04 | -1.01286E-04 | 3.21539E-05 |
| | | | IMAGE SIDE | 2.55305E-01 | 0.285 | 2.500 | 0.00000E+00 | -2.78358E-02 | 1.21383E-04 | 1.24990E-03 | -3.92839E-04 | 2.85623E-05 | 1.33310E-06 | -1.42425E-07 |
| IR CUT GLASS | 1.517 | 64.2 | OBJECT SIDE | 0.00000E+00 | 0.210 | 2.683 | 0.00000E+00 | 0.00000E+00 | 0.00000E+00 | 0.00000E+00 | 0.00000E+00 | 0.00000E+00 | 0.00000E+00 | 0.00000E+00 |
| | | | IMAGE SIDE | 0.00000E+00 | 0.272 | 2.743 | 0.00000E+00 | 0.00000E+00 | 0.00000E+00 | 0.00000E+00 | 0.00000E+00 | 0.00000E+00 | 0.00000E+00 | 0.00000E+00 |
| LOWER LENS | 1.544 | 55.9 | OBJECT SIDE | -3.2478E-01 | 0.217 | 2.757 | 0.00000E+00 | 2.20310E-02 | 1.00250E-02 | -2.83068E-02 | 2.34895E-03 | 3.54410E-03 | -1.49812E-06 | 7.10403E-08 |
| | | | IMAGE SIDE | 0.00000E+00 | 0.100 | 2.881 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | - | - | | 0.00000E+00 | - | - | 0.00000E+00 | 0.00000E+00 | 0.00000E+00 | 0.00000E+00 | 0.00000E+00 | 0.00000E+00 | 0.00000E+00 | 0.00000E+00 |

FIG. 94

EMBODIMENT 25

| MEMBER | MATERIAL CHARACTERISTICS | | SURFACE | CURVATURE RADIUS (mm) | CENTER THICKNESS (mm) | EFFECTIVE RADIUS (mm) | ASPHERIC COEFFICIENT | | | | | | | |
|---|---|---|---|---|---|---|---|---|---|---|---|---|---|---|
| | REFRACTIVE INDEX Vd | ABBE NUMBER Nd | | | | | CONIC COEFFICIENT K | 4-TH ORDER COEFFICIENT | 6-TH ORDER COEFFICIENT | 8-TH ORDER COEFFICIENT | 10-TH ORDER COEFFICIENT | 12-TH ORDER COEFFICIENT | 14-TH ORDER COEFFICIENT | 16-TH ORDER COEFFICIENT |
| APERTURE DIAPHRAGM | — | — | — | 0.00000E+00 | -0.344 | 1.125 | 0.00000E+00 | 0.00000E+00 | 0.00000E+00 | 0.00000E+00 | 0.00000E+00 | 0.00000E+00 | 0.00000E+00 | 0.00000E+00 |
| FIRST LENS | 1.544 | 55.9 | OBJECT SIDE | 4.94714E-01 | 0.596 | 1.140 | 0.00000E+00 | 5.38007E-03 | 3.41276E-03 | -1.42617E-02 | 2.26537E-02 | -8.50673E-03 | -3.35731E-03 | 2.84717E-03 |
| | | | IMAGE SIDE | -1.34142E-01 | 0.030 | 1.137 | 0.00000E+00 | 6.11370E-02 | -2.77016E-02 | 2.04038E-02 | -2.14954E-02 | 2.27500E-02 | -1.44157E-02 | 4.51824E-03 |
| SECOND LENS | 1.614 | 25.6 | OBJECT SIDE | 3.53648E-01 | 0.289 | 1.149 | 0.00000E+00 | -1.24885E-01 | 1.49946E-01 | -1.31477E-01 | 7.53587E-02 | -4.35169E-02 | 2.47491E-02 | -7.17104E-03 |
| | | | IMAGE SIDE | 7.54863E-01 | 0.592 | 1.166 | 0.00000E+00 | -2.22851E-01 | 1.99849E-01 | -1.61690E-01 | 5.70595E-02 | -5.60760E-03 | -1.01146E-03 | -1.70233E-03 |
| THIRD LENS | 1.544 | 55.9 | OBJECT SIDE | 1.39099E-01 | 0.935 | 1.544 | 0.00000E+00 | -8.94554E-03 | 1.53313E-02 | -1.58593E-04 | -3.39569E-03 | 3.89234E-03 | -1.62847E-03 | 2.50605E-04 |
| | | | IMAGE SIDE | -2.05329E-01 | 0.629 | 1.518 | 0.00000E+00 | -5.37307E-02 | 3.92825E-02 | -4.38067E-02 | 3.86680E-02 | -1.75638E-02 | 4.34143E-03 | -3.38630E-04 |
| FOURTH LENS | 1.614 | 25.6 | OBJECT SIDE | 2.52786E-04 | 1.110 | 1.507 | 0.00000E+00 | -9.80756E-02 | 1.82791E-02 | -4.68148E-02 | 5.79952E-02 | -4.30964E-02 | 1.65042E-02 | -2.68437E-03 |
| | | | IMAGE SIDE | 1.20216E-01 | 0.661 | 2.334 | 0.00000E+00 | -4.27320E-02 | -3.08333E-03 | 5.10246E-03 | -2.37173E-03 | 6.11790E-04 | -8.49477E-05 | 4.81959E-06 |
| LOWER LENS | 1.544 | 55.9 | OBJECT SIDE | -3.16286E-01 | 0.180 | 2.757 | 0.00000E+00 | 1.29300E-03 | 6.49067E-03 | -9.01192E-04 | 4.19406E-05 | 6.12093E-07 | 0.00000E+00 | 0.00000E+00 |
| | | | IMAGE SIDE | 0.00000E+00 | 0.100 | 2.917 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | — | — | — | 0.00000E+00 | — | — | 0.00000E+00 | 0.00000E+00 | 0.00000E+00 | 0.00000E+00 | 0.00000E+00 | 0.00000E+00 | 0.00000E+00 | 0.00000E+00 |

FIG. 96

EMBODIMENT 26

| MEMBER | MATERIAL CHARACTERISTICS | | SURFACE | CURVATURE RADIUS (mm) | CENTER THICKNESS (mm) | EFFECTIVE RADIUS (mm) | ASPHERIC COEFFICIENT | | | | | | | | |
|---|---|---|---|---|---|---|---|---|---|---|---|---|---|---|---|
| | REFRACTIVE INDEX Nd | ABBE NUMBER Vd | | | | | CONIC COEFFICIENT K | 4-TH ORDER COEFFICIENT | 6-TH ORDER COEFFICIENT | 8-TH ORDER COEFFICIENT | 10-TH ORDER COEFFICIENT | 12-TH ORDER COEFFICIENT | 14-TH ORDER COEFFICIENT | 16-TH ORDER COEFFICIENT |
| APERTURE DIAPHRAGM | – | – | – | 0.00000E+00 | -0.290 | 1.034 | 0.00000E+00 | 0.00000E+00 | 0.00000E+00 | 0.00000E+00 | 0.00000E+00 | 0.00000E+00 | 0.00000E+00 | 0.00000E+00 |
| FIRST LENS | 1.544 | 55.9 | OBJECT SIDE | 4.99921E-01 | 0.545 | 1.053 | 0.00000E+00 | 6.38922E-03 | 3.99214E-03 | -1.35413E-02 | 2.27052E-02 | -8.78915E-03 | -3.33416E-03 | 3.62415E-03 |
| | | | IMAGE SIDE | -1.21578E-01 | 0.029 | 1.060 | 0.00000E+00 | 6.04969E-02 | -2.76130E-02 | 2.07667E-02 | -2.10984E-02 | 2.28567E-02 | -1.43907E-02 | 5.10093E-03 |
| SECOND LENS | 1.614 | 25.6 | OBJECT SIDE | 3.62525E-01 | 0.288 | 1.079 | 0.00000E+00 | -1.24831E-01 | 1.41284E-01 | -1.32735E-01 | 7.56034E-02 | -4.21864E-02 | 2.55532E-02 | -8.60351E-03 |
| | | | IMAGE SIDE | 7.67475E-01 | 0.597 | 1.098 | 0.00000E+00 | -2.21304E-01 | 1.91441E-01 | -1.62395E-01 | 5.74067E-02 | -5.62798E-03 | -1.49225E-03 | -1.77637E-03 |
| THIRD LENS | 1.544 | 55.9 | OBJECT SIDE | 1.46527E-01 | 0.864 | 1.527 | 0.00000E+00 | -9.75842E-03 | 1.60463E-02 | -3.84174E-04 | -3.45485E-03 | 3.89583E-03 | -1.62999E-03 | 2.55897E-04 |
| | | | IMAGE SIDE | -1.74995E-01 | 0.640 | 1.502 | 0.00000E+00 | -5.71386E-02 | 4.06161E-02 | -4.35246E-02 | 3.68366E-02 | -1.75902E-02 | 4.32100E-03 | -3.34079E-04 |
| FOURTH LENS | 1.614 | 25.6 | OBJECT SIDE | 5.00188E-02 | 1.010 | 1.499 | 0.00000E+00 | -1.00591E-01 | 1.79188E-02 | -4.70626E-02 | 5.80302E-02 | -4.30803E-02 | 1.65678E-02 | -2.72051E-03 |
| | | | IMAGE SIDE | 1.43802E-01 | 0.130 | 2.292 | 0.00000E+00 | -4.32470E-02 | -3.35120E-03 | 5.27988E-03 | -2.37075E-03 | 6.04400E-04 | -8.60823E-05 | 5.11201E-06 |
| IR CUT GLASS | 1.517 | 64.2 | OBJECT SIDE | 0.00000E+00 | 0.210 | 2.673 | 0.00000E+00 | 0.00000E+00 | 0.00000E+00 | 0.00000E+00 | 0.00000E+00 | 0.00000E+00 | 0.00000E+00 | 0.00000E+00 |
| | | | IMAGE SIDE | 0.00000E+00 | 0.477 | 2.741 | 0.00000E+00 | 0.00000E+00 | 0.00000E+00 | 0.00000E+00 | 0.00000E+00 | 0.00000E+00 | 0.00000E+00 | 0.00000E+00 |
| LOWER LENS | 1.544 | 55.9 | OBJECT SIDE | -3.15890E-01 | 0.180 | 2.755 | 0.00000E+00 | 5.44256E-03 | 6.16403E-03 | -9.32261E-04 | 4.41049E-05 | 6.84279E-07 | 0.00000E+00 | 0.00000E+00 |
| | | | IMAGE SIDE | 0.00000E+00 | 0.100 | 2.903 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | – | – | – | 0.00000E+00 | | | 0.00000E+00 | 0.00000E+00 | 0.00000E+00 | 0.00000E+00 | 0.00000E+00 | 0.00000E+00 | 0.00000E+00 | 0.00000E+00 |

FIG. 98

EMBODIMENT 27

| MEMBER | MATERIAL CHARACTERISTICS | | SURFACE | CURVATURE RADIUS (mm) | CENTER THICKNESS (mm) | EFFECTIVE RADIUS (mm) | ASPHERIC COEFFICIENT | | | | | | | | |
|---|---|---|---|---|---|---|---|---|---|---|---|---|---|---|---|
| | REFRACTIVE INDEX Nd | ABBE NUMBER Vd | | | | | CONIC COEFFICIENT K | 4-TH ORDER COEFFICIENT | 6-TH ORDER COEFFICIENT | 8-TH ORDER COEFFICIENT | 10-TH ORDER COEFFICIENT | 12-TH ORDER COEFFICIENT | 14-TH ORDER COEFFICIENT | 16-TH ORDER COEFFICIENT |
| APERTURE DIAPHRAGM | — | — | — | 0.00000E+00 | −0.283 | 1.021 | 0.00000E+00 | 0.00000E+00 | 0.00000E+00 | 0.00000E+00 | 0.00000E+00 | 0.00000E+00 | 0.00000E+00 | 0.00000E+00 |
| FIRST LENS | 1.544 | 55.9 | OBJECT SIDE | 4.90522E−01 | 0.522 | 1.040 | 0.00000E+00 | 8.24218E−03 | 2.41380E−03 | −1.33558E−02 | 3.33070E−02 | −1.37183E−02 | −1.08881E−02 | 1.03662E−02 |
| | | | IMAGE SIDE | −1.28318E−01 | 0.028 | 1.045 | 0.00000E+00 | 7.82020E−02 | −4.68213E−02 | 3.04193E−02 | −1.89488E−02 | 1.90383E−02 | −2.44393E−02 | 1.60889E−02 |
| SECOND LENS | 1.614 | 25.6 | OBJECT SIDE | 3.91777E−01 | 0.264 | 1.071 | 0.00000E+00 | −1.50265E−01 | 1.71301E−01 | −1.57474E−01 | 6.58472E−02 | −3.63020E−02 | 4.08619E−02 | −1.68985E−02 |
| | | | IMAGE SIDE | 8.00165E−01 | 0.502 | 1.114 | 0.00000E+00 | −2.68779E−01 | 2.41870E−01 | −2.14202E−01 | 5.91488E−02 | 8.19272E−03 | 3.45981E−04 | −7.32762E−03 |
| THIRD LENS | 1.544 | 55.9 | OBJECT SIDE | 1.46512E−01 | 0.882 | 1.486 | 0.00000E+00 | −1.48566E−02 | 2.13581E−02 | −2.85059E−03 | −3.38115E−03 | 4.42863E−03 | −1.91889E−03 | 3.16908E−04 |
| | | | IMAGE SIDE | −2.38145E−01 | 0.673 | 1.484 | 0.00000E+00 | −6.83478E−02 | 4.49790E−02 | −4.61296E−02 | 3.75803E−02 | −1.77417E−02 | 4.18936E−03 | −2.45333E−04 |
| FOURTH LENS | 1.614 | 25.6 | OBJECT SIDE | 1.20973E−01 | 0.899 | 1.488 | 0.00000E+00 | −1.28386E−01 | 2.52506E−02 | −5.85868E−02 | 7.47409E−02 | −5.83748E−02 | 2.37168E−02 | −4.07241E−03 |
| | | | IMAGE SIDE | 2.53364E−01 | 0.172 | 2.323 | 0.00000E+00 | −6.40674E−02 | 1.73645E−03 | 4.30679E−03 | −2.32402E−03 | 6.12191E−04 | −8.63866E−05 | 4.99635E−06 |
| IR CUT GLASS | 1.517 | 64.2 | OBJECT SIDE | 0.00000E+00 | 0.210 | 2.735 | 0.00000E+00 | 0.00000E+00 | 0.00000E+00 | 0.00000E+00 | 0.00000E+00 | 0.00000E+00 | 0.00000E+00 | 0.00000E+00 |
| | | | IMAGE SIDE | 0.00000E+00 | 0.371 | 2.808 | 0.00000E+00 | 0.00000E+00 | 0.00000E+00 | 0.00000E+00 | 0.00000E+00 | 0.00000E+00 | 0.00000E+00 | 0.00000E+00 |
| LOWER LENS | 1.544 | 55.9 | OBJECT SIDE | −2.38271E−01 | 0.180 | 2.845 | 0.00000E+00 | 1.37142E−02 | 3.88008E−03 | −7.82245E−04 | 5.38677E−05 | −7.06139E−07 | 0.00000E+00 | 0.00000E+00 |
| | | | IMAGE SIDE | 0.00000E+00 | 0.100 | 2.944 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | — | — | — | 0.00000E+00 | | | 0.00000E+00 | 0.00000E+00 | 0.00000E+00 | 0.00000E+00 | 0.00000E+00 | 0.00000E+00 | 0.00000E+00 | 0.00000E+00 |

FIG. 100

COMPARATIVE EXAMPLE 1

| MEMBER | MATERIAL CHARACTERISTICS | | SURFACE | CURVATURE RADIUS (mm) | CENTER THICKNESS (mm) | EFFECTIVE RADIUS (mm) | ASPHERIC COEFFICIENT | | | | | | | |
|---|---|---|---|---|---|---|---|---|---|---|---|---|---|---|
| | REFRACTIVE INDEX Nd | ABBE NUMBER Vd | | | | | CONIC COEFFICIENT K | 4-TH ORDER COEFFICIENT | 6-TH ORDER COEFFICIENT | 8-TH ORDER COEFFICIENT | 10-TH ORDER COEFFICIENT | 12-TH ORDER COEFFICIENT | 14-TH ORDER COEFFICIENT | 16-TH ORDER COEFFICIENT |
| APERTURE DIAPHRAGM | — | — | — | 0.00000E+00 | −0.326 | 1.081 | 0.00000E+00 | 0.00000E+00 | 0.00000E+00 | 0.00000E+00 | 0.00000E+00 | 0.00000E+00 | 0.00000E+00 | 0.00000E+00 |
| FIRST LENS | 1.544 | 55.9 | OBJECT SIDE | 4.92002E−01 | 0.545 | 1.128 | 0.00000E+00 | 2.35010E−04 | 1.28086E−02 | −2.81487E−02 | 4.51576E−02 | −1.58140E−02 | −1.32320E−02 | 9.95712E−03 |
| | | | IMAGE SURFACE SIDE | −1.27877E−01 | 0.042 | 1.122 | 0.00000E+00 | 8.12404E−02 | −5.19926E−02 | 5.03328E−02 | −3.94986E−02 | 3.61687E−02 | −3.24980E−02 | 1.55600E−02 |
| SECOND LENS | 1.614 | 25.6 | OBJECT SIDE | 3.94371E−01 | 0.242 | 1.145 | 0.00000E+00 | −1.41209E−01 | 1.88239E−01 | −1.76031E−01 | 7.17233E−02 | −4.66711E−02 | 5.23596E−02 | −2.03884E−02 |
| | | | IMAGE SURFACE SIDE | 7.91702E−01 | 0.617 | 1.176 | 0.00000E+00 | −2.59129E−01 | 2.54736E−01 | −2.34404E−01 | 6.28328E−02 | 1.36393E−02 | −3.13102E−04 | −7.54467E−03 |
| THIRD LENS | 1.544 | 55.9 | OBJECT SIDE | 1.54333E−01 | 0.893 | 1.598 | 0.00000E+00 | −2.01004E−02 | 2.23870E−01 | −1.16098E−01 | −5.76348E−03 | 5.78467E−03 | −2.28812E−03 | 3.48462E−04 |
| | | | IMAGE SURFACE SIDE | −1.56353E−01 | 0.545 | 1.569 | 0.00000E+00 | −1.15692E−01 | 7.87314E−02 | −6.22432E−02 | 4.09505E−02 | −1.67075E−02 | 3.82898E−03 | −3.12766E−04 |
| FOURTH LENS | 1.614 | 25.6 | OBJECT SIDE | 1.65767E−01 | 1.155 | 2.511 | 0.00000E+00 | −1.62856E−01 | 3.21949E−02 | −6.74119E−02 | 9.82231E−02 | −7.81281E−02 | 3.08739E−02 | −4.96380E−03 |
| | | | IMAGE SURFACE SIDE | 3.65782E−01 | 0.230 | 2.809 | 0.00000E+00 | −8.13395E−02 | 3.30798E−03 | 5.84725E−03 | −3.21000E−03 | 7.65516E−04 | −8.92550E−05 | 4.04374E−06 |
| IR CUT GLASS | 1.517 | 64.2 | OBJECT SIDE | 0.00000E+00 | 0.210 | 2.861 | 0.00000E+00 | 0.00000E+00 | 0.00000E+00 | 0.00000E+00 | 0.00000E+00 | 0.00000E+00 | 0.00000E+00 | 0.00000E+00 |
| | | | IMAGE SURFACE SIDE | 0.00000E+00 | 0.378 | 2.861 | 0.00000E+00 | 0.00000E+00 | 0.00000E+00 | 0.00000E+00 | 0.00000E+00 | 0.00000E+00 | 0.00000E+00 | 0.00000E+00 |
| LOWER LENS | 1.544 | 55.9 | OBJECT SIDE | −7.56690E−02 | 0.107 | 2.891 | 0.00000E+00 | 0.00000E+00 | 0.00000E+00 | 0.00000E+00 | 0.00000E+00 | 0.00000E+00 | 0.00000E+00 | 0.00000E+00 |
| | | | IMAGE SURFACE SIDE | 0.00000E+00 | 0.100 | 3.026 | 0.00000E+00 | 0.00000E+00 | 0.00000E+00 | 0.00000E+00 | 0.00000E+00 | 0.00000E+00 | 0.00000E+00 | 0.00000E+00 |
| IMAGE SURFACE | — | — | — | 0.00000E+00 | — | — | 0.00000E+00 | 0.00000E+00 | 0.00000E+00 | 0.00000E+00 | 0.00000E+00 | 0.00000E+00 | 0.00000E+00 | 0.00000E+00 |

LENS ELEMENT, IMAGE CAPTURING DEVICE, AND IMAGING LENS

TECHNICAL FIELD

The present invention relates to a lens element, an image capturing device, and an imaging lens.

BACKGROUND ART

In recent years, high pixel density and size reduction have been progressing in image capturing devices to be mounted on a small-sized electronic device. That is, it is required to obtain a low-height and small-sized image capturing device with excellent resolving power.

An image capturing device with five or six lenses (lens elements) has been attracting attention as an example of the low-height and small-sized image capturing device with excellent resolving power.

In order to obtain the excellent resolving power, it is preferable to satisfactorily correct aberrations by increasing the number of lenses. On the other hand, since an optical total length of an optical system increases, as the number of lenses increases, it leads to increase the height of the image capturing device. In addition, as the number of the lenses increases, factors of manufacturing tolerance generating increase. Since the distance between adjacent lenses is decreased, variations in optical characteristics with respect to a relative positional deviation between the lenses become larger. Therefore, when the number of lenses is too large, it leads to deterioration in productivity of the image capturing device. Accordingly, it is not preferable to increase the number of the lenses. In view of the above, the image capturing device with five or six lenses becomes mainstream, in recent years.

Examples of the image capturing device with five or six lenses include image capturing devices disclosed in PTL 1 and PTL 2.

In the image capturing device, a configuration, in which a plano-concave lens having a surface (object side surface) facing an object side which is a concave surface and a surface (image side surface) facing an image surface side which is a plane is disposed adjacent to an imaging element, is proposed. As the image capturing device, image capturing devices disclosed in PTL 3 and PTL 4 are included. PTL 3 and PTL 4 disclose that aberration is satisfactorily corrected by the configuration.

In addition, in recent years, high pixel density and size reduction have been progressing in image capturing devices to be mounted on a small-sized electronic device. That is, it is required to obtain a low-height and small-sized image capturing device with excellent resolving power.

An image capturing device with five or six lenses (lens elements) has been attracting attention as an example of the low-height and small-sized image capturing device with excellent resolving power.

In order to obtain the excellent resolving power, it is preferable to satisfactorily correct aberrations by increasing the number of lenses. On the other hand, since the optical total length of an optical system increases, as the number of lenses increases, it leads to increase the height of the image capturing device. In addition, as the number of the lenses increases, factors of manufacturing tolerance generating increase. Since the distance between adjacent lenses is decreased, variations in optical characteristics with respect to a relative positional deviation between the lenses become larger. Therefore, when the number of lenses is too large, it leads to deterioration in productivity of the image capturing device. Accordingly, it is not preferable to increase the number of the lenses. In view of the above, the image capturing device with five or six lenses becomes mainstream, in recent years.

Examples of the image capturing device including five or six lenses include image capturing devices disclosed in PTL 1 and PTL 2.

In the image capturing device, a configuration, in which a plano-concave lens having a surface (object side surface) facing an object side is a concave surface and a surface (image side surface) facing an image surface side which is a plane is disposed adjacent to an imaging element, is proposed. As the image capturing device, image capturing devices disclosed in PTL 3 and PTL 4 are included. PTL 3 and PTL 4 disclose that aberration is satisfactorily corrected by the configuration.

Furthermore, in recent years, high pixel density (high resolution) and size reduction (low-height) have been progressing in image capturing devices to be mounted on an electronic device (for example, a mobile device).

As a method for satisfying requirements for high resolution, for example, a method for correcting the aberration by increasing the number of lenses is considered.

However, there are problems in that when the number of lenses increases, (1) a whole length of a lens system becomes increases, and it leads to increase the height of the device, and (2) influence of relative positional deviation between the lenses becomes greater due to an increase of error factors or a close arrangement of the distance between the lenses, and it leads to deteriorate in the productivity.

Accordingly, as a recent image capturing device for an electronic device, an image capturing device with five or six lenses becomes mainstream in consideration of the size and the optical characteristics. The image capturing device with five or six lenses is disclosed in PTL 1 and PTL 2, for example.

In addition, as a technique for obtaining excellent aberration correction effect, for example, in PTL 3 and PTL 4, there are described that a lens of which the object side is the concave surface and the image surface side is a plane is used.

CITATION LIST

Patent Literature

PTL 1: Japanese Unexamined Patent Application Publication No. 2012-163963 (published on Aug. 30, 2012)

PTL 2: Japanese Unexamined Patent Application Publication No. 2014-29547 (published on Feb. 13, 2014)

PTL 3: Japanese Unexamined Patent Application Publication No. 2004-302095 (published on Oct. 28, 2004)

PTL 4: Japanese Unexamined Patent Application Publication No. 2013-153537 (published on Aug. 8, 2013)

SUMMARY OF INVENTION

Technical Problem

The outer profile of the plano-concave lens according to PTL 3 and PTL 4 is commonly a cylindrically-shaped. The reason why the outer profile thereof is the cylindrically-shaped, since the concave surface defines a rotationally symmetrical shape, it is preferable that the plano-concave lens has a cylindrically-shaped outer profile for performing various processes.

Here, in a case of a structure in which the plano-concave lens is fitted to an opening which is provided in the element storing unit (a laminate substrate, a sensor cover, or the like) for storing the imaging element, the outer profile of the element storing unit becomes larger in a normal direction with respect to an optical axis of the plano-concave lens. As a result, there is a problem in that the size of the image capturing device increases.

In a case of a structure in which the plano-concave lens is placed on the element storing unit so as to cover the opening, a distance between the plano-concave lens and the imaging element becomes too large. As a result, there is a problem in that it is difficult to obtain desired aberration correction effect.

In addition, PTL 3 discloses that, when a plano-concave lens is disposed immediately above a light receiving unit of an imaging element, an incident angle of light to the light receiving unit becomes greater. Accordingly, there is a problem in that it leads to deterioration in a peripheral light amount ratio.

In the image capturing device with five or six lenses, in a case where the small-sized image capturing device with high resolving power is obtained by disposing the plano-concave lens adjacent to the imaging element, it is required to pay attention to the correction of each aberration and the deterioration in the peripheral light amount ratio.

Furthermore, in the techniques of the above-mentioned PTL 1 and PTL 2, there is a problem in that the high resolution can be achieved by setting the number of lenses to five or six, but the sufficient aberration correction performance cannot be obtained.

In addition, in the techniques of the above-mentioned PTL 3 and PTL 4, there is a problem in that by only using a lens of which the object side is a concave surface and the image surface side is a plane, an incident angle of light with respect to a light receiving surface of a light receiving element becomes greater, and the peripheral light amount ratio is deteriorated.

The present invention has been made in view of the above problems, and an object of the invention is to provide a lens element which is capable of obtaining a small-sized image capturing device with excellent resolving power, and the image capturing device including the lens element.

In addition, the present invention has been made in view of the above problems, and an object of the invention is to provide an imaging lens and the image capturing device which are capable of suppressing the deterioration in the peripheral light amount ratio and correcting various aberrations satisfactorily, in the image capturing device with five or six lens.

Furthermore, the present invention has been made in view of the above problems, and an object of the invention is to provide the imaging lens, which is produced with high productivity and a small-sized, with the high aberration correction performance and the peripheral light amount ratio.

Solution to Problem

In order to solve the above problems, a lens element according to one aspect of the invention includes an object side surface facing an object side, which is an aspheric surface and a concave surface; and an image side surface facing an image surface side, which is substantially plane, in which a shape of an outer profile of the image side surface is substantially rectangular, and in which the image side surface is provided with a projection for defining a distance between the image side surface and an imaging element. Moreover, a lens element according to another aspect of the invention includes an object side surface facing an object side, which is aspheric surface and a concave surface: and an image side surface facing an image surface side, which is substantially plane, in which a shape of an outer profile of the image side surface is substantially rectangular, and in which an inclination is provided adjacent to an edge of the image side surface, which inclination has an inclination angle of 40° or more with respect to an optical axis of the lens element. Further, an image capturing device according to still another aspect of the invention includes: a lens element including an object side facing an object side, which is an aspheric surface and a concave surface; an image side surface facing an image surface side, which is substantially plane, in which a shape of an outer profile of the image side surface is substantially rectangular; and a flange portion which is formed as a portion projected, in a normal direction of an optical axis of the lens element, from the object side surface facing the image side surface; an imaging element which includes a light receiving unit for receiving light passed through the lens element; and an element storing unit which stored the imaging element, wherein the lens element is supported, by the flange portion and the element storing unit, at a position on the object side with respect to the image side surface. Furthermore, an image capturing device according to still another aspect of the invention included: a lens element including: an object side surface facing an object side, which is an aspheric surface and a concave surface; an image side surface facing an image surface side, which is substantially plane, in which a shape of an outer profile of the image side surface is substantially rectangular; a flange portion which is formed as a portion projected, in a normal direction of an optical axis of the lens element, from the object side surface facing the image side surface; and a step portion formed as a portion projected along the optical axis of the lens element from the flange portion; an imaging element which includes a light receiving unit for receiving light passed through the lens element; and an element storing unit which stores the imaging element, wherein the lens element is supported, by the step portion and the element storing unit, at a position on the object side with respect to the image side surface.

In addition, in order to solve the above problems, there is provided an imaging lens according to an another aspect of the invention, in which lenses are disposed in order of a front lens and a rear lens from an object side toward an image surface side, in which the front lens has positive refractive power, and has a center portion of a surface facing an object side, which is in a convex shape, a peripheral portion of a surface facing the object side, which is in a concave shape, a center portion of a surface facing an image surface side which is in a concave shape, and a peripheral portion of a surface facing the image surface side which is in a convex shape, in which the rear lens has a surface facing the object side, which is in a concave shape, which has a center region of a rear object side, which is a center portion of a surface facing the object side, and in which a change amount of a shape of a lens surface toward the object side becomes greater with distance from the position of the center of the lens surface, and an intermediate region of a rear object side, which is an intermediate portion of a surface facing the object side, and in which a change amount of the shape becomes smaller with the distance from the position of the center of the lens surface, and in which a surface facing the image surface side is substantially plane, in which, in the surface facing the object side of the rear lens, a distance from the center of the lens surface to a boundary between the center region of the rear object side and the intermediate region of the rear object side is 30% or more than a distance from the center of the lens surface to an edge of the lens surface, in which, when it is assumed that a distance between an image surface and a surface facing the image surface side of the rear lens is CAV and an optical total length of the imaging lens is OTLV, Expression (1) is satisfied, $$CAV/OTLV<0.15 \quad (1),$$

and in which, when it is assumed that a focal distance of the imaging lens is fV, a focal distance of the front lens is f5V, and a focal distance of the rear lens is fcV, Expression (2) and (3) are satisfied, $$3.4<f5V/fV<5.2 \quad (2).$$

$$-1.7<fcV/fV<-1.1 \quad (3).$$

Furthermore, an imaging lens according to still another aspect of the present invention is an imaging lens which forms an image of an object on an image surface, and which includes an upper lens which includes a first lens of which an object side is convex and which has a positive refractive index, a second lens of which the object side is convex and which is formed by a meniscus lens, a third lens of which an image surface side is convex and which has the positive refractive index, and a fourth lens which has the positive refractive index and in which a shape of the image surface side has a point of inflection, in this order from the object side toward the image surface side; and a lower lens which is disposed on the image surface side with respect to the upper lens, and of which the object side is concave and the image surface side is substantially plane, in which the shape of the surface of the object side in the lower lens is a shape in which a change amount of the shape to the object side increases from a lens center toward an effective diameter edge, until a predetermined distance which is set as 30% or more of a distance between the lens center and the effective diameter edge, and the change amount of the shape to the object side is decreased when exceeding the predetermined distance, and in which a distance between the lower lens and the image surface is less than 0.15 times of an optical total length of the imaging lens.

Advantageous Effects of Invention

According to one aspect of the invention, the small-sized image capturing device with excellent resolving power can be obtained.

In addition, according to another aspect of the present invention, in the image capturing device with five or six lenses, the deterioration of the peripheral light amount ratio can be suppressed and the various aberrations can be satisfactorily corrected.

Furthermore, according to still another aspect of the present invention, the imaging lens, which is produced with high productivity and can be produced in a small-sized, with the high aberration correction performance and the high peripheral light amount ratio can be provided.

BRIEF DESCRIPTION OF DRAWINGS

FIGS. 18(a) and 18(b) are cross-section views illustrating an example of a configuration in which the image side surface is in contact with the imaging element.

FIG. 19(a) is an explanatory diagram of a path of a chief ray in a case where the image side surface is not in contact with the imaging element, and FIG. 19(b) is an explanatory diagram of the path of the chief ray in a case where the image side surface is in contact with the imaging element.

FIG. 32 illustrates an aspherical surface equation and illustrates a table illustrating lens data of the imaging lens illustrated in FIG. 30.

FIG. 38 is a table illustrating lens data of the imaging lens illustrated in FIG. 37.

FIG. 43 is a cross-section view illustrating a configuration of an imaging lens according to Embodiment 16 of the present invention.

FIG. 44 is a table illustrating lens data of the imaging lens illustrated in FIG. 43.

FIG. 50 is a table illustrating lens data of the imaging lens illustrated in FIG. 49.

FIG. 56 is a table illustrating lens data of the imaging lens illustrated in FIG. 55.

FIG. 62 is a table illustrating lens data of the imaging lens illustrated in FIG. 61.

FIG. 67 is a table illustrating comparison of the imaging lens according to each of Embodiments 14 to 22 of the present invention.

FIG. 68 is a cross-section view illustrating a schematic configuration of the image capturing device including the imaging element and the imaging lens according to each of Embodiments 14 to 22 of the present invention.

FIG. 69 is a cross-section view illustrating a configuration of an imaging lens according to Embodiment 20 of the present invention.

FIG. 70 is a table illustrating lens data of the imaging lens illustrated in FIG. 69.

FIG. 76 is a table illustrating lens data of the imaging lens illustrated in FIG. 75.

FIG. 82 is a table illustrating lens data of the imaging lens illustrated in FIG. 81.

FIG. 89 is a diagram illustrating conditions of Embodiments 23 to 27 in simulations performed to examine the optical characteristics of the imaging lens illustrated in FIG. 87.

FIG. 90 illustrates design data of an imaging lens according to Embodiment 23.

FIG. 92 illustrates design data of an imaging lens according to Embodiment 24.

FIG. 94 illustrates design data of an imaging lens according to Embodiment 25.

FIG. 96 illustrates design data of an imaging lens according to Embodiment 26.

FIG. 98 illustrates design data of an imaging lens according to Embodiment 27.

FIG. 100 illustrates design data of an imaging lens according to Comparative Example 1.

DESCRIPTION OF EMBODIMENTS

[Summary 1 of the Invention]

By providing a configuration that a plano-concave lens in which a surface facing an object side (object side surface) is a concave surface and a surface facing an image surface side (image side surface) is a plane is provided adjacent to an imaging element, an aberration can be efficiently corrected. If the concave surface is an aspheric surface, the aberration can be more efficiently corrected.

Accordingly, in the lens element according to following each of embodiments, a shape of the outer profile of the image side surface is set as a substantially rectangular. In the present specification, the term "substantially rectangular" includes a rectangular, and a shape other than the rectangular that has no difficulty in regarded as the rectangular. As an example of the shape other than such a rectangular, a rounded-rectangular is included.

According to each of the embodiments, an increase in an outer profile of an element storing unit in a normal direction with respect to an optical axis of a lens element can be suppressed and an increase in a distance between the lens element and an imaging element can be suppressed. Accordingly, a small-sized image capturing device with excellent resolving power can be obtained.

The image side surface of the plano-concave lens is a plane. However, the image side surface of the lens element according to each of the embodiments may be a plane, may be formed with fine projections and depressions (for example, nm order of the projections and depressions) which reduce a reflective index of light, or may be formed to be cured slightly. There lenses have a common feature in that a change in optical characteristics (refractive power, eccentricity, or the like) to transmit the light or receive the light is so small to be negligible in an optical system of the image capturing device. The lens surface is not limited to the plane. Surfaces having the above feature are collectively called the "substantially plan" in the present specification.

[Relationship Between Size and Resolving Power of Cylindrically-Shaped Lens and Image Capturing Device]

Figure 2:
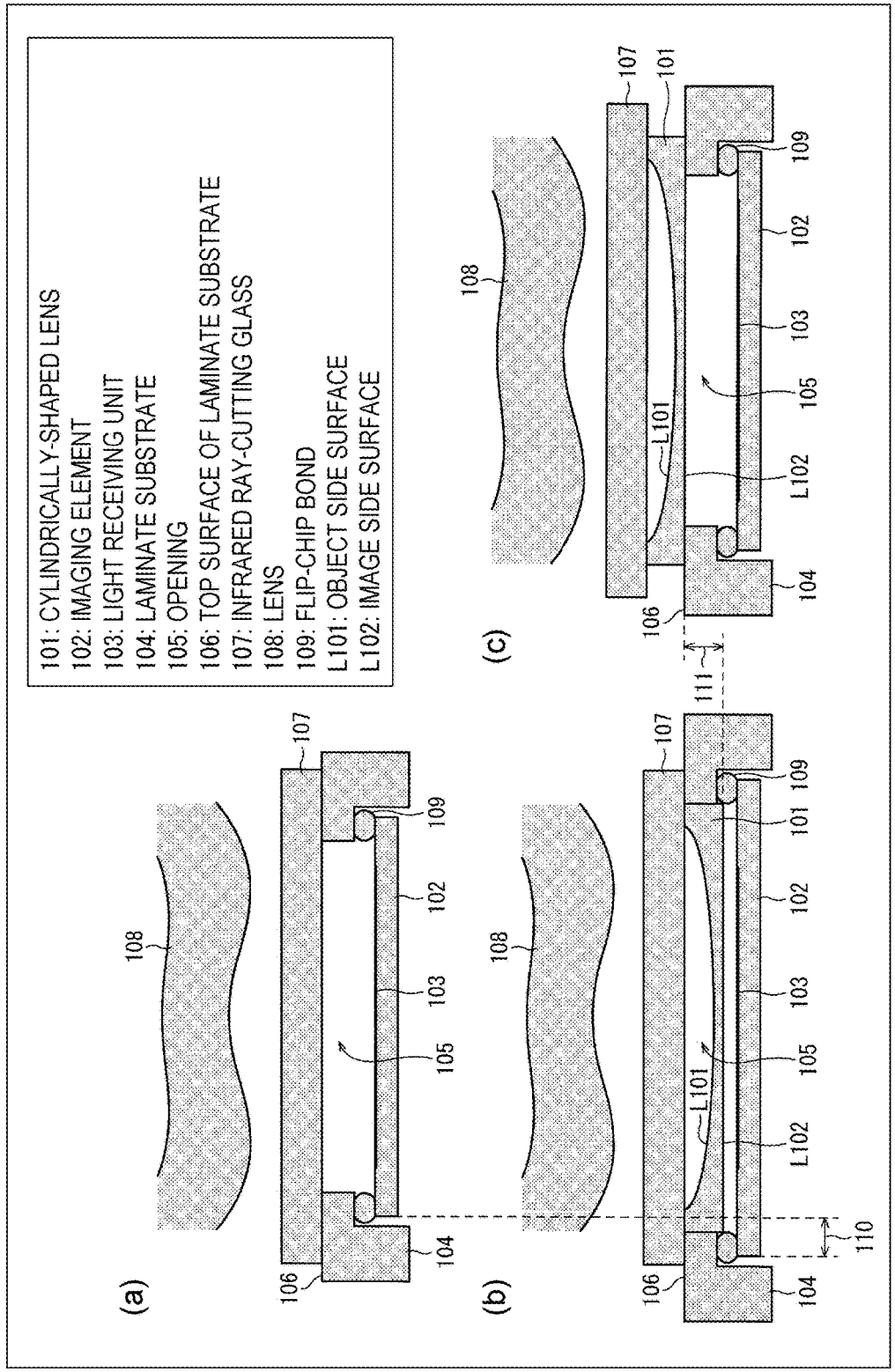
FIG. 2 is a cross-section view illustrating various conventional examples in which a cylindrically-shaped lens is provided in the image capturing device.

FIG. 2 is a cross-section view illustrating various conventional examples in which a cylindrically-shaped lens is provided in the image capturing device. Specifically, FIG. 2 is a diagram illustrating a relationship between cross-section views of FIGS. 2($a$), 2($b$), and 2($c$) of the main portions of the image capturing device.

FIG. 2(a) illustrates a state where a cylindrically-shaped a lens 101 is not provided.

An imaging element 102 includes a light receiving unit 103. A laminate substrate (element storing unit) 104 stores the imaging element 102 and guides light appropriately to the light receiving unit 103, in which an opening 105 is formed above the light receiving unit 103. An infrared rat-cutting glass 107 is placed on a top surface 106 further than the laminate substrate 104 is so as to cover the opening 105. A lens 108 is provided further on an object side of the infrared rat-cutting glass 107. The lens 108 is one of the five or six lenses which constitute an optical system of the image capturing device. The imaging element 102 is connected to the laminate substrate 104 from a side of a rear surface of the laminate substrate 104 with a flip-chip bond 109.

FIG. 2(b) illustrates a state where the cylindrically-shaped lens 101 is fitted to the opening 105.

The cylindrically-shaped lens 101 includes an object side surface L101 facing the object side and an image side surface L102 facing the image surface side. The object side surface L101 is a concave surface and the image side surface L102 is a plane.

When comparing FIGS. 2(a) and 2(b), in FIG. 2(b), since the cylindrically-shaped lens 101 is fitted thereto, a size of the opening 105 is larger than that of the FIG. 2(a). As the size of the opening 105 is large, in FIG. 2(b), the outer profile of the laminate substrate 104 becomes larger than that of the FIG. 2(a) (refer to a width 110, in FIG. 2). It leads to increase in the size of the image capturing device. A case where a side surface of the cylindrically-shaped lens 101 is attached to an inner side surface of the laminate substrate 104 which constitutes the opening 105 is also the same cross-section view. Accordingly, the case has a factor causing an increase in the size of the image capturing device.

FIG. 2(c) illustrates a state where the cylindrically-shaped lens 101 is placed on the top surface 106 so as to cover the opening 105.

Since the cylindrically-shaped lens 101 is placed on the top surface 106, the infrared rat-cutting glass 107 is placed on the cylindrically-shaped lens 101.

When comparing FIGS. 2(b) and 2(c), in FIG. 2(b), the image side surface L102 is positioned on the image surface side further than the top surface 106 is and in FIG. 2(c), the image side surface L102 is positioned on the object side further than the top surface 106 is. As a result, in FIG. 2(c), a distance between the image side surface L102 and the imaging element 102 is greater than that of the FIG. 2(b) (refer to a width 111 in FIG. 2). It suppresses obtaining a desired aberration correction effect, and it causing the resolving power reduction of the image capturing device.

[Embodiment 1]

Figure 1:
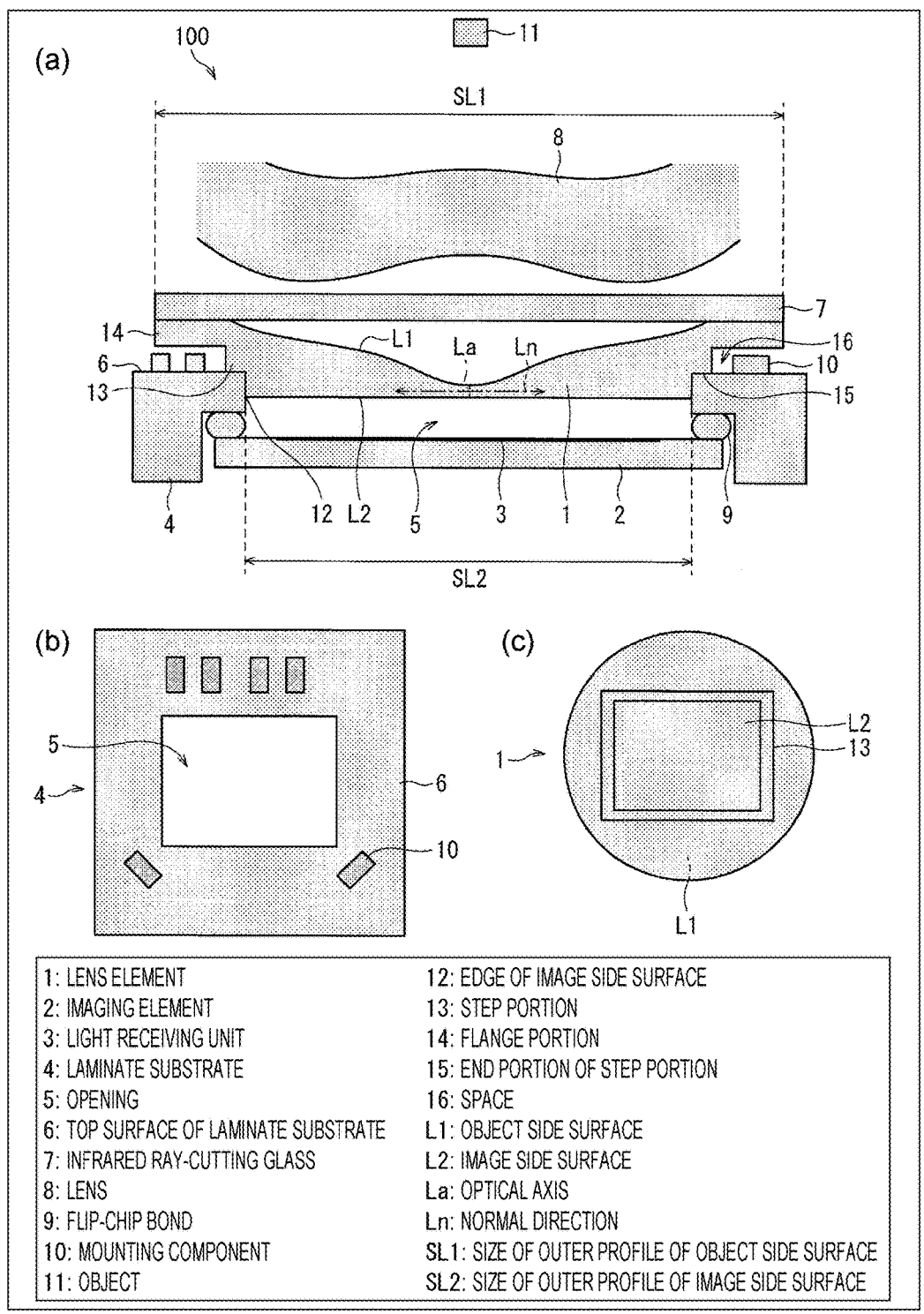
FIG. 1(a) is a cross-section view illustrating a configuration of a main portion of an image capturing device according to Embodiment 1 of the present invention.
FIG. 1(b) is a top view of a laminate substrate.
FIG. 1(C) is a diagram of a lens element according to Embodiment 1 of the present invention when viewed from an image surface side.

FIG. 1(a) is a cross-section view illustrating a configuration of a main portion of an image capturing device according to Embodiment 1 of the present invention, FIG. 1(b) is a top view of a laminate substrate, and FIG. 1(c) is a diagram of a lens element according to Embodiment 1 of the present invention when viewed from an image surface side.

A main portion 100 (hereinafter, simply referred to as a "main portion") of the image capturing device illustrated in FIG. 1(a) includes a lens element 1, an imaging element 2, a laminate substrate (element storing unit) 4, an infrared ray-cutting glass 7, a lens 8, a flip-chip bond 9, and a mounting component 10. The lens 8, the infrared ray-cutting glass 7, the lens element 1, and the imaging element 2 are disposed in this order, from a side of an object 11 that is an imaging target of the image capturing device (hereinafter, referred to as an "object side") to a side of an image surface of the lens element 1 (hereinafter, referred to as an "image surface side").

The lens element 1 is fitted to an opening 5 or a side surface of the lens element 1 is attached to the inner side surface of the laminate substrate 4 which constitutes the opening 5. The lens element 1 includes an object side surface L1 which is a surface facing the object side and an image side surface L2 which is a surface facing the image surface side. The object side surface L1 is an aspheric surface and a concave surface, and the image side surface L2 is substantially plane. That is, the image side surface L2 is not limited to the plane, and may be a surface in which a change in optical characteristics (refractive power, eccentricity, or the like) to transmit the light or receive the light is so small to be negligible in an optical system of the image capturing device. An example of such a surface includes a surface which is formed with fine projections and depressions (for example, nm order of the projections and depressions) which reduce a reflective index of light, or a surface formed to be cured slightly.

The imaging element 2 includes a light receiving unit 3 which receives light passed through the lens element 1. As an example of the imaging element 2, a charge coupled device (CCD) and a complementary metal oxide semiconductor (CMOS) are included.

The laminate substrate 4 stores the imaging element 2 and guides light appropriately to the light receiving unit 3 and the opening 5 is formed on the light receiving unit 3. In addition, the laminate substrate 4 has a predetermined wiring pattern, and is capable of electrically connecting the imaging element 2 and the mounting component 10 which is mounted on the laminate substrate 4. The laminate substrate 4 has a top surface 6.

The infrared ray-cutting glass 7 is placed on the top surface 6 so as to cover the opening 5. The infrared ray-cutting glass 7 has a function for protecting the light receiving unit 3 from infrared light or suppressing moire.

The lens 8 is one of the five or six lenses which constitute the optical system of the image capturing device. An arrangement example of the lenses will be described.

The imaging element 2 is connected to the laminate substrate 4 from the side of the rear surface of the laminate substrate 4 with the flip-chip bond 9. The flip-chip bond 9 is capable of electrically connecting the imaging element 2 and the laminate substrate 4 and includes a bump or the like.

The mounting component 10 is disposed on the top surface 6 and is electrically connected to the imaging element 2 through the laminate substrate 4 and the flip-chip bond 9. The mounting component 10 includes electrical parts for implementing an auto focus function in the image capturing device.

There, as constructed from FIG. 1(a), in the lens element 1, a size SL2 of the outer profile of the image side surface L2 is smaller than a size SL1 of the outer profile of the object side surface L1.

In addition, the lens element 1 further includes a step portion 13 which is provided adjacent to an edge 12 of the image side surface L2. The step portion 13 is projected from a flange portion 14 in an optical axis La direction of the lens element 1 and an end portion 15 closest to the image surface side is located on the object side further than the image side surface L2 is. The flange portion 14 includes a portion in which the object side surface L1 with respect to the image side surface L2 is projected in a normal direction Ln with respect to the optical axis La.

The step portion 13 is placed on the top surface 6. Accordingly, the image side surface L2 is disposed on the image surface side (inner side of the element storing unit) further than the top surface 6 is and the object side surface L1 is disposed on the object side further than the top surface 6 is. In other words, the image side surface L2 is disposed on the inner side of the laminate substrate 4. Therefore, the flange portion 14 and the top surface 6 separate from each other and the mounting component 10 is disposed in the separated space 16.

As illustrated in FIG. 1(b), the shape of the outer profile of the opening 5 and the top surface 6 is a rectangle as viewed from above the laminate substrate 4.

As illustrated in FIG. 1(c), the shape of the outer profile of the image side surface L2 is a rectangle when viewed from the image surface side of the lens element 1. However, the shape of the outer profile of the image side surface L2 is not limited to the rectangle, and may be a shape other than the rectangular that has no difficulty in regarded as the rectangular. As an example of the shape other than such a rectangular, a rounded-rectangular is included. That is the shape of the outer profile of the image side surface L2 may be the substantially rectangular. The size of the outer profile of the image side surface L2 is set according to the shape of the light receiving unit 3. The step portion 13 is provided so as to surround the image side surface L2.

On the other hand, according to FIG. 1(c), the shape of the outer profile of the object side surface L1 is circular. However, the shape of the outer profile of the object side surface L1 is not limited to the circular, and can be appropriately selected according to the design.

In the main portion 100, the size of the opening 5 can be set as smaller than the size of the outer profile of the object side surface L1. Accordingly, the size of the outer profile of the laminate substrate 4 can be reduced. As a result, the size of the image capturing device can be reduced.

In addition, in the main portion 100, as constructed from FIG. 1(a), the image side surface L2 can be disposed on the image surface side further than the top surface 6 is. Accordingly, an increases in a distance between the image side surface L2 and the imaging element 2 (more specifically, the light receiving unit 3) can be suppressed. As a result, the desired aberration correction effect can be obtained, and the image capturing device with excellent resolving power can be obtained.

That is, in the main portion 100, the image side surface L2 is disposed adjacent to the light receiving unit 3. Accordingly, a manufacturing error of the lens element 1 and a variation degree of the optical characteristics with respect to the various types of accuracy relating to the mounting of the lens element 1 can be reduced. In general, as the lens element 1 is closer to the image surface, the variation degree is decreased.

In addition, in the lens element 1, the size of the outer profile of the image side surface L2 is set according to the shape of the light receiving unit 3. Therefore, it is possible to configure the main portion 100 such that increasing in the size of the outer profile of the image side surface L2 too much without any purpose is suppressed and the light receiving unit 3 appropriately receives the light.

In addition, in the lens element 1, the shape of the outer profile of the object side surface L1 is circular. Accordingly, the lens element 1 can be easily manufactured. That is, regarding the object side surface L1, injection molding or thermoset molding using a die can be applied. Additionally, the die can be easily processed. For example, through performing of cutting with a bite while rotating a core spin (since the method is a well-known technique, the detailed description thereof will not be described), the object side surface L1 is easily molded, even when the surface is in an aspherical shape. In addition, regarding the image side surface L2, since it is not required to provide the lens surface, it is needless to say that the molding is easily performed.

In addition, since the image side surface L2 is the substantially plane, the image side surface L2 is easily deviated from the die during molding. By using the fact, if fine projections and depressions which reduce the reflective index of the light are formed on the image side surface L2, the reflection of light can be suppressed without coating the image side surface L2. Accordingly, when performing coating, since attachment of dust to the coated portion can be avoided, entering foreign substance to a captured image (as the image side surface L2 is closer to the light receiving unit 3, the entering of the foreign substance is remarkable) can be suppressed.

In addition, in the main portion 100, the flange portion 14 and the top surface 6 separate from each other, and the mounting component 10 is disposed in the space 16. In other words, the mounting component 10 can be disposed on an inner side further than the edge of the object side surface L1 is. By disposing the mounting component 10 on the inner side further than the edge of the object side surface L1, the size of the outer profile of the laminate substrate 4 can be more reduced.

[Embodiment 2]

Figure 3:
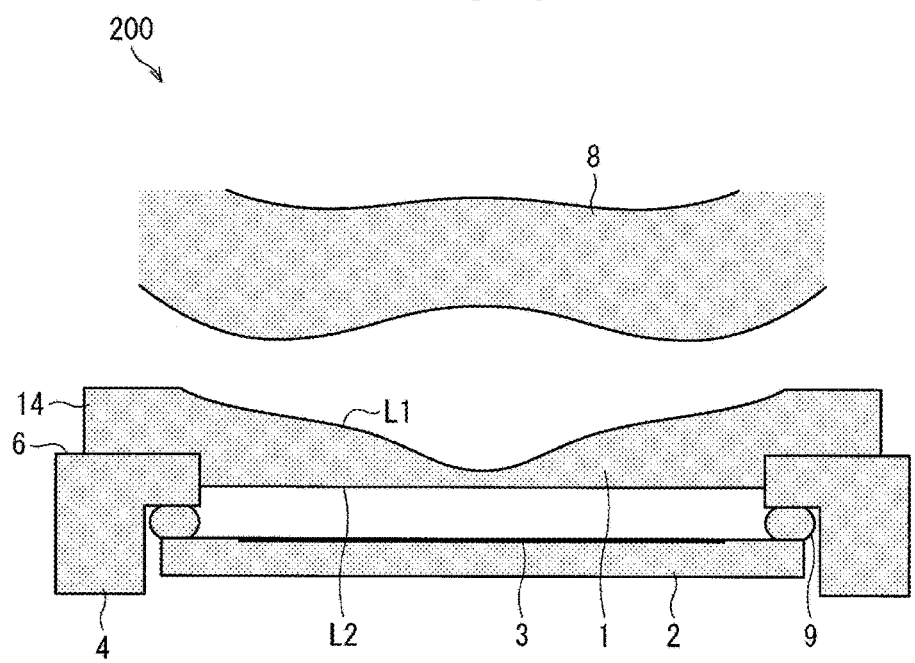
FIG. 3 is a cross-section view illustrating a configuration of a main portion of an image capturing device according to Embodiment 2 of the present invention.

FIG. 3 is a cross-section view illustrating a configuration of a main portion of the image capturing device according to the present embodiment. In FIG. 3, in order to simplify the illustration, only the configuration different from the main portion 100 illustrated in FIG. 1 and the configuration relating thereto are illustrated mainly.

In a main portion 200 illustrated in FIG. 3, the following configuration is different from that of the main portion 100.

That is, in the main portion 200, the infrared ray-cutting glass 7 is omitted. Accordingly, it is possible to simplify the configuration of the image capturing device. Since the optical total length of the optical system of the image capturing device can be decreased, it is possible to decrease the height of the image capturing device.

A configuration required for omitting the infrared ray-cutting glass 7 is a configuration in which a process for blocking the infrared light is subjected at least one of the object side surface L1 and the image side surface L2 (that is, a blocking shape is formed). By using a thermoset material as a material of the lens element 1, the process can be easily performed. The thermoset material is excellent in heat-resisting properties, and the process can be performed by high-temperature deposition.

Furthermore, by omitting the infrared ray-cutting glass 7, a space for disposing the mounting component 10 can be large in the above the top surface 6 (in FIG. 3, the mounting component 10 is not illustrated).

In addition, the lens element 1 illustrated in FIG. 3 does not include the step portion 13. According to this, in the main portion 200, since the flange portion 14 is attached to the top surface 6, there is no space 16.

[Embodiment 3]

Figure 4:
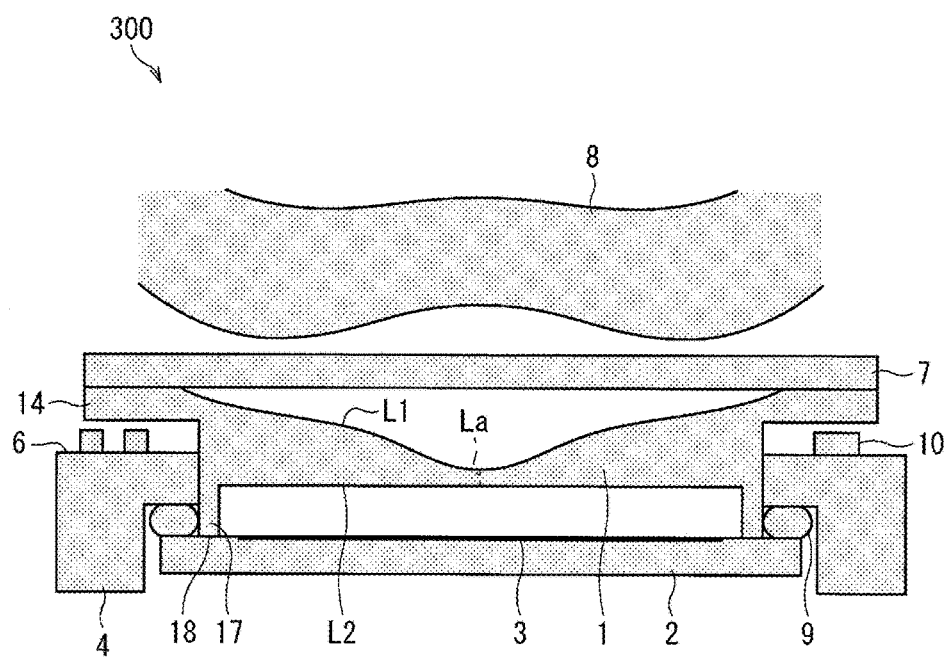
FIG. 4 is a cross-section view illustrating a configuration of a main portion of an image capturing device according to Embodiment 3 of the present invention.

FIG. 4 is a cross-section view illustrating a configuration of a main portion of the image capturing device according to the present embodiment. In FIG. 4, in order to simplify the illustration, only the configuration different from the main portion 100 illustrated in FIG. 1 and the configuration relating thereto are illustrated mainly.

In a main portion 300 illustrated in FIG. 4, the following configuration is different from that of the main portion 100.

That is, the main portion 300 includes a projection portion 17 in the lens element 1.

The projection portion 17 extends in a direction from the image side surface L2 toward the optical axis La, in other words, the projection portion 17 extends from the object side toward the image surface side. Furthermore, an end portion 18 of the projection portion 17 is in contact with around the light receiving unit 3 in the imaging element 2.

In the main portion 300, the end portion 18 of the projection portion 17 extending in a direction along from the image side surface L2 to the optical axis La is in contact with the imaging element 2. Accordingly, the position of the image side surface L2 with respect to the imaging element 2 can be set, and the distance between the image side surface L2 and the imaging element 2 can be suppressed. The distance can be easily changed according to the length of the projection portion 17.

In addition, the lens element 1 illustrated in FIG. 4 does not include the step portion 13.

[Light Blocking of Side Surface of Lens Element]

In the image capturing device according to each embodiment, it is preferable to shield the side surface of the lens element 1 from the light (that is, including a light blocking side surface). Here, strictly, the lens element 1 includes at least two side surfaces of a side surface corresponding to the flange portion 14 and a side surface does not corresponding to the flange portion 14. In addition, regarding the each side surface, the light blocking surface may be a part of the side surfaces or may be the entire the side surfaces. Accordingly, it can be considered that, in at least one of a plurality of side surfaces, at least a part thereof is shielded from the light.

Accordingly, stray light such as a ghost and flare can be suppressed.

[Arrangement Example of Lens]

Figure 5:
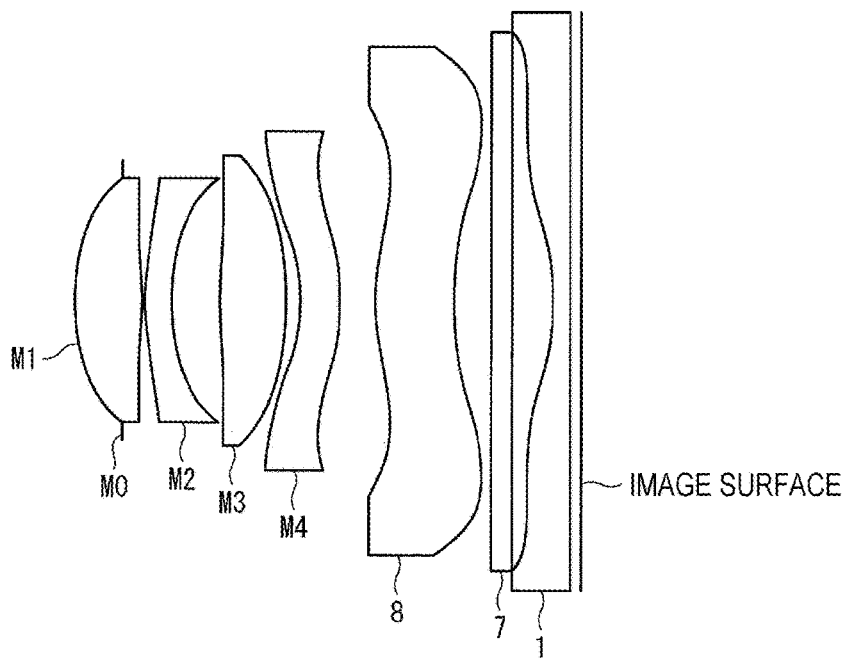
FIG. 5 is a diagram illustrating an arrangement example of the lens in the image capturing device.

FIG. 5 is a diagram illustrating an arrangement example of the lens in the image capturing device.

In the arrangement example of the lens illustrated in FIG. 5, an aperture diaphragm M0, a first lens M1, a second lens M2, a third lens M3, a fourth lens M4, the lens 8, the infrared ray-cutting glass 7 and the lens element 1 are disposed in an order from the object side toward the image surface side.

The first lens M1 has positive refractive power, of which a surface facing the object side is a convex shape.

The second lens M2 has negative refractive power, of which a surface facing the object side is a convex shape and a surface facing the image surface side is a concave shape, a so-called meniscus lens.

The third lens M3 has the positive refractive power, of which a surface facing the image surface side is the convex shape.

The fourth lens M4 has negative refractive power, of which a surface facing the object side is a convex shape and a surface facing the image surface side is a concave shape, a so-called meniscus lens.

The lens 8 has the positive refractive power, of which both of the surfaces of the surface facing the object side and the surface facing the image surface side has a point of inflection. The point of inflection means a point where the convex shape is switched into the concave shape in one certain lens.

Hereinafter, the first lens M1, the second lens M2, the third lens M3, and the fourth lens M4 are referred to as lens M1 to M4, respectively, in some cases.

[Modification Example of Lens Element]

Figure 6:
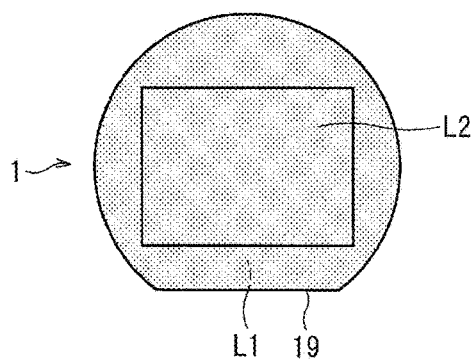
FIG. 6 is a top view illustrating a modification example of the lens element.

FIG. 6 is a top view illustrating a modification example of the lens element.

In FIG. 6, a state where gate cutting is performed when injection molding with respect to the lens element 1 illustrated in FIG. 1(c). However, in the drawings, for convenience sake, the step portion 13 which is specifically unrelated in the present modification example is not illustrated. A place to be cut is a gate cutting unit 19.

There is a case where, even the shape of the outer profile of the object side surface L1 is not circular, there is no disadvantage for guiding the light appropriately to the entire the image side surface L2. That is, according to the shape of the size of the shape of the outer profile of the object side surface L1, it is sufficient to have at least substantially rectangular in accordance with the shape of the size of the outer profile of the image side surface L2.

[Embodiment 4]

Figure 7:
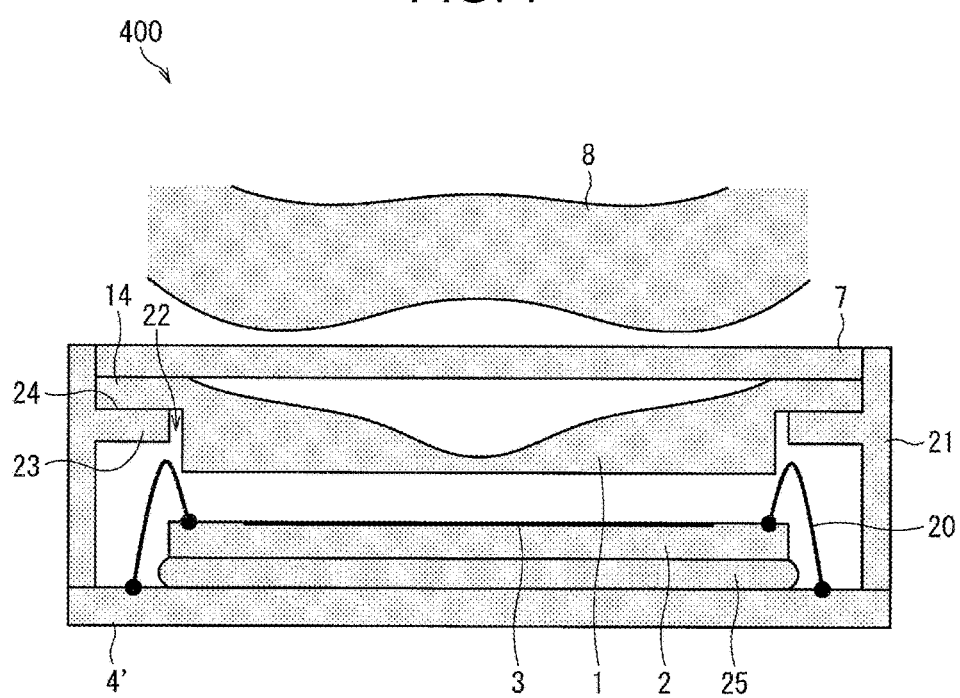
FIG. 7 is a cross-section view illustrating a configuration of a main portion of an image capturing device according to Embodiment 4 of the present invention.

FIG. 7 is a cross-section view illustrating a configuration of a main portion of the image capturing device according to the present invention. In FIG. 7, in order to simplify the illustration, only the configuration different from the main portion 100 illustrated in FIG. 1 and the configuration relating thereto are illustrated mainly.

A main portion 400 illustrated in FIG. 7, the following configuration is different from that of the main portion 100.

That is, in the main portion 400, the imaging element 2 and a laminate substrate 4' are electrically connected. However, it is implemented by a wire bonding method using a bonding wire 20.

The lens element 1 illustrated in FIG. 7 does not include the step portion 13.

The laminate substrate 4' illustrated in FIG. 7 is a flat plate shape, and is not store the imaging element 2 (not the element storing unit). A configuration of other laminate substrate 4' is the same as the configuration of the laminate substrate 4.

On the other hand, the main portion 400 includes a sensor cover (element storing unit) 21.

The sensor cover 21 stores the imaging element 2, of which an opening 22 is formed above the light receiving unit 3 so as to appropriately guide the light to the light receiving unit 3. The sensor cover 21 includes a flange stopper 23 which projects in a central direction of the lens element 1 from the inner side surface of the sensor cover 21. The flange portion 14 of the lens element 1 is placed on a top surface (the top surface of the element storing unit) 24 of the flange stopper 23. As a result, the image side surface L2 is disposed on the image surface side further than the top surface 24 is and the object side surface L1 is disposed on the object side further than the top surface 24 is.

The bonding wire 20 is a wire for electrically connecting the imaging element 2 and the laminate substrate 4' by a well-known wire bonding method.

A surface facing the light receiving unit 3 in the imaging element 2 is adhered and fixed on the laminate substrate 4' with an adhesive 25.

According to the configuration, a technical concept according to Embodiment 1 is capable of applying to the wire bonding method.

[Embodiment 5]

Figure 8:
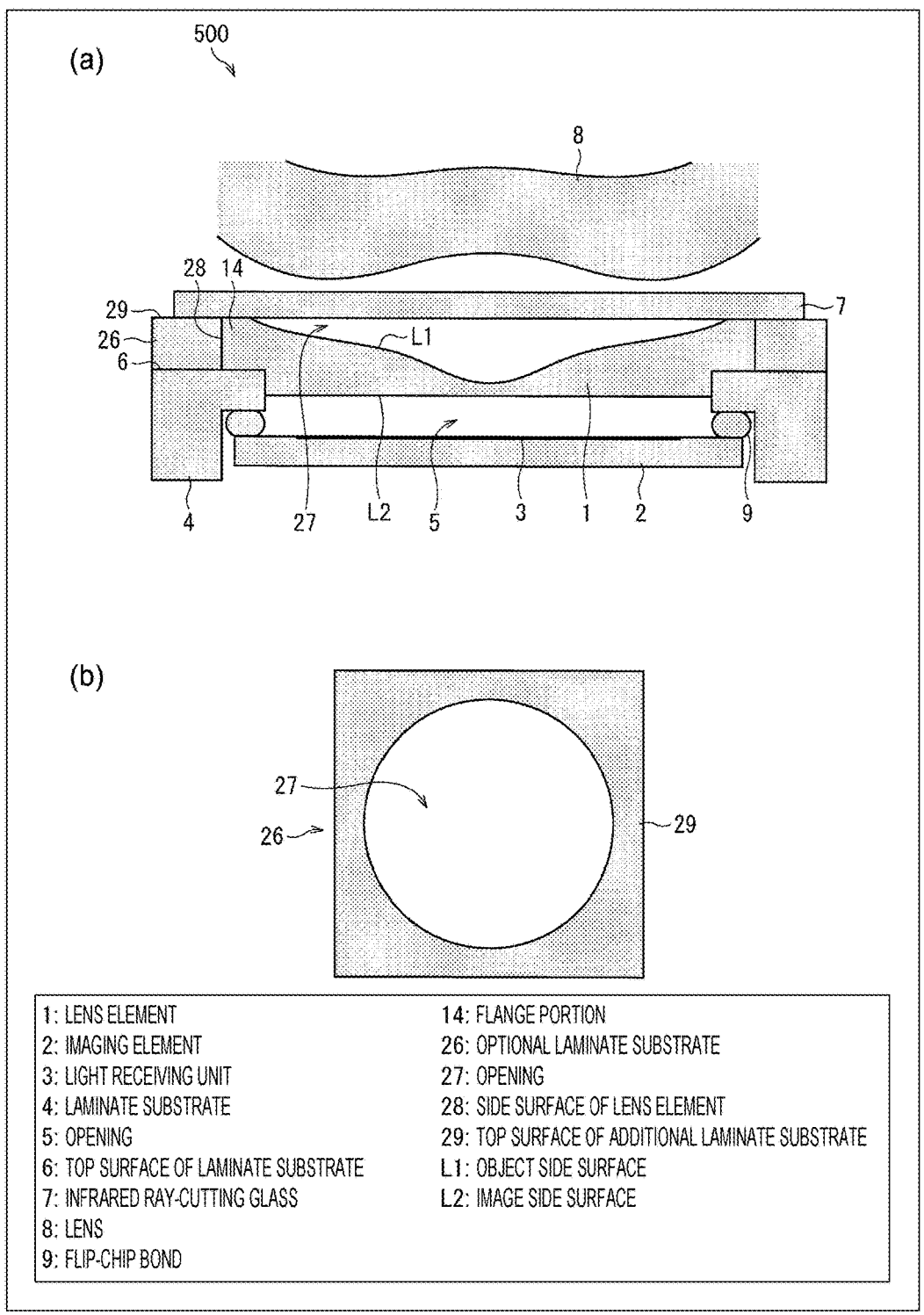
FIG. 8(a) is a cross-section view illustrating a configuration of a main portion of an image capturing device according to Embodiment 5 of the present invention.
FIG. 8(b) is a top view of an additional laminate substrate.

FIG. 8(a) is a cross-section view illustrating a configuration of a main portion of the image capturing device according to the present embodiment and FIG. 8(b) is a top view of the additional laminate substrate. In FIG. 8, in order to simplify the illustration, only the configuration different from the main portion 100 illustrated in FIG. 1 and the configuration relating thereto are illustrated mainly.

A main portion 500 illustrated in FIG. 8, the following configuration is different from that of the main portion 100.

That is, in the main portion 500, an additional laminate substrate 26 is placed on the laminate substrate 4.

In the additional laminate substrate 26, an opening 27 is formed above the light receiving unit 3 so as to appropriately guide the light to the light receiving unit 3. In addition, the additional laminate substrate 26 has a predetermined wiring pattern. The additional laminate substrate 26 is provided next to a side surface 28 corresponding to the flange portion 14 in the lens element 1.

As described above, as illustrated in FIG. 1(b), the shapes of the outer profiles of the opening 5 and the top surface 6 are rectangular in the top view of the laminate substrate 4.

On the other hand, as illustrated in FIG. 8(b), the shape of the outer profile of a top surface 29 of the additional laminate substrate 26 is rectangular like the shape of the outer profile of the top surface 6 when viewed from above the additional laminate substrate 26. On the other hand, as illustrated in FIG. 8(b), the shape of the outer profile of the opening 27 is circular, when viewed from above the additional laminate substrate 26.

In a side of the image side surface L2, the lens element 1 is fitted to the opening 5, or a side surface of the lens element 1 is adhered to the inner side surface of the laminate substrate 4 which constitutes the opening 5. In a side of the object side surface L1, the lens element 1 is fitted to the opening 27, or a side surface of the lens element 1 is adhered to the inner side surface of the additional laminate substrate 26 which constitutes the opening 27.

In a case where the mounting component 10 (refer to FIG. 1) is provided in the main portion 500, the mounting component 10 is disposed on the top surface 29, for example.

In addition, the lens element 1 illustrated in FIG. 8 does not include the step portion 13. Accordingly, in the main portion 500, the flange portion 14 is adhered to the top surface 6, and there is no space 16.

It is considered that the main portion 500 is configured of the openings 5 and 27 which are in accordance with the shapes of the outer profiles of the image side surface L2 and the object side surface L1.

[Embodiment 6]

Figure 9:
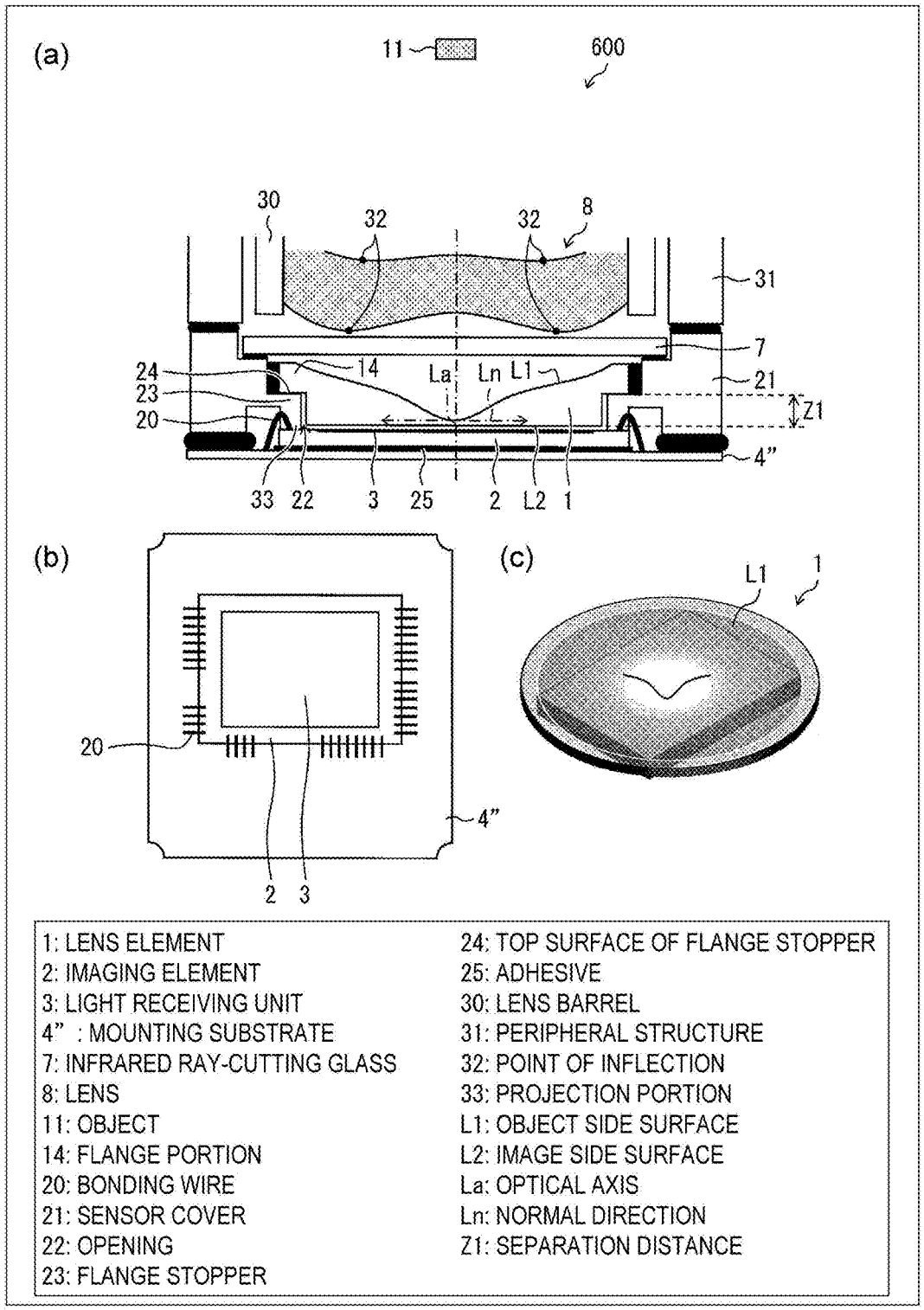
FIG. 9(a) is a cross-section view illustrating a configuration of a main portion of an image capturing device according to Embodiment 6 of the present invention.
FIG. 9(b) is a top view of a mounting substrate.
FIG. 9(c) is a view of the lens element according to Embodiment 6 of the present invention when viewed from an object side.

FIG. 9(a) is a cross-section view illustrating a configuration of a main portion of an image capturing device according to the present embodiment, FIG. 9(b) is a top view of a mounting substrate, and FIG. 9(c) is a view of the lens element according to the present embodiment when viewed from the object side.

A main portion 600 illustrated in FIG. 9(a) includes the lens element 1, the imaging element 2, a mounting substrate 4'', the infrared ray-cutting glass 7, the lens (the lens which constitutes the front lens portion) 8, the bonding wire 20, the sensor cover (element storing unit) 21, a lens barrel 30, and a peripheral structure 31. The lens 8, the infrared ray-cutting glass 7, the lens element 1, and the imaging element 2 are disposed in this order, from the object side toward the image surface side.

The lens element 1 illustrated in FIG. 9(a) does not include the step portion 13.

The mounting substrate 4'' illustrated in FIGS. 9(a) and 9(b) is a flat plate shape, and does not store the imaging element 2 (not the element storing unit).

The sensor cover 21 illustrated in FIG. 9(a) includes the flange stopper 23 which is projected from the inner side surface of the sensor cover 21 in the central direction of the lens element 1. The flange portion 14 of the lens element 1 is placed on the top surface 24 of the flange stopper 23. As a result, the image side surface L2 is disposed on the image surface side of the top surface 24.

As illustrated in FIG. 9(a), the lens 8 is disposed on the object side further than the lens element 1 is and the lens surface of the both sides has the point of inflection 32 that is a boundary between a concave shape and a convex shape. That is, in the each lens surface of the lens 8, the concave shape and the convex shape are switched at the boundary of its point of inflection 32. Only the lens surface of one side of the lens 8 may have the point of inflection 32.

The distance between the top surface of the imaging element 2 along the optical axis La direction and a maximum point (a position closest to the object side) of the bonding wire 20 is in a range of 0.1 to 0.2 mm, 0.3 mm, or the like, and generally is less than 0.15 mm.

The lens barrel 30 stores beginning the lens 8 and each lens (front lens portion) disposed on the object side further than the lens element 1 is. As specific examples, in a case where the lens configuration of the image capturing device is a configuration illustrated in FIG. 5, the lenses M1 to M4 and the lens 8 are stored in the lens barrel 30.

The peripheral structure 31 is provided around the lens barrel 30. The details are not illustrated in FIG. 9(a). However, the peripheral structure 31 includes a housing of the image capturing device and a movement mechanism. The movement mechanism means various types of movement mechanism which moves each lens disposed on the object side further than the lens element 1 is by moving the lens barrel 30. As the movement mechanism, an auto focus mechanism for moving the lens barrel 30 in the optical axis La direction and a camera-shake correction mechanism for moving the lens barrel 30 in the normal direction Ln are included.

In the main portion 600, the size of the opening 22 of the sensor cover 21 can be reduced smaller than the size of the outer profile of the object side surface L1. Accordingly, the size of the outer profile of the sensor cover 21 can be reduced. As a result, the size of the image capturing device can be reduced.

In addition, in the main portion 600, as constructed from FIG. 9(a), the image side surface L2 can be disposed on the image surface side further than the top surface 24 is. Accordingly, an increase in the distance between the image side surface L2 and the imaging element 2 (more specifically, the light receiving unit 3) can be suppressed. As a result, the desired aberration correction effect can be obtained and the image capturing device with excellent resolving power can be implemented.

In addition, as described above, the distance between the top surface of the imaging element 2 along the optical axis La direction and the maximum point (a position closest to the object side) of the bonding wire 20 along the optical axis La direction is generally less than 0.15 mm. In view of this, in order to avoid that the bonding wire 20 hits the immediately above the lens element 1 portion (in FIG. 9(a), the flange portion 14), it is required to set a separation distance Z1 between the flange portion 14 and the image side surface L2 to 0.15 mm or more. Accordingly, it is possible to suppress deformation of the bonding wire 20 and failure in the wire bonding.

In addition, in the main portion 600, the lens element 1 is placed on the sensor cover 21. Specifically, the flange portion 14 is placed on the flange stopper 23. In addition, the sensor cover 21 includes a projection portion 33 around the image side surface L2. The projection portion 33 extends to the image surface side in the optical axis La direction. The end surface of the projection portion 33 is in contact with the top surface of the imaging element 2 in the optical axis La direction. By the contacting, the distance between the image side surface L2 and the imaging element 2 is defined. Accordingly, positioning of the image side surface L2 can be performed with a simple configuration and with high accuracy.

In addition, it is preferable that the image side surface L2 has projections and depressions formed by nanoimprinting.

Generally, in order to obtain a bright image and to suppress the generation of stray light, in the lens element 1, an antireflection treatment (a so-called AR code) using an oxide thin film is subjected. In the antireflection treatment, there are some problems in that when forming of the oxide thin film, a foreign substance is attached to the oxide thin film. In particular, since the image side surface L2 is disposed closer to the light receiving unit 3, when the foreign substance is attached to the image side surface L2, the foreign substance shields the light receiving unit 3 from the light over a wider range. Accordingly, in the image capturing device, there is concerned that black scratches or strains are generated.

A technique of obtaining the antireflection effect by forming the projections and depressions which have an order size closer to the wavelength is well-known. This technique is applied to an antireflection treatment of the surface of a liquid crystal panel, for example. By providing the projections and depressions formed by nanoimprinting on the image side surface L2, the antireflection treatment using the oxide thin film is not required. As a result, the risk of the foreign substance attachment can be reduced and the excellent antireflection effect can be obtained.

Figure 10:
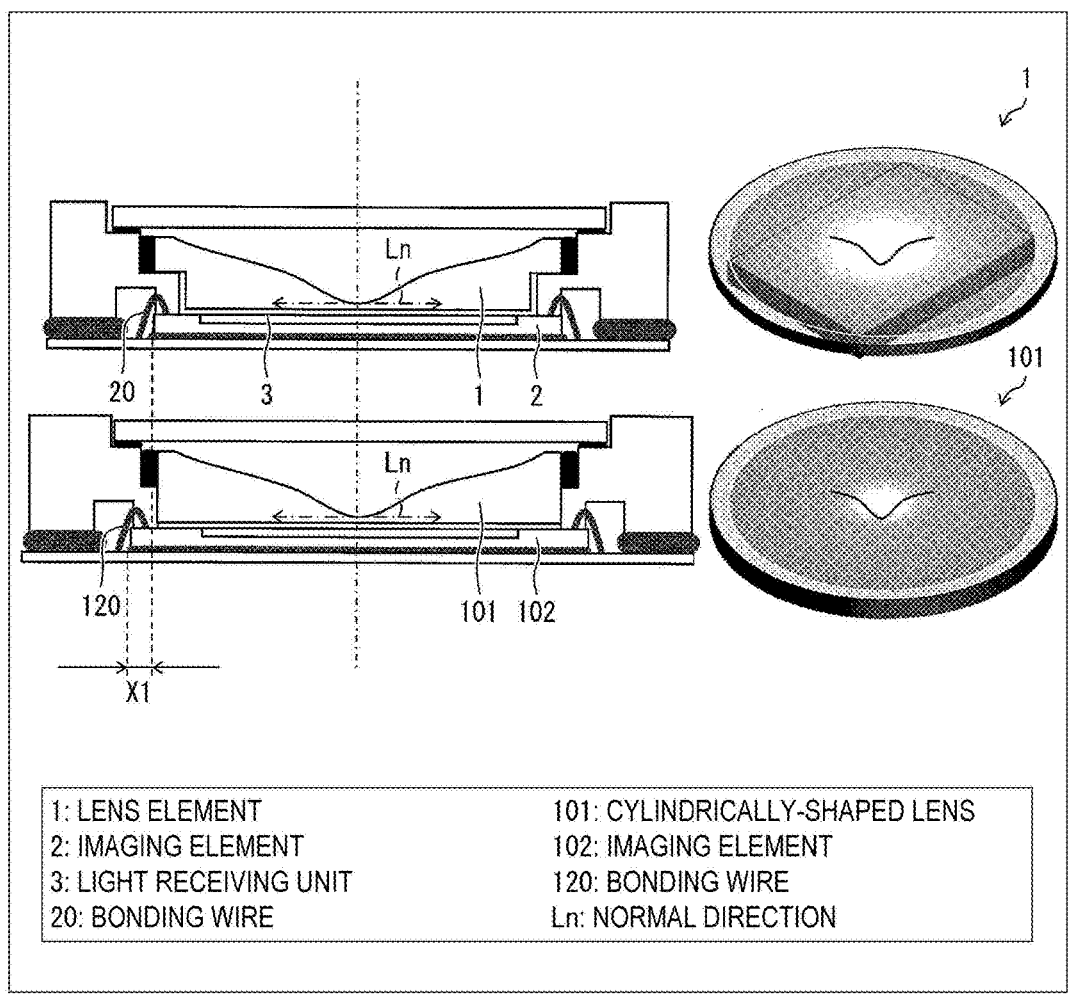
FIG. 10 is a diagram illustrating a composition between an example in which the lens element illustrated in FIGS. 9(a) and 9(c) is provided in the image capturing device and a conventional example in which a cylindrically-shaped lens is provided in the image capturing device.

FIG. 10 is a diagram illustrating a composition between an example in which the lens element 1 illustrated in FIGS. 9(a) and 9(c) is provided in the image capturing device and a conventional example in which a cylindrically-shaped lens 101 is provided in the image capturing device. In FIG. 10, for convenience sake, the lens 8 and the configuration of the object side from the lens 8 are not illustrated.

The size of the imaging element 102 in a case where the cylindrically-shaped lens 101 is provided in the image capturing device is greater about twice than a distance X1 in the normal direction Ln as compared with the size of the imaging element 2 in a case where the lens element 1 is provided in the image capturing device. In order to avoid that a bonding wire 120 hits the cylindrically-shaped lens 101, it is required to provide the bonding wire 120 sufficiently outer side further than the cylindrically-shaped lens 101. As a result, in a case where the cylindrically-shaped lens 101 is provided in the image capturing device, it leads to the increase in the size of the image capturing device as compared with a case where the lens element 1 is provided in the image capturing device.

In addition, in the lens element 1, the size of the outer profile of the image side surface L2 is set according to the shape of the light receiving unit 3. Therefore, it is possible to configure the main portion 600 such that increasing in the size of the outer profile of the image side surface L2 too much without any purpose is suppressed and the light receiving unit 3 appropriately receives the light.

Figure 11:
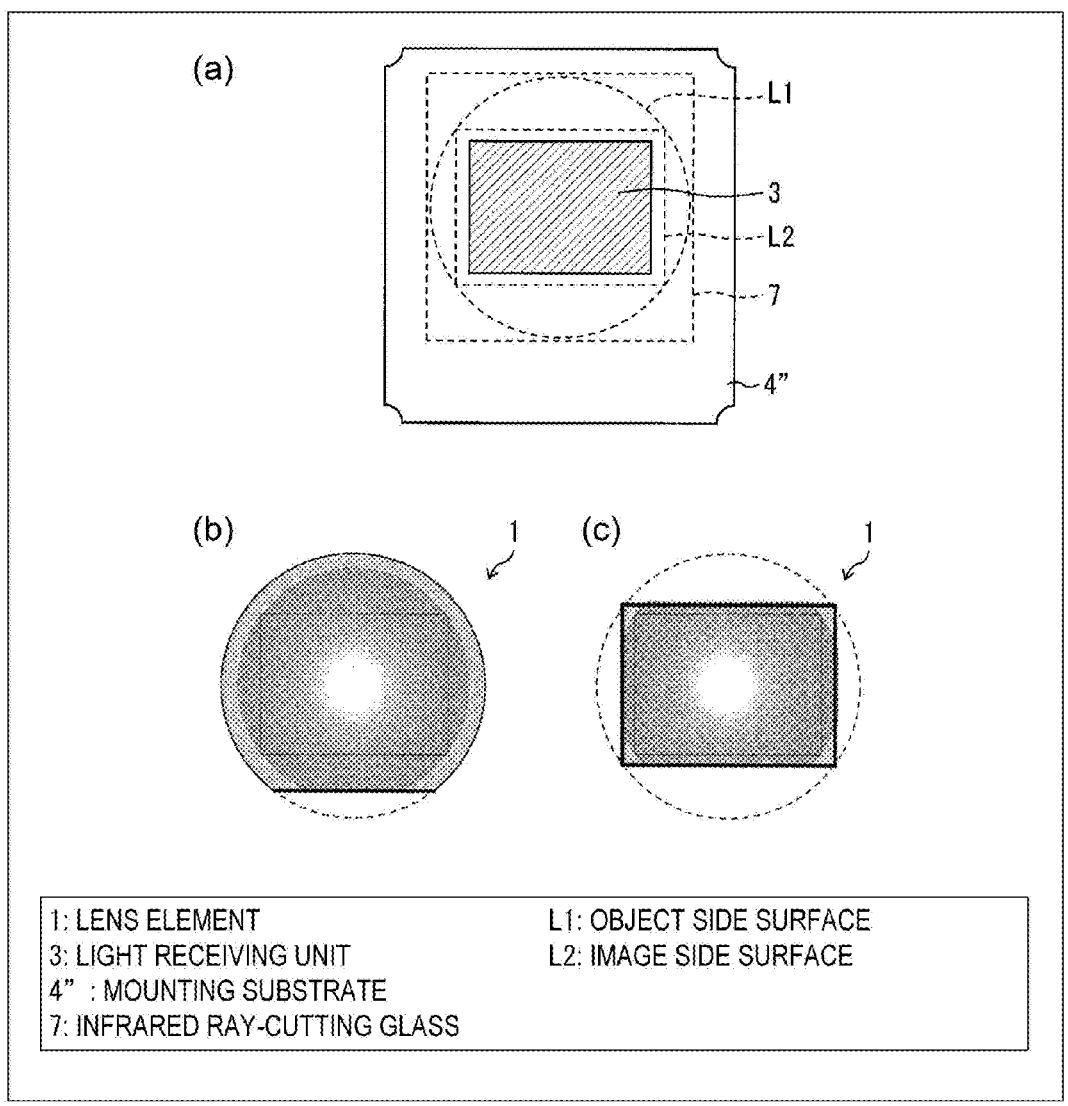
FIG. 11(a) is a diagram in which a positional relationship between an infrared ray-cutting glass, an object side surface, an image side surface, and a light receiving unit is illustrated in the top surface of the mounting substrate.
FIGS. 11(b) and 11(c) are diagrams illustrating modification examples of a shape of an outer profile of the object side surface.

FIG. 11(a) is a diagram in which a positional relationship between the infrared ray-cutting glass 7, the object side surface L1, the image side surface L2, and the light receiving unit 3 is illustrated in the top surface of the mounting substrate 4", and FIGS. 11(b) and 11(c) are diagrams illustrating modification examples of a shape of an outer profile of the object side surface L1.

In order to appropriately perform light receiving in the light receiving unit 3, the size of the outer profile is preferable in order of the infrared ray-cutting glass 7 (largest), the object side surface L1, the image side surface L2, and the light receiving unit 3 (smallest).

In FIG. 9(c), the outer profile of the object side surface L1 is set to a circle. However, the shape thereof is not limited thereto. That is, as illustrated in FIG. 11(b), the outer profile of the object side surface L1 may be a shape (a so-called D-shaped cut) obtained by cutting the circle by one line inscribed in the circle in FIG. 9(c) and may be a shape (a so-called square cut) obtained by cutting the circle by the same four lines. Furthermore, note that although not illustrated in drawings, the outer profile of the object side surface L1 may be a shape (a so-called I-shaped cut) obtained by cutting the circle by the same two lines. As described above, the shape of the outer profile of the object side surface L1 may be a shape obtained by cutting the circle by at least one line inscribed in the circle.

Accordingly, the lens element 1 can be relatively easily manufactured. That is, regarding the object side surface L1, injection molding or thermoset molding using a die can be applied. Additionally, the die can be easily processes. On the other hand, regarding the image side surface L2, since the image side surface L2 is the substantially plane, it is needless to say that the molding is easy.

Figure 12:
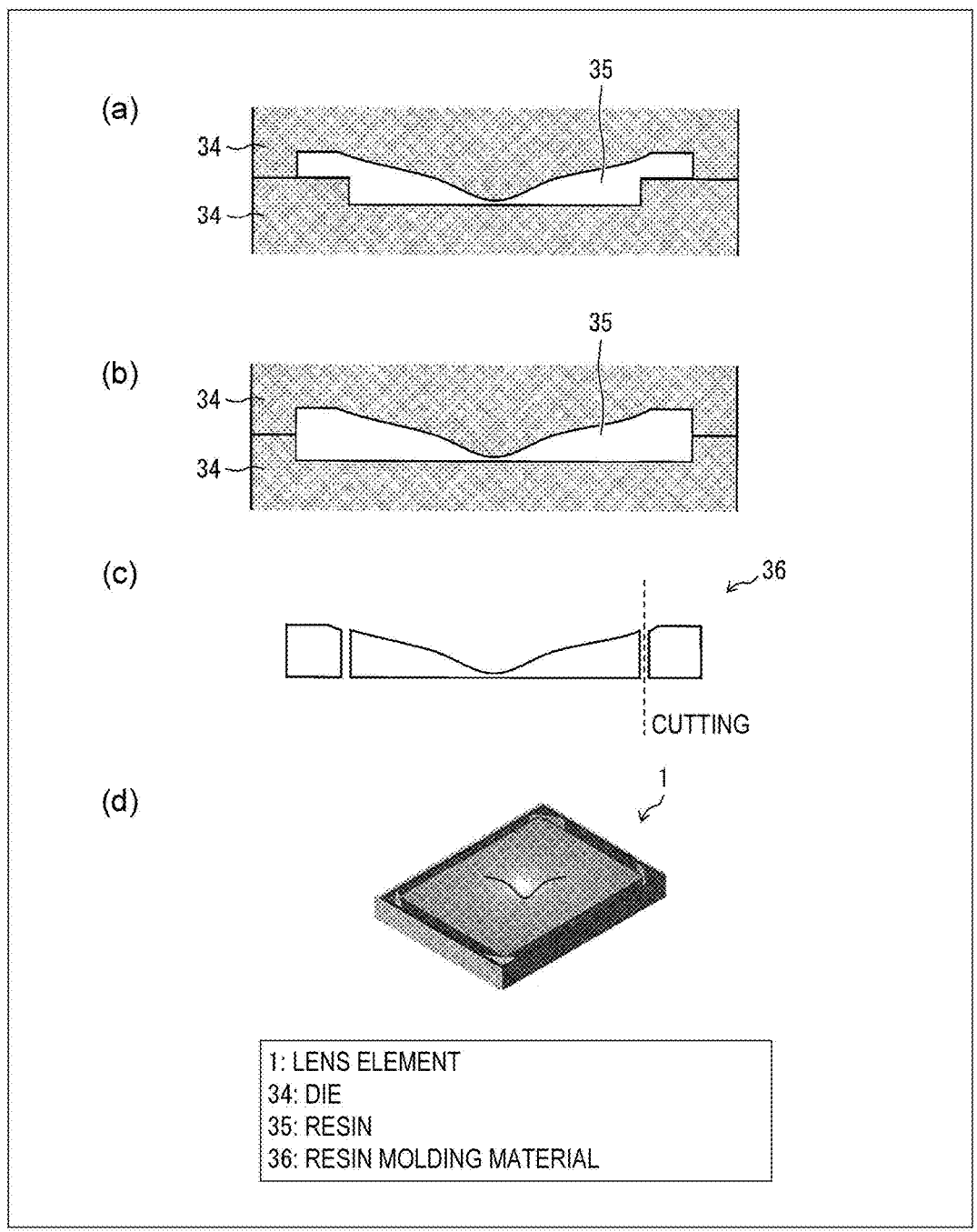
FIG. 12(a) is a diagram illustrating a process for performing molding of the lens element illustrated in FIG. 9(c)
FIG. 12(b) is a diagram illustrating a process for performing molding of the lens element illustrated in FIG. 11(c)
FIG. 12(c) is a diagram illustrating a process for cutting a molded article obtained by molding of FIG. 12(b)
FIG. 12(d) is a perspective view illustrating a completed article of the lens element illustrated in FIG. 11(c).

FIG. 12(a) is a diagram illustrating a process for performing molding of the lens element 1 illustrated in FIG. 9(c), FIG. 11(b) is a diagram illustrating a process for performing molding of the lens element 1 illustrated in FIG. 11(c), FIG. 11(c) is a diagram illustrating a process for cutting a molded article obtained by molding of FIG. 12(b), and FIG. 11(d) is a perspective view illustrating a completed article of the lens element 1 illustrated in FIG. 11(c).

According to a process illustrated in FIG. 12(a), by fitting a resin 35 (a thermoplastic resin, a thermosetting resin, or the like) to a die 34 having a shape counter to the both surfaces of the lens element 1 illustrated in FIG. 9(c), the lens element 1 can be manufactured (injection molding).

According to processes illustrated in FIGS. 12(b) and 12(c), the resin 35 is fitted to the die 34 having the shape counter to the both surfaces of the cylindrically-shaped lens 101 (refer to FIG. 10) (FIG. 12(b)). A resin molding material 36 obtained in this manner is cut by four lines inscribed in the outer profile (circle) as described above (FIG. 12(c)). Accordingly, the lens element 1 illustrated in FIG. 11(c) can be manufactured.

Figure 13:
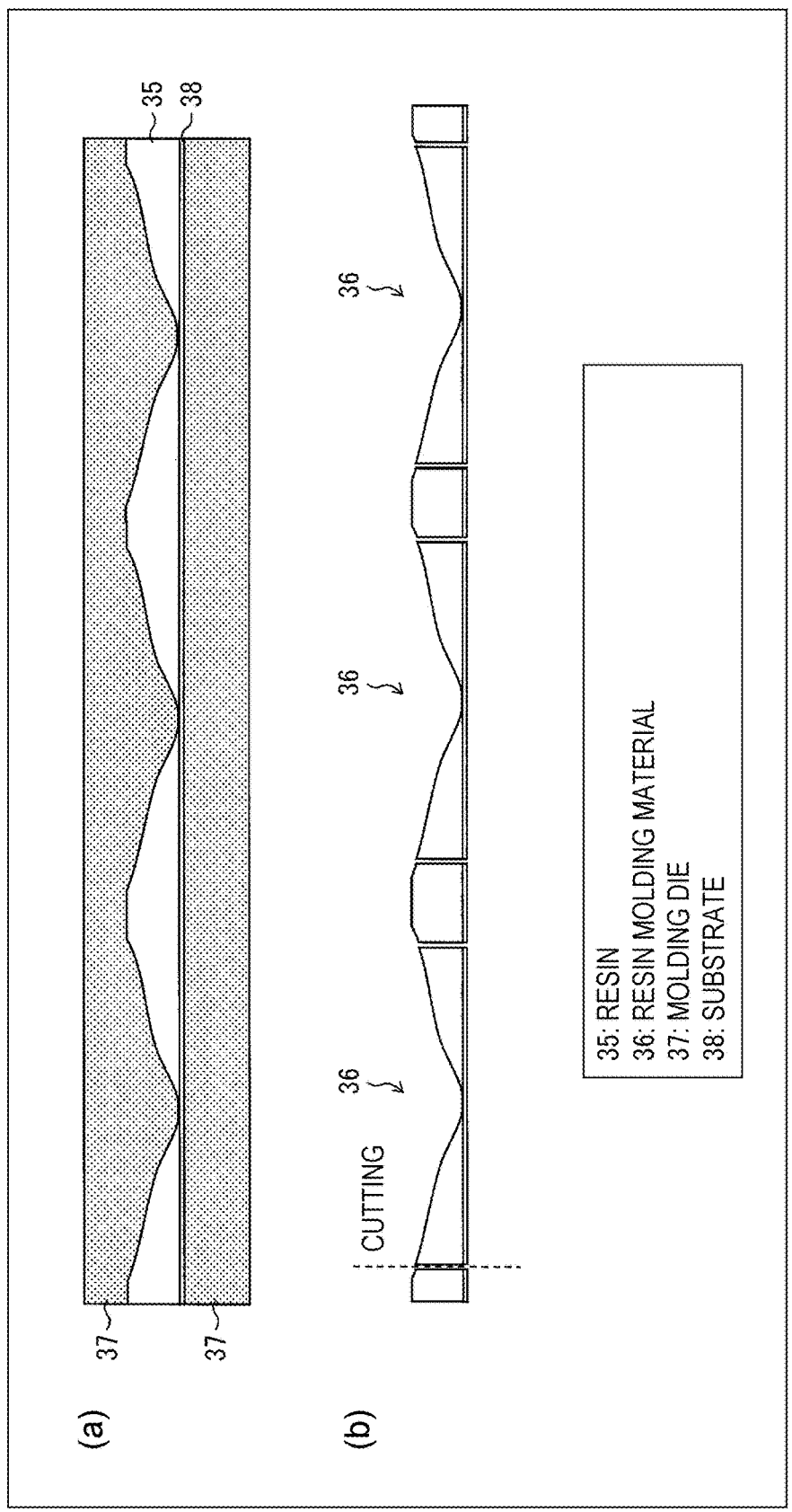
FIGS. 13(a) and 13(b) are diagrams illustrating processes for performing molding of the lens element illustrated in FIG. 11(c) different from the presses of FIGS. 12(b) and 12(c).

FIGS. 13(a) and 13(b) are diagrams illustrating processes for performing molding of the lens element 1 illustrated in FIG. 11(c) different from the presses of FIGS. 12(b) and 12(c).

For transfer the image side surface L2 to the resin 35, the die 34 forms a recess of which a bottom is a substantially plane. On the other hand, a molding die 37 has a flat plate formed of a glass, for example, instead of the die having the recess.

By manufacturing the lens element 1 illustrated in FIG. 11(c) using the molding die 37, a plurality of lens elements 1 can be collectively manufactured in an array. That is, a substrate 38 is provided in the flat plate, the resin 35 is supplied on the substrate 38, a shape counter to the object side surface L1 is provided in a shape of an opposite side of the flat plate in the molding die 37, and the transferring is performed in the resin 35 by the molding die 37.

By using the substrate 38, the lens element 1 has a high uneven thickness ratio can be easily manufactured. In addition, in a case where the flat plate is a glass, since the resin 35 can be irradiated with light over the flat plate, an ultraviolet curable resin can be used as the resin 35. The lens elements 1 can be collectively manufactured in an array. Accordingly, the productivity can be improved. The lens elements 1 may be manufactured one by one by using one lens element 1 of the molding die 37.

[Embodiment 7]

Figure 14:
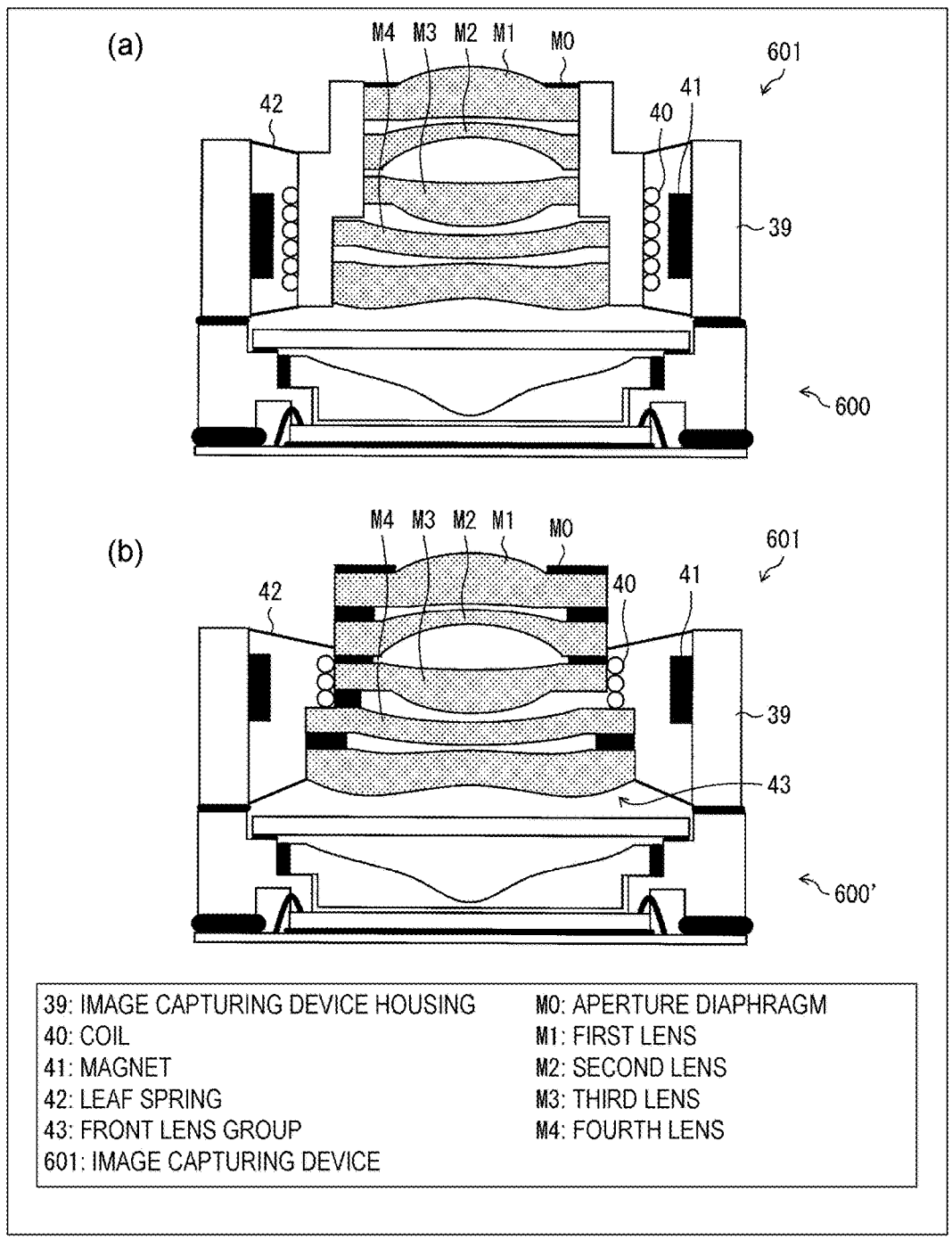
FIG. 14(a) is a cross-section view illustrating a configuration of an image capturing device according to Embodiment 7 of the present invention.
FIG. 14(b) is a cross-section view illustrating a configuration of another image capturing device according to Embodiment 7 of the present invention.

FIG. 14(a) is a cross-section view illustrating a configuration of an image capturing device according to the present embodiment, and FIG. 14(b) is a cross-section view illustrating a configuration of another image capturing device according to the present embodiment.

An image capturing device 601 illustrated in FIG. 14(a) includes the main portion 600 (refer to FIG. 9(a)). An image capturing device housing 39, a coil 40, a magnet 41, and a leaf spring 42 correspond to the peripheral structure 31 of the main portion 600. The image capturing device 601 includes the aperture diaphragm M0 and the lenses M1 to M4. In FIGS. 14(a) and 14(b) and FIG. 5, the shapes of the surface facing the image surface side of the lens M1 are different from each other (in FIG. 5, the shape thereof is a convex shape and in FIGS. 14(a) and 14(b), the shape thereof is a concave shape). However, the shape facing the image surface side of the lens M1 is not particularly limited, originally, and the shape may be any shapes. The same fact is applied to the surface facing the object side of the third lens M3 (in FIG. 5, the shape thereof is the convex shape and in FIGS. 14(a) and 14(b), the shape thereof is the concave shape).

The lenses M1 to M4 and the lens 8 are stored in the lens barrel 30.

The coil 40 is provided on an outer wall of the lens barrel 30. The magnet 41 is provided on an inner wall of the image capturing device housing 39. The leaf spring 42 is connected to the outer wall of the lens barrel 30 and the image capturing device housing 39. A plurality of leaf springs 42 is provided so as to support the lens barrel 30.

When supplying a current to the coil 40, the current flown to the coil 40 interacts with a magnetic field which is generated from the magnet 41. Accordingly, thrust for moving the coil 40 is generated. As a result, the lens barrel 30 moves along a movement direction of the coil 40. The focus mechanism (which moves the coil 40 in the optical axis La direction) or the camera-shake correction mechanism (which moves the coil 40 in the normal direction Ln) can be implemented as the movement mechanism.

The object side surface L1 is close enough to the light receiving unit 3. Therefore, the distance between the lens 8 and the object side surface L1 can be increased enough. Accordingly, changes in a contrast in the image capturing device 601 with respect to the relative positional deviation between the lens 8 and the lens element 1 can be reduced. According to this, the changes in the contrast with respect to the various positional deviations generated between each of the lenses M1 to M4 and 8 to be disposed on the object side further than the lens element 1 is can be reduced. In addition, a size of an optical component becomes increased from the aperture diaphragm M0 toward the image surface side. Since the lens element 1 which is the largest in the size among the lenses included in the image capturing device 601 is set to have a configuration the lens element 1 is not stored in the lens barrel 30, the lens element 1 is a movement target of the movement mechanism. Accordingly, since a total weight of each lens stored in the lens barrel 30 can be reduced, a performance of the movement mechanism can be improved.

The image capturing device 601 illustrated in FIG. 14(b) is obtained by omitting the lens barrel 30 from the image capturing device 601 illustrated in FIG. 14(a). That is, the image capturing device 601 illustrated in FIG. 14(b) does not include the lens barrel 30 for storing each lens disposed on the object side further than the lens element 1 is. A main portion 600' in FIG. 14(b) is obtained by omitting the lens barrel 30 from the main portion 600.

The lenses M1 to M4 and 8 disposed on the object side further than the lens element 1 is are attached to each other, and constitute a front lens group 43. The coil 40 is provided on a side wall of the front lens group 43. The magnet 41 is provided on the inner wall of the image capturing device housing 39. The leaf spring 42 is connected to the side wall of the front lens group 43 and the image capturing device housing 39. The plurality of leaf springs 42 is provided so as to support the front lens group 43.

Since, in the image capturing device 601 illustrated in FIG. 14(b), the lens barrel 30 is omitted, the lens barrel 30 is excluded from the movement object of the movement mechanism. Accordingly, the weight of the movement target of the movement mechanism can further be reduced.

In the movement mechanism, the front lens group 43 is moved and the lens element 1 is fixed, that is, an effect obtained such that the lens element 1 is not included in the movement target by the movement mechanism will be described in detail.

In a case where macro photographing (close up) is performed with the image capturing device 601, the front lens group 43 moves to the object side when during photographing the infinite object 11. In this time, by increasing the distance between the front lens group 43 and the lens element 1, an F number can be decreased.

A focal distance of the front lens group 43 is defined as f1, the focal distance of the lens element 1 is defined as f2, a distance (distance between the main plans) between the lens 8 and the lens element 1 defined as d. In this time, a synthetic focal distance f of the front lens group 43 and the lens element 1 is given in Expression (a) described below.

$$1/f=1/f1+1/f2-d/(f1 \times f2) \tag{a}$$

Here, since the object side surface L1 is the concave surface and the image side surface L2 is the substantially plane, the lens element 1 has negative refractive power (that is, f2<0). On the other hand, since the entire of the front lens group 43 and the lens element 1 constitute an image forming lens, the front lens group 43 has positive refractive power (that is, f1>0). When the macro photographing, since the distance d becomes greater, the synthetic focal distance f becomes decreased.

On the other hand, when it is assumed that the F number is F, by the synthetic focal distance f and an opening diameter D of the aperture diaphragm M0, Expression (b) described below is given.

$$F=f/D \tag{b}$$

In a case where the opening diameter D is constant, the F number F is proportional to the synthetic focal distance f.

From the above description, in the image capturing device 601 in which the front lens group 43 is moved and the lens element 1 is fixed, by reducing the F number, the bright image can be obtained.

Figure 15:
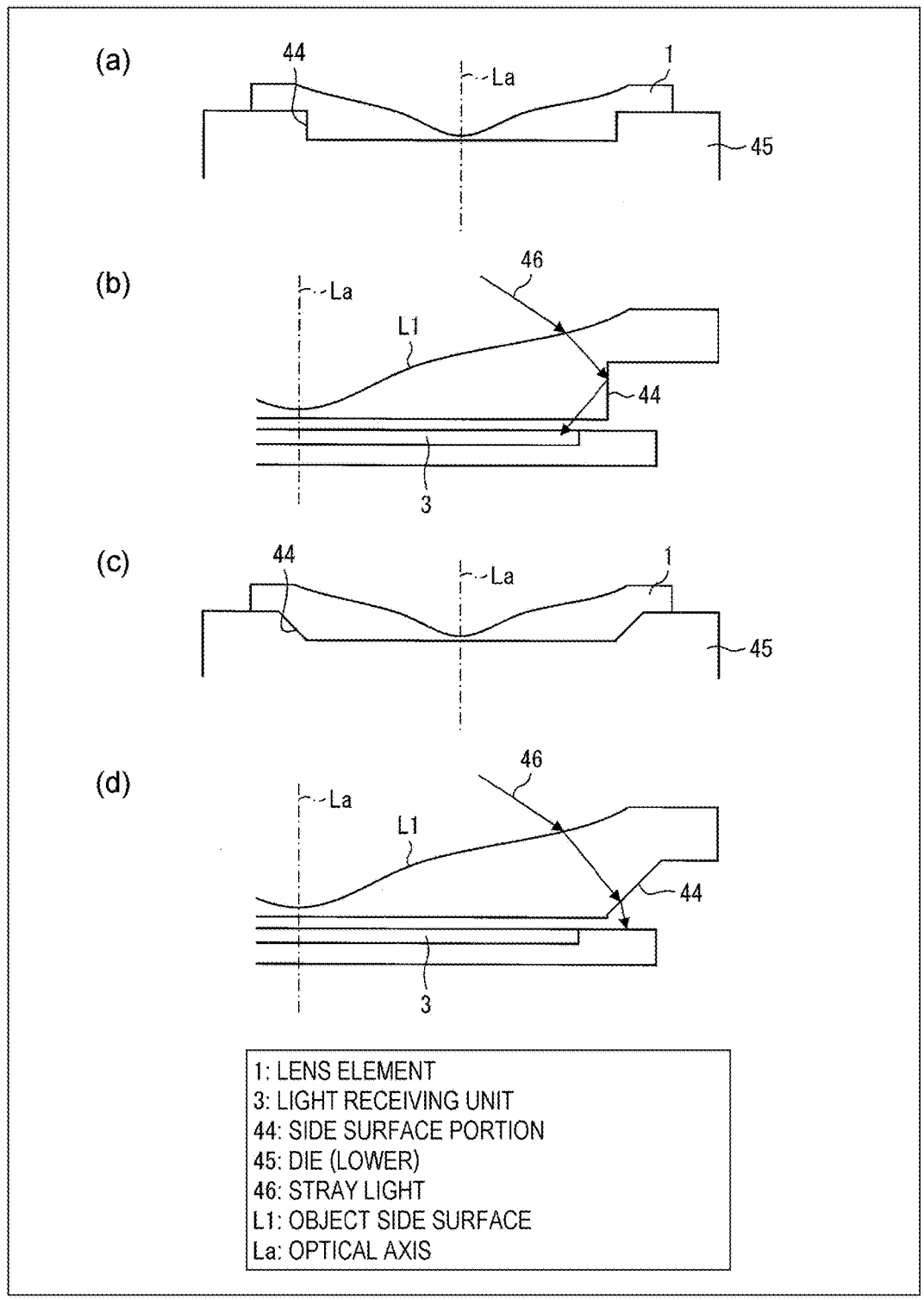
FIG. 15(a) is a cross-section view illustrating the lens element illustrated in FIG. 9(a) and a die.
FIG. 15(b) is a diagram illustrating a path of light incident in the lens element illustrated in FIG. 15(a)
FIG. 15(c) is a cross-section view illustrating a modification example of the lens element and the die.
FIG. 15(d) is a diagram illustrating a path of the light incident in the lens element illustrated in FIG. 15(c).

FIG. 15(a) is a cross-section view illustrating the lens element 1 illustrated in FIG. 9(a) and the die, FIG. 15(b) is a diagram illustrating the path of the light incident in the lens element 1 illustrated in FIG. 15(a), FIG. 15(c) is a cross-section view illustrating a modification example of the lens element 1 and the die, and FIG. 15(d) is a diagram illustrating the path of the light incident in the lens element 1 illustrated in FIG. 15(c).

In the lens element 1 illustrated in FIG. 9(a), a side surface portion 44 of the lens element 1 extending from the edge of the image side surface L2 is substantially parallel to the optical axis La. In this case, as illustrated in FIG. 15(a), when molding is performed using a die (lower) 45 having a shape counter to the image side surface L2, the molded lens element 1 is difficult to separate from the die (lower) 45 due to the resistance between the molded lens element 1 and the die (lower) 45. As a result, there is a possibility that warping or distortion occurs in the lens element 1, regardless of whether the die (lower) 45 is fixed or moved. In addition, as illustrated in FIG. 15(b), in a case where stray light 46 is incident to the lens element 1 from the object side surface L1, when an incident angle of the stray light 46 to the optical axis La is small, the stray light 46 is reflected on the side surface portion 44. Accordingly, there is possibility that the stray light 46 is received in the light receiving unit 3.

In order to reduce the possibilities, as illustrated in FIGS. 15(c) and 15(d), it is preferable to incline the side surface portion 44 with respect to the optical axis La. In this case, as illustrated in FIG. 15(c), when the molding is performed using the die (lower) 45 having a shape counter to the image side surface L2, the molded lens element 1 is easily separated from the die (lower) 45. As a result, the possibility that the warping or the distortion occurs in the lens element 1 can be reduced. In addition, as illustrated in FIG. 15(d), in a case where the stray light 46 is incident to the lens element 1 from the object side surface L1, when the incident angle of the stray light 46 with respect to the optical axis La is small, since stray light 46 is not reflected on the side surface portion 44 and is passed through the lens element 1, the possibility that the stray light 46 is received by the light receiving unit 3 can be reduced.

As described above, it is preferable that the lens element 1 includes a side surface portion 44 (inclination) adjacent to the edge of the image side surface L2. Accordingly, the lens element 1 can be manufactured with a good accuracy.

An inclination angle of the side surface portion 44 is 40° or more with respect to the optical axis La.

[Embodiment 8]

Figure 16:
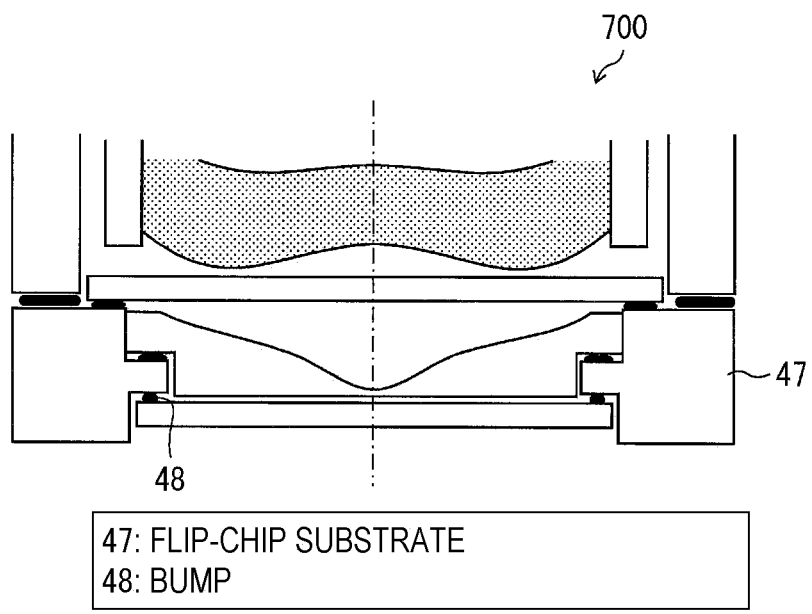
FIG. 16 is a cross-section view illustrating a configuration of a main portion of an image capturing device according to Embodiment 8 of the present invention.

FIG. 16 is a cross-section view illustrating a configuration of a main portion of the image capturing device according to present embodiment.

A main portion 700 illustrated in FIG. 16 includes a flip-chip substrate (element storing unit) 47 having a predetermined wiring pattern, instead of the mounting substrate 4" and the sensor cover 21 with respect to the main portion 600. In addition, the imaging element 2 is not electrically connected to the mounting substrate 4" with the bonding wire 20 and is electrically connected to the flip-chip substrate 47 with a bump 48.

By the above-described configuration, the effect same as that of the main portion 600 can be obtained.

In the main portion 600, the separation distance Z1 between the flange portion 14 and the image side surface L2 should have been equal to or greater than 0.15 mm. However, in the main portion 700, there is no need to set the separation distance Z1 equal to or greater than 0.15 mm.

[Embodiment 9]

Figure 17:
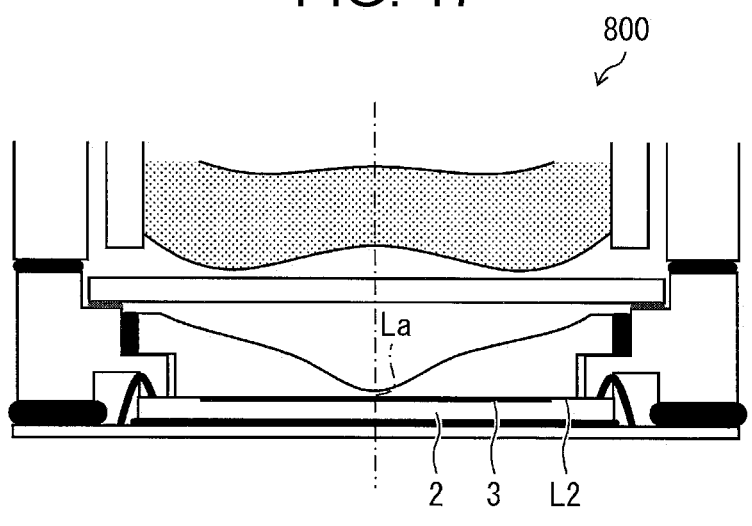
FIG. 17 is a cross-section view illustrating a configuration of a main portion of an image capturing device according to Embodiment 9 of the present invention.

FIG. 17 is a cross-section view illustrating a configuration of a main portion of the image capturing device according to the present embodiment.

A main portion 800 illustrated in FIG. 17 is in contact with the image side surface L2 and the imaging element 2 in the optical axis La with respect to the main portion 600.

FIGS. 18(a) and 18(b) are cross-section views illustrating an example of a configuration in which the image side surface L2 is in contact with the imaging element 2.

As illustrated in FIG. 18(a), a configuration in which the image side surface L2 comes into directly contact with the light receiving unit 3 may be used, and as illustrated in a left side of FIG. 18(b), a configuration in which a micro lens group 49 is provided on the light receiving unit 3 and the image side surface L2 comes into directly contact with the micro lens group 49. In a right side of FIG. 18(b), a configuration in which the micro lens group 49 is provided on the light receiving unit 3 and the image side surface L2 is separated from the micro lens group 49 is illustrated as a reference.

Therefore, since the object side surface L1 can further be positioned on the image surface side, the height of the image capturing device can further be reduced.

In addition, in a case where the image side surface L2 is in contact with the imaging element 2, since the light can be focused on the light receiving unit 3, even when the incident angle of the chief ray to the lens element 1 is small, the image capturing device with an excellent peripheral light amount ratio can be obtained. The excellent peripheral light amount ratio is based on an amount of the light to be received in the light receiving unit 3, and means a ratio of the amount of the light other than the image center with respect to the amount of the light of the image center. The same fact is applied to light other than the chief ray. As a result, the image capturing device, of which a focal depth of the image capturing device is large, and which can correspond to the wide object distance, can be obtained.

Figure 20:
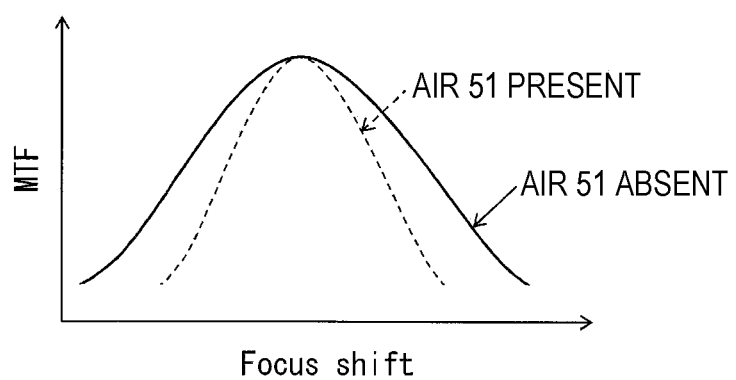
FIG. 20 is a graph illustrating comparison of defocus modulation transfer functions (MTF) between a case of FIG. 19(a) and a case of FIG. 19(b).

FIG. 19(a) is an explanatory diagram of a path of a chief ray in a case where the image side surface L2 is not in contact with the imaging element 2, and FIG. 19(b) is an explanatory diagram of the path of the chief ray in a case where the image side surface L2 is in contact with the imaging element 2. FIG. 20 is a graph illustrating comparison of defocus modulation transfer functions (MTF) between a case of FIG. 19(a) and a case of FIG. 19(b).

When comparing FIGS. 19(a) and 19(b), spreading of a light beam 50 passed through the lens element 1 in FIG. 19(b) is smaller than that of FIG. 19(a). Accordingly, in a case of FIG. 19(b), the light far from the object 11 can be appropriately guided to the light receiving unit 3. In other words, as illustrated in FIG. 20, in a case of air 51 absent (in a case of FIG. 19(b)), a reduction amount of the MTF (vertical axis) with respect to a change in a focus shift amount (horizontal axis) is smaller than that of a case of air 51 present (in a case of FIG. 19(a)).

Furthermore, since the occurrence of the stray light caused by the present of the air 51 can be suppressed, improved image quality of the image capturing device can also be expected.

[Embodiment 10]

Figure 21:
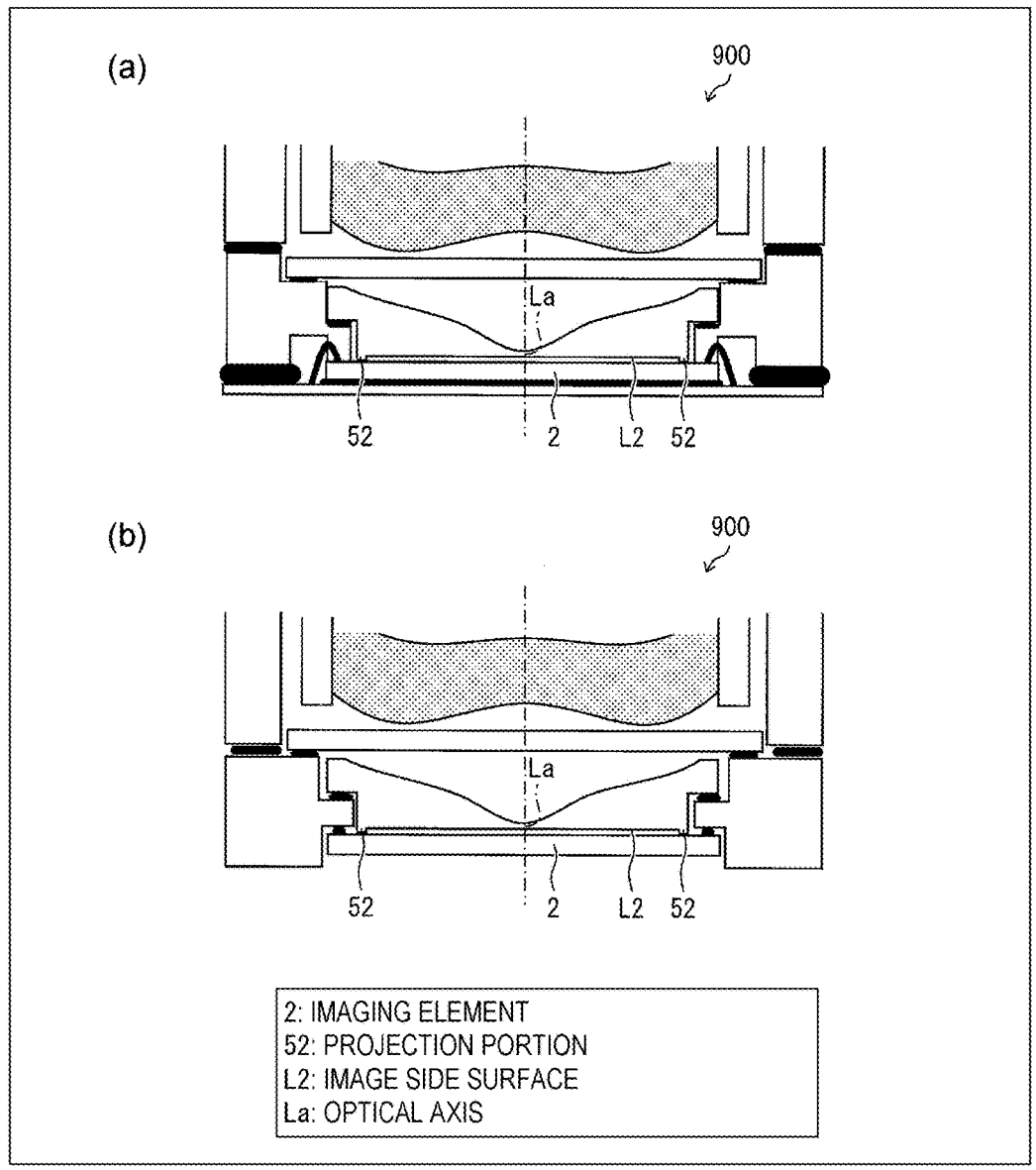
FIGS. 21(a) and 21(b) are cross-section views illustrating a configuration of a main portion of an image capturing device according to Embodiment 10 of the present invention.

FIGS. 21(a) and 21(b) are cross-section views illustrating a configuration of a main portion of the image capturing device according to present embodiment.

In a main portion 900 illustrated in FIG. 21(a), a projection portion 52 is formed on the image side surface L2 with respect to the main portion 600. In the main portion 900 illustrated in FIG. 21(b), the projection portion 52 is formed on the image side surface L2 with respect to the main portion 700.

The projection portion 52 extends to the image surface side in the optical axis La direction. The end portion of the projection portion 52 is in contact with the imaging element 2 to define the distance between the image side surface L2 and the imaging element 2.

Accordingly, positioning of the image side surface L2 can be performed with a simple configuration and with high accuracy.

[Embodiment 11]

Figure 22:
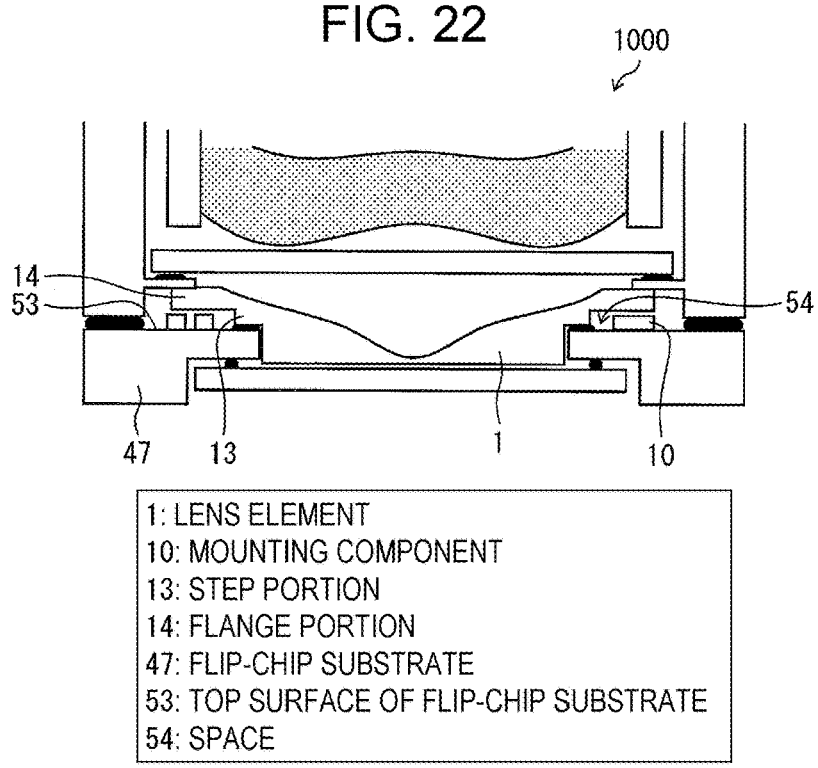
FIG. 22 is a cross-section view illustrating a configuration of a main portion of an image capturing device according to Embodiment 11 of the present invention.

FIG. 22 is a cross-section view illustrating a configuration of a main portion of the image capturing device according to the present embodiment.

In a main portion 1000 illustrated in FIG. 22, the lens element 1 includes the step portion 13 with respect to the main portion 700. The step portion 13 is placed on a top surface 53 of the flip-chip substrate 47.

In addition, in the main portion 1000, the flange portion 14 and the top surface 53 are separated from each other by the step portion 13, and the mounting component 10 is disposed in a separated space 54. In other words, the mounting component 10 can be disposed on an inner side of the edge of the object side surface L1. By disposing the mounting component 10 on the inner side further than the edge of the object side surface L1, the size of the outer profile of the flip-chip substrate 47 can be more reduced.

[Embodiment 12]

Figure 23:
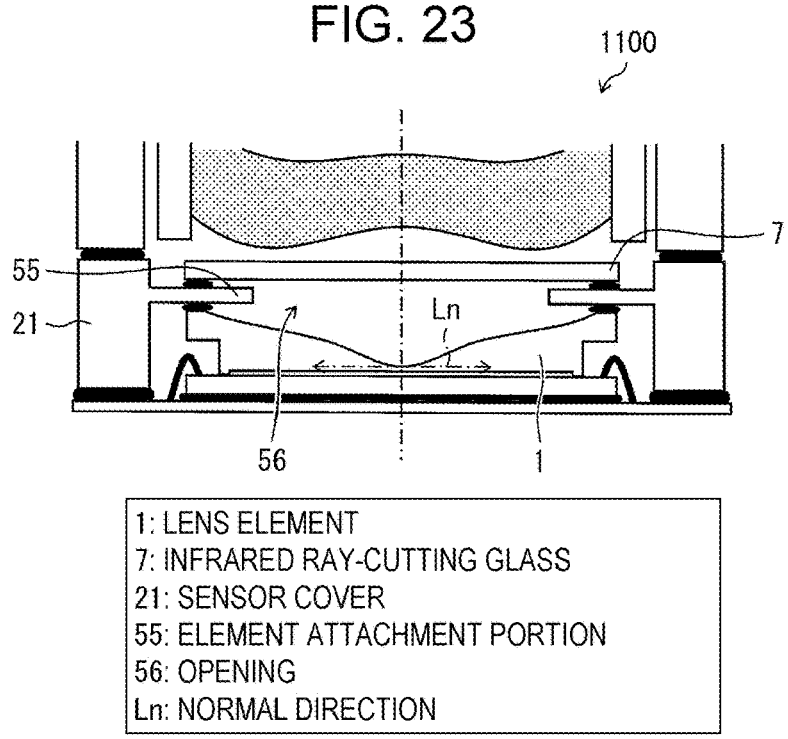
FIG. 23 is a cross-section view illustrating a configuration of a main portion of an image capturing device according to Embodiment 12 of the present invention.

FIG. 23 is a cross-section view illustrating a configuration of a main portion of the image capturing device according to the present embodiment.

A main portion 1100 illustrated in FIG. 23 is different from the main portion 900 illustrated in FIG. 21(a) in the following point.

Figure 24:
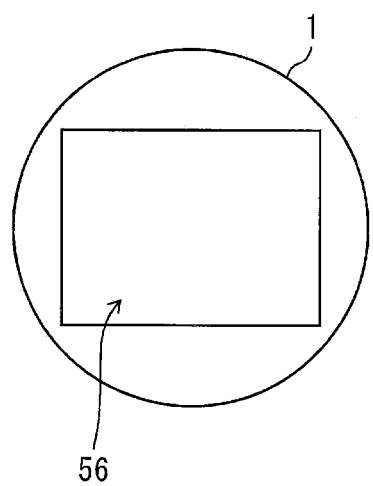
FIG. 24 is a diagram illustrating comparison between a size of an opening of an element attachment portion along the normal direction and a size of the outer profile of the lens element.

That is, the sensor cover 21 includes an element attachment portion 55 in which the lens element 1 is attached from the image surface side. The element attachment portion 55 extends along the normal direction Ln in the central direction of the lens element 1. The size of the opening 56 of the element attachment portion 55 along the normal direction Ln is smaller than the size of the outer profile of the lens element 1 (refer to FIG. 24).

Furthermore, in this time, the lens element 1 of the main portion 1100 is entered in the sensor cover 21 from the image surface side. Therefore, the main portion 1100 has an internal structure of the sensor cover 21 such that the lens element 1 is entered from the image surface side to the sensor cover 21. Here, in the sensor cover 21 excepting the element attachment portion 55, the size of the opening of the sensor cover 21 along the normal direction Ln is larger than the size of the outer profile of the lens element 1.

In other words, in the main portion 1100, the sensor cover 21 has an opening 56 which is opened in the optical axis La direction and which has a size smaller than the size of the outer profile of the object side surface L1. The object side surface L1 is disposed on the image surface side further than the opening 56 is. Accordingly, the stray light is shielded by the element attachment portion 55. Therefore, entering the stray light to the lens element 1 can be suppressed.

A form in which flip-chip substrate 47 is included may be used, that is, the element attachment portion 55 may be provided to the main portion 900 illustrated in FIG. 21(b).

In addition, a light blocking mask may be formed in the infrared ray-cutting glass 7.

[Embodiment 13]

FIGS. 25(a) to 25(d) are cross-section views illustrating a configuration of a main portion of the image capturing device according to the present embodiment.

Figure 25:
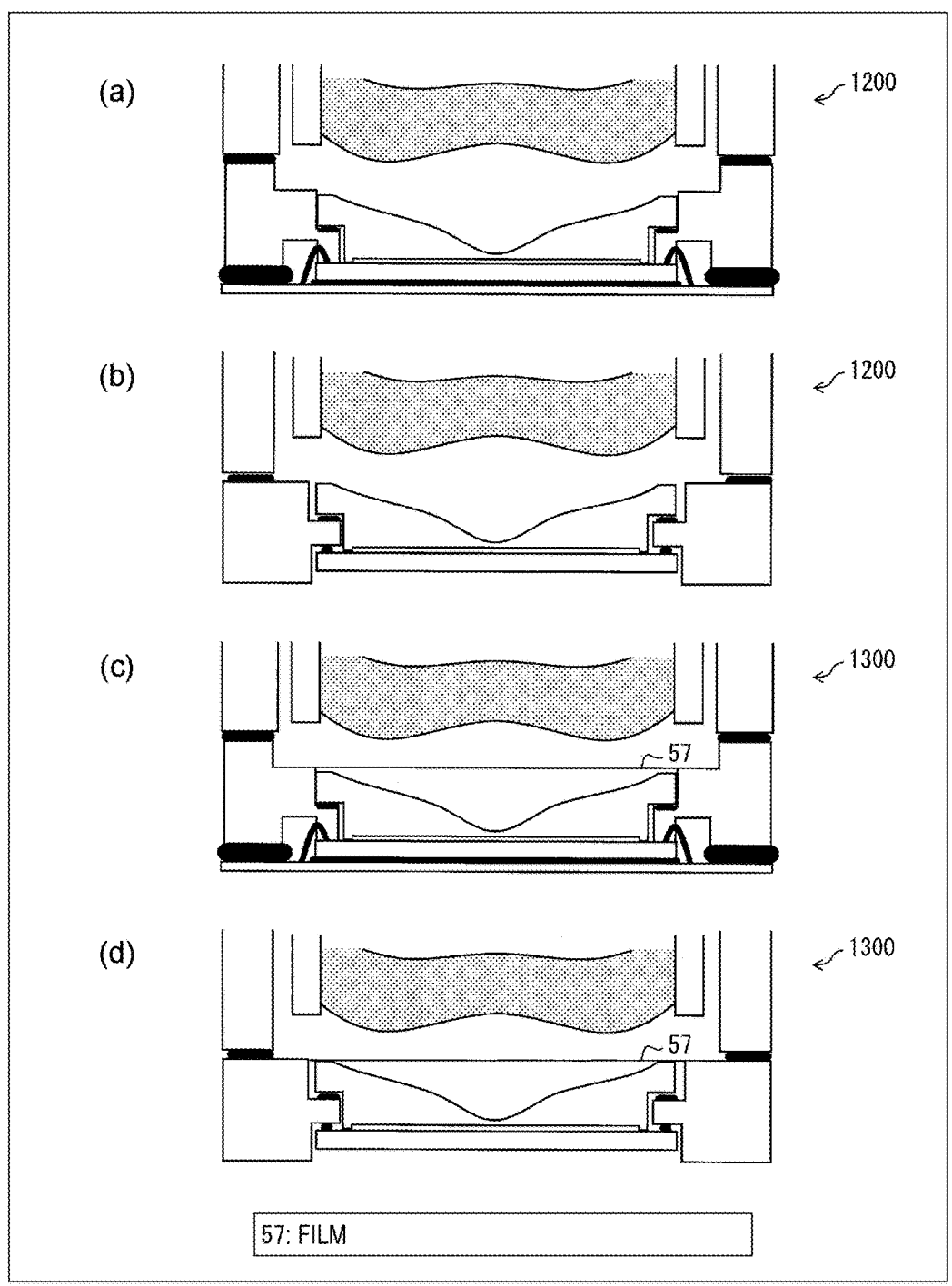
FIGS. 25(a) to 25(d) are cross-section views illustrating a configuration of a main portion of an image capturing device according to Embodiment 13 of the present invention.

In a main portion 1200 illustrated in FIG. 25(a), the infrared ray-cutting glass 7 is omitted with respect to the main portion 600. In the main portion 1200 illustrated in FIG. 25(b), the infrared ray-cutting glass 7 is omitted with respect to the main portion 700.

In addition, a film for removing foreign substance may be provided instead of the infrared ray-cutting glass 7. In each of main portions 1300 illustrated in FIGS. 25(c) and 25(d), a film 57 may be provided with respect to the main portion 1200 illustrated in FIGS. 25(a) and 25(b).

In order to omit the infrared ray-cutting glass 7, the lens element 1 is required to include a material for absorbing infrared light. Examples of the material for absorbing the infrared light includes indium tin oxide (ITO), antimony tin oxide (ATO), an organic boron compound, and the like. By including these materials to the lens element 1, the lens element 1 can be shielded from the infrared light. As a result, the image capturing device with a good image quality can be obtained.

In addition, by omitting the infrared ray-cutting glass 7, the height of the image capturing device can be easily reduced and the aberration correction is easily performed. In general, when a component having 1 or more of a specific refractive index is provided in the optical system, the total length of the optical system increases.

[Application Example 1]

Figure 26:
FIG. 26 is a cross-section view illustrating a first application example of the lens element.

FIG. 26 is a cross-section view illustrating a first application example of the lens element 1.

The lens element 1 may include a point of inflection 58 on the object side surface L1. In design terms of lens element 1, a case where the object side surface L1 has the point of inflection 58 preferably is considered. In the above-describe each embodiment, such a lens element 1 can also be applied without any trouble.

[Application Example 2]

FIG. 27(a) illustrates a plan view and a cross-section view illustrating one of second application examples of the lens element 1. FIG. 27(b) is a plan view illustrating another one of the second application examples of the lens element 1.

Figure 27:
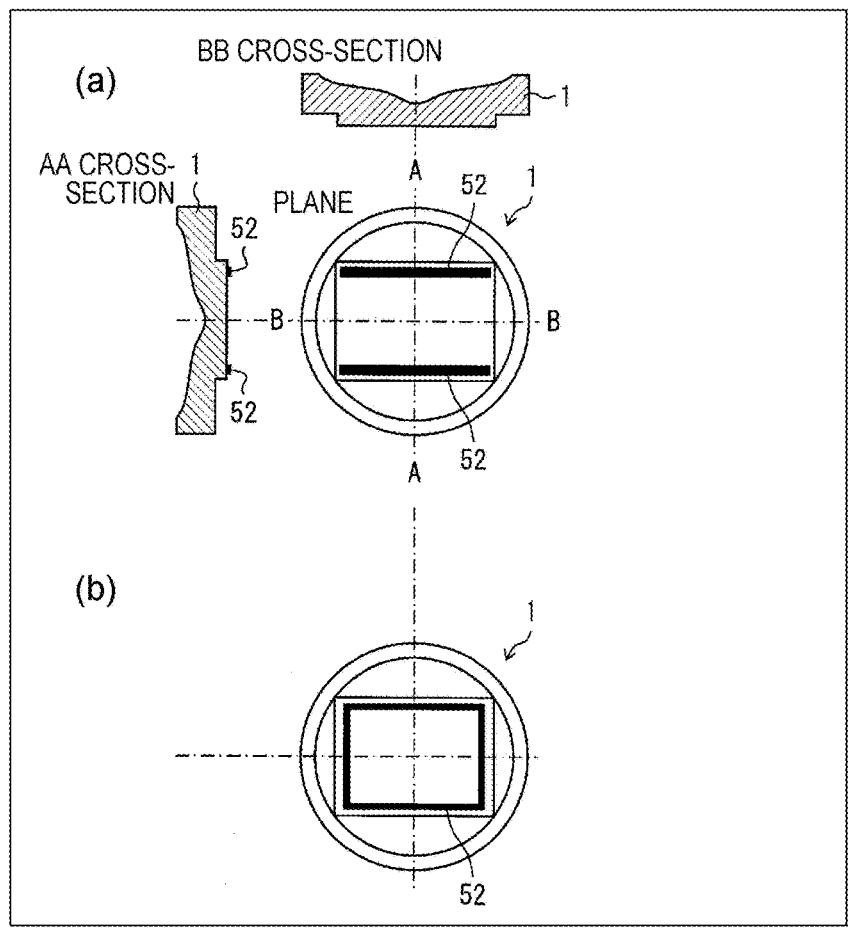
FIG. 27(a) illustrates a plan view and a cross-section view illustrating one of second application examples of the lens element and FIG. 27(b) is a plan view illustrating another one of the second application examples of the lens element.

In a case where the projection portion 52 is provided in the lens element 1, the projection portion 52 may be formed on the entire outer periphery of the image side surface L2 and may be formed on only a part of the outer periphery of the image side surface L2 (may not be formed on the entire outer periphery of the image side surface L2). In FIG. 27, a plan view, a AA cross-section view, an a BB cross-section view of an example that the projection portion 52 is formed on only a part of the outer periphery of the image side surface L2 are illustrated in FIG. 27(a) and a plan view of an example that the projection portion 52 is formed on the entire outer periphery of the image side surface L2 is illustrated in FIG. 27(b), respectively.

As illustrated in FIG. 27(a), by forming the projection portion 52 on only a part of the outer periphery of the image side surface L2, it is suitable for a case where it is required for providing a certain distance between the image side surface L2 and the imaging element 2 (in particular, the light receiving unit 3). That is, in a case of providing the bonding wire 20, if the certain distance is provided, there is possibility that the bonding wire 20 is in contact with the lens element 1. However, if the projection portion 52 is not provided on a place having the high possibility, the possibility can be suppressed.

On the other hand, as illustrated in FIG. 27(b), since the image side surface L2 and the projection portion 52 can surround the light receiving unit 3, by forming the projection portion 52 on the entire outer periphery of the image side surface L2, a possibility that the foreign substance is attached to the light receiving unit 3 can be reduced.

[Application Example 3]

Figure 28:
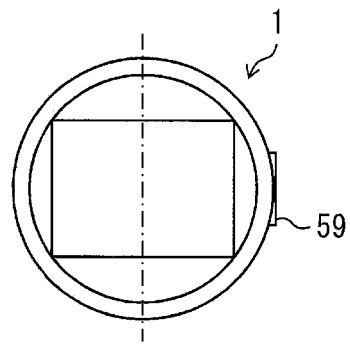
FIG. 28 is a plan view illustrating an example of the lens element manufactured by injection molding.

FIG. 28 is a plan view illustrating an example of the lens element 1 manufactured by injection molding.

When the lens element 1 is manufactured by injection molding, a gate 59 is formed on the end portion of the object side surface L1.

Figure 29:
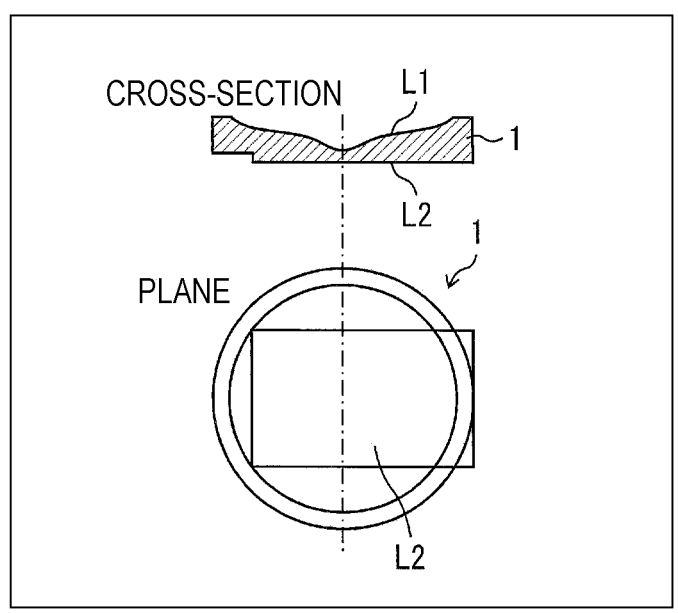
FIG. 29 illustrates a plan view and a cross-section illustrating a third application example of the lens element.

FIG. 29 illustrates a plan view and a cross-section illustrating a third application example of the lens element 1.

In the lens element 1 illustrated in FIG. 29, the end portion of the image side surface L2 is positioned at a position same as the end portion of the object side surface L1. Since the outer profile of the object side surface L1 is the circular and the outer profile of the image side surface L2 is the substantially rectangular, a part of the image side surface L2 is extracted from the object side surface L1.

A part of the image side surface L2 extracted from the object side surface L1 serves as the gate 59 when the lens element 1 is manufactured by the injection molding, for example.

In this manner, in order to have an advantage of the manufacturing of the lens element 1, the image side surface L2 may have a shape asymmetrical to the optical axis La.

[Summary 2 of the Invention]

In the image capturing device, by the configuration that a plano-concave lens of which the surface facing the object side (object side surface) is the concave surface and the surface facing the image surface side (image side surface) is the plane is disposed adjacent to the imaging element, the aberration can be efficiently corrected.

When the configuration is combined with five lenses, the F number is secured at about 1.6 and the height of the image capturing device can be reduced.

[Basic Configuration of Imaging Lens]

A basic configuration of the imaging lens will be described with reference to FIG. 30.

Figure 30:
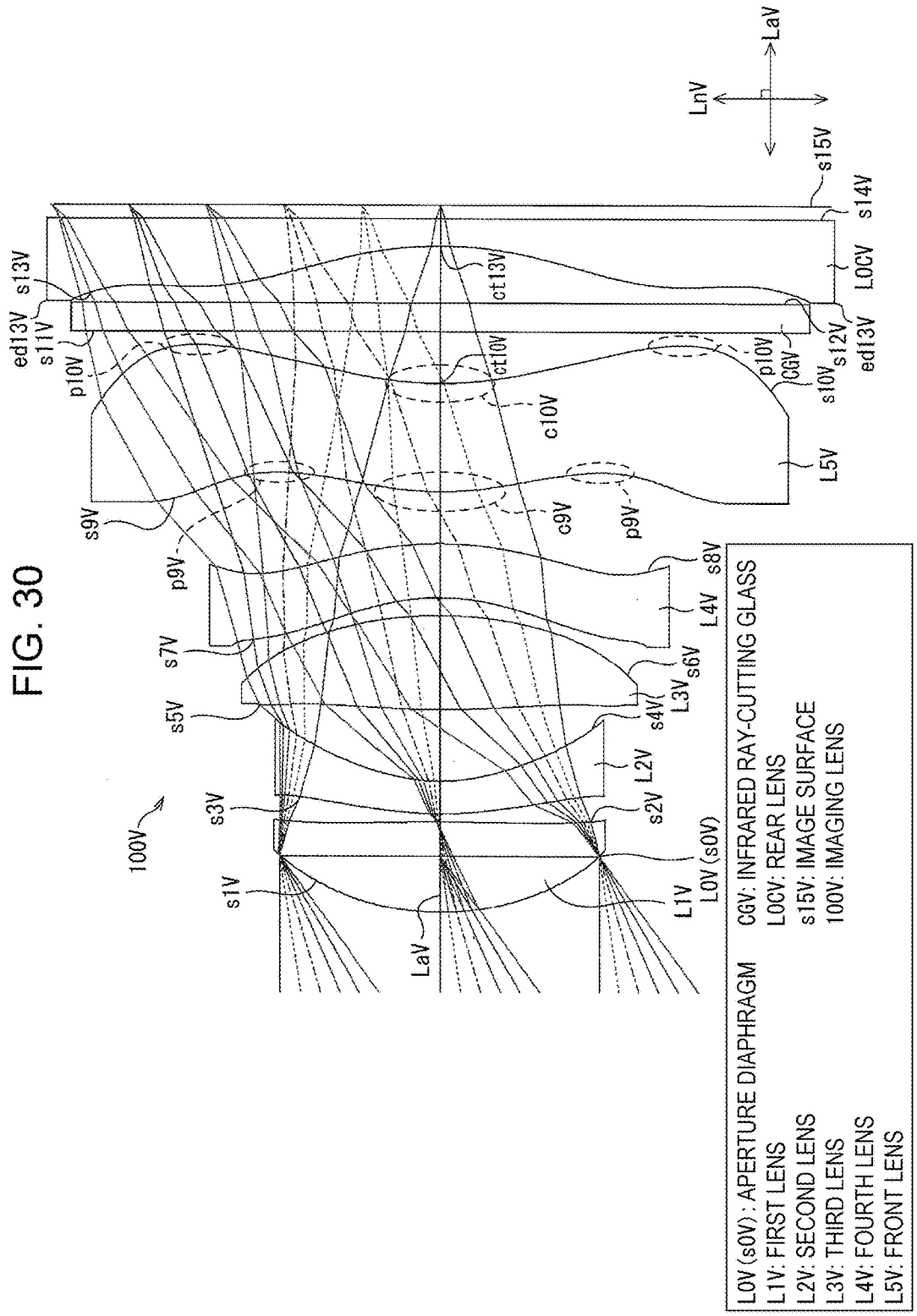
FIG. 30 is a cross-section view illustrating a configuration of an imaging lens according to Embodiment 14 of the present invention.

FIG. 30 is a cross-section view illustrating a configuration of the imaging lens according to Embodiment 14 to be described.

In an imaging lens 100V illustrated in FIG. 30, an aperture diaphragm L0V, a first lens L1V, a second lens L2V, a third lens L3V, a fourth lens L4V, a front lens L5V, an infrared ray-cutting glass CGV, a rear lens LOCV are disposed in this order from the object side toward the image surface side.

The first lens L1V has a surface s1V facing the object side and a surface s2V facing the image surface side. The second lens L2V has a surface s3V facing the object side and a surface s4V facing the image surface side. The third lens L3V has a surface s5V facing the object side and a surface s6V facing the image surface side. The fourth lens L4V has a surface s7V facing the object side and a surface s8V facing the image surface side. The front lens L5V has a surface s9V facing the object side and a surface s10V facing the image surface side. The infrared ray-cutting glass CGV has a surface s11V facing the object side and a surface s12V facing the image surface side. The rear lens LOCV has a surface s13V facing the object side and a surface s14V facing the image surface side. In addition, a surface defined by the aperture diaphragm L0V is set as s0V and an image surface is set as s15V.

The aperture diaphragm L0V limits an amount of light to be entered to the surface s1V.

The first lens L1V has positive refractive power. In addition, the surface s1V is a convex shape.

It is preferable that the first lens L1V is configured by a low-dispersion material.

The second lens L2V has negative refractive power. The second lens L2V is a so-called meniscus lens (a lens of which a side surface is a convex surface and an opposite surface is a concave surface), of which the surface s3V is a convex surface.

It is preferable that the second lens L2V is configured by a high-dispersion material.

The third lens L3V has positive refractive power. In addition, the surface s6V is a convex shape.

It is preferable that the third lens L3V is configured by the low-dispersion material.

The fourth lens L4V has negative refractive power. The fourth lens L4V is a so-called meniscus lens, of which the surface s7V is a concave surface.

The front lens L5V has positive refractive power. In addition, in the surface s9V, a center portion c9V is a convex shape and a peripheral portion p9V positioned so as to surround the center portion c9V is a concave shape. On the other hand, in the surface s10V, a center portion c10V is the concave shape and a peripheral portion p10V positioned so as to surround the center portion c10V is the convex shape.

All of the surface s9V and the surface s10V can be considered as a surface having a point of inflection.

The point of inflection means a boundary where the convex shape and the concave shape are switched in the same lens surface. When the lens surface has the point of inflection, the various aberrations of a peripheral portion of the lens surface can be appropriately corrected. In addition, telecentricity in the image side can be easily secured.

The infrared ray-cutting glass CGV has a function for protecting the image surface from the infrared light or suppressing the moire.

The entire shape of the surface s13V of the rear lens LOCV is the concave shape. A center region c13V of the rear object side, an intermediate region m13V of the rear object side, and a periphery region p13V of the rear object side are distinguished in order from a center ct13V of the lens surface toward an edge ed13V of the lens surface.

The center region c13V of the rear object side includes the center ct13V and is a center portion of the surface s13V. In addition, in the center region c13V of the rear object side, a change amount of a shape of a lens surface toward the object side becomes greater with distance from the center ct13V.

The change amount of the shape means an amount indicating changes in a height (a position in an optical axis direction) of the projections and depressions of the lens surface with respect to an unit distance from the center toward the edge of the lens surface (however, a length in the normal direction with respect to the optical axis).

The intermediate region m13V of the rear object side is an intermediate portion of the surface s13V, which is positioned between the center region c13V of the rear object side and the periphery region p13V of the rear object side. In addition, in the intermediate region m13V of the rear object side, a change amount of a shape of a lens surface toward the object side becomes smaller with distance from the center ct13V.

The periphery region p13V of the rear object side includes the edge ed13V and is a peripheral portion of the surface s13V.

Furthermore, the distance from the center ct13V to the boundary between the center region c13V of the rear object side and the intermediate region m13V of the rear object side is 30% or more than a distance from the center ct13V to the edge ed13V. Any distance is a distance along a normal direction LnV with respect to an optical axis LaV of the imaging lens 100V.

The surface s13V may have the point of inflection.

The surface s14V is a substantially plane. That is, the surface s14V is not limited to the plane, and may be a surface in which a change in optical characteristics (refractive power, eccentricity, or the like) to transmit the light or receive the light is so small to be negligible in an optical system of the image capturing device. An example of such a surface includes a surface which is formed with fine projections and depressions (for example, nm order of the projections and depressions) which reduce a reflective index of light, or a surface formed to be cured slightly.

Figure 31:
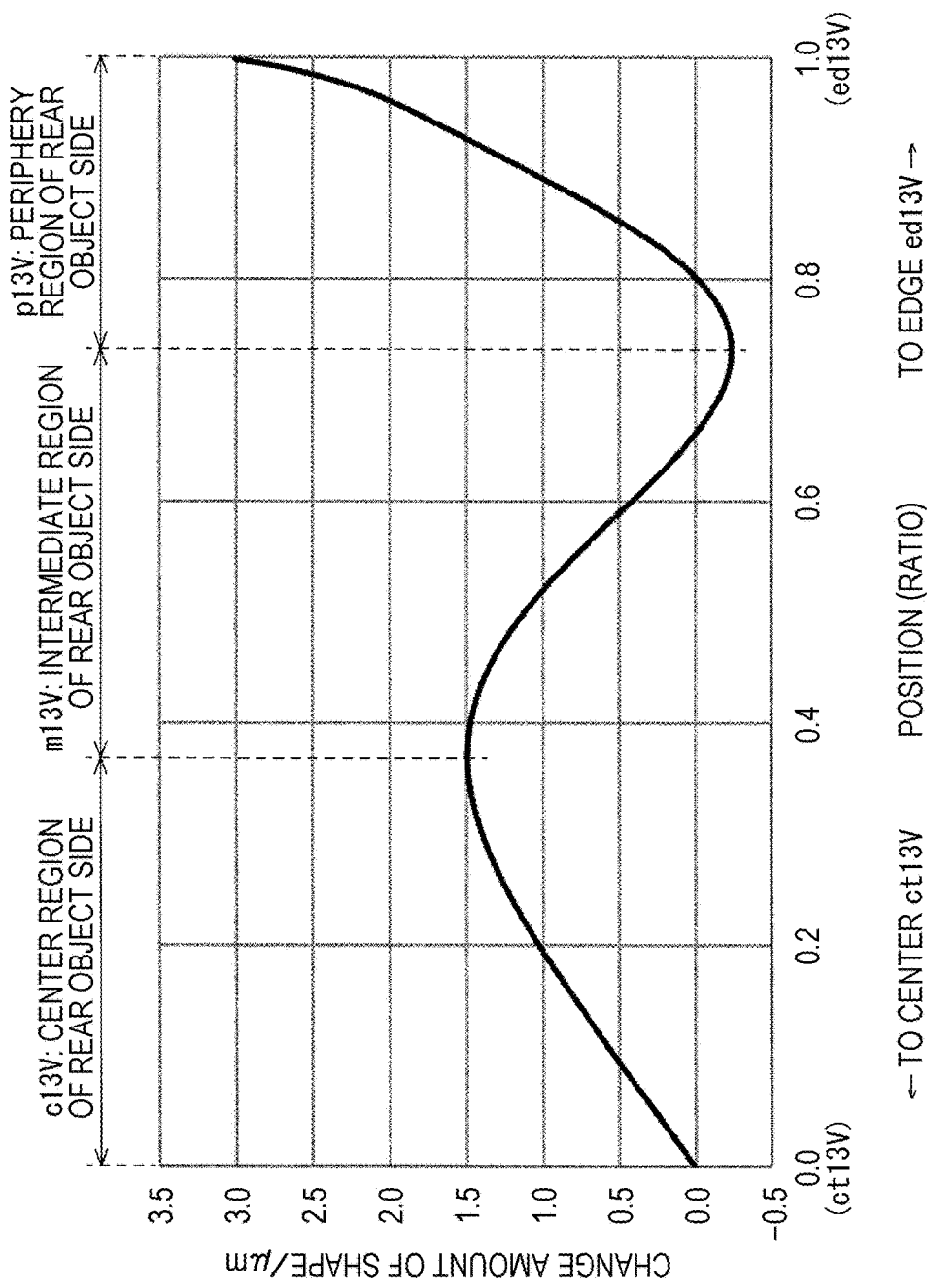
FIG. 31 is a graph illustrating a change amount of the shape of a surface facing the object side of a rear lens in the imaging lens illustrated in FIG. 30.

FIG. 31 is a graph illustrating a change amount of the shape of a surface s13V in the imaging lens 100V.

In a graph illustrated in FIG. 31, a horizontal axis represents a position in the lens surface in terms of proportion. The position of the center ct13V is defined as "0.0" and the position of the edge ed13V is defined as "1.0". In the graph illustrated in FIG. 31, a vertical axis represents the change amount of the shape. Here, as an example thereof, a change amount of the height (a position in the optical axis direction) of the projections and depressions of the lens surface with respect to 5.6 μm of the displacement to the normal direction LnV. The 5.6 μM of the displacement to the normal direction LnV corresponds to about 1/500 of an effective diameter of the surface s13V. Accordingly, it can be considered that the same graph can be obtained, even in a case where the values are further small (for example, 1/1000 of the same, and 1/50000 of the same).

According to FIG. 31, in the surface s13V, a range from the position 0.0 to a position where the change amount of the shape indicates the maximum value (around the position 0.4: about 1.5 μm of the change amount of the shape) corresponds to the center region c13V of the rear object side. As constructed from FIG. 31, in the center region c13V of the rear object side, the change amount of the shape becomes greater with increase in the proportion, in other words, with distance from the center ct13V.

According to FIG. 31, in the surface s13V, a range from a position the change amount of the shape indicates the maximum value to a position where the change amount of the shape indicates the minimum value (around the position 0.8: about −0.3 μm of the change amount of the shape) corresponds to the intermediate region m13V of the rear object side. As constructed from FIG. 31, in the intermediate region m13V of the rear object side, the change amount of the shape becomes smaller as the proportion becomes greater.

A range from the intermediate region m13V of the rear object side to the position 1.0 corresponds to the periphery region p13V of the rear object side.

Here, since the position where the change amount of the shape indicates the maximum value is the boundary between the center region c13V of the rear object side and the intermediate region m13V of the rear object side, the distance from the center ct13V to the boundary is about 40% of the distance from the center ct13V to the edge ed13V.

Here, when it is assumed that a distance (separation distance of the imaging lens in the optical axis direction) between an image surface s15V and the surface s14V is CAV and an optical total length of the imaging lens 100V is OTLV, the imaging lens 100V satisfies Expression (1):

$$CAV/OTLV<0.15 \tag{1}$$

The optical total length indicates a length of the entire optical system in the optical axis direction.

Generally, in order to efficiently perform the correction of various aberrations by the rear lens LOCV, it is preferable that the surface s14V is sufficiently in contact with the image surface s15V. By satisfying Expression (1), the surface s14V can be sufficiently in contact with the image surface s15V.

In addition, since the incident angle of the light from the rear lens LOCV to the image surface s15V is small, the deterioration in the peripheral light amount ratio can be suppressed. An optical system with about 1.6 F number and with a brightness image can be obtained. Generally, a digital correction is performed for shading characteristics at the time of output in accordance with the peripheral light amount ratio. Since a dynamic range is narrowed with respect to sensitivity as the corrected amount, wide characteristics of the sensitivity can be obtained by suppressing the deterioration in the peripheral light amount ratio.

Furthermore, when using the rear lens LOCV instead of a lens of which the both surfaces are aspheric surfaces, it is possible to prevent the deterioration in the resolving power due to an eccentricity between both surfaces of the lens and it is possible to approach the image surface s15V with the rear lens LOCV alone. Accordingly, it is possible to suppress the variation on the optical characteristics due to manufacturing tolerances of the imaging lens 100V. In other words, the imaging lens 100V can be easily manufactured.

In addition, when it is assume that a focal distance of the imaging lens 100V is fV, a focal distance of the front lens L5V is f5V, and a focal distance of the rear lens LOCV is fcV, Expressions (2) and (3) are satisfied:

$$3.4<f5V/fV<5.2 \tag{2}$$

$$-1.7<fcV/fV<-1.1 \tag{3}$$

When f5V/fV is equal to or more than 5.2, it is advantage for reducing the height of the imaging lens 100V. However, there is a possibility that the mounting of the rear lens LOCV becomes difficult, structurally. On the other hand, when f5V/fV is less than or equal to 3.4, the front lens L5V is separated from the image surface s15V. Accordingly, there is a possibility that the correction of the various aberrations is not sufficient.

When the fcV/fV is −1.1 or more, the distortion and the curvature of the image field can be favorably corrected, and there is a possibility that it is difficult to reduce the incident angle of the light to the image surface s15V. On the other hand, when the fcV/fV is −1.7 or less, a possibility of increasing the size of the imaging lens 100V occurs.

In addition, it is preferable that the distance between the image surface s15V and the center ct10V of the surface s10V (separation distance of the imaging lens in the optical axis direction) of 0.8 mm or more.

Therefore, the lens diameter of the front lens L5V can be reduced. Accordingly, the size of a periphery device such as an auto focus mechanism (AF) can be reduced. Therefore, it is possible to greatly reduce the size of the image capturing device unit. In addition, the diameter of the light beams increase as the distance between the image surface s15V and the center ct10V becomes greater. As a result, a possibility that the foreign substance present in the vicinity of the front lens L5V is visible on the captured image. Since the rear lens LOCV is significantly effective on the correction of the curvature of the image field, it is possible to correct the curvature of the image field sufficiently good even when the front lens L5V is separated from the image surface s15V.

Furthermore, in a case where the image capturing device including the imaging lens is configured, the imaging element is disposed on the image surface s15V (an image capturing device 1V including an imaging lens 2V and an imaging element 3V, refer to FIG. 68).

When it is assumed that a size of a sensor which is positioned diagonally to the imaging element is SDV, Expression (4) is satisfied:

$$0.7 < OTLV/SDV < 1.0 \qquad (4).$$

When OTLV/SDV is 1.0 or more, the image angle becomes narrower, and a case where the various aberrations is favorably corrected without using the rear lens LOCV can be generated. Accordingly, the condition of OTLV/SDV is 1.0 or more cannot be said to be the best choice in view of the technical idea of the present invention. When OTLV/SDV is 0.7 or less, the image angle becomes too wide, and there is a possibility that it is required to reconsider the conditions for correcting the various aberrations.

By applying the high dispersion material (30 or less of the Abbe number) to the second lens L2V, chromatic aberration can be favorably corrected. Accordingly, by applying a material with high refractive index (1.6 or more of the refractive index) to the fourth lens L4V, there is an effect of the reducing the optical total length.

[Notes Relating to Description of Various Characteristics of Imaging Lens According to Each of Embodiments 14 to 22]

Various characteristics of the imaging lens according to each of Embodiments 14 to 22 will be described. However, prior to description thereof, notes will be shown below.

The definitions of words used in a table indicating lens data will be listed below.

A column "element" indicates a member to be contributed to the optical properties, the L0V (aperture diaphragm L0V), the L1V (first lens L1V), the L2V (second lens L2V), the L3V (third lens L3V), the L4V (fourth lens L4V), the L5V (front lens L5V), the CGV (infrared ray-cutting glass CGV), the LOCV (rear lens LOCV), and the image surface are included.

The column "Vd" indicates the Abbe number of each member, and the column "Nd" indicates the refractive index of each member.

The Abbe number is a constant of an optical medium illustrating the ratio of the refractive index with respect to the dispersion. It is a degree to which light having different wavelengths reflected into different directions, and distribution by the degree of refraction of light beams with respect to the high Abbe number of the medium having different wavelengths is small.

The column "surface" indicates the surface s1V to the surface s14V and the image surface s15V.

The column "curvature" indicates curvatures of the surface s1V to the surface s14V and the image surface s15V. The curvature means the reciprocal of the radius of curvature.

The column "center thickness" indicates a distance from the center any one of the surface s1V to the surface s14V to the center of the next surface (image surface s15V side) in the optical axis LaV direction.

The column "radius" indicates a radius of a circle region which can regulate the range of the light beam, in the surface s1V to the surface s14V and the image surface s15V.

The column "aspheric coefficient" indicates ith-order of aspheric coefficient Ai (i represents an even number of 4 or more) in an aspherical surface equation constituting the aspherical surface (refer to FIG. 32), from A4 to A16. In the aspherical surface equation, Z represents a coordinate in the optical axis LaV direction, x represents a coordinate of the normal direction LnV, R represents a curvature radius (reciprocal of the curvature), and K represents a conic coefficient.

The notation of "(constant a)E(+constant B)" indicates the (constant a)×10(+constant B) square. Similarly, the notation of "(constant a)E(−constant B)" indicates (constant a)×10(−constant B) square.

The optical characteristics are measured based on the following conditions (A) of (C).

(A) Size of the sensor which is positioned diagonally to the imaging element . . . 5.867 mm (B) Pixel pitch of the imaging element . . . 1.12 μm (C) Each wavelength constituting a simulation light source and these mixing ratio . . . 450 nm:550 nm (main wavelength):650 nm=0.16:1:0.56

In the graph indicating the astigmatism, the horizontal axis represents a deviation of the light beam to the normal direction LnV (−0.10 mm to +0.10 mm) and the vertical axis indicate an image height (from the below, 0% of the image height to 100% of the image height).

The image height represents a height from the center of the image. In a case where the image height is indicated by the distance, the center of the image is set as 0 mm. In a case where the image height is indicated by the proportion, the center of the image is set as 0% and the maximum image height is set as 100%.

In the graph indicating the astigmatism, an index of S indicates characteristics of a sagittal image surface and an index of T indicates characteristics of a tangential image surface.

In the graph indicating the distortion, the horizontal axis indicates a deviation of the light beam to the normal direction LnV (−2% to +2%) and the vertical axis indicates the image height (from the below, 0% of the image height to 100% of the image height).

In the graph indicating the astigmatism, the horizontal axis indicates the deviation of the light beam to the normal direction LnV (−0.1 mm to +0.1 mm) and the vertical axis indicates the image height (from the below, 0% of the image height to 100% of the image height).

In the graph indicating the transverse aberration, a horizontal axis Px indicates a position in a sagittal cross-section (−20 μm to +20 μm), a horizontal axis Py indicates a position in a tangential cross-section (−20 μm to +20 μm), a vertical axis ex indicates a position in a sagittal direction (−20 μm to +20 μm), and a vertical axis ey indicates a position in a tangential direction (−20 μm to +20 μm). In addition, the number of the light sources is 100 pieces. Further, in the graph, the corresponding relationship between an IMA value and the proportion of the image height is as follows.

IMA: 0.0000 mm . . . Center of image (0% of image height)

IMA: 0.5867 mm . . . 20% of image height

IMA: 1.1734 mm . . . 40% of image height

IMA: 1.7601 mm . . . 60% of image height

IMA: 2.3468 mm . . . 80% of image height

IMA: 2.9335 mm . . . Maximum image height (100% of image height)

In the graph indicating the characteristics of a modulation transfer function (MTF) with respect to the image height, the horizontal axis represents the image height (0 mm to 2.934 mm) and the vertical axis represents the MTF (0 to 1.0). Further, in the graph, all of S1, S2, and S3 indicate characteristics in a sagittal image surface, respectively. The spatial frequency represents the characteristics when the Nyquist frequency/4, the Nyquist frequency/2, and the Nyquist frequency. Further, in the graph, all of T1, T2, and T3 indicate characteristics in a tangential image surface, respectively.

The spatial frequency represents the characteristics when the Nyquist frequency/4, the Nyquist frequency/2, and the Nyquist frequency.

The Nyquist frequency is a value corresponding to the Nyquist frequency of the imaging element and is to be calculated from the pixel pitch of the imaging element. The Nyquist frequency is a value of the resolvable spatial frequency. Specifically, the Nyquist frequency Nyq of the imaging element (Unit: cyc/mm) is calculated by Nyq.=1/(pixel pitch of the imaging element)/2. In a case where the pixel pitch of the imaging element is 1.12 µm, the Nysuist frequency is about 446.42857 cyc/mm. Therefore, the optical characteristics were measured as the Nyquist frequency=446.00 cyc/mm is an approximate value of this.

[Embodiment 14]

The imaging lens 100V illustrated in FIG. 30 can be said that a typical design. The imaging lens 100V can obtain the bright image (1.60 of F number) and the height of the imaging lens 100V is low.

The configuration of the imaging lens 100V is as illustrated in FIG. 30.

FIG. 32 is a graph illustrating the lens data of the imaging lens 100V.

Figure 33:
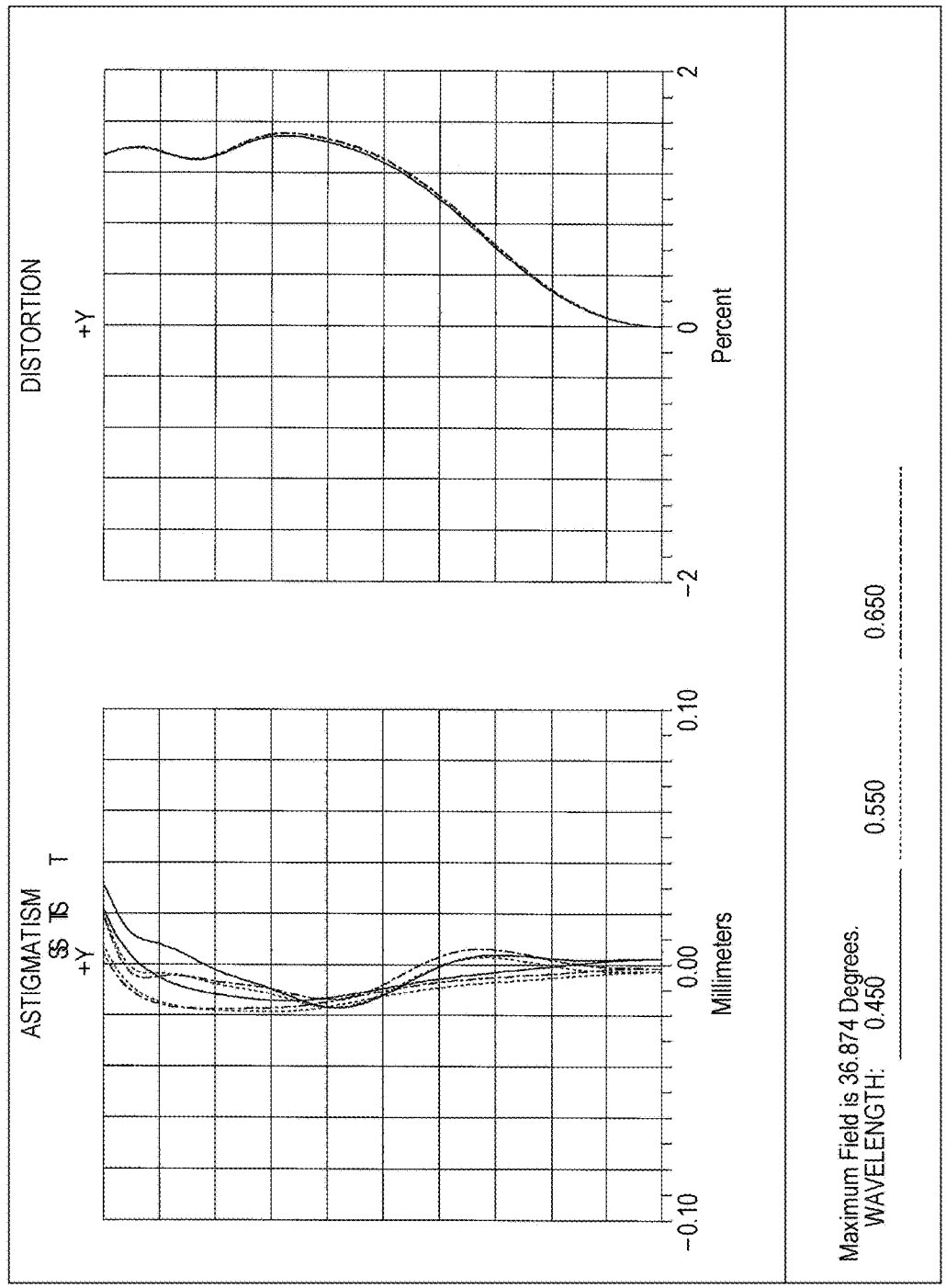
FIG. 33 is a graph illustrating astigmatism and distortion of the imaging lens illustrated in FIG. 30.

FIG. 33 is a graph illustrating the astigmatism and the distortion of the imaging lens 100V.

Figure 34:
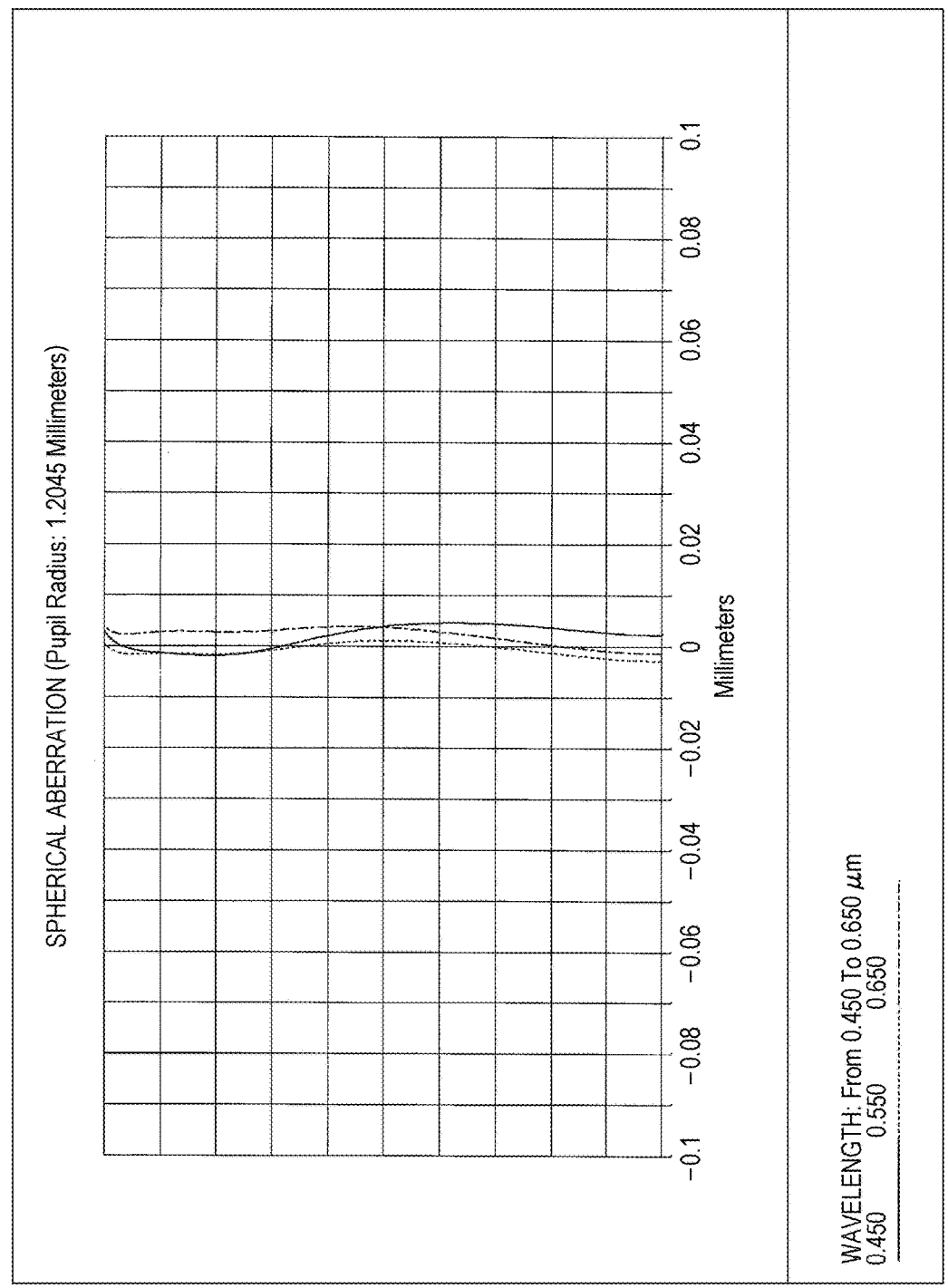
FIG. 34 is a graph illustrating a spherical aberration of the imaging lens illustrated in FIG. 30.

FIG. 34 is a graph illustrating the spherical aberration of the imaging lens 100V.

Figure 35:
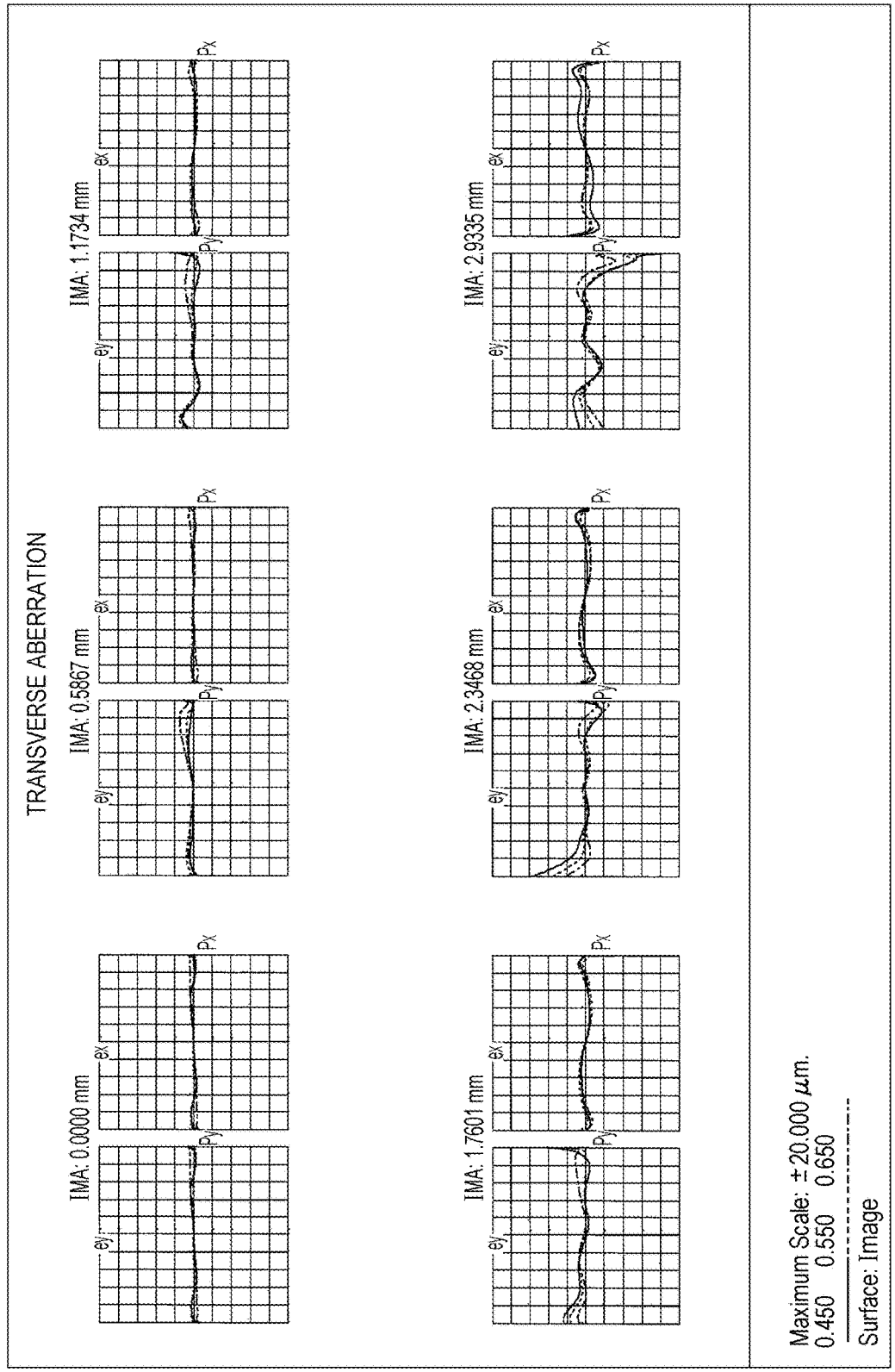
FIG. 35 is a graph illustrating a transverse aberration of the imaging lens illustrated in FIG. 30.

FIG. 35 is a graph illustrating the transverse aberration of the imaging lens 100V.

According to FIGS. 33 to 35, it can be considered that the aberration is satisfactorily corrected in the imaging lens 100V.

Figure 36:
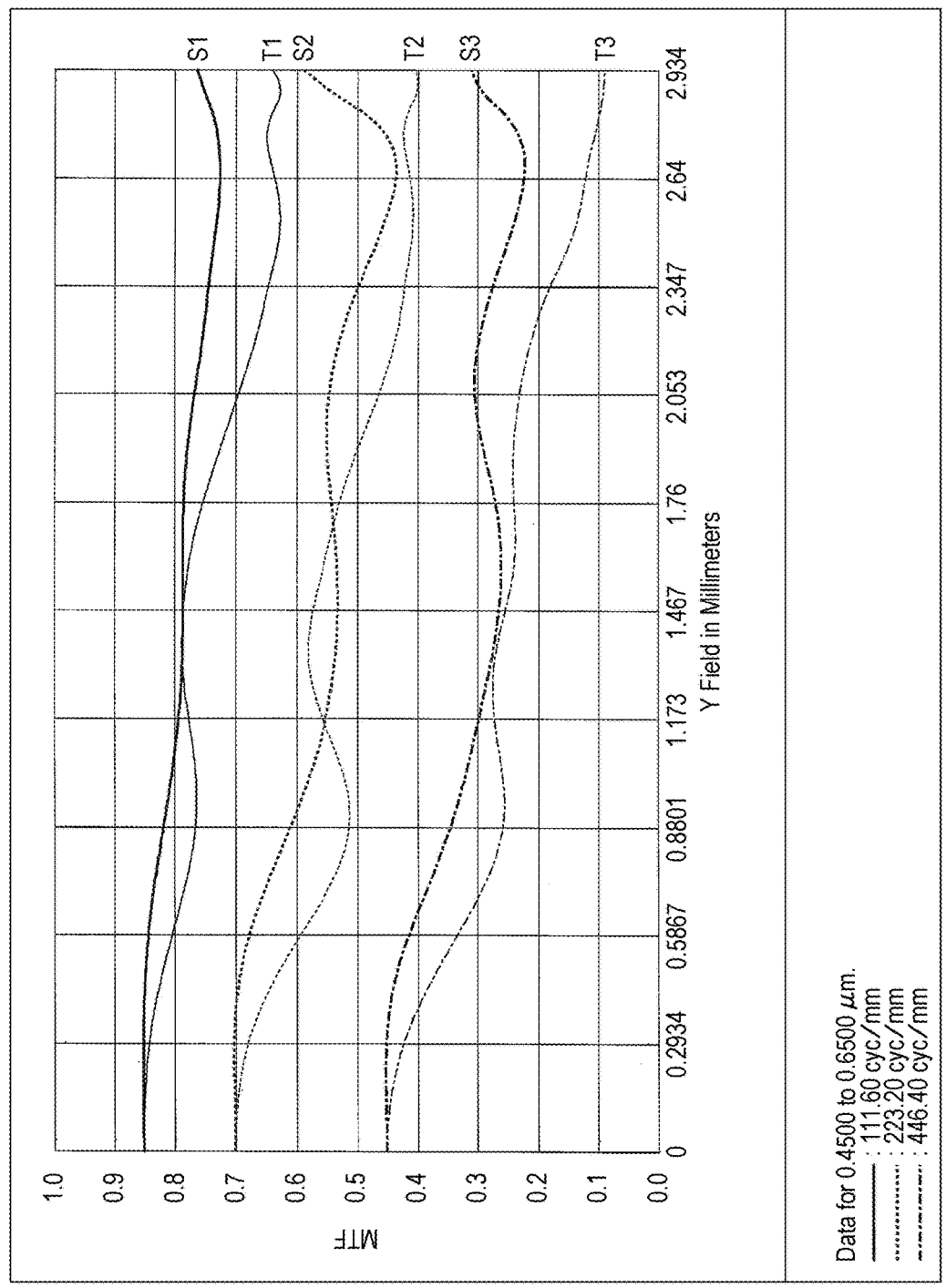
FIG. 36 is a graph illustrating characteristics of the MTF with respect to an image height of the imaging lens illustrated in FIG. 30.

FIG. 36 is a graph illustrating characteristics of the MTF with respect to an image height of the imaging lens 100V.

According to FIG. 36, if excluding a characteristic T3 near the maximum image height (2.934 mm), 0.2 or more of the MTF can be secured. Therefore, it is considered that the resolving power of the imaging lens 100V is high.

[Embodiment 15]

Figure 37:
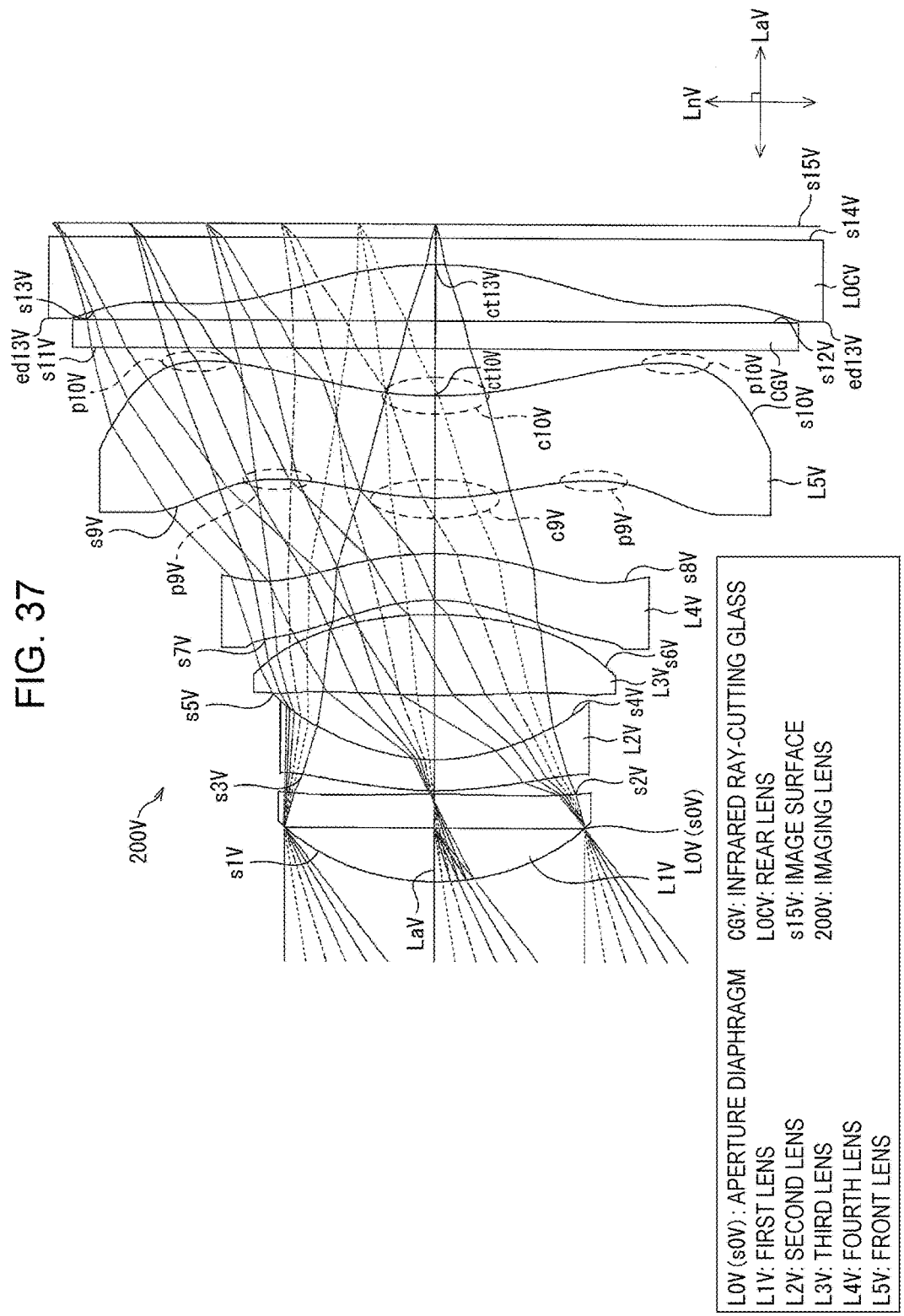
FIG. 37 is a cross-section view illustrating a configuration of an imaging lens according to Embodiment 15 of the present invention.

FIG. 37 is a cross-section view illustrating a configuration of the imaging lens according to Embodiment 15.

The basic configuration of an imaging lens 200V illustrated in FIG. 37 is the same as that of the imaging lens 100V. It can be said that it is a design term that the height of the imaging lens 100V further reduced (further details of the reducing the height thereof will be described).

FIG. 38 is a table illustrating the lens data of the imaging lens 200V.

Figure 39:
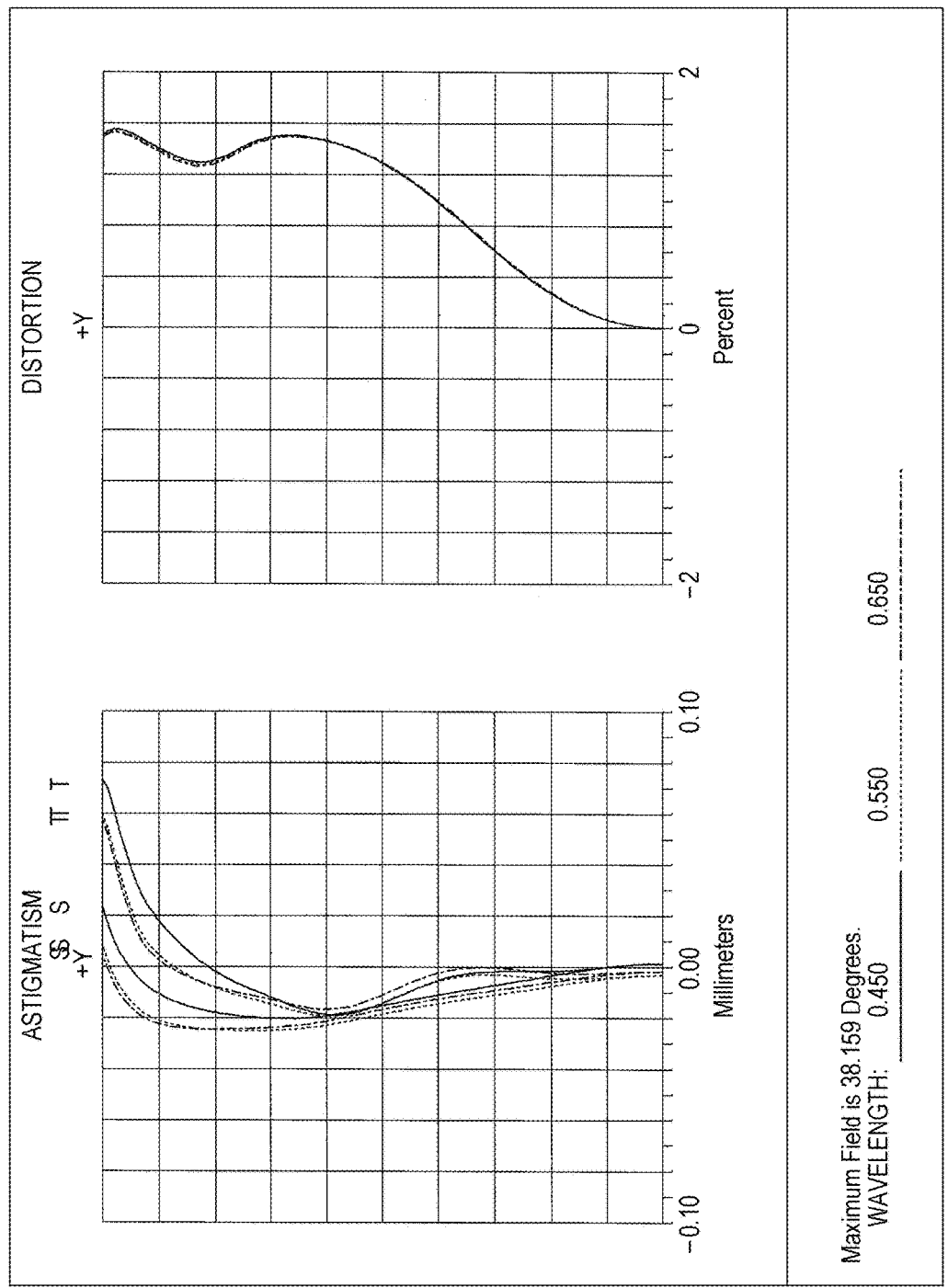
FIG. 39 is a graph illustrating the astigmatism and the distortion of the imaging lens illustrated in FIG. 37.

FIG. 39 is a graph illustrating the astigmatism and the distortion of the imaging lens 200V.

Figure 40:
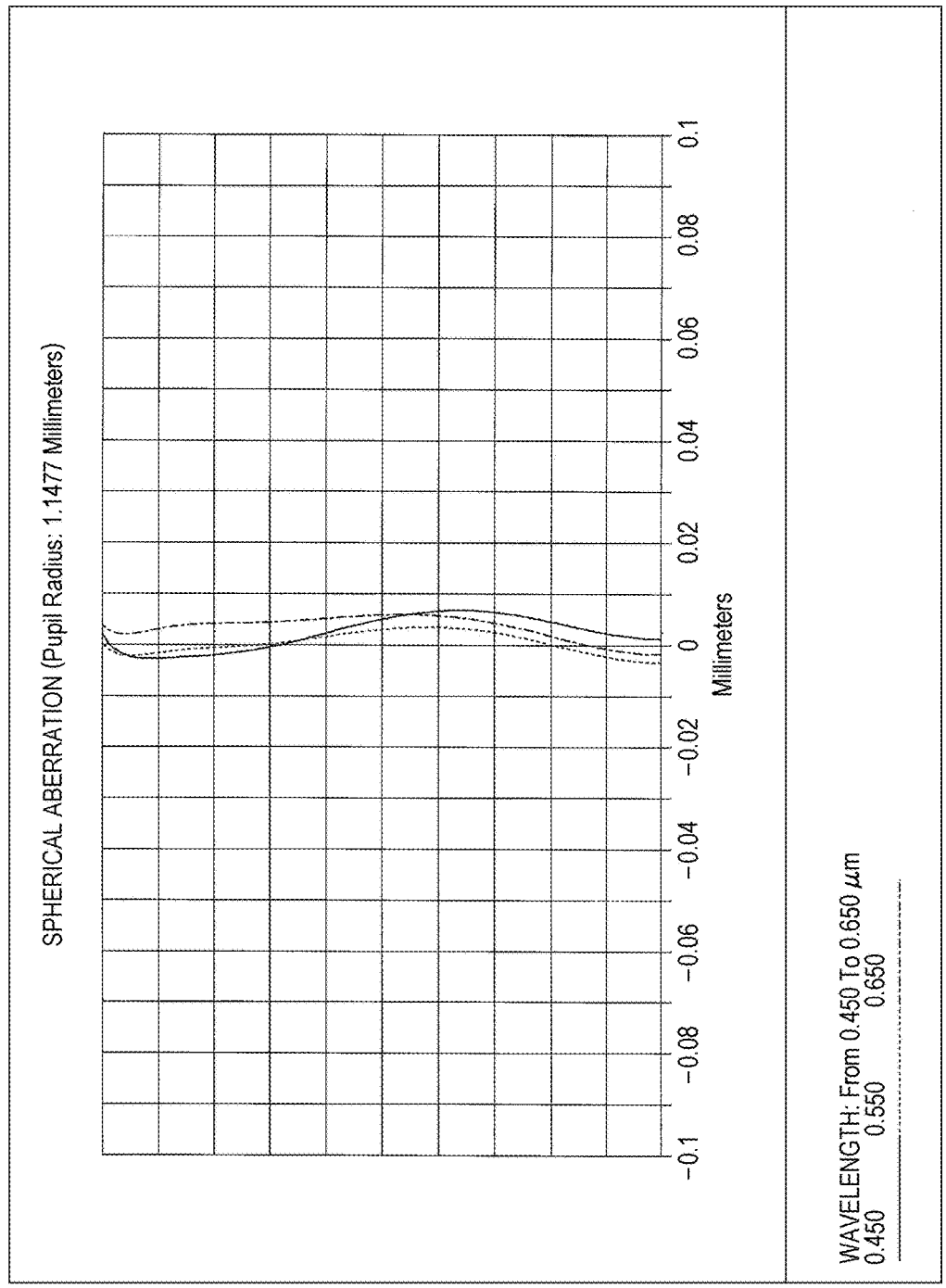
FIG. 40 is a graph illustrating the spherical aberration of the imaging lens illustrated in FIG. 37.

FIG. 40 is a graph illustrating the astigmatism of the imaging lens 200V.

Figure 41:
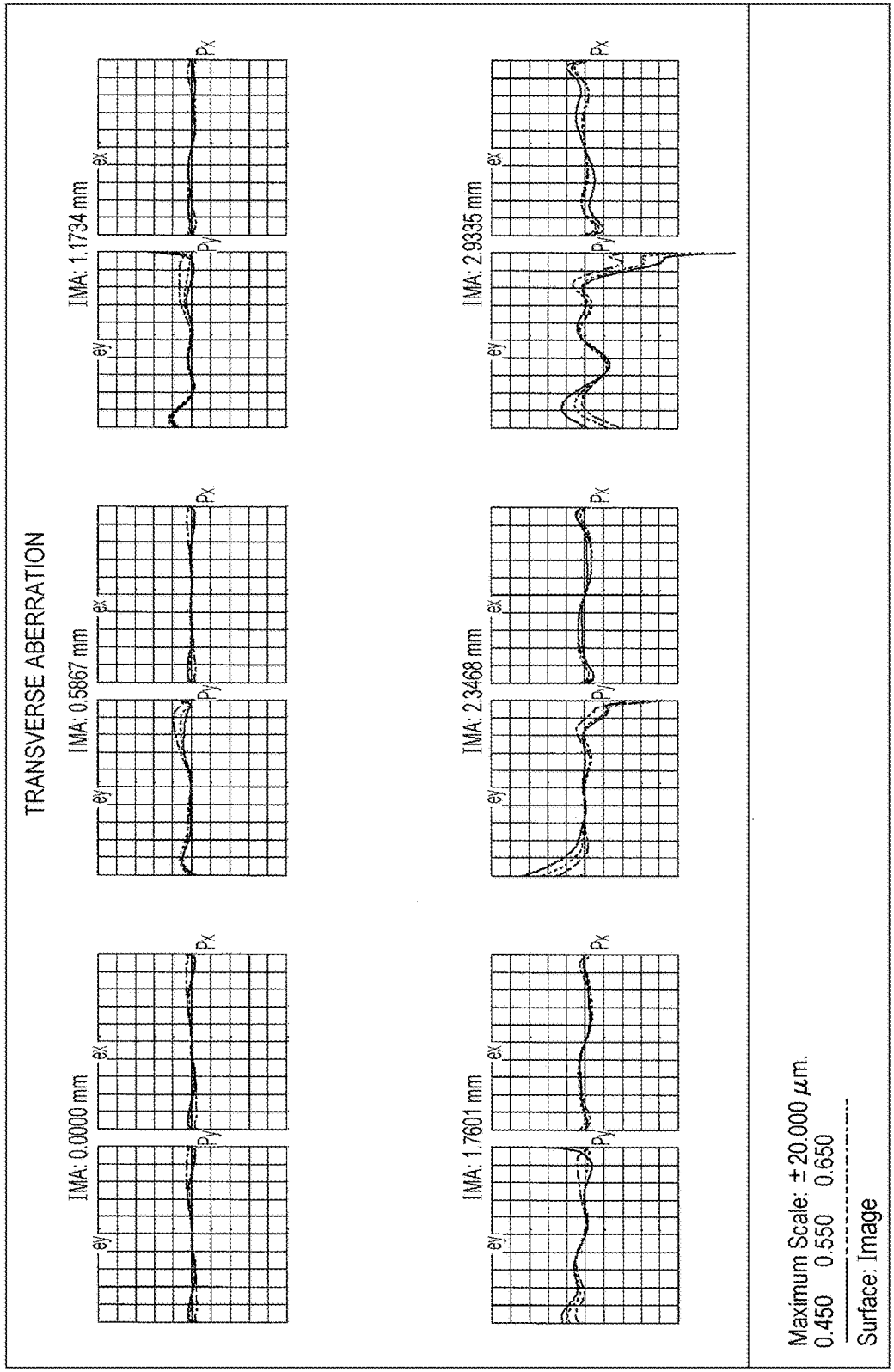
FIG. 41 is a graph illustrating the transverse aberration of the imaging lens illustrated in FIG. 37.

FIG. 41 is a graph illustrating the transverse aberration of the imaging lens 200V.

According to FIGS. 39 to 41, it can be considered that the aberration is satisfactorily corrected in the imaging lens 200V.

Figure 42:
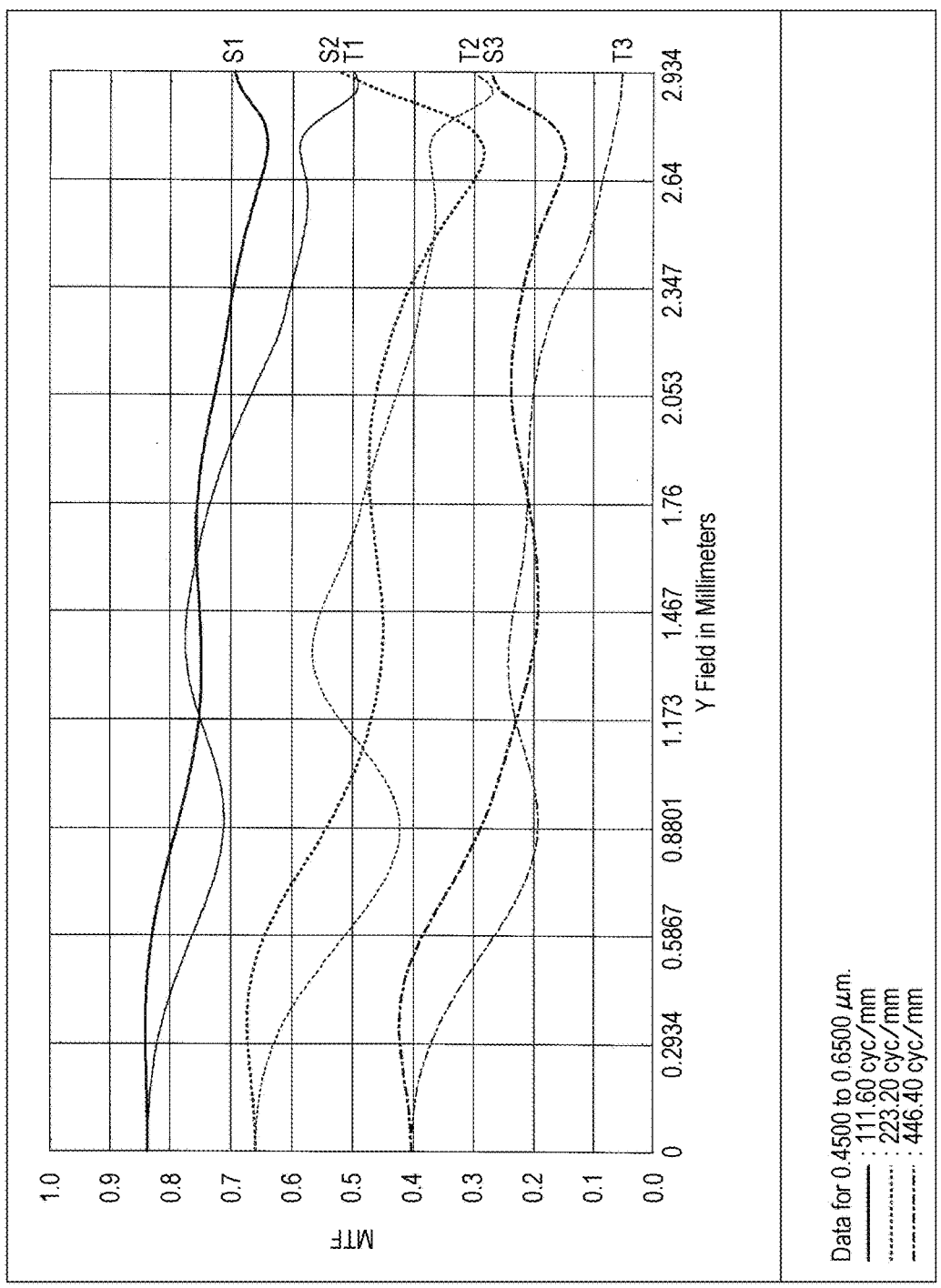
FIG. 42 is a graph illustrating the characteristics of the MTF with respect to the image height of the imaging lens illustrated in FIG. 37.

FIG. 42 is a graph illustrating the characteristics of the MTF with respect to the image height of the imaging lens 200V.

According to FIG. 42, if excluding a characteristic T3 and a part of a characteristic S3 near the maximum image height, 0.2 or more of the MTF can be secured. Therefore, it is considered that the resolving power of the imaging lens 200V is high.

[Embodiment 16]

FIG. 43 is a cross-section view illustrating a configuration of the imaging lens according to Embodiment 16.

The basic configuration of an imaging lens 300V illustrated in FIG. 43 is the same as that of the imaging lens 100V. It is an example that the rear lens LOCV is generally constituted by a plastic material.

FIG. 44 is a table illustrating the lens data of the imaging lens 300V.

According to FIG. 44, in the rear lens LOCV of the imaging lens 300V, the Abbe number is 1.614 and the refractive index is 25.6. It is different from that of the rear lens LOCV of the imaging lens 100V (the Abbe number is 1.544 and the refractive index is 55.9).

Figure 45:
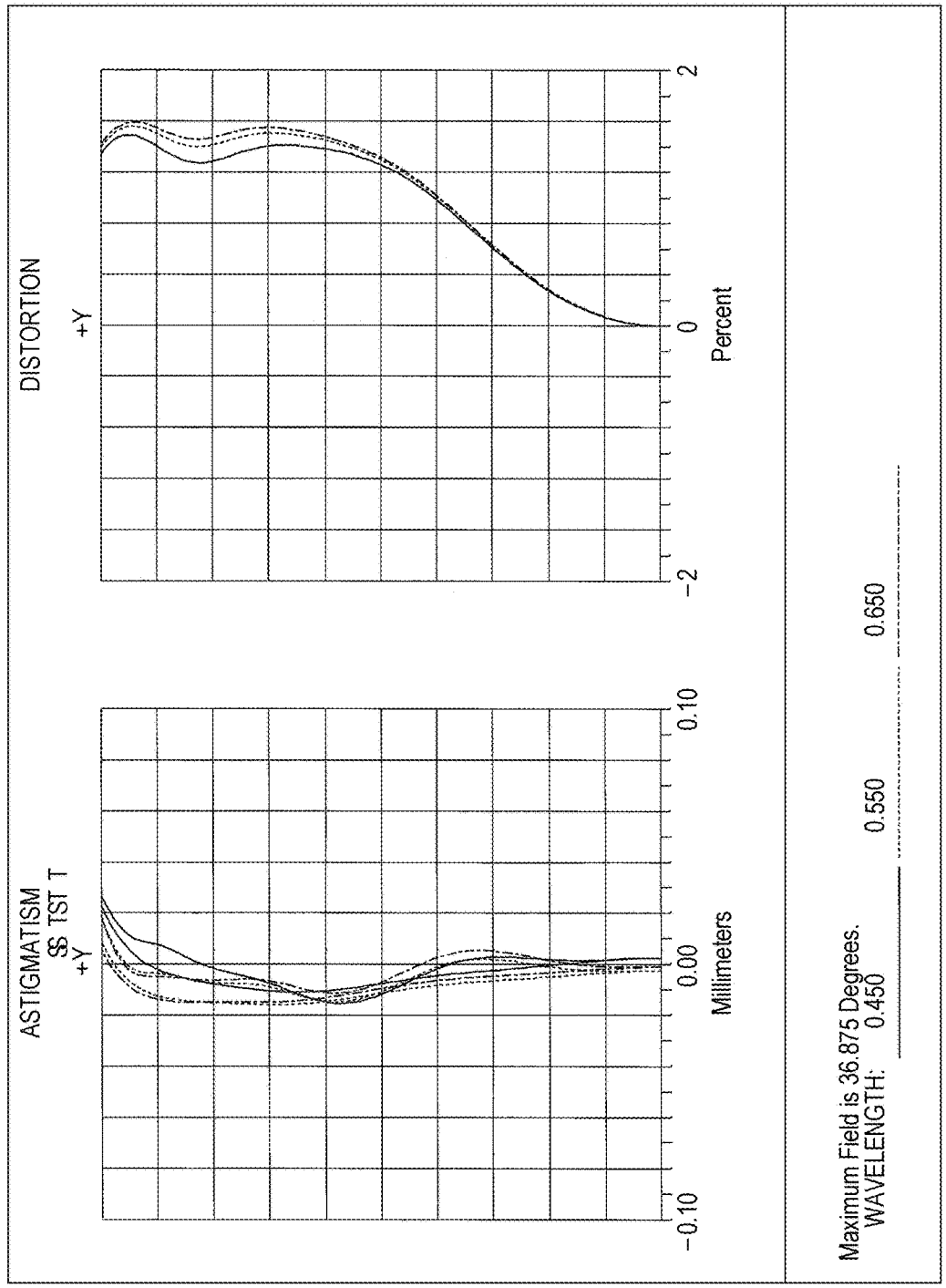
FIG. 45 is a graph illustrating the astigmatism and the distortion of the imaging lens shown in FIG. 43.

FIG. 45 is a graph illustrating the astigmatism and the distortion of the imaging lens 300V.

Figure 46:
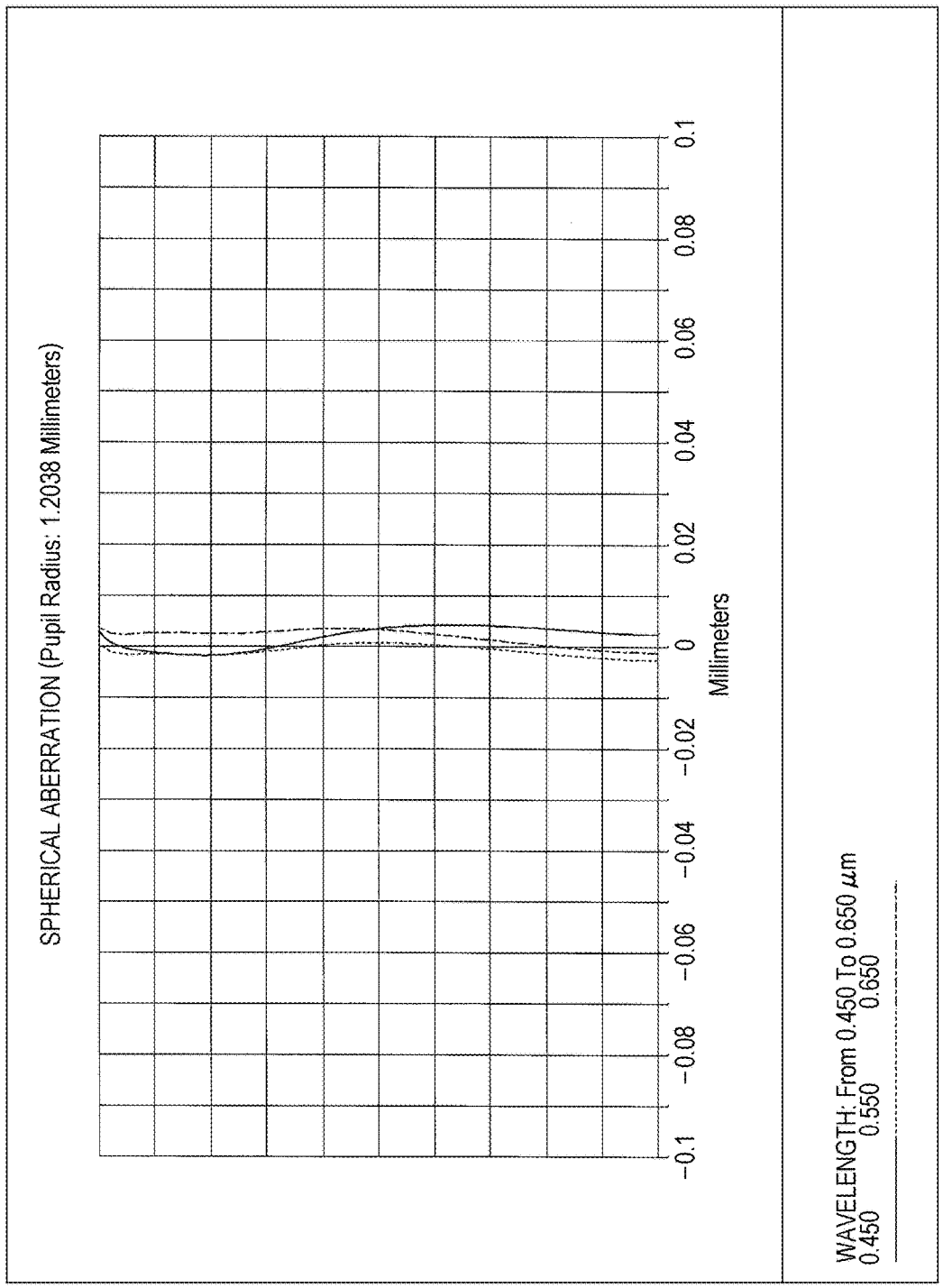
FIG. 46 is a graph illustrating the spherical aberration of the imaging lens illustrated in FIG. 43.

FIG. 46 is a graph illustrating the spherical aberration of the imaging lens 300V.

Figure 47:
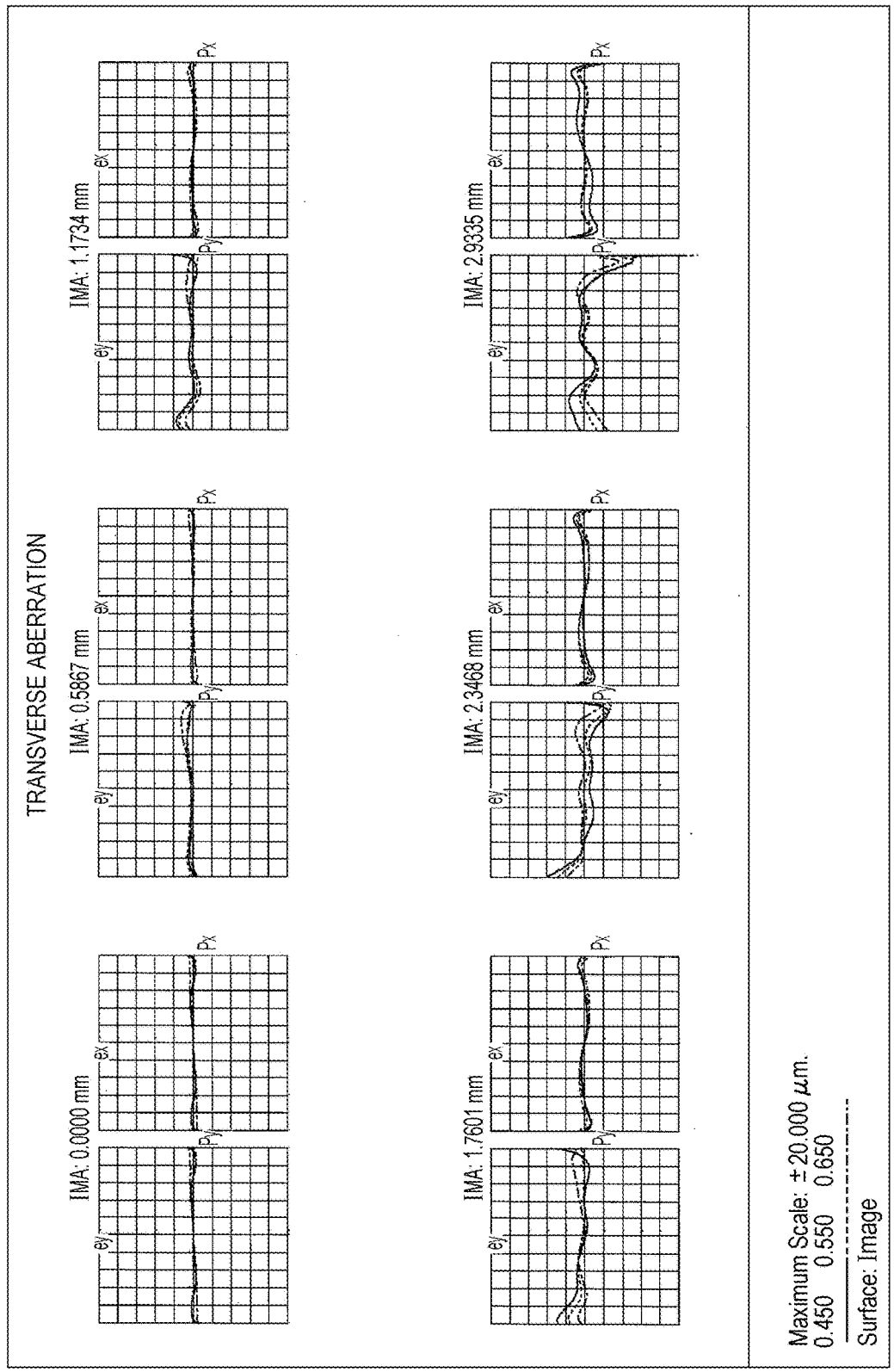
FIG. 47 is a graph illustrating the transverse aberration of the imaging lens shown in FIG. 43.

FIG. 47 is a graph illustrating the transverse aberration of the imaging lens 300V.

According to FIGS. 45 to 47, it can be considered that the aberration is satisfactorily corrected in the imaging lens 300V.

Figure 48:
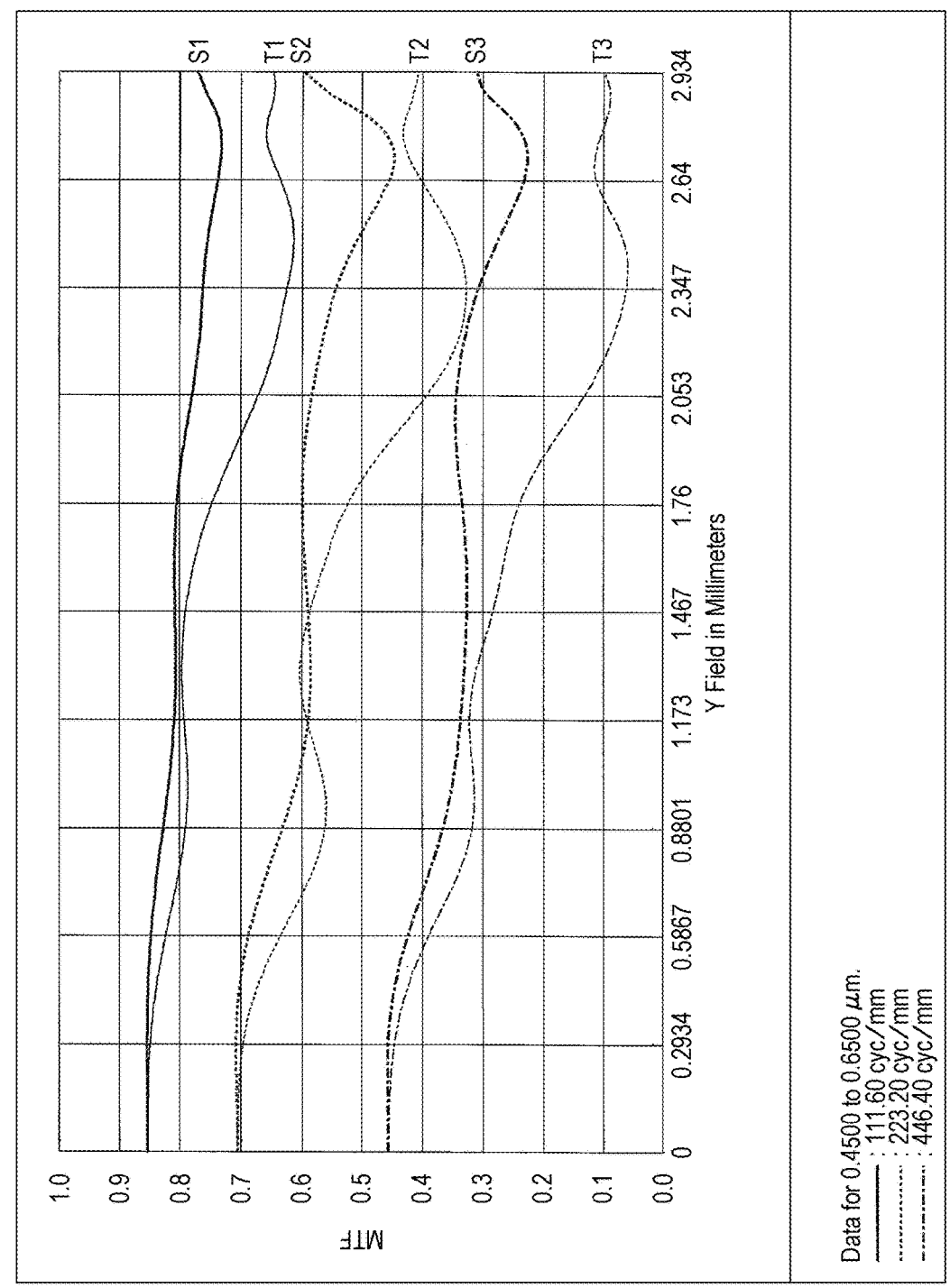
FIG. 48 is a graph illustrating the characteristics of the MTF with respect to the image height of the imaging lens illustrated in FIG. 43.

FIG. 48 is a graph illustrating the characteristics of the MTF with respect to the image height of the imaging lens 300V.

According to FIG. 48, if excluding the characteristic T3 near the maximum image height, 0.2 or more of the MTF can be secured. Therefore, it is considered that the resolving power of the imaging lens 300V is high.

[Embodiment 17]

Figure 49:
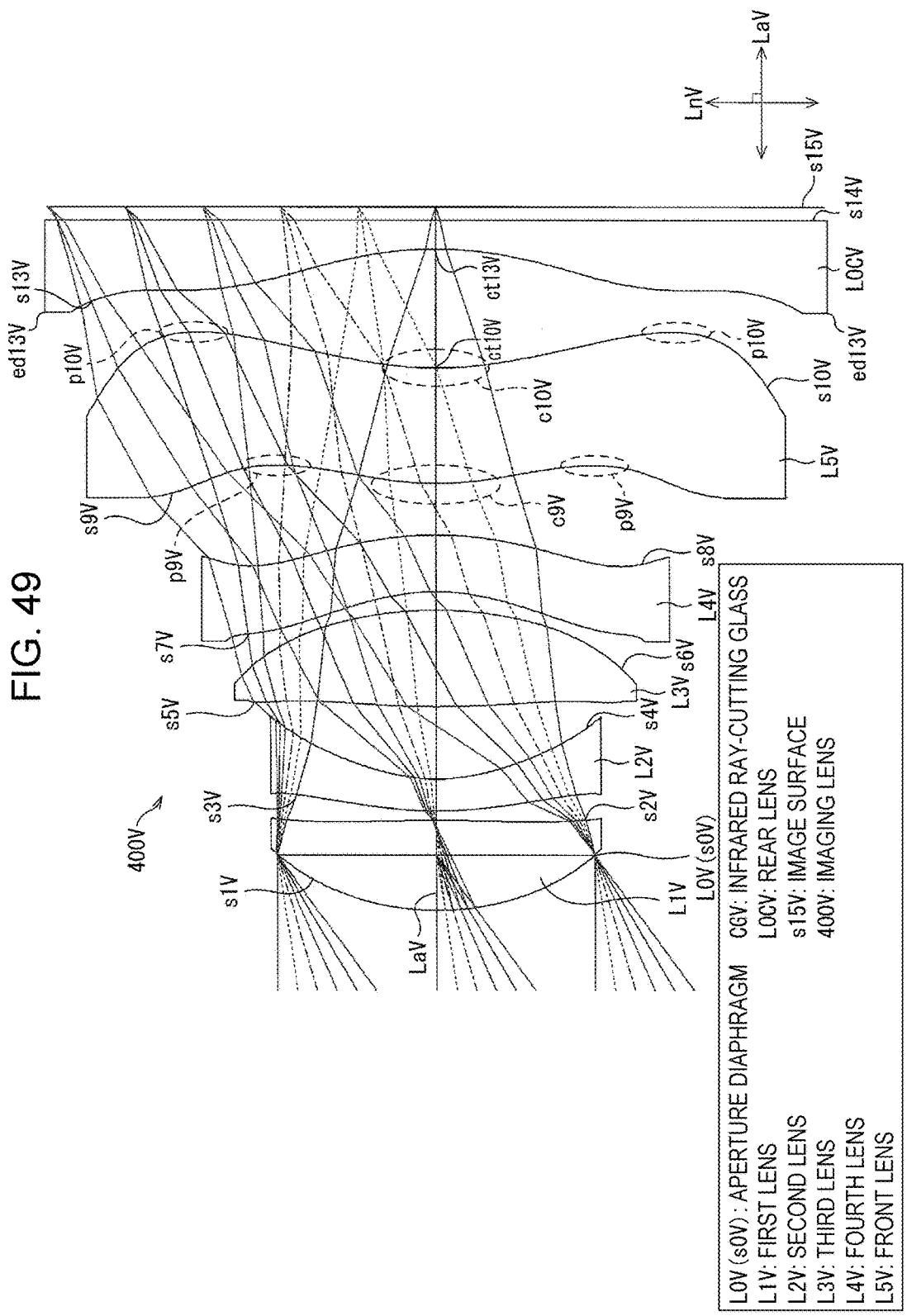
FIG. 49 is a cross-section view illustrating a configuration of an imaging lens according to Embodiment 17 of the present invention.

FIG. 49 is a cross-section view illustrating a configuration of the imaging lens according to Embodiment 17.

An imaging lens 400V illustrated in FIG. 49 is obtained by omitting the infrared ray-cutting glass CGV from the imaging lens which have the same basic configuration as that of the imaging lens 100V. The surface s13V and/or the surface S14V is subjected to processing for blocking the infrared light. Accordingly, it is possible to omit the infrared ray-cutting glass CGV. By using a thermoset material as a material of the rear lens LOCV, the process can be easily performed. The thermoset material is excellent in heat-resisting properties, and the process can be performed by high-temperature deposition.

FIG. 50 is a table illustrating the lens data of the imaging lens 400V.

Figure 51:
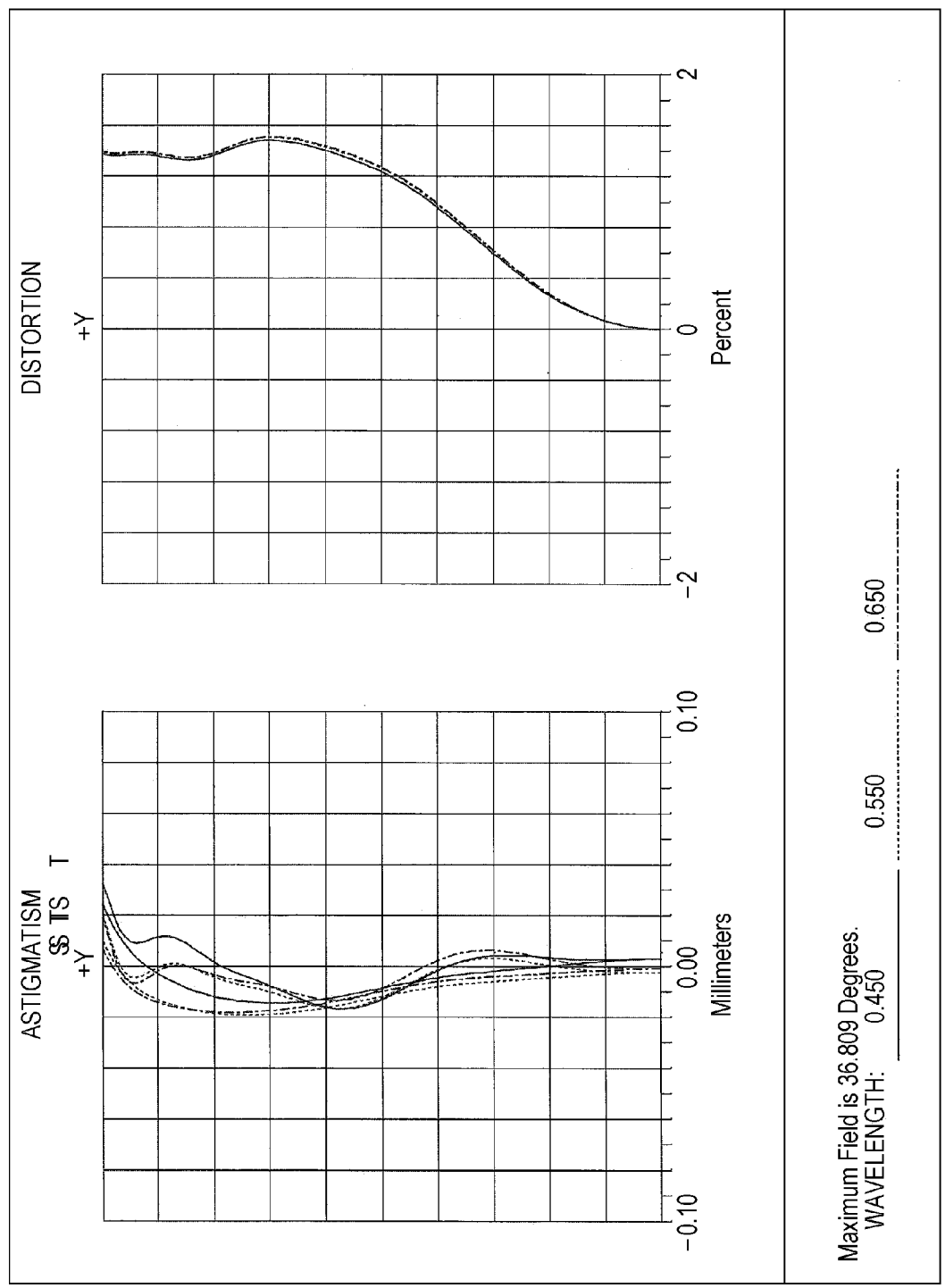
FIG. 51 is a graph illustrating the astigmatism and the distortion of the imaging lens illustrated in FIG. 49.

FIG. 51 is a graph illustrating the astigmatism and the distortion of the imaging lens 400V.

Figure 52:
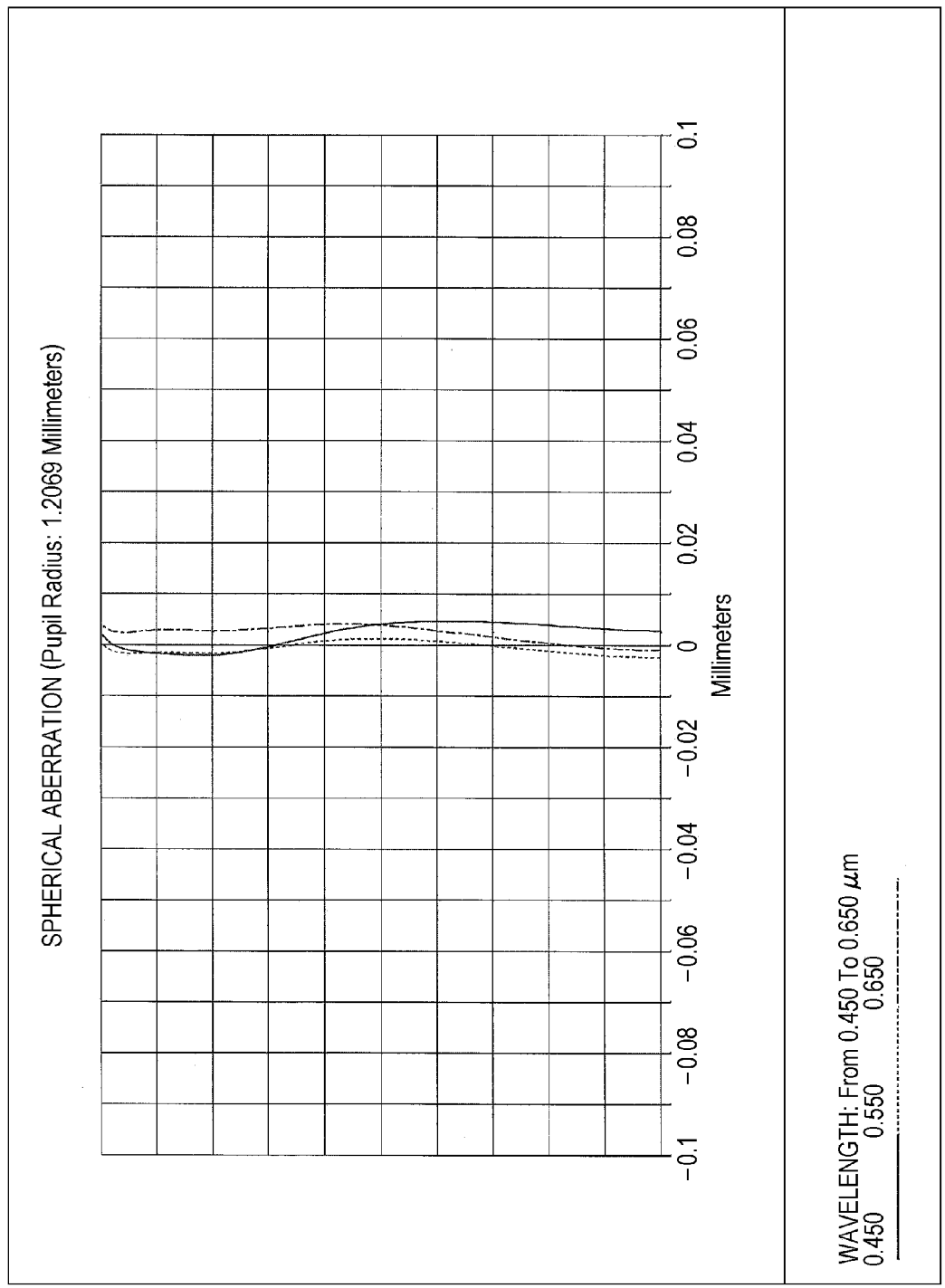
FIG. 52 is a graph illustrating the spherical aberration of the imaging lens illustrated in FIG. 49.

FIG. 52 is a graph illustrating the spherical aberration of the imaging lens 400V.

Figure 53:
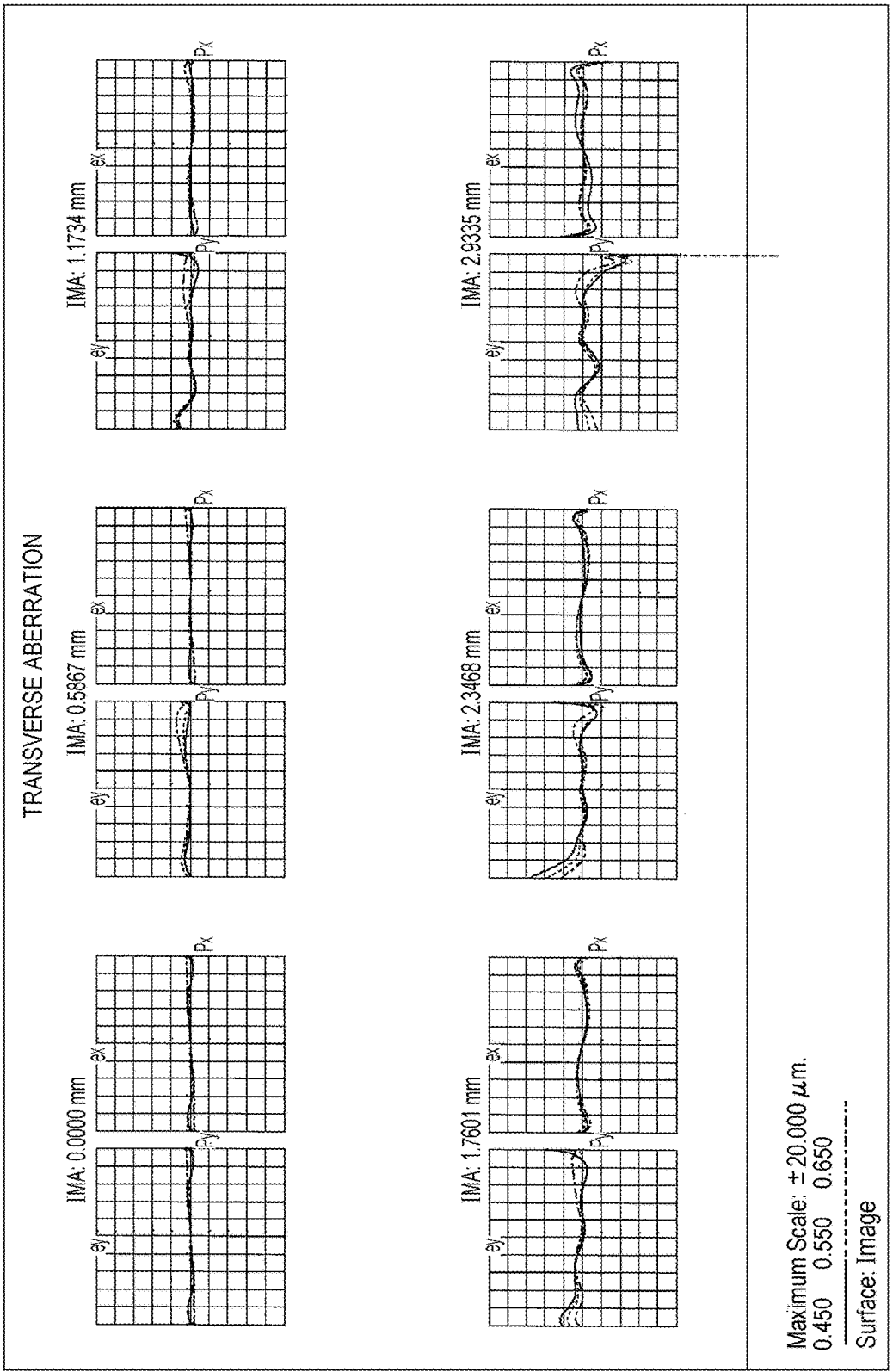
FIG. 53 is a graph illustrating the transverse aberration of the imaging lens illustrated in FIG. 49.

FIG. 53 is a graph illustrating the transverse aberration of the imaging lens 400V.

According to FIGS. 51 to 53, it can be considered that the aberration is satisfactorily corrected in the imaging lens 400V.

Figure 54:
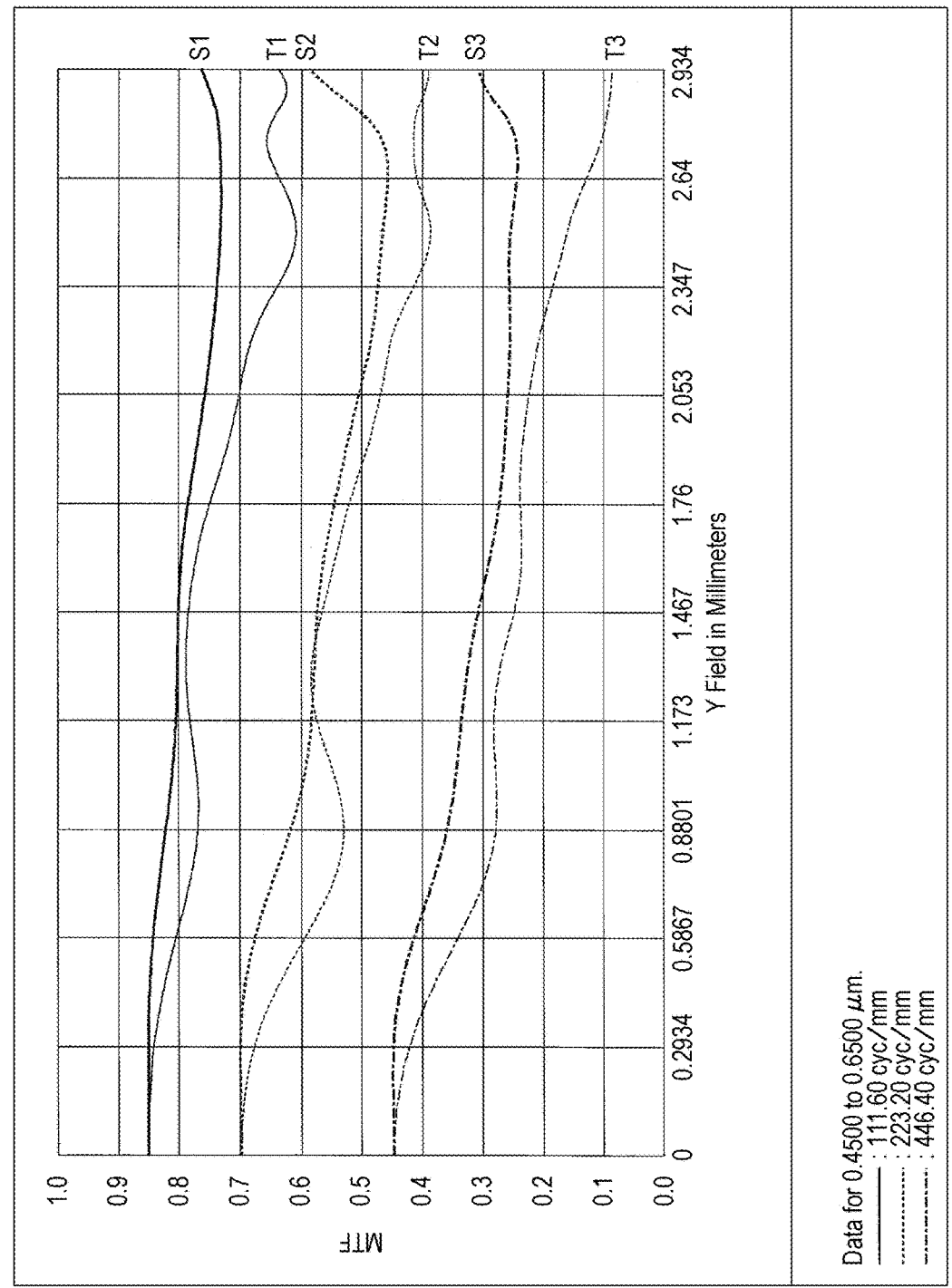
FIG. 54 is a graph illustrating the characteristics of the MTF with respect to the image height of the imaging lens illustrated in FIG. 49.

FIG. 54 is a graph illustrating the characteristics of the MTF with respect to the image height of the imaging lens 400V.

According to FIG. 54, if excluding the characteristic T3 near the maximum image height, 0.2 or more of the MTF can be secured. Therefore, it is considered that the resolving power of the imaging lens 400V is high.

[Embodiment 18]

Figure 55:
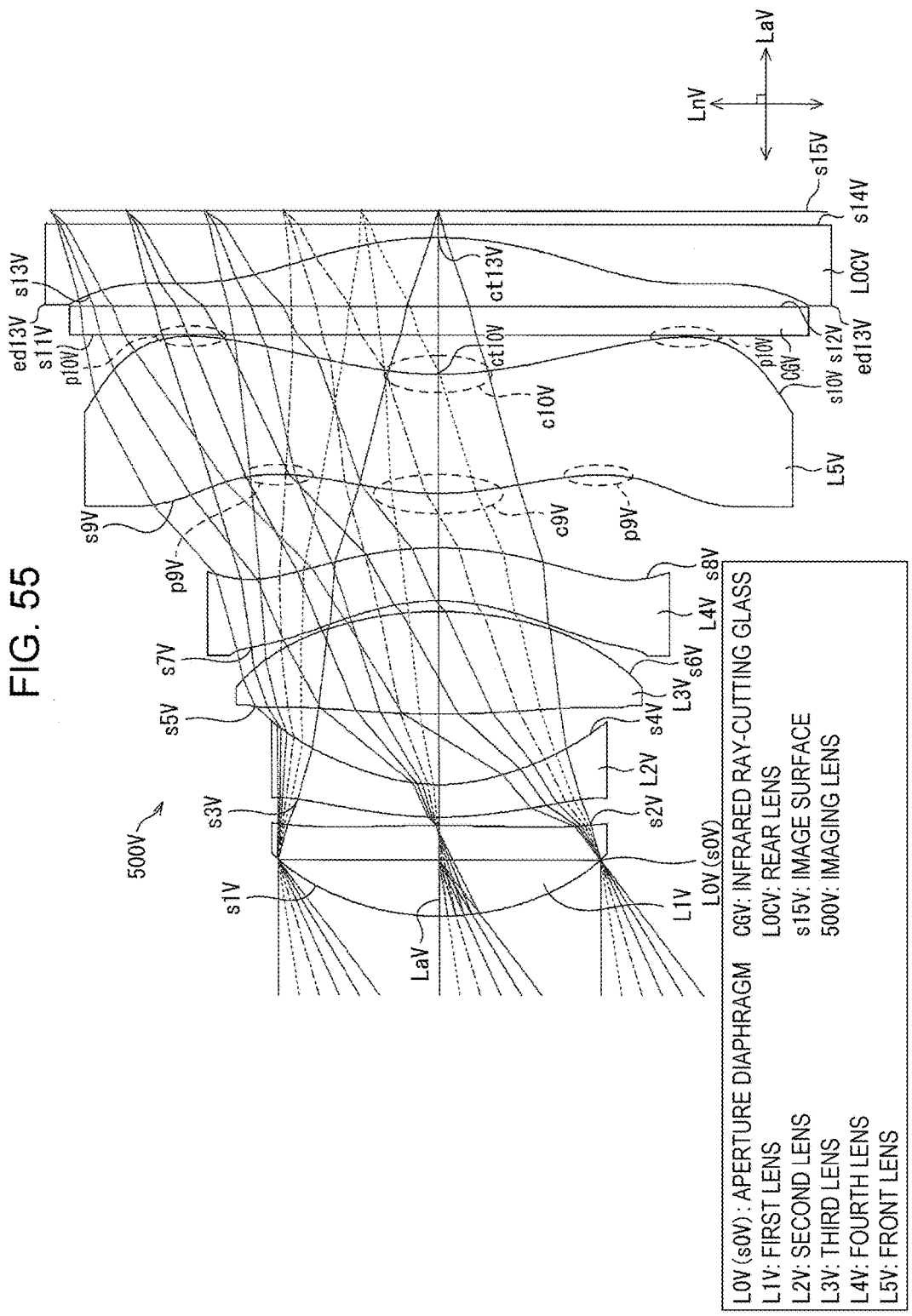
FIG. 55 is a cross-section view illustrating a configuration of an imaging lens according to Embodiment 18 of the present invention.

FIG. 55 is a cross-section view illustrating a configuration of the imaging lens according to Embodiment 18.

An imaging lens 500V illustrated in FIG. 55 has the same basic configuration as that of the imaging lens 100V, and is an example of further reducing the F number from 1.60 (details that the F number is small will be described).

FIG. 56 is a table illustrating the lens data of the imaging lens 500V.

Figure 57:
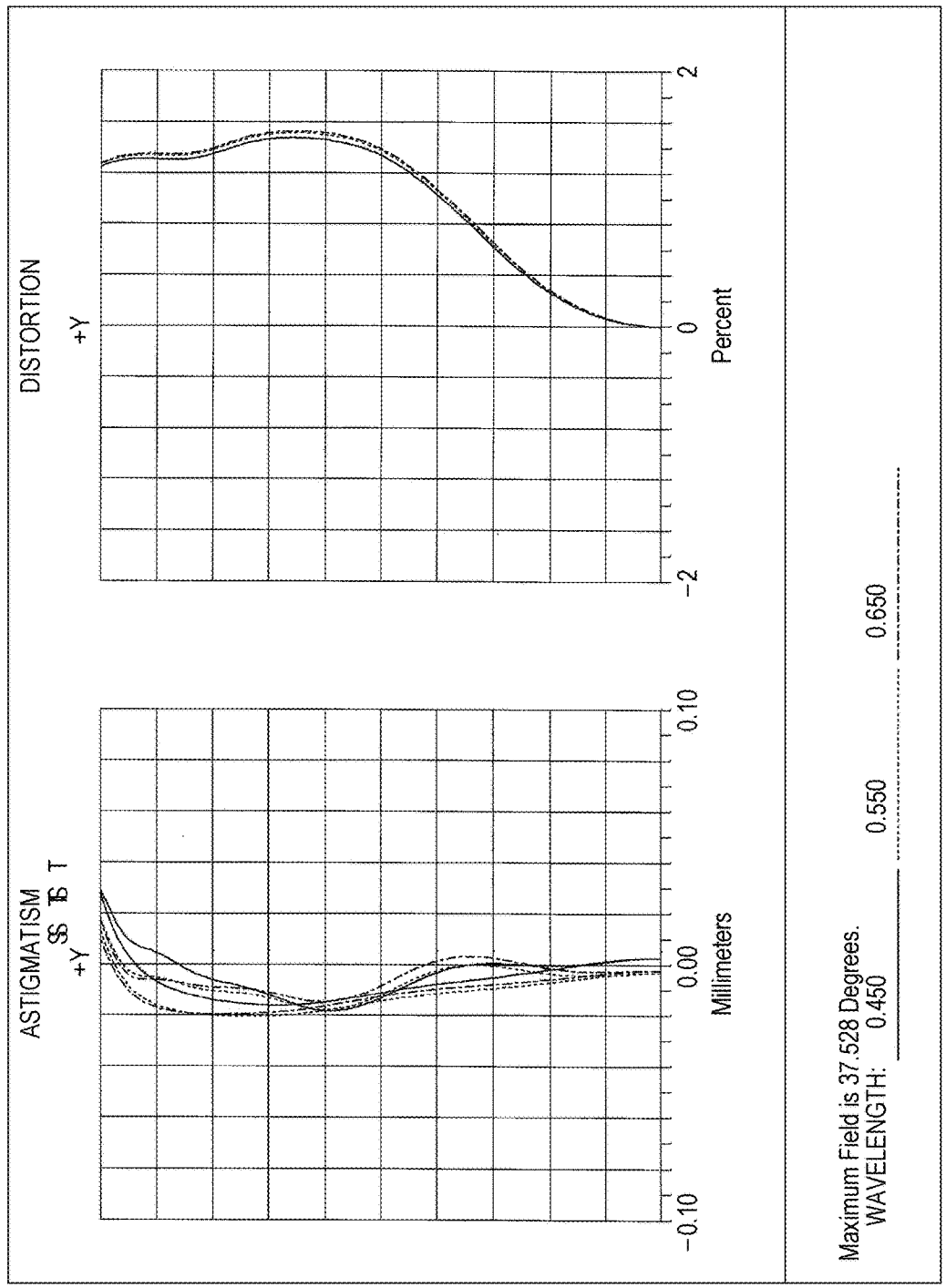
FIG. 57 is a graph illustrating the astigmatism and the distortion of the imaging lens illustrated in FIG. 55.

FIG. 57 is a graph illustrating the astigmatism and the distortion of the imaging lens 500V.

Figure 58:
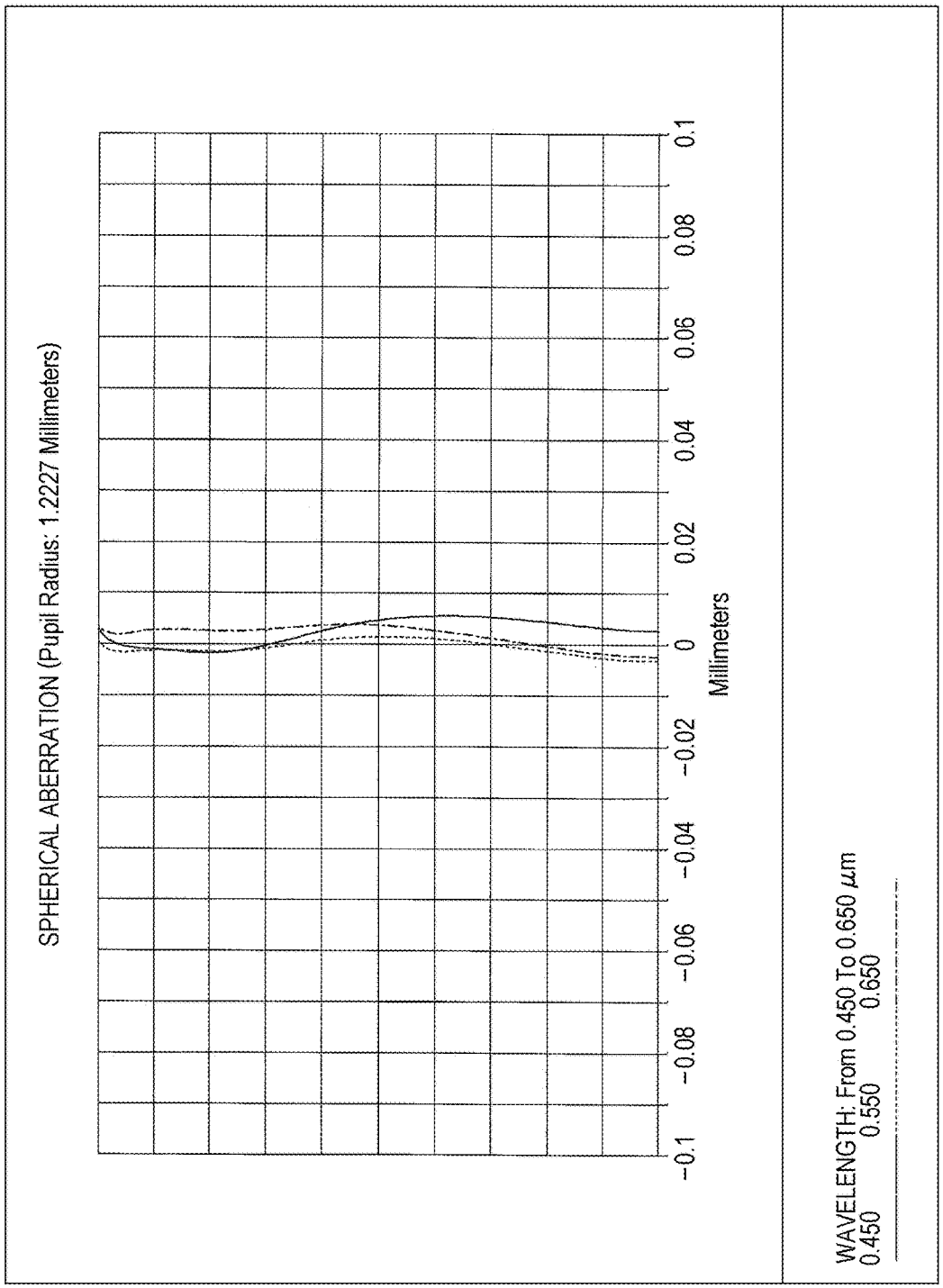
FIG. 58 is a graph illustrating the spherical aberration of the imaging lens illustrated in FIG. 55.

FIG. 58 is a graph illustrating the spherical aberration of the imaging lens 500V.

Figure 59:
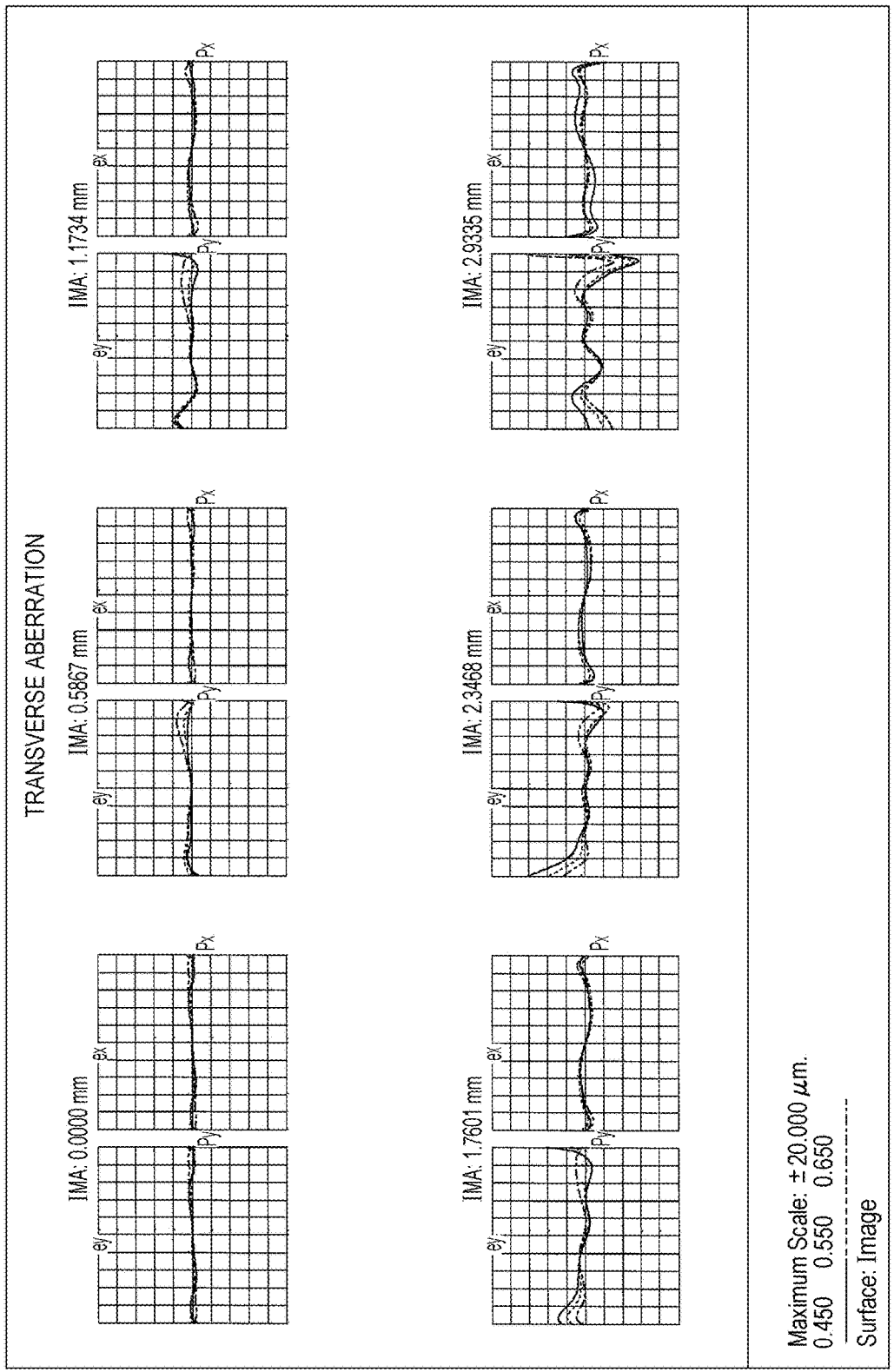
FIG. 59 is a graph illustrating the transverse aberration of the imaging lens illustrated in FIG. 55.

FIG. 59 is a graph illustrating the transverse aberration of the imaging lens 500V.

According to FIGS. 57 to 59, it can be considered that the aberration is satisfactorily corrected in the imaging lens 500V.

Figure 60:
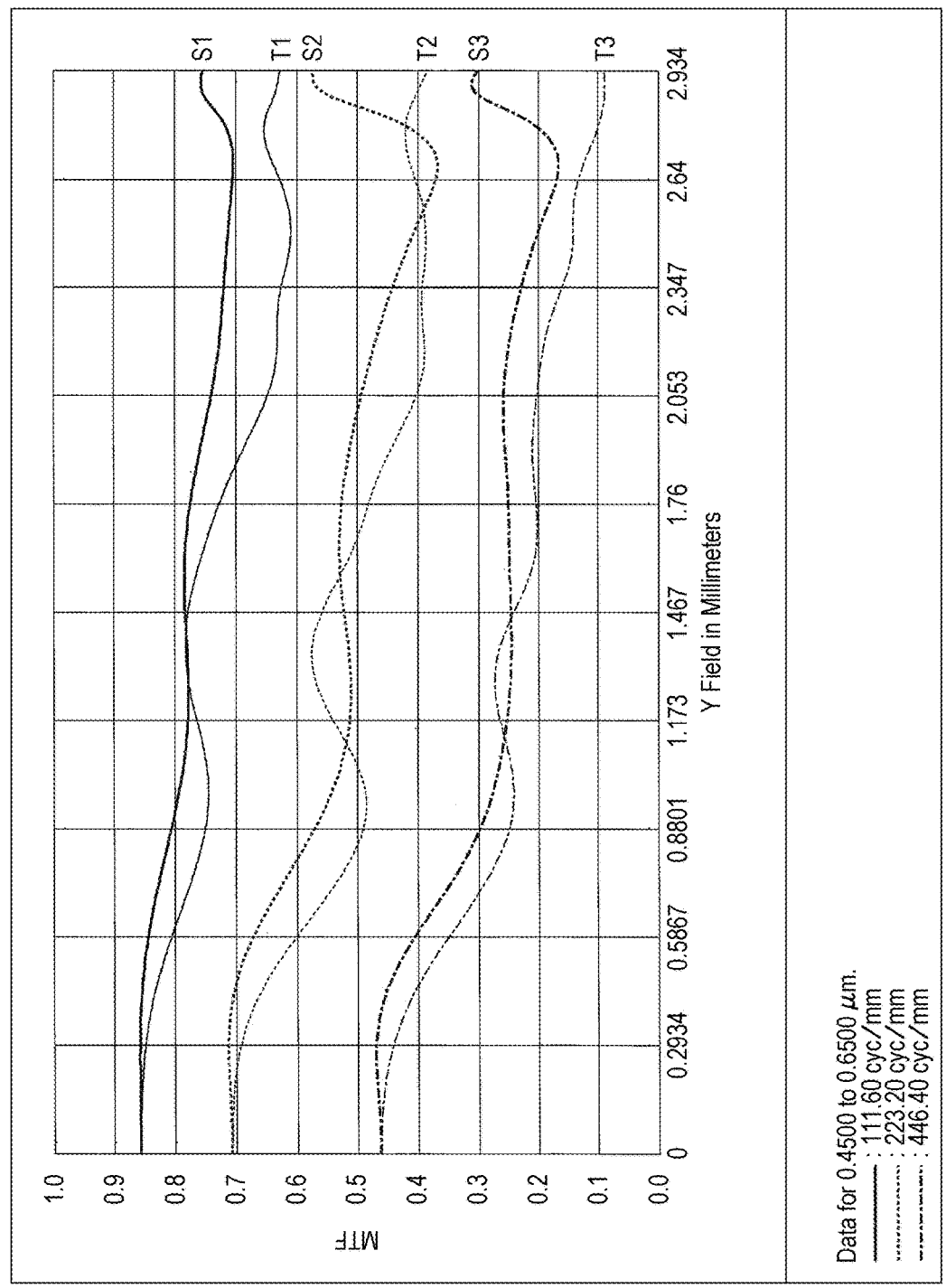
FIG. 60 is a graph illustrating the characteristics of the MTF with respect to the image height of the imaging lens illustrated in FIG. 55.

FIG. 60 is a graph illustrating the characteristics of the MTF with respect to the image height of the imaging lens 500V.

According to FIG. 60, if excluding the characteristic T3 near the maximum image height of the characteristic S3, 0.2 or more of the MTF can be secured. Therefore, it is considered that the resolving power of the imaging lens 500V is high.

[Embodiment 19]

Figure 61:
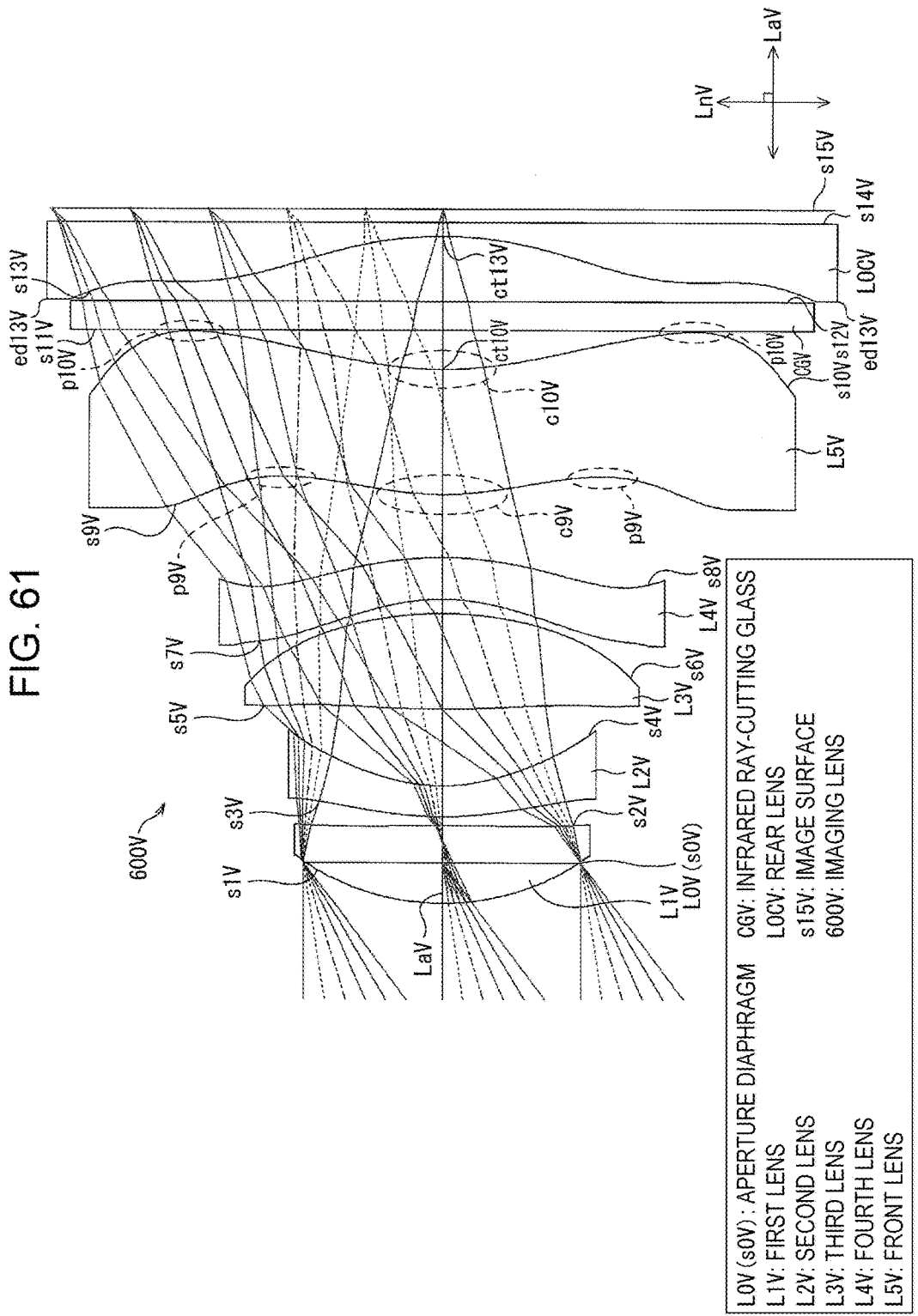
FIG. 61 is a cross-section view illustrating a configuration of an imaging lens according to Embodiment 19 of the present invention.

FIG. 61 is a cross-section view illustrating a configuration of the imaging lens according to Embodiment 19.

An imaging lens 600V illustrated in FIG. 61 is an example of the well-known imaging lens. In the imaging lens 600V, the number of the lenses is six and the F number is about 1.80. For the clarity of explanation, each member of the imaging lens 600V is denoted by the same reference numeral as that of each member of the imaging lens 100V.

FIG. 62 is a table illustrating the lens data of the imaging lens 600V.

Figure 63:
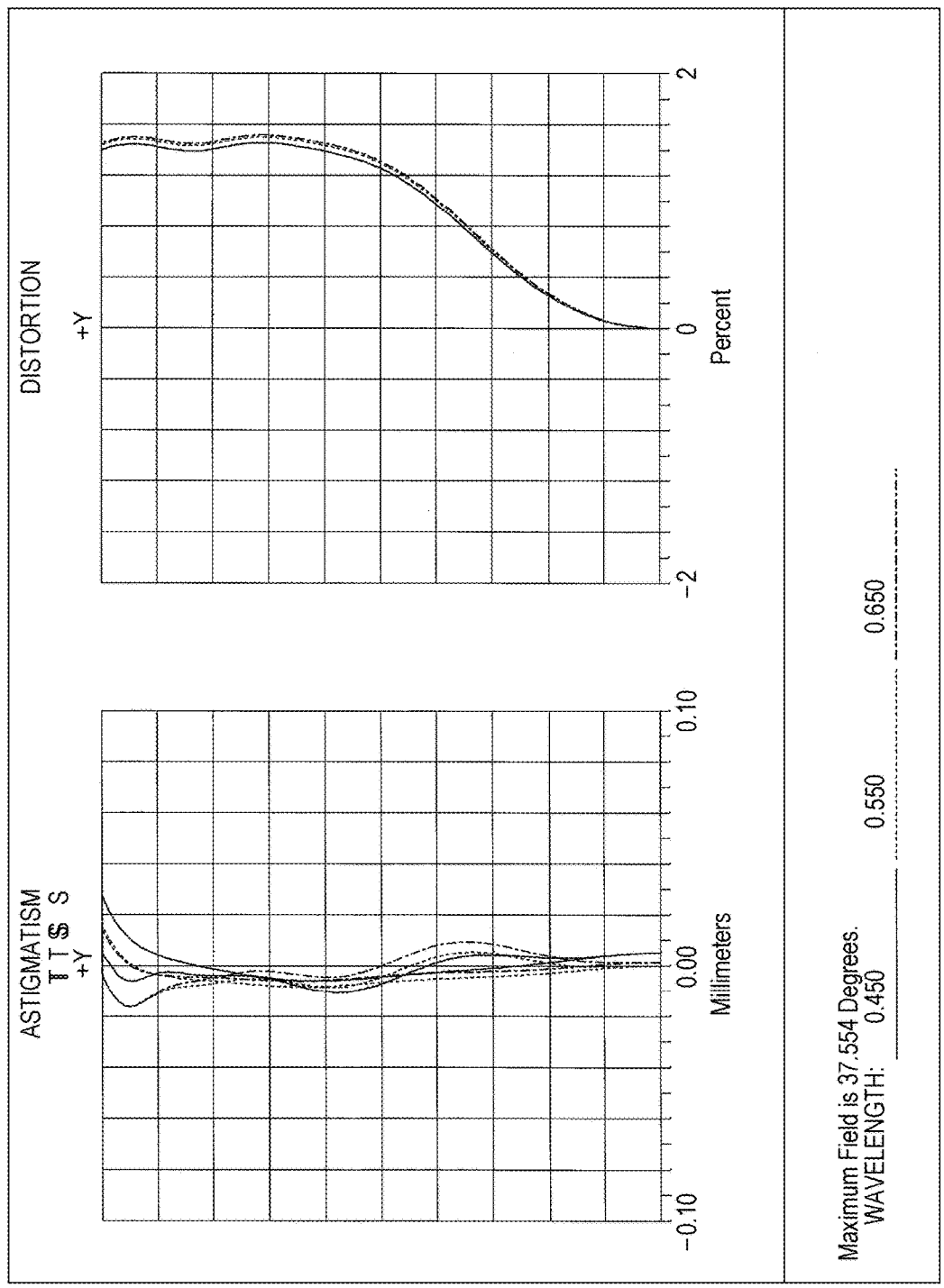
FIG. 63 is a graph illustrating the astigmatism and the distortion of the imaging lens illustrated in FIG. 61.

FIG. 63 is a graph illustrating the astigmatism and the distortion of the imaging lens 600V.

Figure 64:
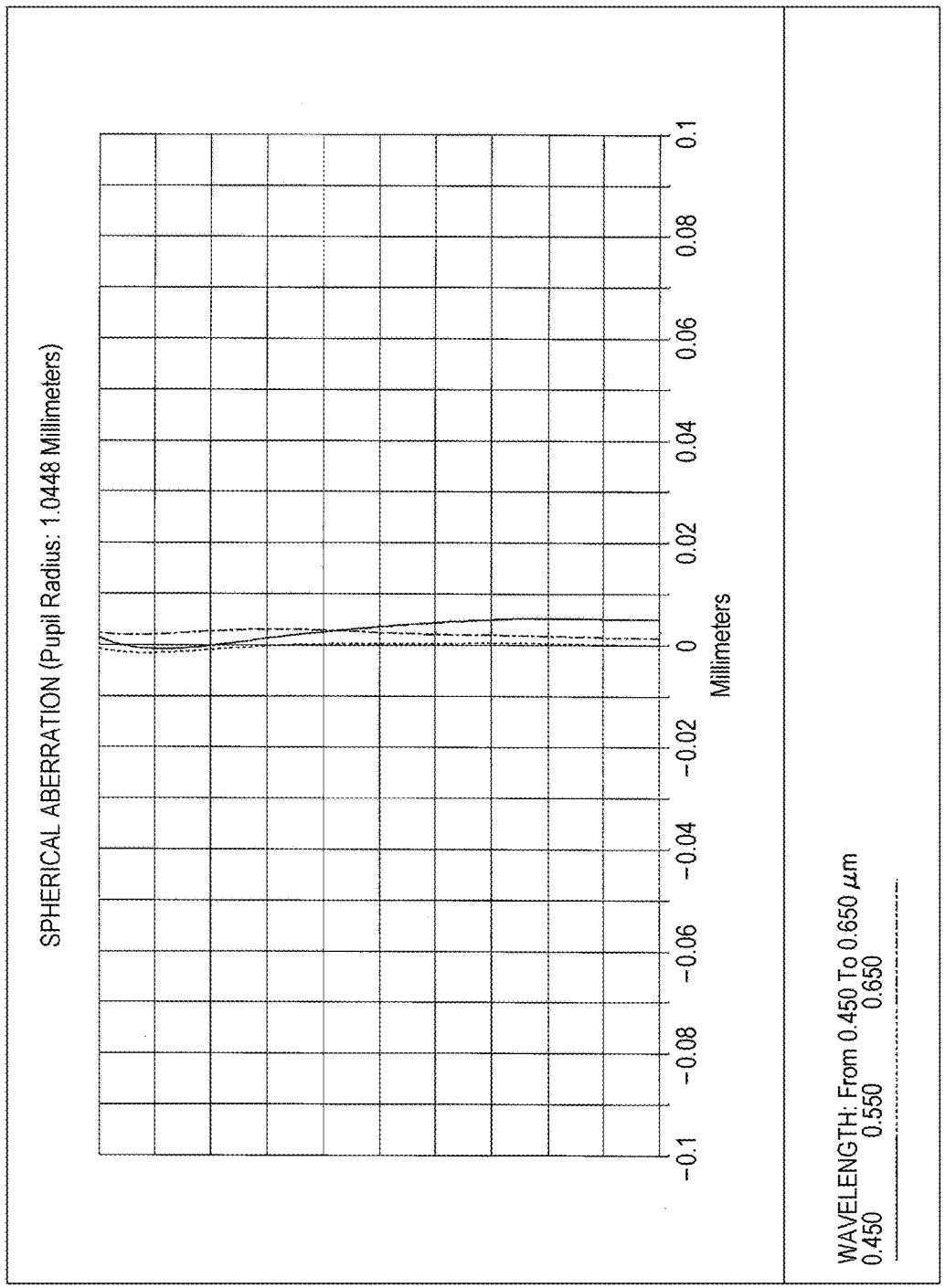
FIG. 64 is a graph illustrating the spherical aberration of the imaging lens illustrated in FIG. 61.

FIG. 64 is a graph illustrating the spherical aberration of the imaging lens 600V.

Figure 65:
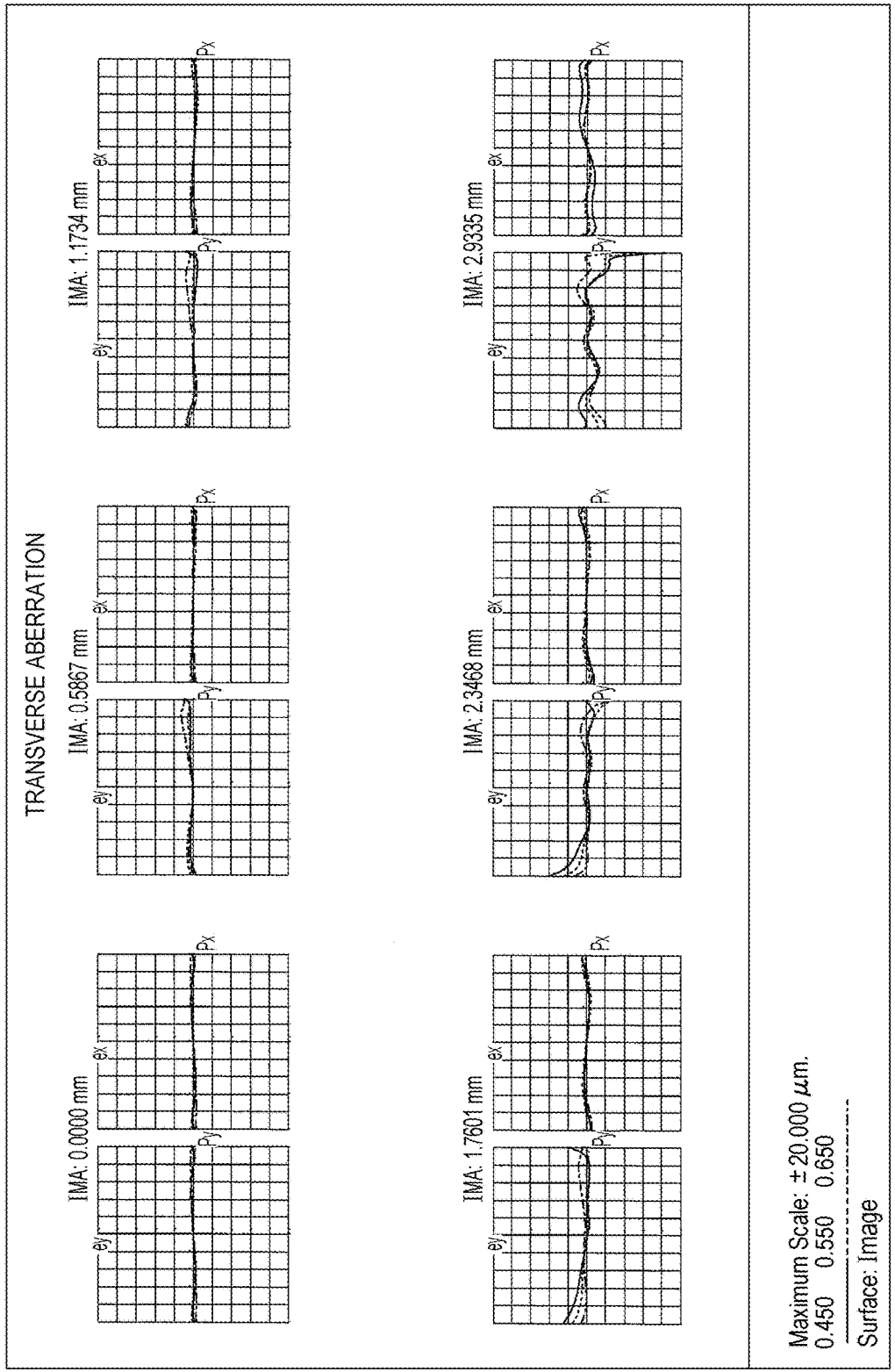
FIG. 65 is a graph illustrating the transverse aberration of the imaging lens illustrated in FIG. 61.

FIG. 65 is a graph illustrating the transverse aberration of the imaging lens 600V.

According to FIGS. 63 to 65, it can be considered that the aberration is satisfactorily corrected in the imaging lens 600V.

Figure 66:
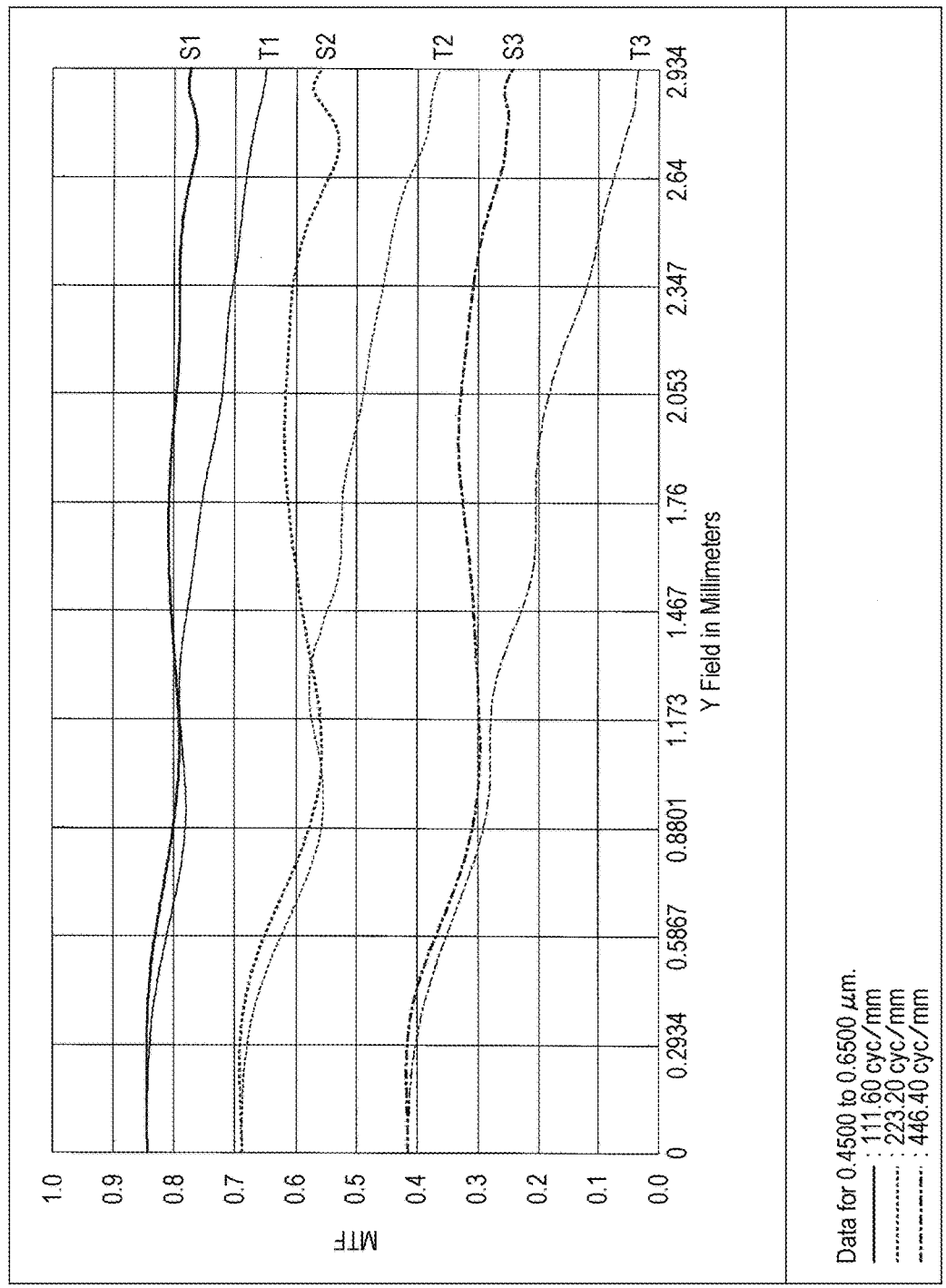
FIG. 66 is a graph illustrating the characteristics of the MTF with respect to the image height of the imaging lens illustrated in FIG. 61.

FIG. 66 is a graph illustrating the characteristics of the MTF with respect to the image height of the imaging lens 600V.

According to FIG. 66, if excluding the characteristic T3 near the maximum image height, 0.2 or more of the MTF can be secured. Therefore, it is considered that the resolving power of the imaging lens 600V is high.

[Embodiment 20]

FIG. 69 is a cross-section view illustrating a configuration of the imaging lens according to Embodiment 20.

An imaging lens 700V illustrated in FIG. 69 has a low height and a small F number and is an example in which the infrared ray-cutting glass CGV is omitted from the imaging lens which has the same basic configuration as that of the imaging lens 100V.

FIG. 70 is a table illustrating the lens data of the imaging lens 700V.

Figure 71:
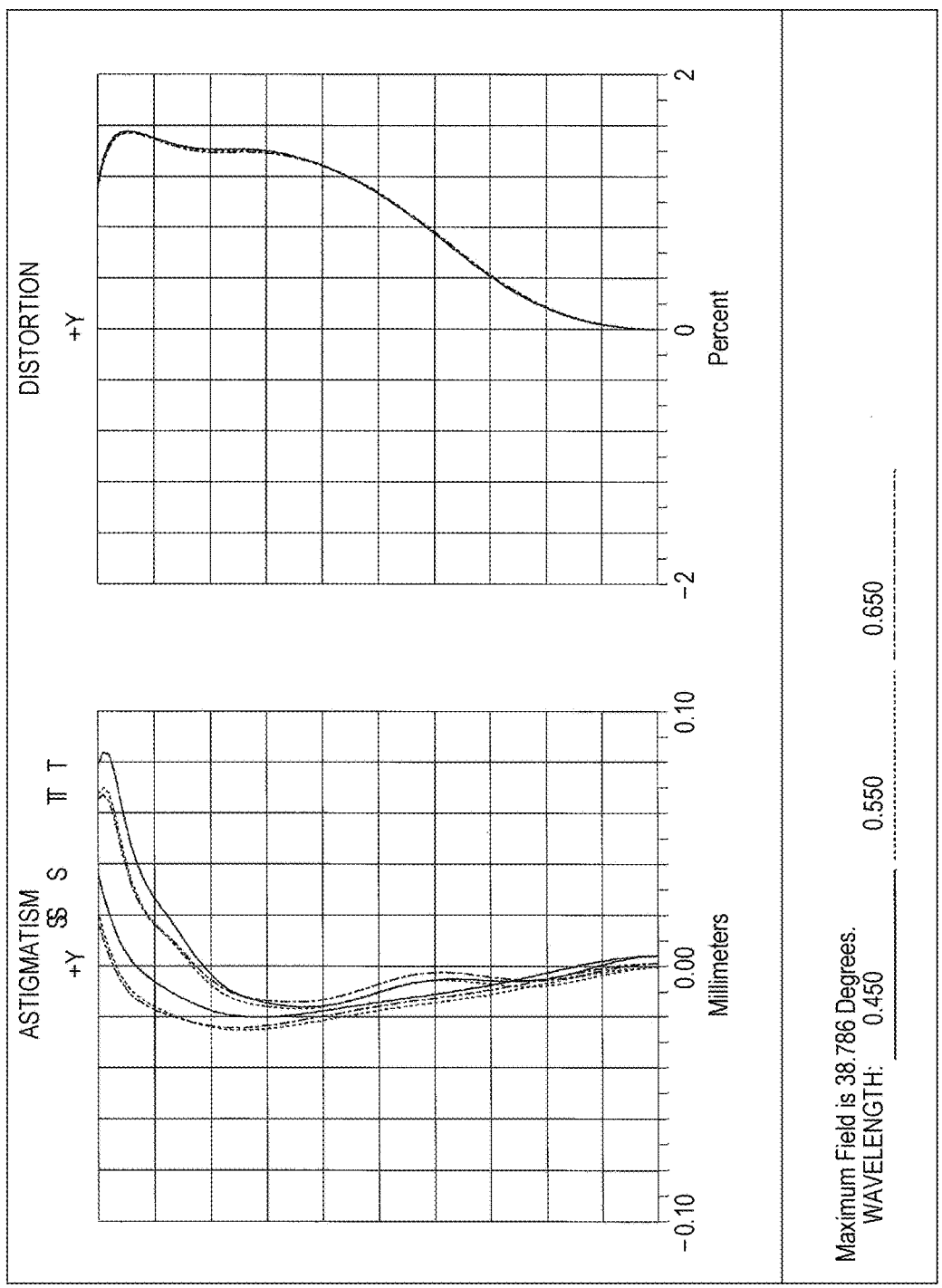
FIG. 71 is a graph illustrating the astigmatism and the distortion of the imaging lens illustrated in FIG. 69.

FIG. 71 is a graph illustrating the astigmatism and the distortion of the imaging lens 700V.

Figure 72:
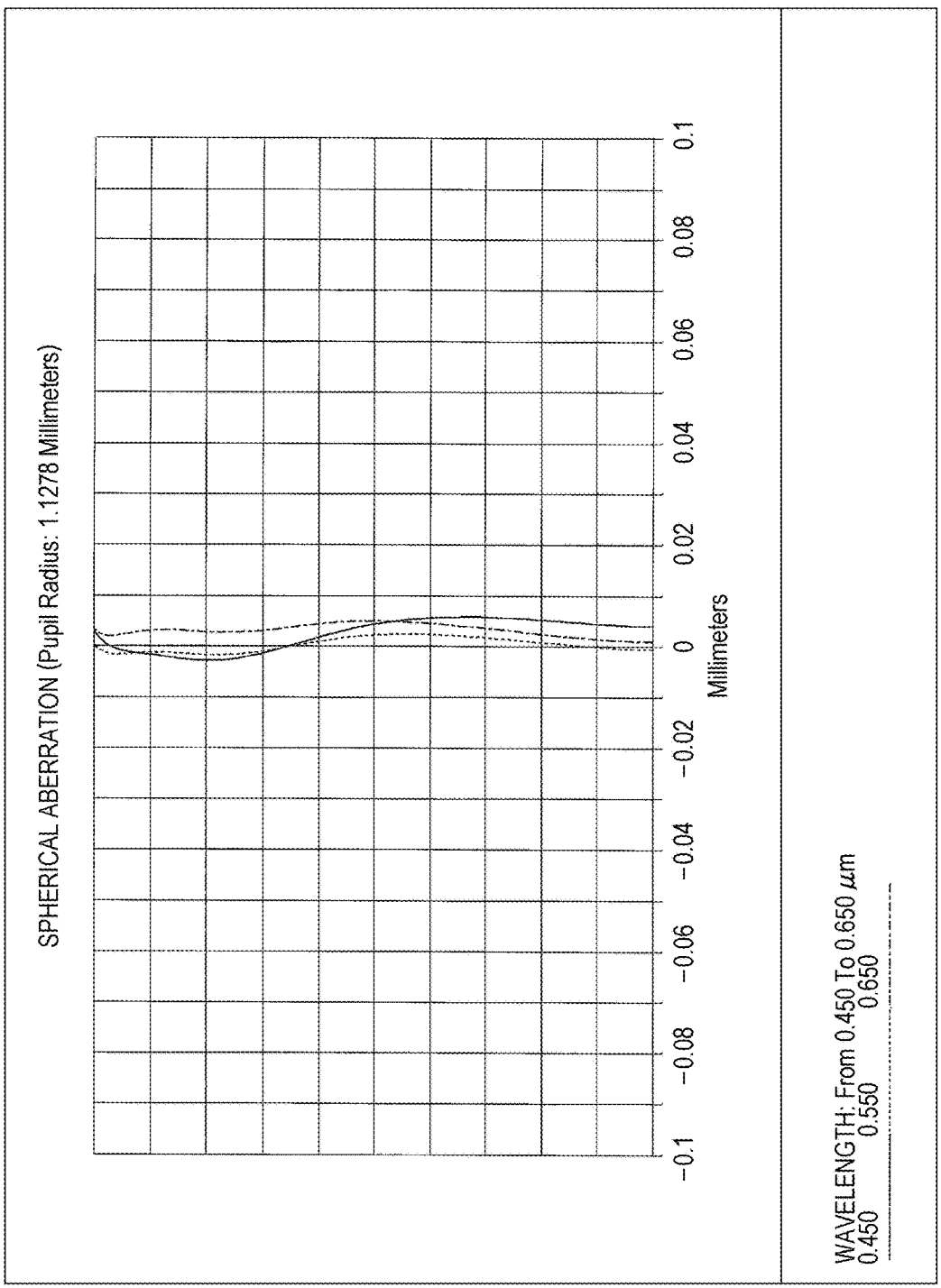
FIG. 72 is a graph illustrating the spherical aberration of the imaging lens illustrated in FIG. 69.

FIG. 72 is a graph illustrating the spherical aberration of the imaging lens 700V.

Figure 73:
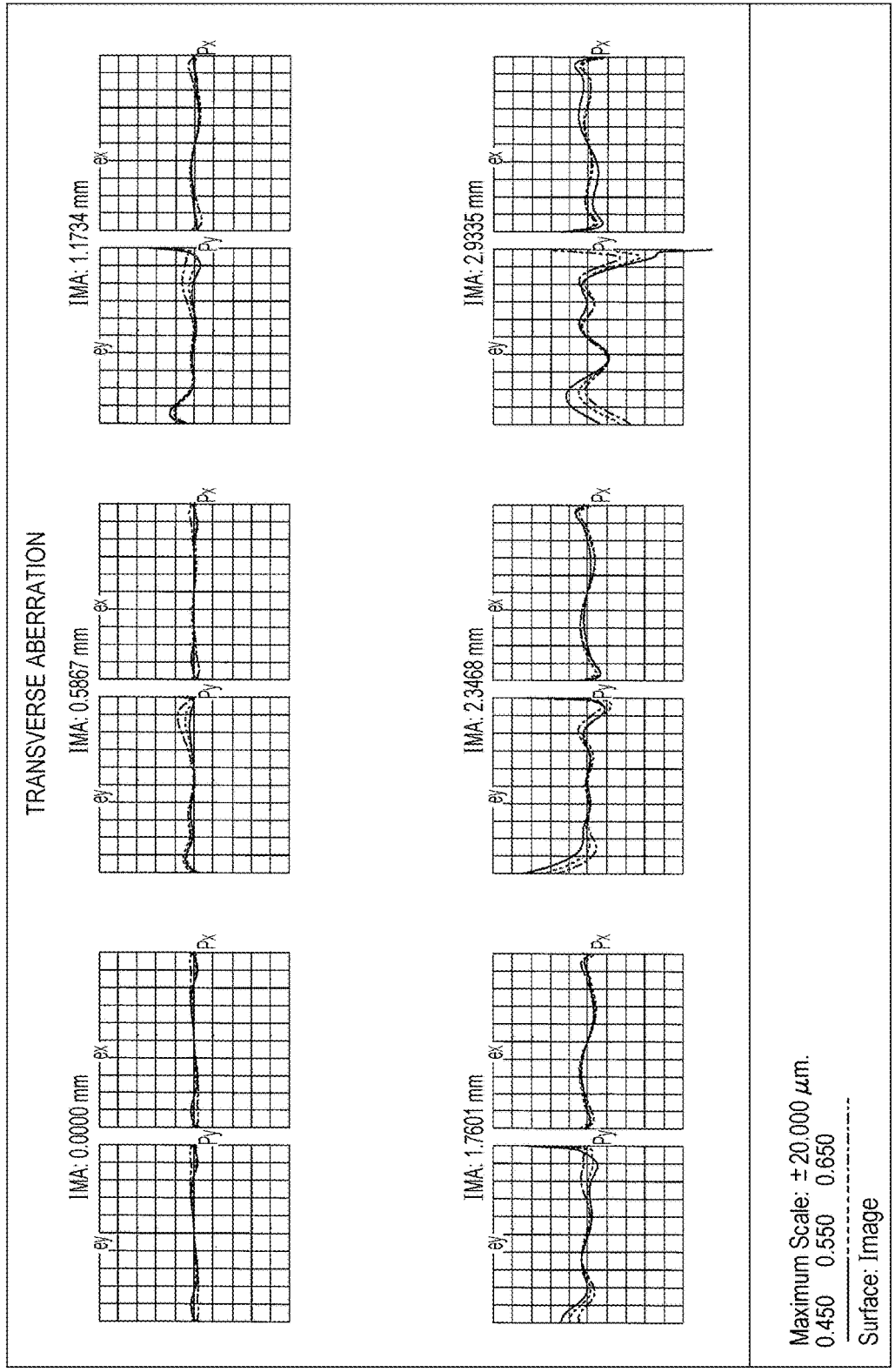
FIG. 73 is a graph illustrating the transverse aberration of the imaging lens illustrated in FIG. 69.

FIG. 73 is a graph illustrating the transverse aberration of the imaging lens 700V.

According to FIGS. 71 to 73, it can be considered that aberration is satisfactorily corrected in the imaging lens 700V.

Figure 74:
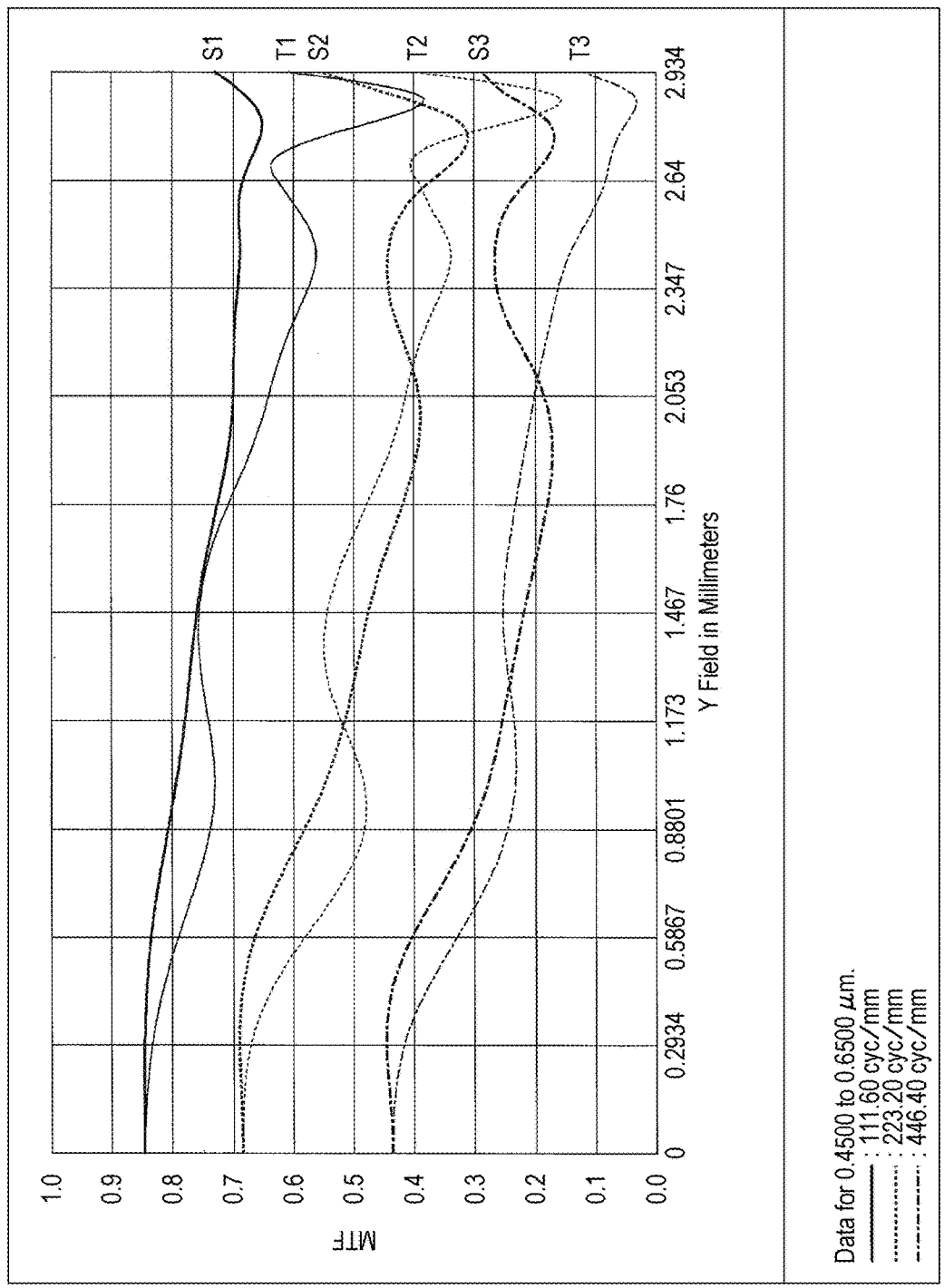
FIG. 74 is a graph illustrating the characteristics of the MTF with respect to the image height of the imaging lens illustrated in FIG. 69.

FIG. 74 is a graph illustrating the characteristics of the MTF with respect to the image height of the imaging lens 700V.

According to FIG. 74, if excluding the characteristic T3 near the maximum image height of a part of the characteristics S3 and T2, 0.2 or more of the MTF can be secured. Therefore, it is considered that the resolving power of the imaging lens 700V is high.

[Embodiment 21]

Figure 75:
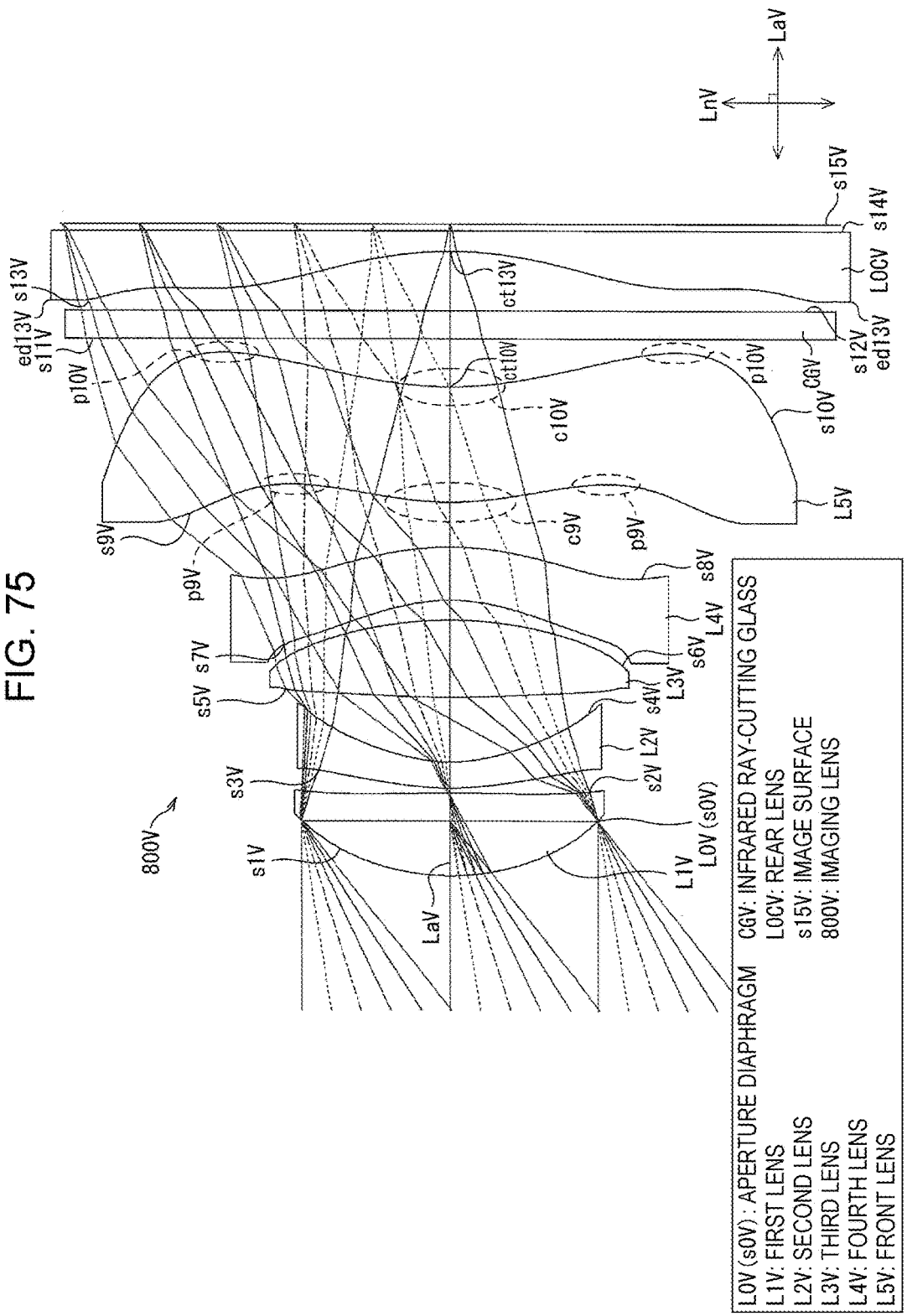
FIG. 75 is a cross-section view illustrating a configuration of an imaging lens according to Embodiment 21 of the present invention.

FIG. 75 is a cross-section view illustrating a configuration of the imaging lens according to Embodiment 21.

An imaging lens 800V illustrated in FIG. 75 has a low height and a small F number and is an example in which the basic configuration is the same as that of the imaging lens 100V.

FIG. 76 is a table illustrating the lens data of the imaging lens 800V.

Figure 77:
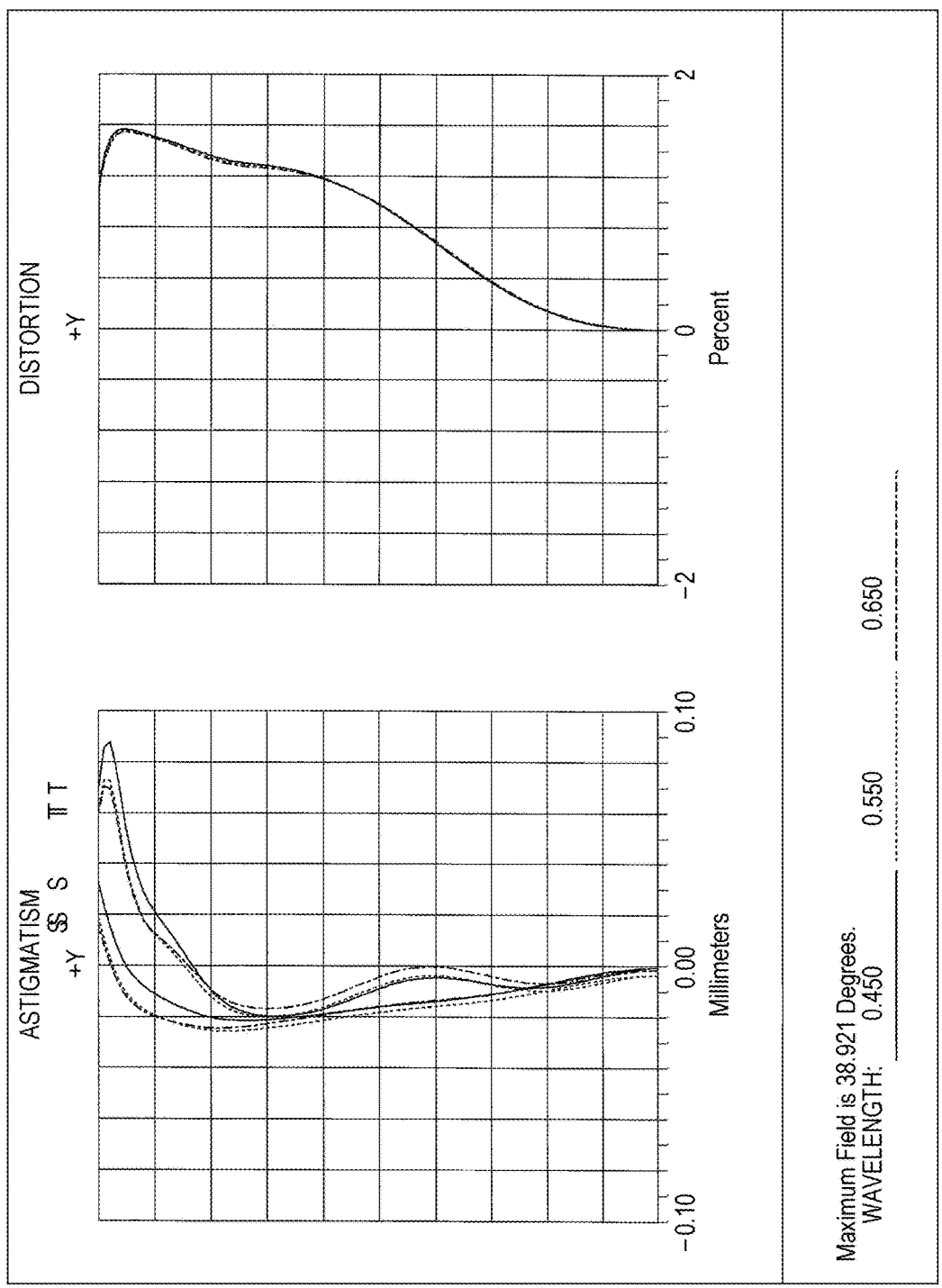
FIG. 77 is a graph illustrating the astigmatism and the distortion of the imaging lens illustrated in FIG. 75.

FIG. 77 is a graph illustrating the astigmatism and the distortion of the imaging lens 800V.

Figure 78:
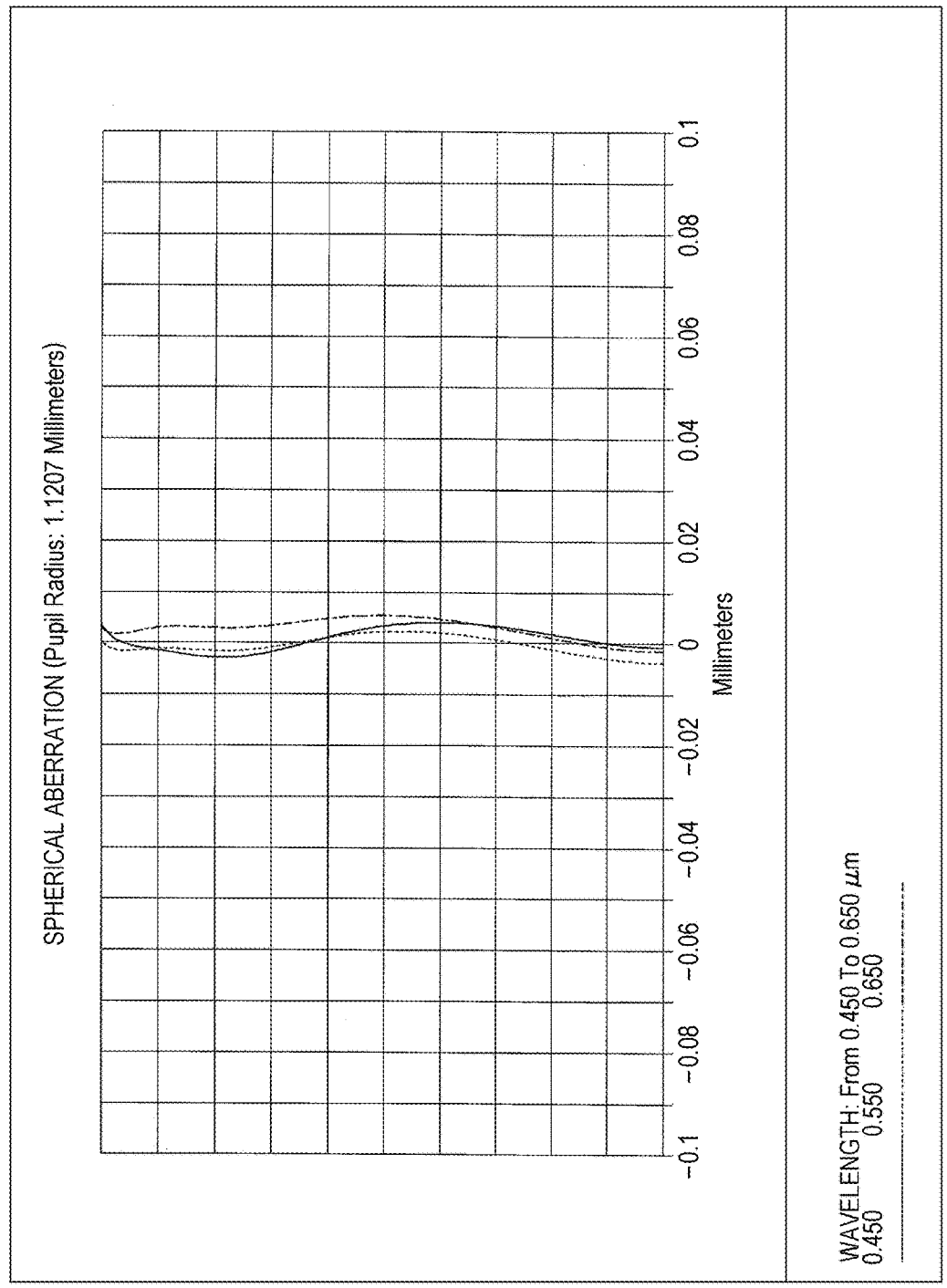
FIG. 78 is a graph illustrating the spherical aberration of the imaging lens illustrated in FIG. 75.

FIG. 78 is a graph illustrating the spherical aberration of the imaging lens 800V.

Figure 79:
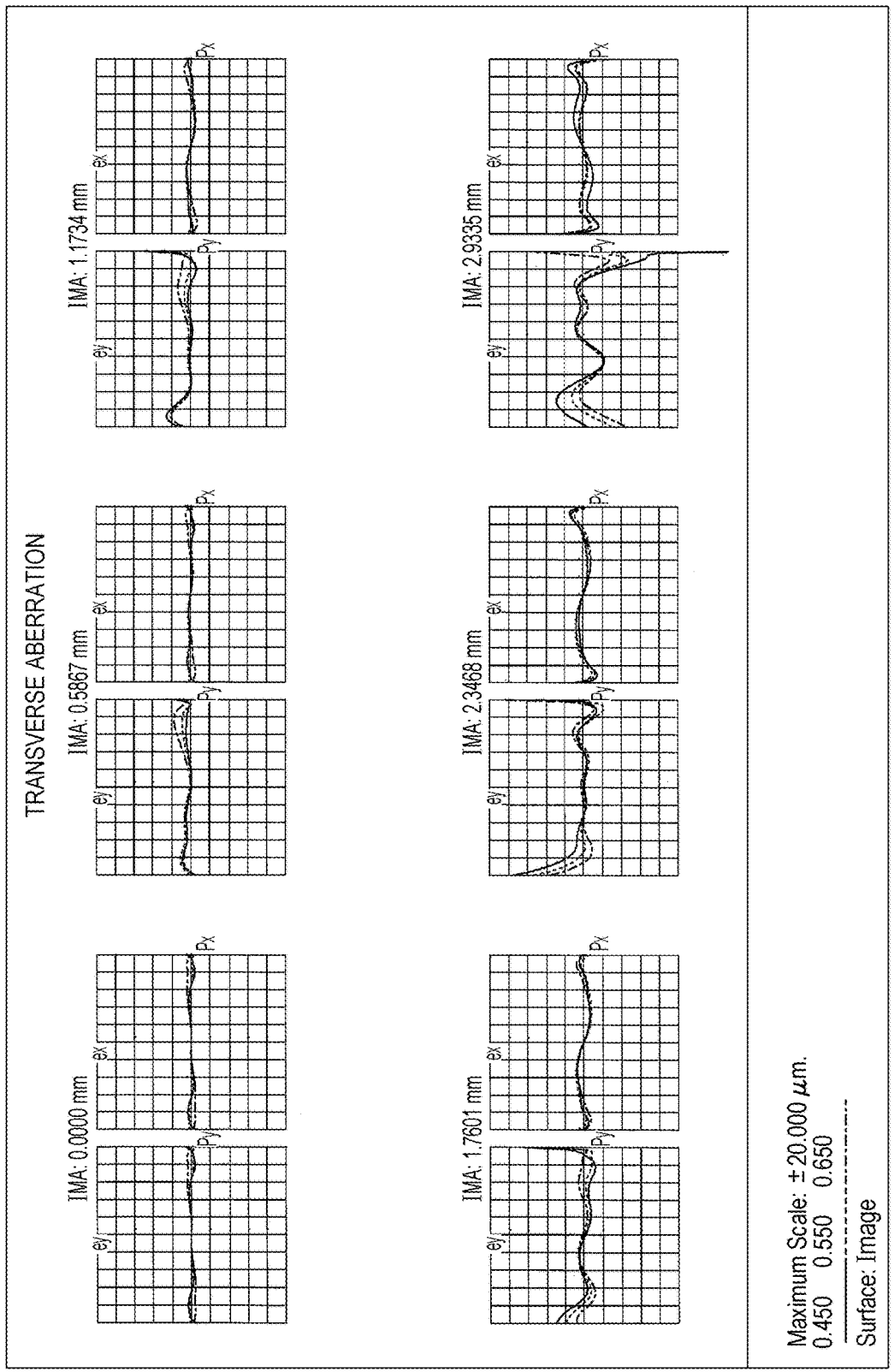
FIG. 79 is a graph illustrating the transverse aberration of the imaging lens illustrated in FIG. 75.

FIG. 79 is a graph illustrating the transverse aberration of the imaging lens 800V.

According to FIGS. 77 to 79, it can be considered that the aberration is satisfactorily corrected in the imaging lens 800V.

Figure 80:
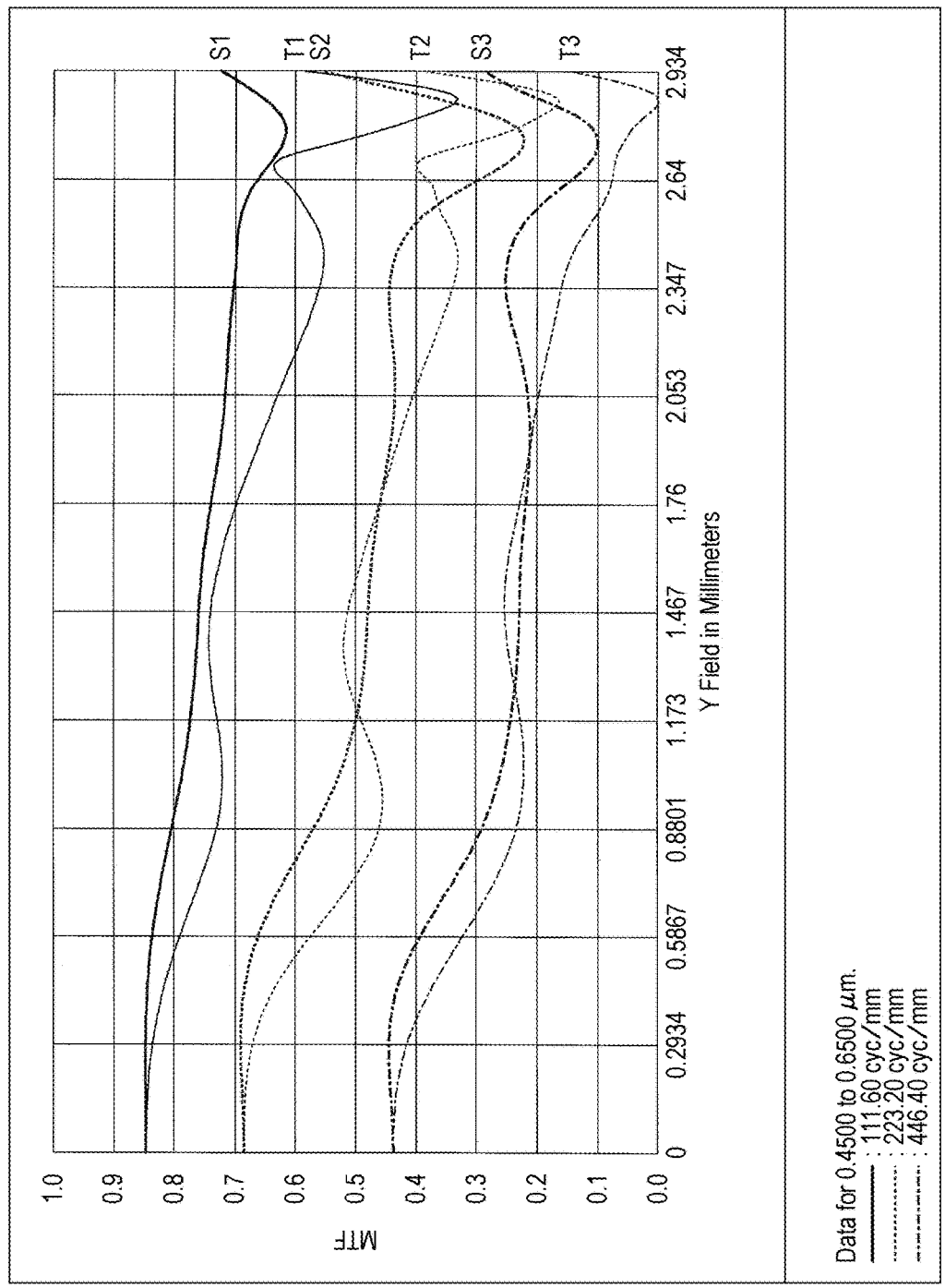
FIG. 80 is a graph illustrating the characteristics of the MTF with respect to the image height of the imaging lens illustrated in FIG. 75.

FIG. 80 is a graph illustrating the characteristics of the MTF with respect to the image height of the imaging lens 800V.

According to FIG. 80, if excluding the characteristics T3, S3, and T2 near the maximum image height, 0.2 or more of the MTF can be secured. Therefore, it is considered that the resolving power of the imaging lens 800V is high.

[Embodiment 22]

Figure 81:
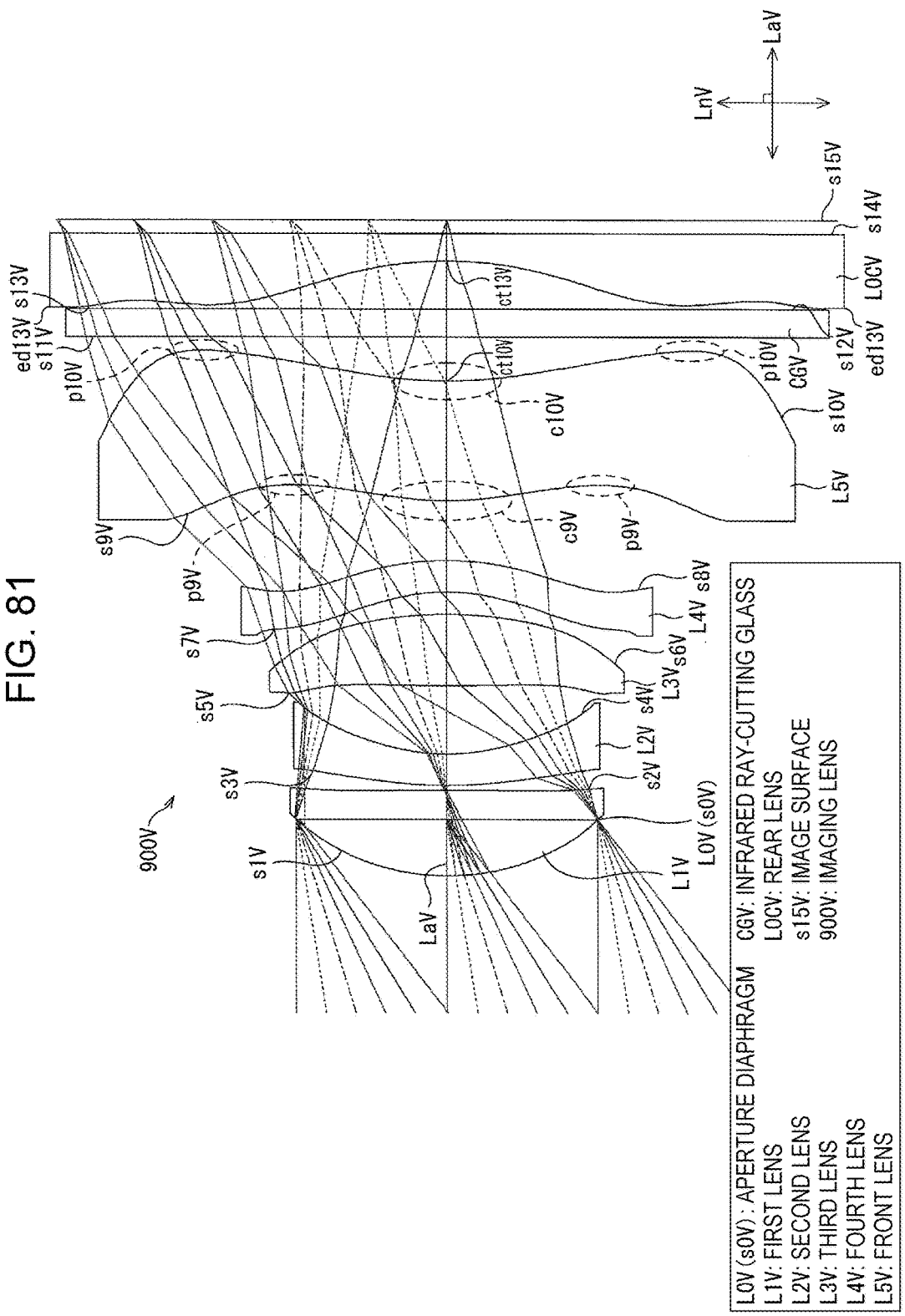
FIG. 81 is a cross-section view illustrating a configuration of an imaging lens according to Embodiment 22 of the present invention.

FIG. 81 is a cross-section view illustrating a configuration of the imaging lens according to Embodiment 22.

An imaging lens 900V illustrated in FIG. 81 has a low height and a small F number and is an example in which the basic configuration is the same as that of the imaging lens 100V. In addition, in the imaging lens 900V, the high dispersion material is applied to the second lens L2V and the fourth lens L4V, and the distance between the surface s14V and the image surface s15V is greater than the imaging lens 800V.

FIG. 82 is a table illustrating lens data of the imaging lens 900V.

Figure 83:
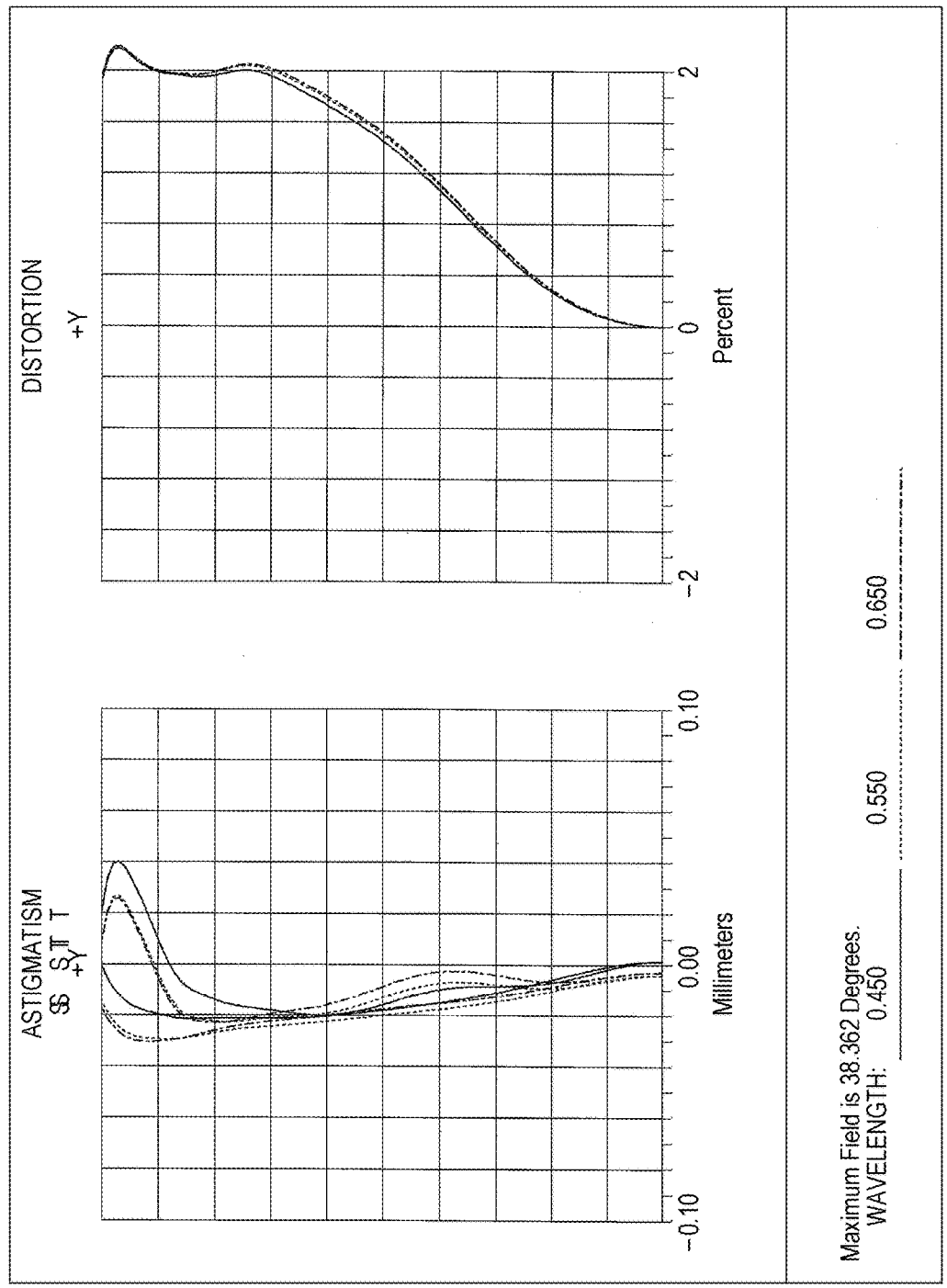
FIG. 83 is a graph illustrating the astigmatism and the distortion of the imaging lens illustrated in FIG. 81.

FIG. 83 is a graph illustrating the astigmatism and the distortion of the imaging lens 900V.

Figure 84:
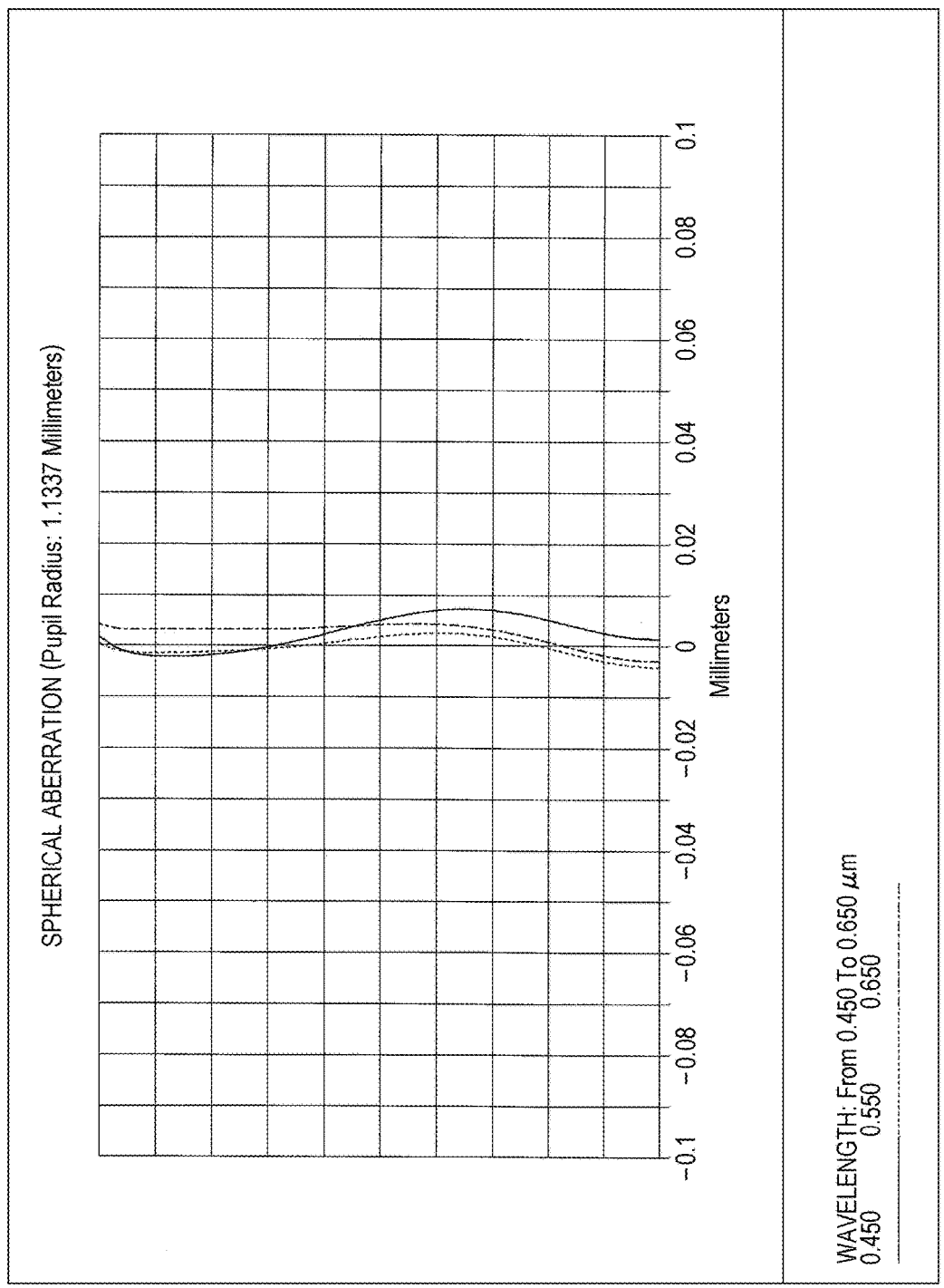
FIG. 84 is a graph illustrating the spherical aberration of the imaging lens illustrated in FIG. 81.

FIG. 84 is a graph illustrating the spherical aberration of the imaging lens 900V.

Figure 85:
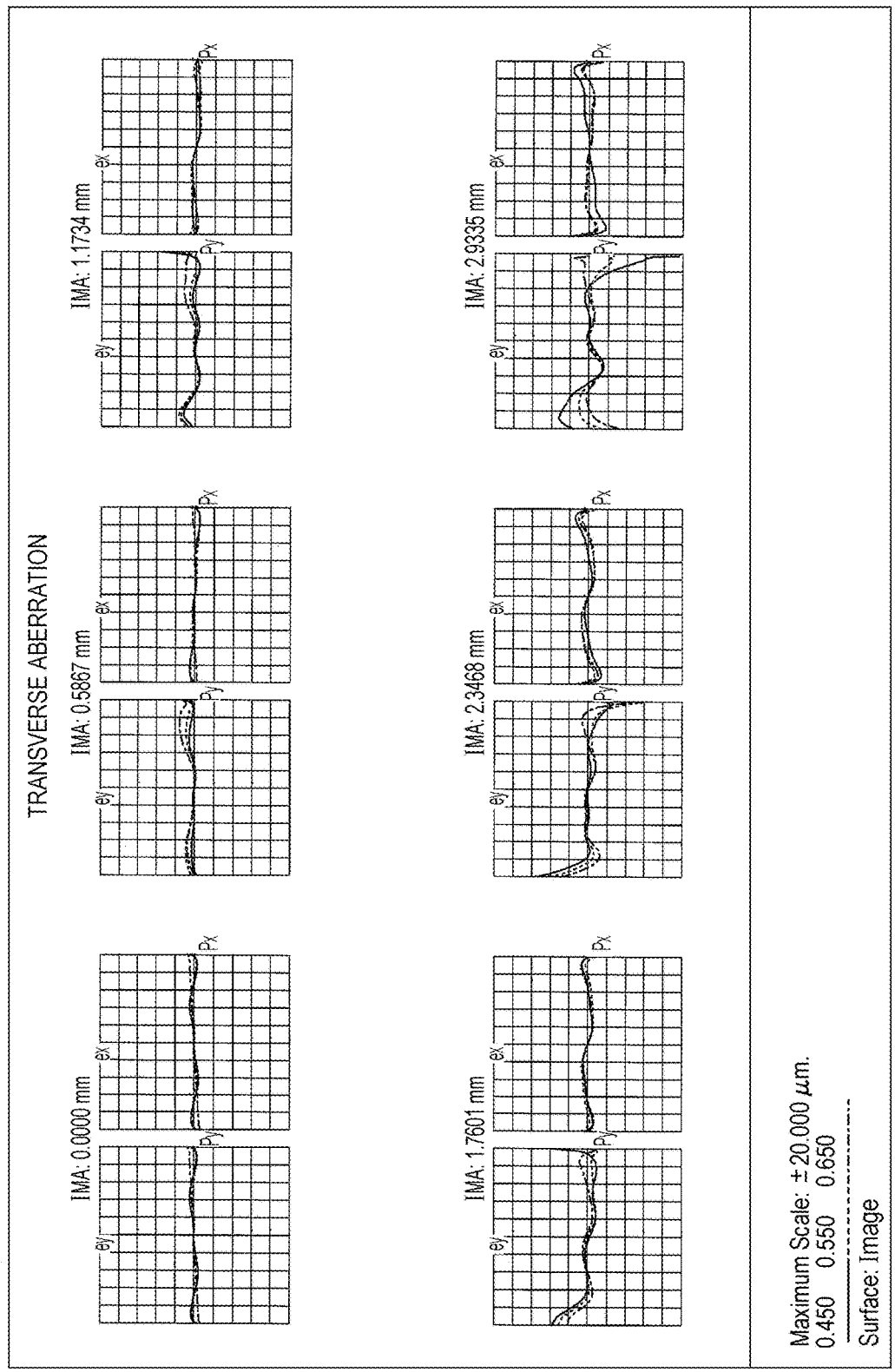
FIG. 85 is a graph illustrating the transverse aberration of the imaging lens illustrated in FIG. 81.

FIG. 85 is a graph illustrating the transverse aberration of the imaging lens 900V According to FIGS. 83 to 85, it can be considered that the aberration is satisfactorily corrected in the imaging lens 900V.

Figure 86:
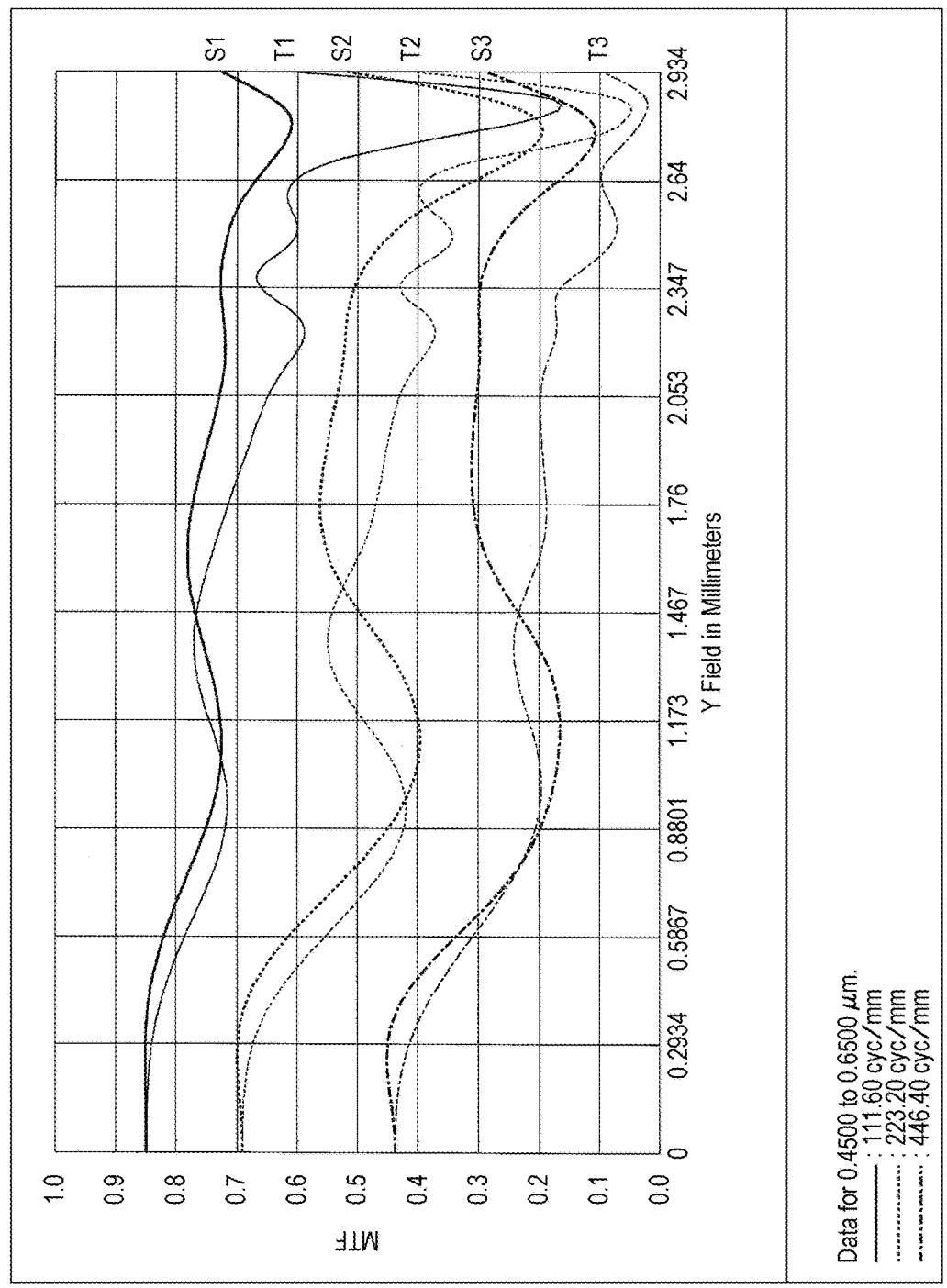
FIG. 86 is a graph illustrating the characteristics of the MTF with respect to the image height of the imaging lens illustrated in FIG. 81.

FIG. 86 is a graph illustrating the characteristics of the MTF with respect to the image height of the imaging lens 900V.

According to FIG. 86, if excluding the characteristics T3, S3, T2, and S2, and a part of T1 near the maximum image height, 0.2 or more of the MTF can be secured. Therefore, it is considered that the resolving power of the imaging lens 900V is high.

In the imaging lens 900V, by applying a material having the higher refractive index than that of the imaging lenses 700V and 800V to the fourth lens L4V, it is possible to reduce the height and obtain excellent characteristics, even when the distance between the surface s14V and the image surface s15V increases.

[Comparison of Imaging Lenses]

FIG. 67 is a table illustrating comparison of the imaging lens according to each of Embodiments 14 to 22.

The optical characteristics are measured based on the following conditions (A), (B), and (D).

(A) Size of the sensor which is positioned diagonally to the imaging element . . . 5.867 mm (B) Pixel pitch of the imaging element . . . 1.12 μm (D) Wavelength constituting the simulation light source . . . 550 nm In a row "F number", the F number of the imaging lens is indicated. The F numbers of the imaging lens 100V, the imaging lens 200V, the imaging lens 300V, the imaging lens 400V, the imaging lens 700V, the 800V imaging lens, and the imaging lens 900V are 1.60. On the other hand, the F number of the imaging lens 500V is 1.54 and less than 1.60. The F number of the imaging lens 600V is 1.80.

In the row "image angle (diagonal)/deg" indicates the image angle (diagonal direction) of the imaging lens.

In the row "focal distance/mm" indicates the focal distance. In particular, fV is the focal distance of the entire imaging lens, f5V is the focal distance of the front lens L5V, and fcV is the focal distance of the rear lens LOCV.

In the row "OTLV/mm" indicates an optical total length of the imaging lens. The optical total lengths of the imaging lens 100V, the imaging lens 300V, the imaging lens 400V, the imaging lens 500V, and the imaging lens 600V are 5 mm or more. On the other hand, the optical total lengths of the imaging lens 200V, the imaging lens 700V, the imaging lens 800V, and the imaging lens 900V are about 4 mm, and the reducing in the size thereof can be obtained.

In the row "CAV/mm" indicates the distance between the image plane s15V the surface s14V.

When referring to the row "CAV/OTLV", it can be considered that all of the imaging lens 100V, the imaging lens 200V, the imaging lens 300V, the imaging lens 400V, the imaging lens 500V, the imaging lens 600V, the imaging lens 700V, the imaging lens 800V, and neither the imaging lens 900V satisfy Expression (1).

The row "FBV/mm" indicates the distance between the center ct10V the image surface s15V and the surface S10V. It can be considered that the distance is 0.8 mm or more, in all of the imaging lens 100V, the imaging lens 200V, the imaging lens 300V, the imaging lens 400V, the imaging lens 500V, the imaging lens 600V, the imaging lens 700V, the imaging lens 800V, and the imaging lens 900V.

In the row "CGV thickness/mm" indicates the thickness of the infrared ray-cutting glass CGV. As described above, since the imaging lenses 400V and 700V do not include the infrared ray-cutting glass CGV, "NONE" is displayed in FIG. 67.

In the row "f5V/fV" indicates the value of f5V/fV to be used in Expression (2) described above. All of the imaging lens 100V, the imaging lens 200V, the imaging lens 300V, the imaging lens 400V, the imaging lens 500V, the imaging lens 600V, the imaging lens 700V, the imaging lens 800V, and the imaging lens 900V satisfy Expression (2).

In the row "fcV/fV" indicates the value of the fcV/fV to be used in Expression (3) described above. All of the imaging lens 100V, the imaging lens 200V, the imaging lens 300V, the imaging lens 400V, the imaging lens 500V, the imaging lens 600V, the imaging lens 700V, the imaging lens 800V, and the imaging lens 900V satisfy Expression (3).

In the row "OTLV/SDV" indicates the value of OTLV/SDV to be used in Expression (4) described above. All of the imaging lens 100V, the imaging lens 200V, the imaging lens 300V, the imaging lens 400V, the imaging lens 500V, the imaging lens 600V, the imaging lens 700V, the imaging lens 800V, and the imaging lens 900V satisfy Expression (4).

[Regarding Image Capturing Device]

FIG. 68 is a cross-section view illustrating a schematic configuration of the image capturing device including the imaging element and the imaging lens according to each of Embodiments 14 to 22.

The image capturing device 1V illustrated in FIG. 68 includes the imaging lens 2V and the imaging element 3V.

The imaging lens 2V may be any one of the imaging lens 100V, the imaging lens 200V, the imaging lens 300V, the imaging lens 400V, the imaging lens 500V, the imaging lens 600V, the imaging lens 700V, the imaging lens 800V, and the imaging lens 900V.

The imaging element 3V is disposed on the image surface s15V of the imaging lens 2V.

The imaging element 3V receives the light passed through the imaging lens 2V includes a charge coupled device (CCD), a complementary metal oxide semiconductor (CMOS), or the like.

[Additional Statement]

In all of the imaging lenses described above, the number of the lenses is six as an example, and the number of the lenses may be five. However, even in a case where the number of the lenses is five, it is required to maintain at least the configuration which is configured of the front lens L5V and the rear lens LOCV.

[Basic Configuration of Imaging Lens 1W]

Figure 87:
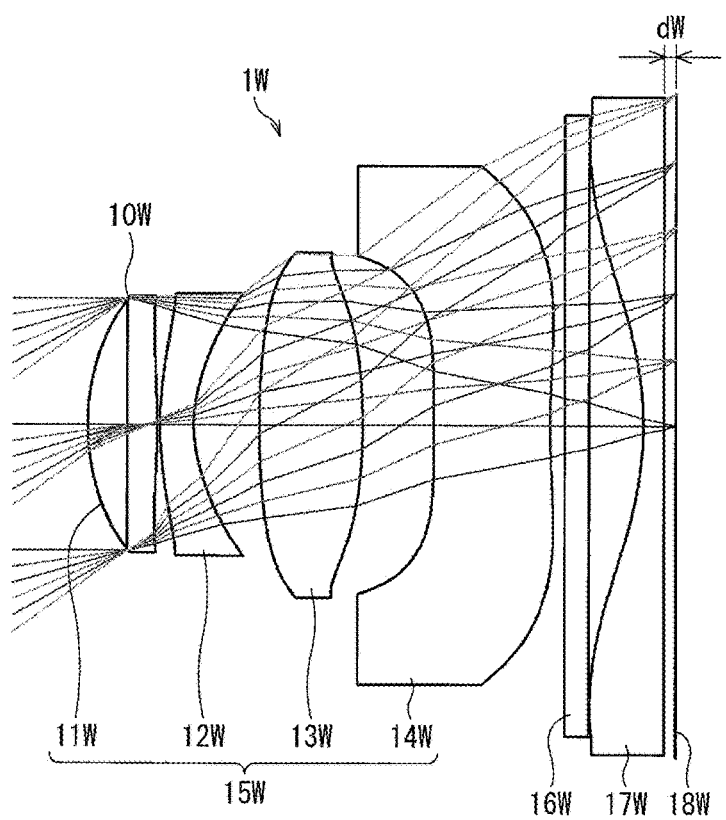
FIG. 87 is an explanatory diagram illustrating a schematic configuration of the imaging lens according to one embodiment of the present invention.

FIG. 87 is an explanatory diagram illustrating a schematic configuration of an imaging lens 1W of the present embodiment. As illustrated in this figure, the imaging lens 1W includes an upper lens 15W configured of a first lens 11W, a second lens 12W, a third lens 13W, and a fourth lens 14W, a IR cut glass (cover glass) 16W, and a lower lens 17W. Theses members are disposed in an order of from the object side (a subject side, left side in FIG. 87) toward an image surface 18W side (right side in FIG. 87). In addition, an aperture diaphragm 10W is provided adjacent to the surface of the object side in the first lens 11W.

The first lens 11W of which the object side is convex surface (convex shape) has a positive refractive index (positive power).

The second lens 12W is formed of a meniscus lens (a lens of which one side is a convex surface and the other surface is a concave surface) and is disposed such that the object side is the convex surface.

The third lens 13W, of which the image surface 18W side is the convex surface, has the positive refractive index.

The fourth lens 14W has the positive refractive index, and the shape of the image surface 18W side has a shape having the point of inflection.

The aperture diaphragm 10W is provided so as to surround the effective aperture of the surface of the object side in the first lens 11W. The diameter of a light beam incident on the imaging lens 1W is limited such that the light incident on the imaging lens 1W is appropriately passed the each lens.

The infrared ray-cutting glass (IR cut glass) 16W is disposed between the lower lens 17W and the fourth lens 14W, blocks light having an infrared wave length among the light beams to be incident from the object side, protect an image surface (light receiving surface) 18W of the imaging element (an image sensor, will not be illustrated), and suppresses the moire. The IR cut glass 16W may also have a function of protecting the surface of the lower lens 17W from being damaged mechanically.

In the lower lens 17W, a lens of which the object side is the concave surface and the image surface 18W side is the plane. In addition, in the surface of the object side in the lower lens 17W, the lens center portion is a concave shape and has the negative refractive index. The degree of the negative refractive index becomes weak from the lens center toward the lens effective diameter edge. The shape of the surface of the object side in the lower lens 17W has a shape having the point of inflection. That is, the surface of the object side in the lower lens 17W has the concave shape near the lens center portion and has the convex shape or a planar shape substantially parallel to the image surface side near the peripheral portion. In addition, the lower lens 17W may be a lens on chip (LOC) which is integrally formed with the IR cut glass 16W.

By using the lens of which the image surface 18W side is the plane, as the lower lens 17W, it is possible to reduce the effect of eccentric error in the lens surfaces. Therefore, it is possible to improve the aberration correction effect rather than a case where the aberration is corrected by using the lens of which the both lens surfaces are the aspherical surfaces. In addition, by using the lower lens 17W of which the image surface 18W side is the plane, since the lower lens 17W can approach the image surface 18W independently of the design condition of the upper lens 15W, a configuration having little effect on the manufacturing error, which can be easily manufactured, can be obtained.

Figure 88:
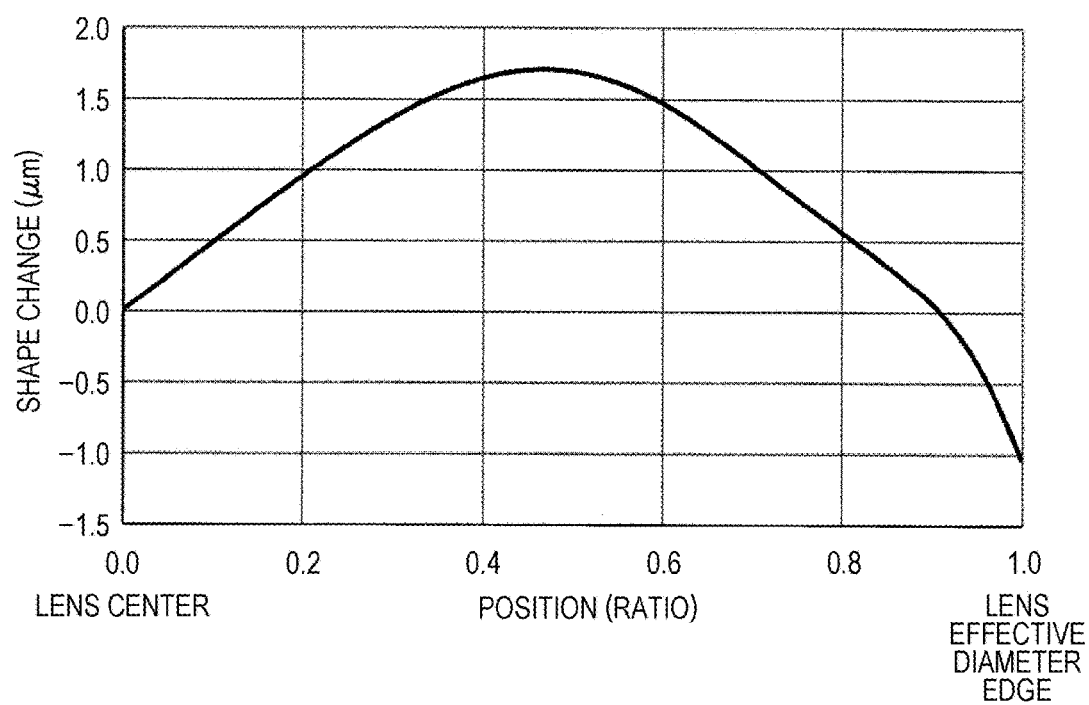
FIG. 88 is a graph illustrating an example of the shape change of the surface of the object side in a lower lens to be included in the imaging lens illustrated in FIG. 87.

FIG. 88 is a graph illustrating an example of the shape change of the surface of the object side in the lower lens 17W. The horizontal axis indicates a value expressed by a ratio of a position on the lens to a distance from the lens center to the lens effective diameter edge (a value of each position in a case where the lens center is defined as 0 and the lens effective diameter edge is defined as 1), and the vertical axis indicates the change amount of the shape in the optical axis direction with respect to the lens center (a normal direction of the image surface 18W in the lower lens 17W).

As illustrated in FIG. 88, in the present embodiment, regaining the shape of the surface of the object side in the lower lens 17W, the change amount of the shape to the abject side with respect to the lens center increases when up to a predetermined distance XW (in an example of FIG. 88, a position where about 47% of the distance between the lens center and the lens effective diameter edge), from the lens center toward the lens effective diameter edge side, and the change amount of the shape to the object side with respect to the lens center decreases when exceeding the predetermined distance XW.

By setting the shape of surface of the object side in the lower lens 17W such that manner, the aberration correction performance can be improved by using the lens of which the object side is the concave surface and the image surface 18W side is the plane, and the deterioration in the peripheral light amount ratio can be suppressed by increasing the incident angle of the light with respect to the light receiving surface (image surface 18W) of the imaging element (image sensor).

In addition, it is preferable that the predetermined distance XW is set to 30% or more of the distance between the lens center and the lens effective diameter edge. That is, when it is assume that the distance between the lens center and the lens effective diameter edge is LW, the predetermined distance XW satisfies the relationship of XW/LW≥0.3. Accordingly, the peripheral light amount ratio can be secured in a range which is not problematic in terms of practical.

In addition, the image capturing device according to the present embodiment is configured of the imaging lens 1W which is formed by the above-described configuration and the imaging element (not illustrated) which receives light passed through the imaging lens 1W in the image surface 18W and converts the received light into an electrical signal. In addition, the configuration of the imaging element is not particularly limited, the conventional imaging element can be used.

In addition, the imaging lens 1W (or the above device) may be includes a function for executing an auto focus (AF) or the like, in addition to the above described configuration.

[Optical Characteristics of Imaging Lens 1W]

Next, the simulation results performed to examine the optical characteristics of the imaging lens 1W will be shown below. In these simulations, the optical characteristics of the imaging lenses 1W according to Embodiments 23 to 27 illustrated in FIG. 89 and the imaging lens according to Comparative Example 1 are examined.

In the simulations for Embodiments 23 to 27 and Comparative Example 1 above described, an application wavelength in the numerical calculation is set as 550 nm. In addition, the imaging lens 1W according to Embodiments 23 to 27 of each of the embodiments is intended for focusing the light on the substantially rectangular-shaped light receiving surface (sensor surface) in the imaging element (image sensor), and the size of the light receiving surface of the imaging element is set such that a diagonal length DW is 5.867 mm and the pixel pitch is 1.12 μm.

[Embodiment 23]

FIG. 90 illustrates design data of the imaging lens 1W according to Embodiment 23. In addition, FIG. 91 illustrates simulation results of the astigmatism, the distortion aberration, the spherical aberration, the transverse aberration, and a modulation transfer function (MTF) relating to the imaging lens 1W according to Embodiment 23.

Figure 91:
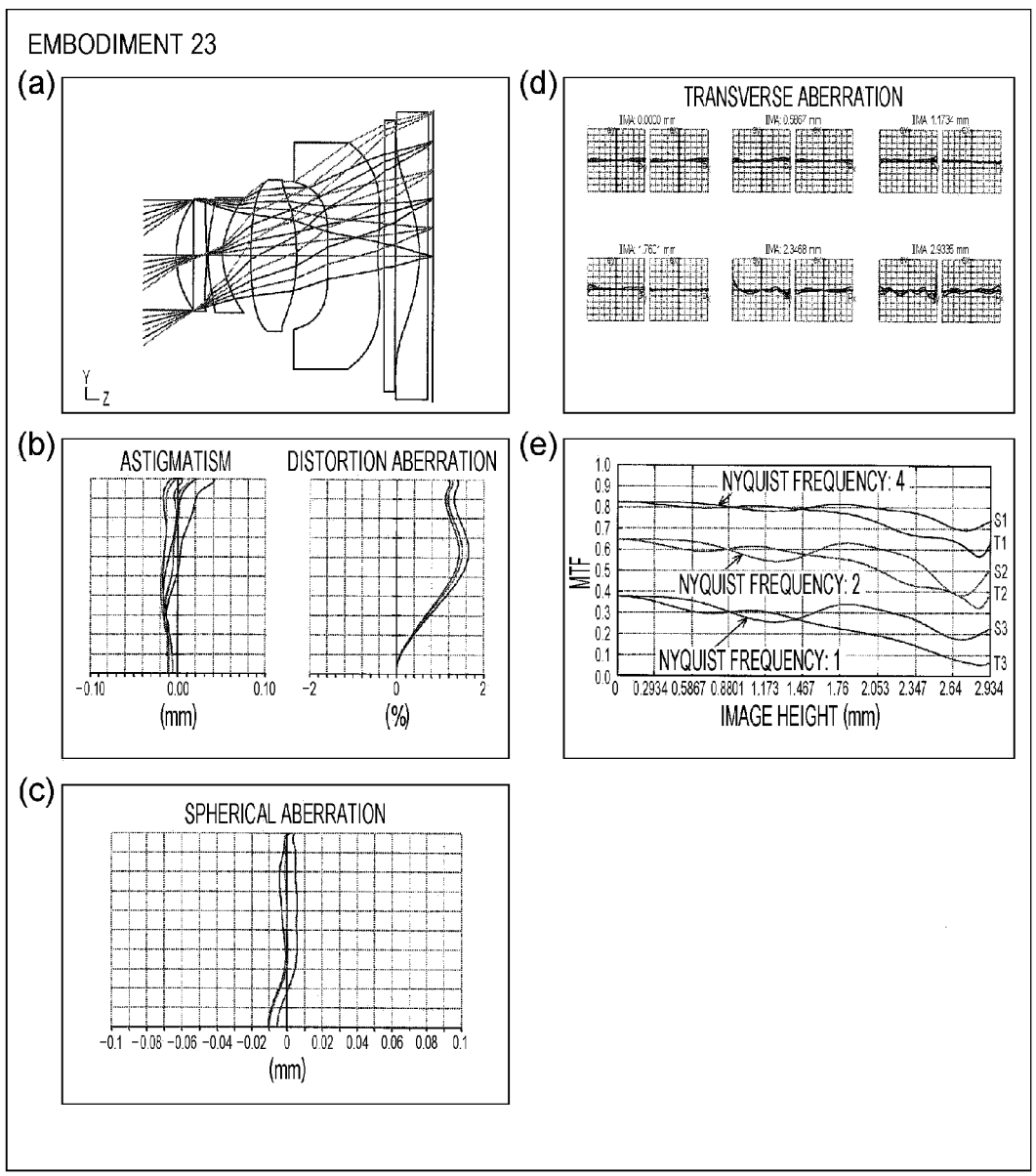
FIG. 91 illustrates simulation results relating to the imaging lens according to Embodiment 23.

As illustrated in FIG. 91, by design conditions illustrated in FIG. 90, the imaging lens which has a brightness of the F number 1.8 and of which various aberrations (the astigmatism, the distortion aberration, the spherical aberration, the transverse aberration, and the MTF) are satisfactorily corrected. Specifically, it can be set such that astigmatism is ±0.1 mm or less, the distortion is ±2% or less, the spherical aberration is ±0.11 mm or less, and lateral aberration is ±20 μm or less.

[Embodiment 24]

Figure 93:
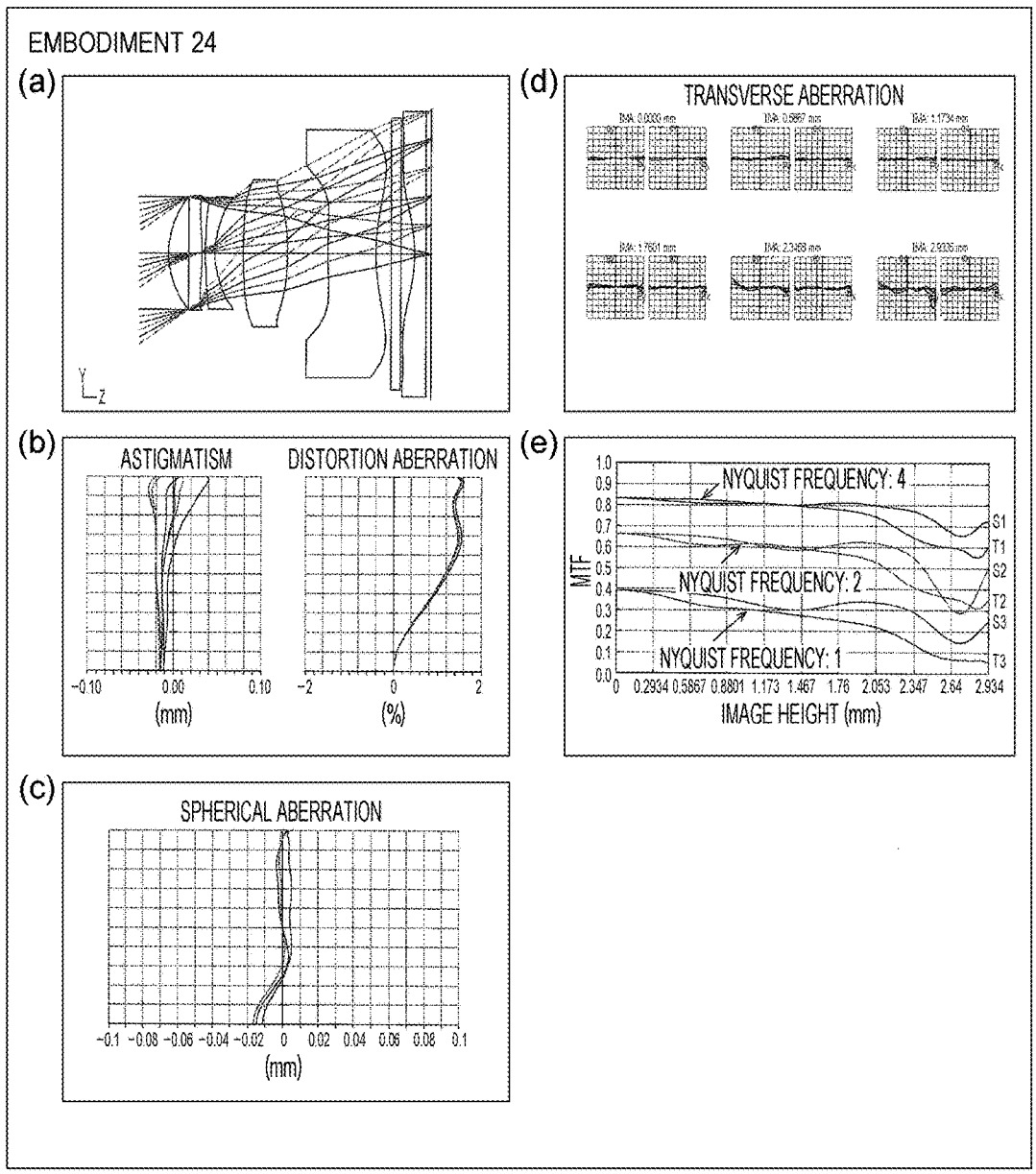
FIG. 93 illustrates simulation results relating to the imaging lens according to Embodiment 24.

FIG. 92 illustrates design data of the imaging lens 1W according to Embodiment 24. In addition, FIG. 93 illustrates simulation results of the astigmatism, the distortion aberration, the spherical aberration, the transverse aberration, and the MTF relating to the imaging lens 1W according to Embodiment 24. In Embodiment 24, a low dispersion material is applied to the fourth lens 14W.

As illustrated in FIG. 93, by the design conditions illustrated in FIG. 92, the imaging lens having brightness of F number 1.8, in which the aberration is satisfactorily corrected, in the same manner as that of Embodiment 23, can be obtained.

[Embodiment 25]

Figure 95:
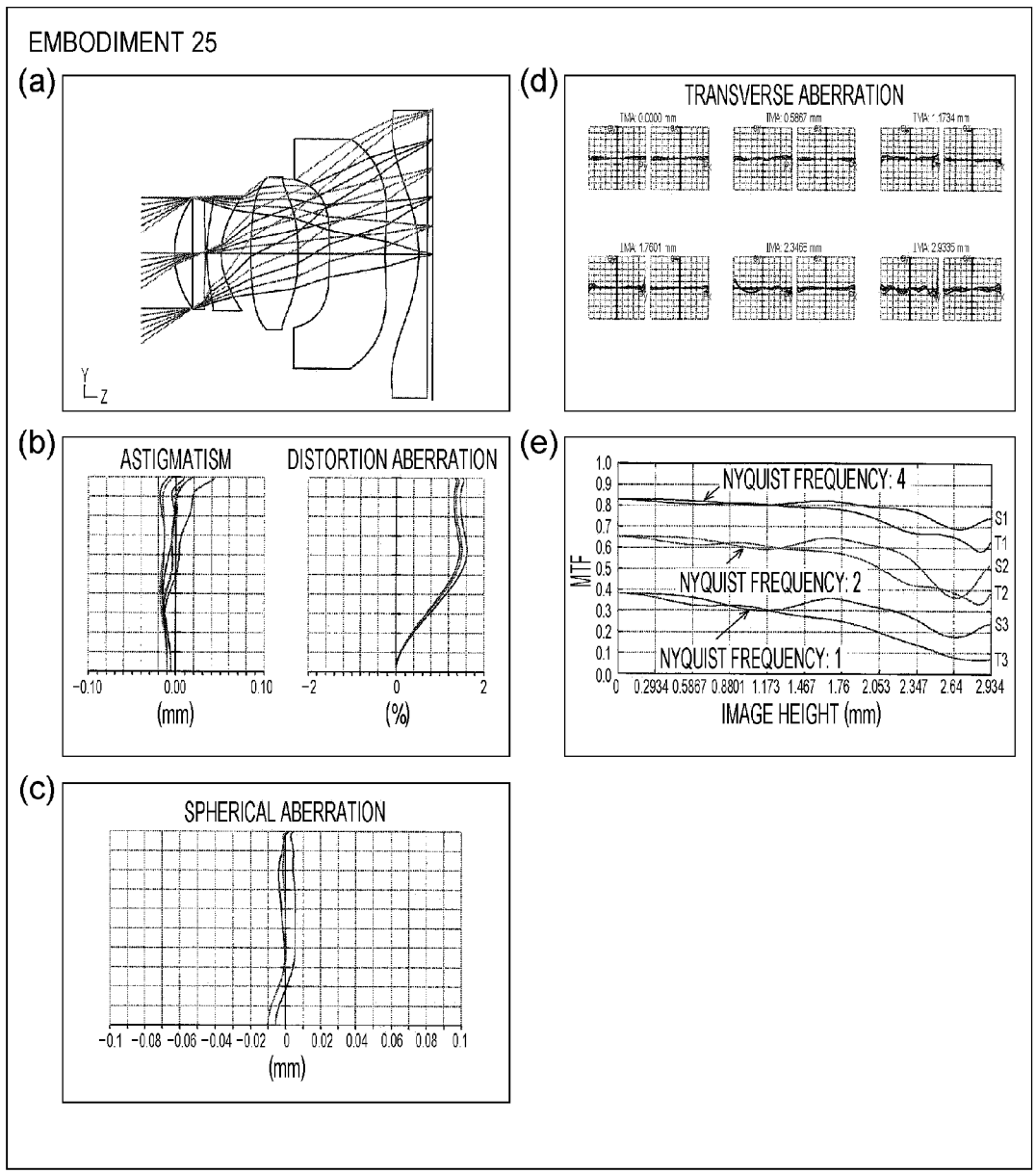
FIG. 95 illustrates simulation results relating to the imaging lens according to Embodiment 25.

FIG. 94 illustrates design data of the imaging lens 1W according to Embodiment 25. In addition, FIG. 95 illustrates simulation results of the astigmatism, the distortion aberration, the spherical aberration, the transverse aberration, and the MTF relating to the imaging lens 1W according to Embodiment 25. In Embodiment 25, the IR cut glass 16W and the lower lens 17W are integrally formed.

As illustrated in FIG. 95, by the design conditions illustrated in FIG. 94, the imaging lens having brightness of F number 1.8, in which the aberration is satisfactorily corrected, in the same manner as that of Embodiment 23, can be obtained.

[Embodiment 26]

FIG. 96 illustrates design data of the imaging lens 1W according to Embodiment 26. In addition, FIG. 97 illustrates simulation results of the astigmatism, the distortion aberration, the spherical aberration, the transverse aberration, and the MTF relating to the imaging lens 1W according to Embodiment 26.

Figure 97:
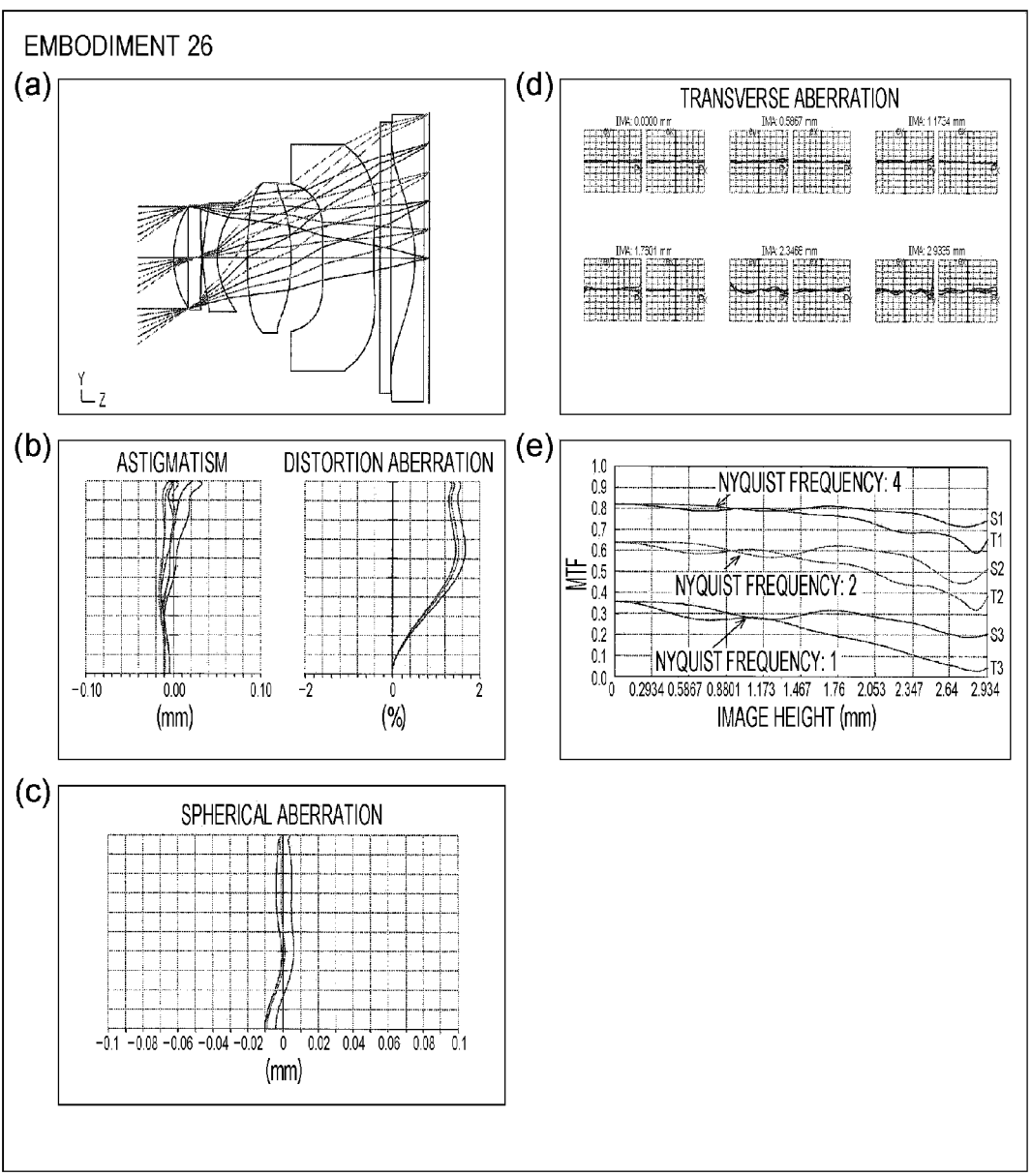
FIG. 97 illustrates simulation results relating to the imaging lens according to Embodiment 26.

As illustrated in FIG. 97, by the design conditions illustrated in FIG. 96, the imaging lens having brightness of F number 1.94, in which the aberration is satisfactorily corrected, in the same manner as that of Embodiment 23, can be obtained.

[Embodiment 27]

FIG. 98 illustrates design data of the imaging lens 1W according to Embodiment 27. In addition, FIG. 99 illustrates simulation results of the astigmatism, the distortion aberration, the spherical aberration, the transverse aberration, and the MTF relating to the imaging lens 1W according to Embodiment 27.

Figure 99:
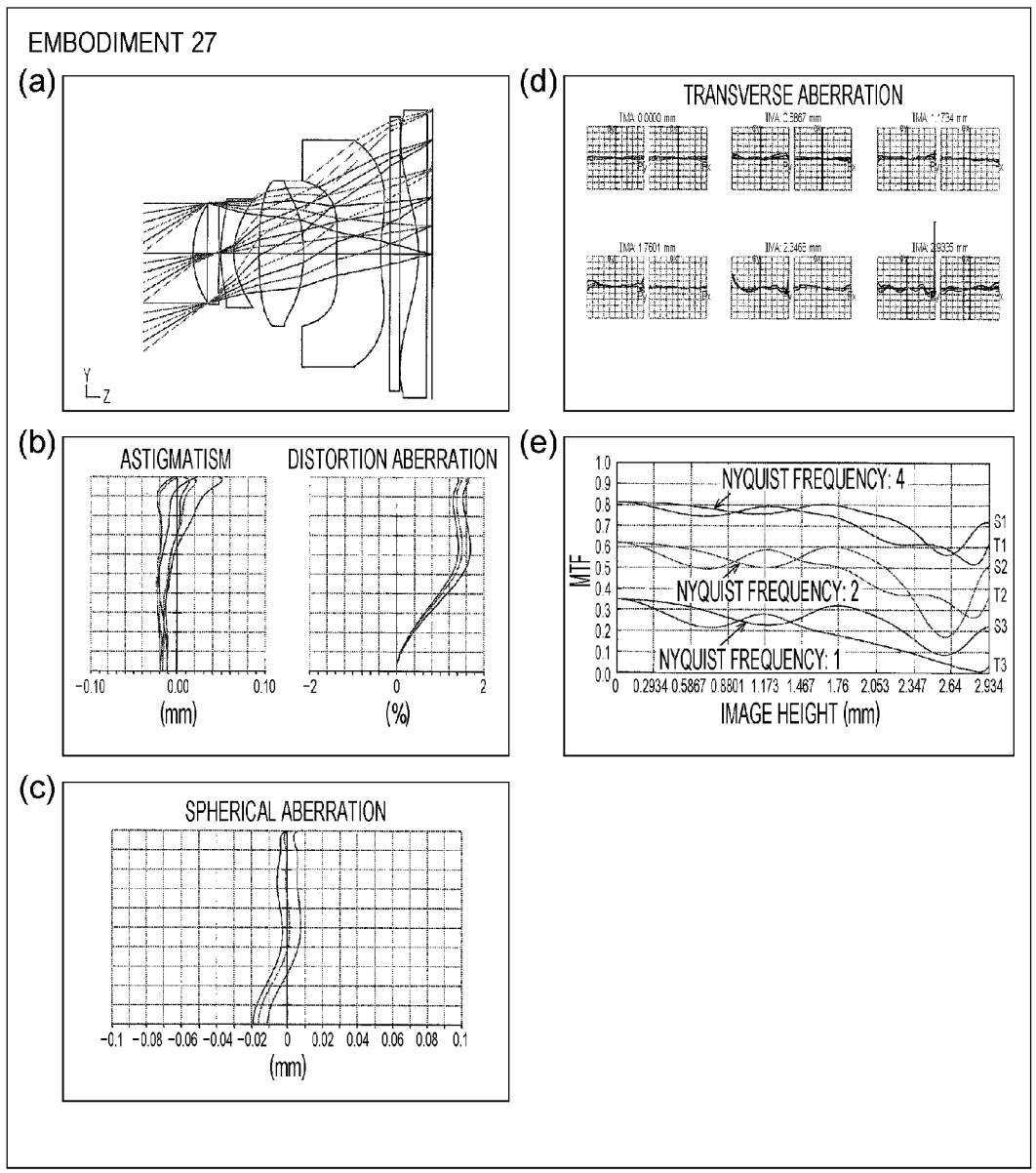
FIG. 99 illustrates simulation results relating to the imaging lens according to Embodiment 27.

As illustrated in FIG. 99, by the design conditions illustrated in FIG. 98, the imaging lens having brightness of F number 1.8, in which the aberration is satisfactorily corrected, in the same manner as that of Embodiment 23, can be obtained.

[Comparative Example 1]

FIG. 100 illustrates design data of the imaging lens according to Comparative Example 1. In Comparative Example 1, a lens having a concave shape without a point of inflection on the surface of the object side, in which the surface of the image surface side is a plane, is used as the lower lens 17W. In addition, FIG. 101 illustrates simulation results of the astigmatism, the distortion aberration, the spherical aberration, the transverse aberration, and the MTF relating to the imaging lens according to Comparative Example 1.

Figure 101:
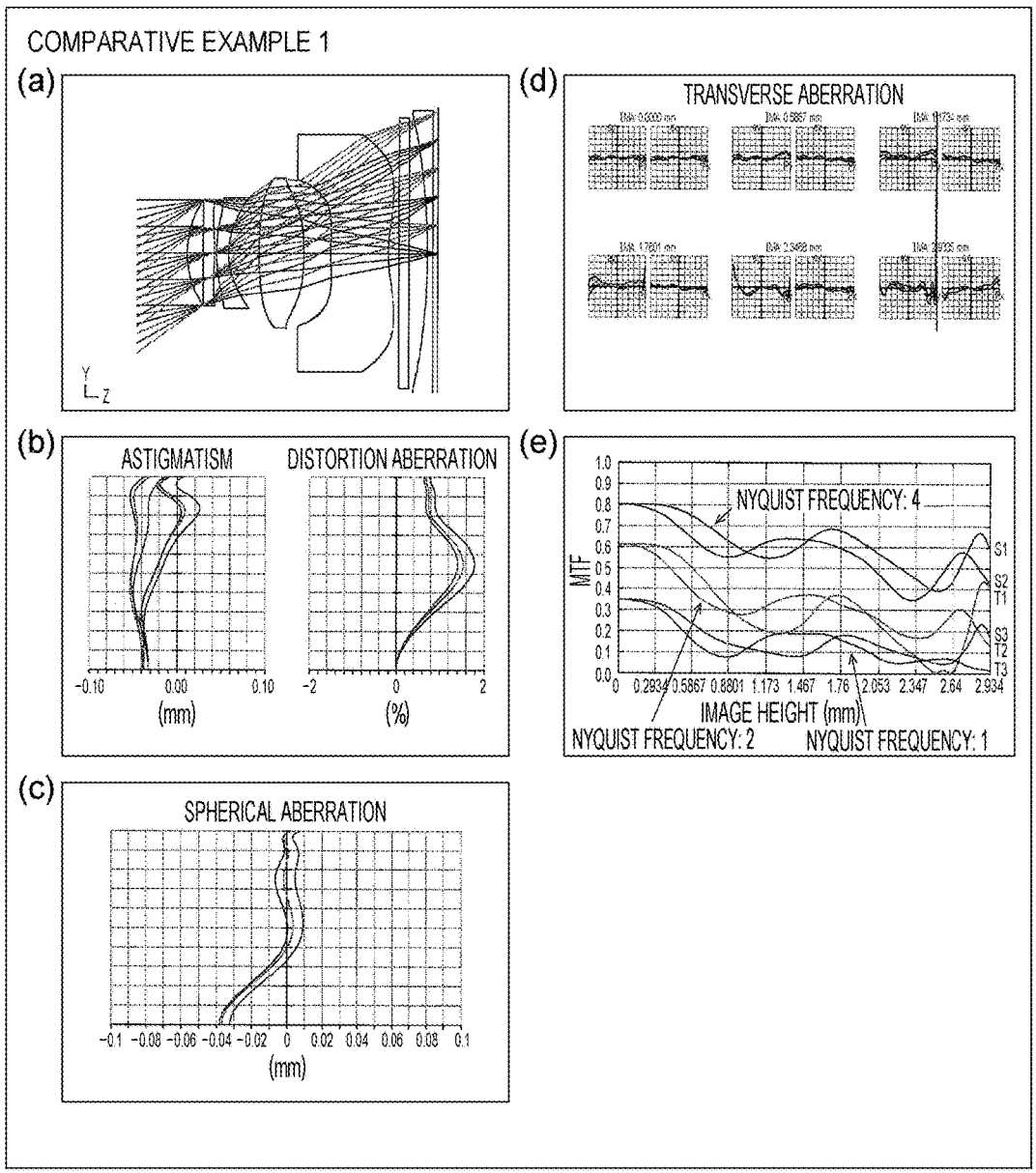
FIG. 101 illustrates simulation results relating to the imaging lens according to Comparative Example 1.

As illustrated in FIG. 101, in a case of the design conditions illustrated in FIG. 100, an absolute value |fcW| of the focal distance of the lower lens 17W becomes too greater.

In addition, it is preferable to set the ratio dW/OTLW of the lower lens proximity distance dW (distance between the lower lens 17W and the image surface 18W) and the optical total length OTLW to less than 0.15 (dW/OTLW<0.15). By setting the ratio dW/OTLW to be fall within the above described range, the curvature of the image field can be favorably corrected by the lower lens 17W.

In addition, it is preferable to set the ratio OTLW/DW of the optical total length OTLW and a diagonal length DW of the light receiving surface of the image element to in a range of 0.7<OTLW/DW<0.9. By setting the ratio OTLW/DW in the above-described range, it is possible to reduce the height (size) of the imaging lens 1W.

In addition, when the ratio f4W/fW of the focal distance of the fourth lens 14W and the focal distance fW of the entire optical system (entire imaging lens 1W) is too small, it is difficult to reduce the height thereof, and when the ratio f4W/fW is too large, the contribution of the lower lens 17W becomes smaller and the sufficient aberration correction effect cannot be obtained. Therefore, in order to reduce the height of the imaging lens 1W and to improve the aberration correction performance, it is preferable to set the ratio f4W/fW to a range of −5.7<f4W/fW<−2.9.

In addition, when the ratio fcW/fW of the focal distance fcW of the lower lens 17W and the focal distance fW of the entire optical system it too small, the lens size becomes increased and when the ratio fcW/fW is too large, it leads to the deterioration in an image surface curvature correction performance and the increase in the incident angle of the light with respect to the light receiving surface of the imaging element. Accordingly, in order to reduce the size of the imaging lens 1W, to improve the image surface curvature correction performance, and to reduce incident angle of the light with respect to the light receiving surface of the imaging element, it is preferable to set the ratio fcW/fW to a range of −1.8<fcW/fW<−1.2.

In addition, it is preferable to set the focal distance FBW of the upper lens 15W to a range of FBW>0.8 mm. By setting the focal distance FBW of the upper lens 15W to the above described range, it is possible to reduce the lens diameter and reduce the size of the configuration of the imaging lens 1W including a mechanism system such as the auto focus (AF) or the like. In addition, since the light beam diameter becomes greater as farther away from the image surface 18W, it is possible to reduce the influence of the reflection of the foreign substance dust in the upper lens 15W.

[Other Configuration Example]

Figure 102:
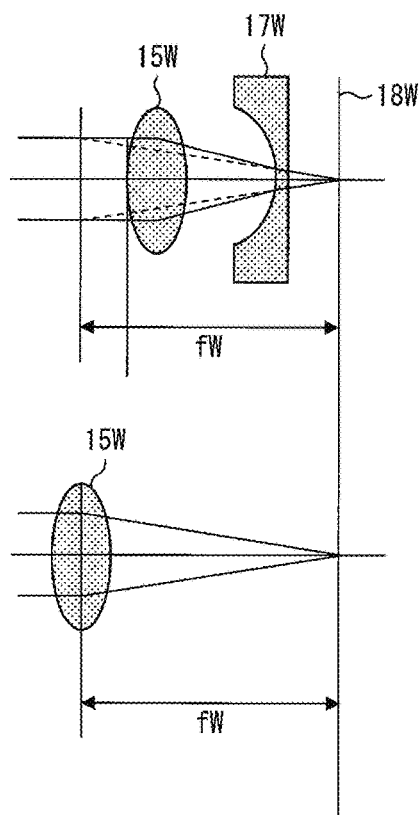
FIG. 102 is a cross-section view illustrating an outline of another configuration example of the imaging lens.

FIG. 102 is a cross-section view illustrating an outline of another configuration example of the imaging lens 1W. For the clarity of explanation, in FIG. 102, only the upper lens 15W and the lower lens 17W are illustrated among the configurations of the imaging lens 1W.

In the imaging lens 1W, it is preferable that the upper lens 15W has positive refractive power and lower lens 17W has negative refractive power. Accordingly, as illustrated in FIG. 102, the optical total length OTLW can further be reduced.

Figure 103:
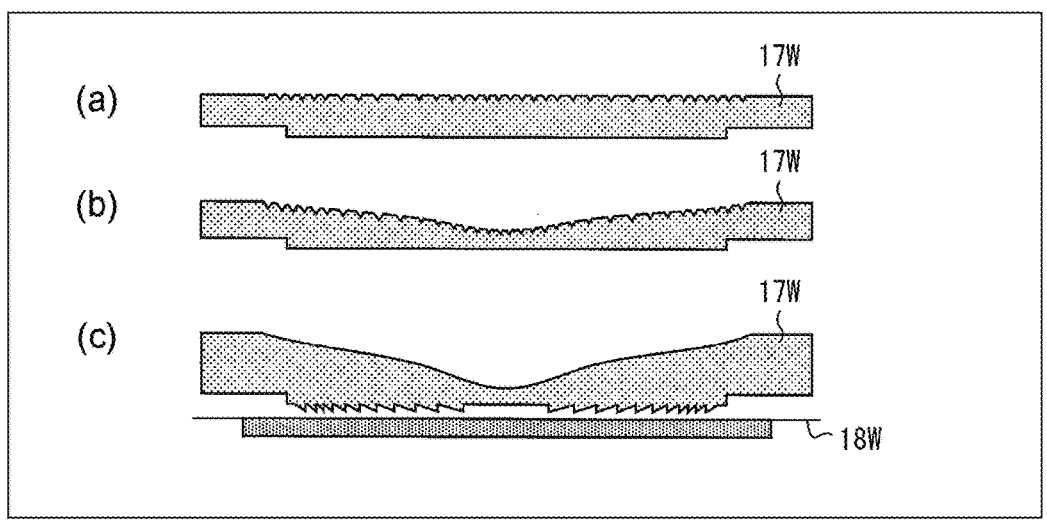
FIGS. 103($a$) to 103($c$) are cross-section views illustrating an outline of a configuration example of the lower lens.

FIGS. 103(*a*) to 103(*c*) are cross-section views illustrating an outline of a configuration example of the lower lens 17W.

The lower lens 17W may have a diffraction pattern on the surface of the object side. In FIG. 103(*a*), a configuration in which a surface of the object side of the lower lens 17W is formed of the diffraction pattern is illustrated and in FIG. 103(*b*), a configuration in which the surface of the object side of the lower lens 17W is formed by combining the shape of the concave and an aspherical lens and the diffraction pattern is illustrated, respectively.

Furthermore, in a case where the lower lens 17W is disposed separate from the image surface 18W (or the imaging element), the surface of the image surface side of the lower lens 17W may be a Fresnel lens shape. Accordingly, the incident angle of the chief ray with respect to the imaging element can be adjusted appropriately.

[Conclusion]

A lens element according to Aspect 1 of the present invention includes an object side surface facing an object side, which is an aspheric surface and a concave surface; and an image side surface facing an image surface side, and which is substantially plane, in which a shape of an outer profile of the image side surface is substantially rectangular.

According to the configuration, the size of the opening of the element storing unit of the image capturing device can be reduced smaller than the size of the outer profile of the object side surface. Accordingly, the size of the outer profile of the element storing unit can be reduced. As a result, the size of the image capturing device can be reduced.

In addition, according to the configuration, the image side surface can be disposed on the image surface side further than the top surface of the element storing unit is. Accordingly, an increase in the distance between the image side surface and the imaging element (more specifically, the light receiving unit) can be suppressed. As a result, the desired aberration correction effect can be objected, and the image capturing device with excellent resolving power can be implemented.

In Aspect 1 above described, the lens element according to Aspect 2 of the invention is configured such that a size of the outer profile of the image side surface is set in accordance with a shape of a light receiving unit for receiving light passed through the lens element.

According to the configuration, it is possible to configure the image capturing device such that increasing in the size of the outer profile of the image side surface too much without any purpose is suppressed and the light receiving unit appropriately receives the light.

In Aspect 1 or 2 above described, the lens element according to Aspect 3 of the present invention is configured such that the shape of the outer profile of the object side surface is a circle, or a shape obtained by cutting the circle by at least one line inscribed in the circle.

According to the configuration, the lens element can be relatively easily manufactured. That is, regarding the object side surface, injection molding or thermoset molding using a die can be applied. Additionally, the die can be easily processes. On the other hand, regarding the image side surface, since the image side surface is the substantially plane (it is not required to provide the lens surface), it is needless to say that the molding is easy.

In any one of Aspects 1 to 3 above described, the lens element according to Aspect 4 of the invention is configured to have inclination (side surface portion 44) adjacent to an edge of the image side surface.

In Aspect 4 above described, the lens element according to Aspect 5 of the present invention is configured such that an inclination angle of the inclination is 40° or more with respect to an optical axis of the lens element.

According to the above configuration, when the molding is performed using the die (lower) having a shape counter to the image side surface, the molded lens element is easily separated from the die (lower). As a result, the possibility that the warping or the distortion occurs in the lens element can be reduced. In addition, in a case where the stray light is incident to the lens element from the object side surface, even when the incident angle of the stray light with respect to the optical axis is small, since the stray light is not reflected at the inclination and is passed through the lens element, the possibility that the stray light is received by the light receiving unit can be reduced. Accordingly, the lens element can be manufactured with a good accuracy.

In any one of Aspects 1 to 5 above described, the lens element according to Aspect 6 of the present invention is configured to have projections and depressions formed by nanoimprinting on the image side surface.

According to the configuration, by providing the projections and depressions formed by nanoimprinting on the image side surface, the antireflection treatment using the oxide thin film is not required. As a result, the risk of the foreign substance attachment can be reduced and the excellent antireflection effect can be obtained.

In any one of Aspect 1 to 6 above described, the lens element according to Aspect 7 of the present invention is configured to include a material for absorbing an infrared ray.

According to the configuration, the lens element can be shielded from the infrared ray. As a result, the image capturing device with a good image quality can be obtained. In addition, by omitting the infrared ray-cutting glass in the image capturing device, the height of the image capturing device can be easily reduced and the aberration correction is easily performed.

An image capturing device according to Aspect 8 of the present invention includes the lens element according to any one of the Aspects 1 to 7 above described, an imaging element which includes a light receiving unit for receiving light passed through the lens element; and an element storing unit (the laminate substrate 4, the sensor cover 21, and the flip-chip substrate 47) which stores the imaging element, in which the lens element is supported in the object side which is disposed further than the image side surface by the element storing unit.

According to the configuration, the size of the opening of the element storing unit can be reduced smaller than the size of the outer profile of the object side surface. Accordingly, the size of the outer profile of the element storing unit can be reduced. As a result, the size of the image capturing device can be reduced.

In addition, according to the configuration, the image side surface can be disposed on the image surface side further than the top surface of the element storing unit is. Accordingly, an increase in the distance between the image side surface and the imaging element (more specifically, the light receiving unit) can be suppressed. As a result, the desired aberration correction effect can be objected, and the image capturing device with excellent resolving power can be implemented.

In Aspect 8 above described, the image capturing device according to Aspect 9 of the present invention includes a front lens portion which is formed of at least one lens and is disposed on the object side further than the lens element is; and a movement mechanism which moves the front lens portion in a state where the lens element is fixed, in which a surface of at least one lens closest to the lens element among the lenses which configure the front lens portion has a point of inflection that is a boundary between a concave shape and a convex shape.

According to the configuration, since a total weight of the movement target of the movement mechanism can be reduced, a performance of the movement mechanism can be improved. Further, it is possible to reduce the F number at the time of macro photographing.

In Aspect 9 above described, the image capturing device according to Aspect 10 of the present invention is configured to not have a lens barrel which stores the front lens portion.

According to the configuration, since the lens barrel is omitted, the lens barrel is excluded from the movement object of the movement mechanism. Accordingly, the weight of the movement target of the movement mechanism can further be reduced.

In any one of Aspects 8 to 10 above described, the image capturing device according to Aspect 11 of the present invention is configured such that in the lens element, the object side surface with respect to the image side surface has a flange portion which is formed as a portion projected to an optical axis of the lens element in a normal direction, and a separation distance between the flange portion and the image side surface along an optical axis of the lens element is 0.15 mm or more.

The distance between the top surface of the imaging element and the maximum point of the bonding wire along the optical axis direction is about 0.15 mm. In view of this, in order to avoid that the bonding wire hits the immediately above the lens element portion, it is required to set a separation distance between the flange portion and the image side surface along the optical axis direction to be 0.15 mm or more. Accordingly, it is possible to suppress deformation of the bonding wire and failure in the wire bonding.

In any one of Aspects 8 to 10 above described, the image capturing device according to Aspect 12 of the present invention is configured such that the element storing unit has a predetermined wiring pattern.

In Aspect 12 above described, the image capturing device according to Aspect 13 of the present invention is configured such that, in the lens element, the object side surface with respect to the image side surface has a flange portion which is formed as a portion projected to an optical axis of the lens element in a normal direction, and the flange portion is separated from the element storing unit in the optical axis direction of the lens element.

According to the configuration, the mounting component to be disposed on the top surface of the element storing unit can be disposed on the inner side further than the edge of the object side surface is. By disposing the mounting component on the inner side further than the edge of the object side surface, it is possible to further reduce the size of the outer profile of the element storing unit.

In any one of Aspects 8 to 13 above described, the image capturing device according to Aspect 14 of the present invention is configured such that the image side surface is in contact with the imaging element in an optical axis direction of the lens element.

According to the configuration, since the object side surface can further be positioned on the image surface side, the height of the image capturing device can further be reduced.

In addition, in a case where the image side surface is in contact with the imaging element, since the light can appropriately be focused on the light receiving unit, even when the incident angle of the chief ray to the lens element is small, the image capturing device with an excellent peripheral light amount ratio can be obtained. The same fact is applied to light other than the chief ray. As a result, the image capturing device of which a focal depth is large, and which can correspond to the wide object distance.

Furthermore, since the occurrence of the stray light caused by the present of the air between the image side surface and the imaging element can be suppressed, improved image quality of the image capturing device can also be expected.

In any one of Aspects 8 to 13 above described, the image capturing device according to Aspect 15 of the present invention is configured such that a projection portion is formed in the image side surface and a distance between the image side surface and the imaging element is defined by an end portion of the projection portion contacting with the imaging element.

In any one of Aspects 8 to 13 above described, the image capturing device according to Aspect 16 of the present invention is configured such that the lens element is placed on the element storing unit, and a distance between the image side surface and the imaging element is defined by the element storing unit contacting with the imaging element in the optical axis direction of the lens element.

According to the above-described both configurations, positioning of the image side surface can be performed with a simple configuration and with high accuracy.

In any one of Aspects 8 to 16 above-described, the image capturing device according to Aspect 17 of the present invention is configured such that the element storing unit has an opening which is opened in the optical axis direction of the lens element and in which the size of the opening is smaller than a size of the outer profile of the object side surface, and the object side surface is disposed on the image surface side further than the opening is.

According to the configuration, the stray light is shielded by the element attachment portion. Therefore, entering the stray light to the lens element can be suppressed.

[Different Regarding of the Present Invention]

The present invention can be regarded as below.

A lens element according to one aspect of the invention includes an object side surface facing an object side, which is a concave surface; and an image side surface facing an image surface side, which is substantially plane, in which a shape of an outer profile of the image side surface is substantially rectangular and the size of the outer profile of the image side surface is smaller than the size of the outer profile of the object side surface.

According to the configuration, the size of the opening of the element storing unit of the image capturing device can be reduced smaller than the size of the outer profile of the object side surface. Accordingly, the size of the outer profile of the element storing unit can be reduced. As a result, the size of the image capturing device can be reduced.

In addition, according to the configuration, the image side surface can be disposed on the image surface side further than the top surface of the element storing unit is. Accordingly, an increase in the distance between the image side surface and the imaging element (more specifically, the light receiving unit) can be suppressed. As a result, the desired aberration correction effect can be objected, and the image capturing device with excellent resolving power can be implemented.

In the lens element according to another aspect of the present invention, a size of an outer profile of the image side surface is set in accordance with a shape of a light receiving unit for receiving light passed through the lens element.

According to the configuration, it is possible to obtain the image capturing device which can suppress the increasing in the size of the outer profile of the image side surface too much without any purpose and of which the light receiving unit appropriately receives the light.

In the lens element according to another aspect of the present invention, a shape of an outer profile of the object side surface is circular.

According to the configuration, the lens element can be easily manufactured. That is, regarding the object side surface, injection molding, thermoset molding, or the like using a die can be applied. Additionally, the die can be easily processes. In addition, regarding the image side surface, since it is not required to provide the lens surface, it is needless to say that the molding is easily performed.

The lens element according to another aspect of the present invention is configured such that at least one of the object side surface and the image side surface, a blocking shape for blocking the infrared ray is formed.

According to the configuration, in the image capturing device, it is possible to omit the infrared ray-cutting glass. Therefore, it is possible to simplify the configuration of the image capturing device. In addition, since it is possible to deduce the optical total length of the optical system of the image capturing device, it is possible to reduce the height of the image capturing device.

A lens element according to another aspect of the present invention is configured such that fine projections and depressions which reduce the reflective index of the light are formed on the image side surface.

Since the image side surface is the substantially plane, the image side surface is easily deviated from the die during molding. By using the fact, if fine projections and depressions which reduce the reflective index of the light are formed on the image side surface, the reflection of light can be suppressed without coating the image side surface. Accordingly, when performing coating, since attachment of dust to the coated portion can be avoided, entering foreign substance to a captured image can be suppressed.

In a lens element according to another aspect of the present invention, the lens element includes at least one of a light blocking side surface of which at least a part is shielded from the light.

According to the configuration, stray light such as a ghost and flare can be suppressed.

In addition, the image capturing device according to another aspect of the present invention includes the lens element according to any one of the above, an imaging element including a light receiving unit which receives light passed through the lens element, and an element storing unit which stores the imaging element (laminate substrate 4 and the sensor cover 21), in which the image side surface is disposed on the inner side of the element storing unit.

According to the configuration, the size of the opening of the element storing unit can be reduced smaller than the size of the outer profile of the object side surface. Accordingly, the size of the outer profile of the element storing unit can be reduced. As a result, the size of the image capturing device can be reduced.

In addition, according to the configuration, the image side surface can be disposed on the image surface side further than the top surface of the element storing unit is. Accordingly, an increase in the distance between the image side surface and the imaging element (more specifically, the light receiving unit) can be suppressed. As a result, the desired aberration correction effect can be objected, and the image capturing device with excellent resolving power can be implemented.

In addition, in the image capturing device according to another aspect of the present invention, the lens element includes a step portion which is provide adjacent the edge of the image side surface, a flange portion of which the object side surface with respect to the image side surface is formed in a portion projecting in a normal direction with respect to an optical axis of the lens element, in which the step portion is placed on the element storing unit, and the flange portion is separated from the element storing unit.

According to the configuration, the mounting component to be disposed on the top surface of the element storing unit can be disposed on the inner side further than the edge of the object side surface is. By disposing the mounting component on the inner side further than the edge of the object side surface is, it is possible to further reduce the size of the outer profile of the element storing unit.

In addition, the image capturing device according to another aspect of the present invention has a projection portion extending from the image side surface in the direction along the optical axis of the lens element, and the end portion of the projection portion is in contact with the imaging element.

According to the configuration, the position of the image side surface with respect to the imaging element can be set, and the distance between the image side surface and the imaging element can be suppressed. The distance can be easily changed according to the length of the projection portion.

There is provided an imaging lens according to another Aspect 1 of the present invention, in which lenses are disposed in order of a front lens and a rear lens from an object side toward an image surface side, in which the front lens having positive refractive power, of which a center portion of a surface facing an object side has a convex shape, a peripheral portion of a surface facing the object side which is in a concave shape, a center portion of a surface facing an image surface side has the concave shape, and a peripheral portion of a surface facing the image surface side has the convex shape, in which the rear lens, of which a surface facing the object side has the concave shape, which has a center region of a rear object side, which is a center portion of a surface facing the object side, and in which a change amount of a shape of a lens surface toward the object side becomes greater with distance from the position of the center of the lens surface, and an intermediate region of a rear object side, which is an intermediate portion of a surface facing the object side, and in which a change amount of the shape becomes smaller with the distance from the position of the center of the lens surface, and of which a surface facing the image surface side is substantially plane, in which, in the surface facing the object side of the rear lens, a distance from the center of the lens surface to a boundary between the center region of the rear object side and the intermediate region of the rear object side is 30% or more than a distance from the center of the lens surface to an edge of the lens surface, and in which, when it is assumed that a distance between an image surface and a surface facing the image surface side of the rear lens is CAV and an optical total length of the imaging lens is OTLV, Expression (1) is satisfied $$CAV/OTLV<0.15 \qquad (1).$$

In order to efficiently perform the correction of various aberrations by the rear lens, it is preferable that the image surface is sufficiently in contact with the surface facing the image surface side of the rear lens. By satisfying Expression (1), the image surface can be sufficiently in contact with the surface facing the image surface side of the rear lens.

In addition, since the incident angle of the light from the rear lens to the image surface is small, the deterioration in the peripheral light amount ratio can be suppressed. An optical system with about 1.6 F number and with a brightness image can be obtained.

Furthermore, when using the rear lens instead of a lens of which the both surfaces are aspheric surfaces, it is possible to prevent the deterioration in the resolving power due to an eccentricity between both surfaces of the lens and it is possible to approach the image surface with the rear lens LOCV alone. Accordingly, it is possible to suppress the variation on the optical characteristics due to manufacturing tolerances of the imaging lens. In other words, the imaging lens can be easily manufactured.

In another Aspect 1 above described, the imaging lens according to another Aspect 2 of the present invention is configured such that, when it is assume that a focal distance of the imaging lens is fV, a focal distance of the front lens is f5V, and the focal distance of the rear lens is fcV, Expressions (2) and (3) are satisfied:

$$3.4<f5V/fV<5.2 \qquad (2)$$

$$-1.7<fcV/fV<-1.1 \qquad (3).$$

When f5V/fV is equal to or more than 5.2, it is advantage for reducing the height of the imaging lens. However, there is a possibility that the mounting of the rear lens becomes difficult, structurally. On the other hand, when f5V/fV is less than or equal to 3.4, the front lens is separated from the image surface. Accordingly, there is a possibility that the correction of the various aberrations is not sufficient.

When the fcV/fV is −1.1 or more, the distortion and the curvature of the image field can be favorably corrected, and there is a possibility that it is difficult to reduce the incident angle of the light to the image surface. On the other hand, when the fcV/fV is −1.7 or less, a possibility of increasing the size of the imaging lens occurs.

In another Aspect 1 or 2 above described, the imaging lens according to another Aspect 3 of the present invention is configured such that the distance between the image surface and the center of the surface facing the image surface side of the front lens is 0.8 mm or more.

According to the configuration, the lens diameter of the front lens can be reduced. Accordingly, the size of a periphery device such as an AF mechanism can be reduced. Therefore, it is possible to greatly reduce the size of the image capturing device unit. In addition, the diameter of the light beams increase as the distance between the image surface and the center becomes greater. As a result, a possibility that the foreign substance present in the vicinity of the front lens is visible on the captured image. Since the rear lens is significantly effective on the correction of the curvature of the image field, it is possible to correct the curvature of the image field sufficiently good even when the front lens is separated from the image surface.

An image capturing device according to another Aspect 4 of the present invention includes the imaging lens according to any one of another Aspects 1 to 3 above described; and an imaging element disposed on an image surface of the imaging lens, in which an aperture diaphragm, a first lens, a second lens, a third lens, a fourth lens, the front lens, and the rear lens are disposed in this order from an object side toward an image surface side, in which the first lens has positive refractive power, of which a surface facing the object side is a convex shape, in which the second lens is a meniscus lens having negative refractive power, of which a surface facing the object side is a convex shape, in which the third lens has positive refractive power, of which a surface facing the image surface side is the convex shape, in which the fourth lens is the meniscus lens having negative refractive power, of which a surface facing the object side is a concave shape, and in which, when it is assumed that a size of a sensor which is positioned diagonally to the imaging element is SDV, Expression (4) is satisfied:

$$0.7 < OTLV/SDV < 1.0 \qquad (4).$$

When OTLV/SDV is 1.0 or more, the image angle becomes narrower, and a case where the various aberrations are favorably corrected without using the rear lens can be generated. Accordingly, the condition of OTLV/SDV is 1.0 or more cannot be said to be the best choice in view of the technical idea of the present invention. When OTLV/SDV is 0.7 or less, the image angle becomes too wide, and there is a possibility that it is required to reconsider the conditions for correcting the various aberrations.

In another Aspect 4 above described, the image capturing device according to the another Aspect 5 of the present invention is configured such that an Abbe number of the second lens is 30 or less, and a refractive index of the fourth lens is 1.6 or more.

By applying the high dispersion material (30 or less of the Abbe number) to the second lens, the chromatic aberration can be favorably corrected. Accordingly, by applying a material with high refractive index (1.6 or more of the refractive index) to the fourth lens, there is an effect of the reducing the optical total length.

An imaging lens 1W according to the further still another Aspect 1 of the present invention is the imaging lens 1W for forming an image of an object on an image surface 18W and includes an upper lens 15W which includes a first lens 11W of which an object side is convex and which has a positive refractive index, a second lens 12W of which the object side is convex and which is formed by a meniscus lens, a third lens 13W of which the image surface 18W side is convex and which has the positive refractive index, and a fourth lens 14W which has the positive refractive index and in which a shape of the image surface 18W side has a point of inflection, in this order from the object side toward the image surface 18W side; and a lower lens 17W which is disposed on the image surface 18W side with respect to the upper lens 15W, and of which the object side is concave and the image surface 18W side is substantially plane, in which the shape of the surface of the object side in the lower lens 17W is a shape in which a change amount of the shape to the object side increases from a lens center toward an effective diameter edge, until a predetermined distance XW which is set as 30% or more of a distance between the lens center and the effective diameter edge, and the change amount of the shape to the object side is decreased when exceeding the predetermined distance XW, and in which a distance dW between the lower lens 17W and the image surface 18W is less than 0.15 times of the optical total length OTLW of the imaging lens 1W.

According to the configuration, by using the lower lens 17W of which the image surface 18W side is the substantially plane, an influence of an eccentric error in between the lenses can be reduced. Accordingly, the aberration correction effect can be improved as compared to a case where the aberration correction is performed by adding a bi-aspherical lens with respect to the upper lens 15W. In addition, by using the lower lens 17W of which the image surface 18W side is the substantially plane, since the lower lens 17W can approach the image surface independently of the design condition of the upper lens 15W, a configuration having little effect on the manufacturing error, which can be easily manufactured, can be obtained.

Further, by adopting the configuration in which the upper lens 15W is formed of four lenses, it is possible to reduce the height (size) of the configuration of the imaging lens 1W.

In addition, by setting the shape of the surface of the object side in the lower lens 17W to a shape in which a change amount of the shape to the object side increases from a lens center toward an effective diameter edge, until a predetermined distance XW which is set as 30% or more of a distance between the lens center and the effective diameter edge, and the change amount of the shape to the object side is decreased when exceeding the predetermined distance XW, the deterioration in the peripheral light amount ratio can be suppressed by increasing the incident angle of the light with respect to the image surface 18W.

In addition, by setting the distance between the lower lens 17W and the image surface 18W to less than 0.15 times of the optical total length OTLW of the imaging lens 1W, it is possible to effectively correct the curvature of the image filed by the lower lens 17W.

That is, according to the configuration, the imaging lens 1W, which is produced with high productivity and can be produced in a small-sized, with the high aberration correction performance and the peripheral light amount ratio can be provided.

In still another Aspect 1 above described, the imaging lens 1W according to the further another Aspect 2 of the present invention is configured such that the image surface 18W is a light receiving surface of an imaging element, and the light receiving surface has a substantially rectangular shape of which a diagonal length is defined as DW (mm), and when it is assumed that the optical total length of the imaging lens 1W is OTLW (mm), a focal distance of the whole imaging lens 1W is fW (mm), a focal distance of the fourth lens 14W is f4W (mm), and a focal distance of the lower lens 17W is fcW (mm), the following relationships are satisfied, $$0.7<OTLW/DW<0.9,$$

$$-5.7<f4W/fW<-2.9, \text{ and}$$

$$-1.8<fcW/fW<-1.2.$$

According to the configuration, by setting the above-described ratio OTLW/DW in the range of 0.7<OTLW/DW<0.9, it is possible to reduce the height (size) of the imaging lens 1W. In addition, by setting the ratio f4W/fW to −5.7<f4W/fW<−2.9, it is possible to improve the aberration correction performance while realizing a low height of the imaging lens 1W. By setting the ratio fcW/fW to −1.8<fcW/fW<−1.2, the size of the imaging lens 1W can be reduced, the correction performance of the curvature of the image field can be improved, and the incident angle of the light with respect to the image surface 18W can be reduced.

In addition, the imaging lens 1W according to the further still another Aspect 3 of the present invention is configured such that a distance from the upper lens 15W to the image surface 18W is less than 0.8 mm.

According to the configuration, the lens diameter is reduced, and it is possible to further reduce the size of the imaging lens 1W. In addition, since the light beam diameter becomes greater as farther away from the image surface 18W, it is possible to reduce the influence of the reflection of the foreign substance dust in the upper lens 15W.

In any one of the further still another Aspects 1 to 3 described above, the imaging lens 1W according to the further still another Aspect 4 of the present invention is configured to have an aperture diaphragm 10W which is provided at a position surrounding an effective aperture of a surface of the object side in the first lens 11W.

According to the configuration, it is possible to limit the diameter of a light beam incident on the imaging lens 1W by the aperture diaphragm 10W such that the light incident on the imaging lens 1W is appropriately passed the each lens.

An image capturing device according to further still another Aspect 5 of the present invention includes the imaging lens 1W according to any one of the further still another Aspects 1 to 4; and an imaging element which receives light passed through the imaging lens 1W and converts the received light into an electrical signal.

According to the configuration, the image capturing device including the imaging lens 1W, which is produced with high productivity and can be produced in a small-sized, with the high aberration correction performance and the peripheral light amount ratio can be obtained.

The present invention is not limited to the description of the embodiments above, but may be altered by a skilled person within the scope of the claims. An embodiment based on a proper combination of technical means disclosed in different embodiments is encompassed in the technical scope of the present invention. Furthermore, a new technical feature can be formed by a combination of technical means disclosed in the embodiments.

INDUSTRIAL APPLICABILITY

The present invention can be used in the lens element, the image capturing device, and the imaging lens. In particular, the present invention can be applied to the imaging lens and the image capturing device, and more particularly, can be appropriately applied to the image capturing device to be mounted on an electronic device such as a mobile device.

REFERENCE SIGNS LIST 1 lens element
2 imaging element
3 light receiving unit
4 laminate substrate (element storing unit)
4" mounting substrate
5 opening
6 top surface of laminate substrate
7 infrared ray-cutting glass
8 lens
9 flip-chip bond
10 mounting component
11 object
12 edge of image side surface
13 step portion
14 flange portion
15 end portion of step portion
16 space
17 projection portion
18 end portion of projection portion
19 gate cutting unit
20 bonding wire
21 sensor cover (element storing unit)
22 opening
23 flange stopper
24 top surface of flange stopper (top surface of element storing unit)
25 adhesive
26 additional laminate substrate
27 opening
28 side surface of lens element
29 top surface of additional laminate substrate
30 lens barrel
31 peripheral structure
32 point of inflection
33 projection portion
34 die
35 resin
36 resin molding material
37 molding die
38 substrate
39 image capturing device housing
40 coil
41 magnet
42 leaf spring
43 front lens group
44 side surface portion (inclination)
45 die (lower)
46 stray light
47 flip-chip substrate (element storing unit)
48 bump
49 micro lens group
50 light beam
51 air
52 projection portion
53 top surface of flip-chip substrate
54 space 55 element attachment portion
56 opening
57 film
58 point of inflection
59 gate
601 image capturing device
L1 object side surface
L2 image side surface
La optical axis
Ln normal direction
M0 aperture diaphragm
M1 first lens
M2 second lens
M3 third lens
M4 fourth lens
SL1 size of outer profile of object side surface
SL2 size of outer profile of image side surface
Z1 separation distance
1V image capturing device
2V, 100V, 200V, 300V, 400V, 500V, 600V, 700V, 800V, 900V imaging lens
3V imaging element
L0CV rear lens
L1V first lens
L2V second lens
L3V third lens
L4V fourth lens
L5V front lens
c9V center portion
p9V peripheral portion
s9V surface toward object side of front lens
c10V center portion
p10V peripheral portion
s10V surface facing image surface side of front lens
ct10V center of the surface facing image surface side of front lens
c13V center region of rear object side
m13V intermediate region of rear object side
s13V surface facing object side of rear lens
ct13V center of surface facing object side of rear lens
ed13V edge of surface facing object side of rear lens
s14V surface facing image surface side of rear lens
s15V image surface
1W imaging lens
11W first lens
12W second lens
13W third lens
14W fourth lens
15W upper lens
16W IR cut glass
17W lower lens
18W image surface
DW diagonal length of light receiving surface of imaging element
FBW focal distance of upper lens
OTLW optical total length of imaging lens
dW lower lens proximity distance
fW focal distance of whole of imaging lens
f4W focal distance of fourth lens
fcW focal distance of lower lens

The invention claimed is:
1. An image capturing device comprising:
a lens element including:
an object side surface facing an object side, which is an aspheric surface and a concave surface;
an image side surface facing an image surface side, which is substantially plane, in which a shape of an outer profile of the image side surface is substantially rectangular; and
a flange portion which is formed as a portion projected, in a normal direction of an optical axis of the lens element, from the object side surface facing the image side surface;
an imaging element which includes a light receiving unit for receiving light passed through the lens element;
an element storing unit which stores the imaging element;
a front lens portion which is formed of at least one lens and is disposed on the object side further than the lens element is; and
a movement mechanism which moves the front lens portion in a state where the lens element is fixed, wherein
the lens element is supported, by the flange portion and the element storing unit, at a position on the object side with respect to the image side surface, and
among the at least one lens which defines the front lens portion, a lens which is closest to the lens element has at least one surface having a point of inflection that is a boundary between a concave shape and a convex shape.
2. The image capturing device according to claim 1, wherein a lens barrel which stores the front lens portion is not provided.
3. The image capturing device according to claim 1, further comprising:
a mounting substrate on which the imaging element is mounted; and
a bonding wire for electrically connecting the imaging element with the mounting substrate,
wherein the bonding wire is not in contact with the lens element.
4. The image capturing device according to claim 1, wherein a separation distance between the flange portion and the image side surface along an optical axis of the lens element is 0.15 mm or more.
5. The image capturing device according to claim 1, wherein the image side surface is in contact with the imaging element in an optical axis direction of the lens element.
6. The image capturing device according to claim 1, wherein a projection portion is formed in the image side surface, and
wherein a distance between the image side surface and the imaging element is defined by an end portion of the projection portion contacting with the imaging element.
7. The image capturing device according to claim 1, wherein the lens element is placed on the element storing unit, and
wherein a distance between the image side surface and the imaging element is defined by the element storing unit contacting with the imaging element in the optical axis direction of the lens element.
8. The image capturing device according to claim 1, wherein the element storing unit has an opening which is opened in the optical axis direction of the lens element and in which the size of the opening is smaller than a size of the outer profile of the object side surface, and
wherein the object side surface is disposed on the image surface side further than the opening is.

9. An image capturing device comprising:
a lens element including:
an object side surface facing an object side, which is an aspheric surface and a concave surface;
an image side surface facing an image surface side, which is substantially plane, in which a shape of an outer profile of the image side surface is substantially rectangular;
a flange portion which is formed as a portion projected, in a normal direction of an optical axis of the lens element, from the object side surface facing the image side surface; and
a step portion formed as a portion projected along the optical axis of the lens element from the flange portion;
an imaging element which includes a light receiving unit for receiving light passed through the lens element; and
an element storing unit which stores the imaging element;
a front lens portion which is formed of at least one lens and is disposed on the object side further than the lens element is; and
a movement mechanism which moves the front lens portion in a state where the lens element is fixed, wherein
the lens element is supported, by the step portion and the element storing unit, at a position on the object side with respect to the image side surface, and
among the at least one lens which defines the front lens portion, a lens which is closest to the lens element has at least one surface having a point of inflection that is a boundary between a concave shape and a convex shape.

10. The image capturing device according to claim 9, wherein the element storing unit has a predetermined wiring pattern.

11. The image capturing device according to claim 10, wherein the flange portion is separated from the element storing unit in the optical axis direction of the lens element.

* * * * *